(12) United States Patent
Yang

(10) Patent No.: US 12,534,506 B2
(45) Date of Patent: Jan. 27, 2026

(54) COMPOSITION AND METHOD FOR ADOPTIVE IMMUNOTHERAPY

(71) Applicant: Wen Yang, Sharon, MA (US)

(72) Inventor: Wen Yang, Sharon, MA (US)

(*) Notice: Subject to any disclaimer, the term of this patent is extended or adjusted under 35 U.S.C. 154(b) by 1047 days.

(21) Appl. No.: 17/628,032

(22) PCT Filed: Jul. 22, 2020

(86) PCT No.: PCT/US2020/043072
§ 371 (c)(1),
(2) Date: Jan. 18, 2022

(87) PCT Pub. No.: WO2021/016353
PCT Pub. Date: Jan. 28, 2021

(65) Prior Publication Data
US 2022/0267405 A1     Aug. 25, 2022

Related U.S. Application Data

(60) Provisional application No. 63/044,059, filed on Jun. 25, 2020, provisional application No. 62/877,331, filed on Jul. 23, 2019.

(51) Int. Cl.
| | |
|---|---|
| C07K 14/725 | (2006.01) |
| A61K 40/11 | (2025.01) |
| A61K 40/30 | (2025.01) |
| A61K 40/31 | (2025.01) |
| A61K 40/32 | (2025.01) |
| A61K 40/42 | (2025.01) |
| C07K 14/705 | (2006.01) |
| C07K 16/30 | (2006.01) |
| C12N 5/0783 | (2010.01) |

(52) U.S. Cl.
CPC .......... *C07K 14/7051* (2013.01); *A61K 40/11* (2025.01); *A61K 40/31* (2025.01); *A61K 40/32* (2025.01); *A61K 40/4255* (2025.01); *A61K 40/4269* (2025.01); *C07K 14/70521* (2013.01); *C07K 14/70578* (2013.01); *C07K 16/30* (2013.01); *C12N 5/0636* (2013.01); *A61K 2239/31* (2023.05); *A61K 2239/38* (2023.05); *A61K 2239/46* (2023.05); *C07K 2319/02* (2013.01); *C07K 2319/03* (2013.01); *C07K 2319/33* (2013.01)

(58) Field of Classification Search
None
See application file for complete search history.

(56) References Cited

U.S. PATENT DOCUMENTS

| | | |
|---|---|---|
| 9,206,440 B2 | 12/2015 | Yang et al. |
| 10,550,176 B2 | 2/2020 | Yang et al. |
| 2016/0362472 A1 | 12/2016 | Bitter et al. |
| 2018/0044424 A1 | 2/2018 | June et al. |
| 2018/0353545 A1 | 12/2018 | Webster et al. |
| 2019/0055318 A1 | 2/2019 | Yankee et al. |
| 2019/0292238 A1 | 9/2019 | Bitter et al. |
| 2020/0063101 A1 | 2/2020 | Voss et al. |
| 2020/0085869 A1 | 3/2020 | Schuster et al. |
| 2020/0085872 A1 | 3/2020 | Rezvani et al. |

FOREIGN PATENT DOCUMENTS

| | | |
|---|---|---|
| CN | 105131126 A | 12/2015 |
| WO | 2005044996 A2 | 5/2005 |
| WO | 2010085660 A2 | 7/2010 |
| WO | 2016184592 A1 | 11/2016 |
| WO | 2017044661 A1 | 3/2017 |
| WO | 2018055140 A1 | 3/2018 |
| WO | 2018067993 A1 | 4/2018 |
| WO | 2018191490 A1 | 10/2018 |
| WO | 2018195339 A1 | 10/2018 |
| WO | 2020076156 A1 | 4/2020 |

OTHER PUBLICATIONS

Zhang et al., "Recombination of a dual-CAR-modified T lymphocyte to accurately eliminate pancreatic malignancy," Journal of Hematology & Oncology (2018); 11(102): 1-14.
Zhao et al., "Engineered TCR-T Cell Immunotherapy in Anticancer Precision Medicine: Pros and Cons," Frontiers in Immunology (2021); 12: 1-12.
Harris et al., "Comparison of T Cell Activities Mediated by Human TCRs and CARs That Use the Same Recognition Domains," J Immunol (2018); 200: 1088-1100.
Walsen et al., "A TCR-based Chimeric Antigen Receptor," Scientific Reports (2017); 7: 1-10.
Willemsen et al., "Grafting primary human T lymphocytes with cancerspecific chimeric single chain and two chain TCR", Gene Therapy (2000); 7(21): pp. 1369-1377, XP093065655.

*Primary Examiner* — Michail A Belyavskyi
(74) *Attorney, Agent, or Firm* — Fox Rothschild LLP

(57) ABSTRACT

The present invention relates to agents, compositions, and methods to confer and/or increase immune responses mediated by cellular immunotherapy.

10 Claims, 20 Drawing Sheets

Specification includes a Sequence Listing.

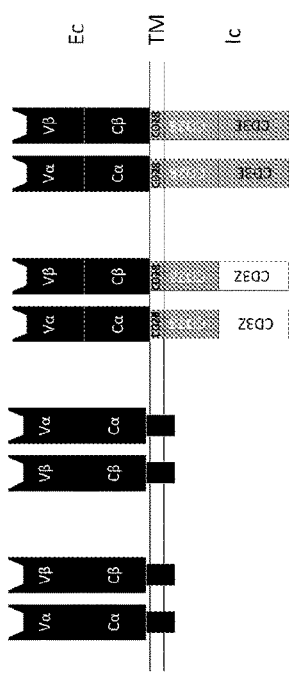
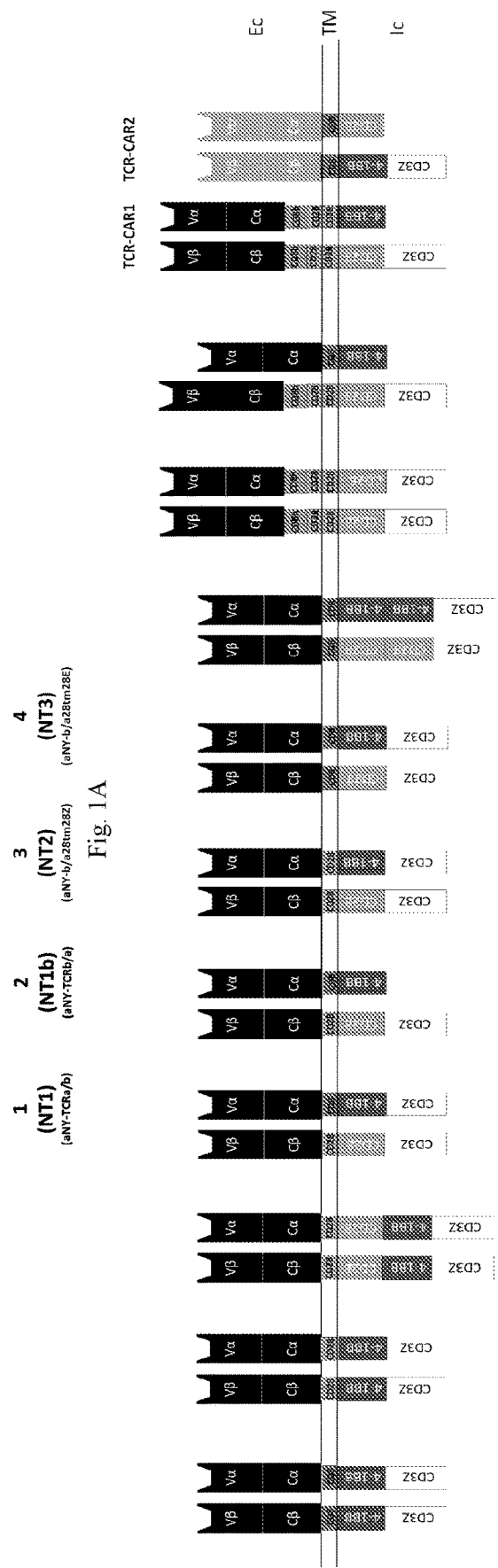
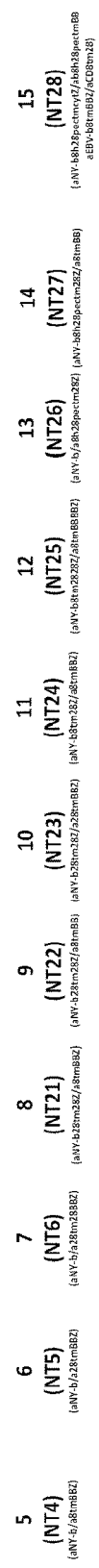
Fig. 1A
Fig. 1B

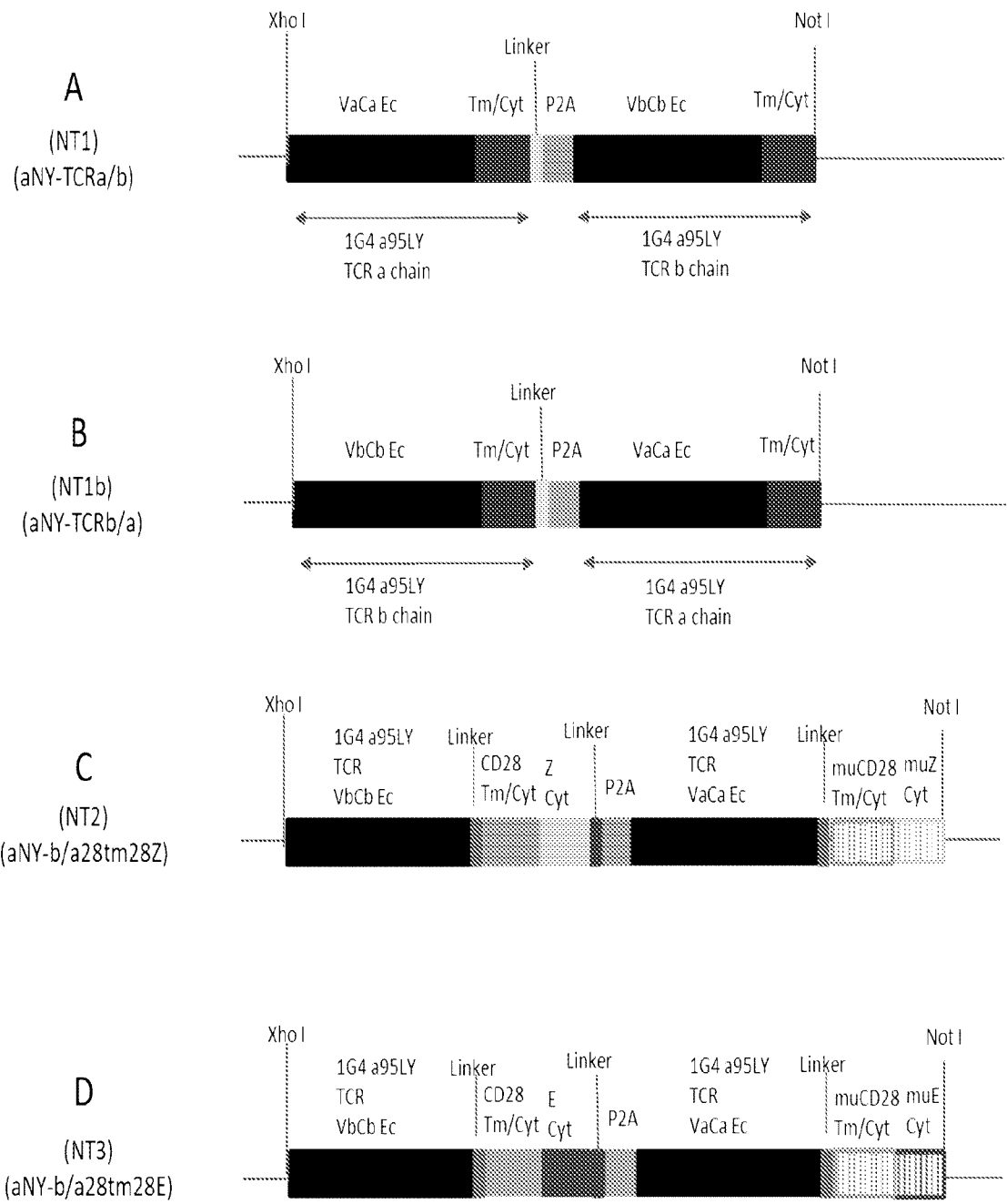
Figs. 2A, 2B, 2C, and 2D

| Sequence | Name | SEQ ID NO: |
|---|---|---|
| METLLGLLILWLQLQWVSSKQEVTQIPAALSVPEGENLVLNCSFTDSAIYNLQWFRQDPGKGLTSLLLIQSSQREQTSGRLNASLDKSSGRSTLYIAASQPGDSATYLCAVRPLYGGSYIPTFGRGTSLIVHPYIQNPDPAVYQLRDSKSSDKSVCLFTDFDSQTNVSQSKDSDVYITDKTVLDMRSMDFKSNSAVAWSNKSDFACANAFNNSIIPEDTFFPSPESS | 1G4-a95LYaEc | 4 |
| CDVKLVEKSFETDTNLNFQNLSVIGFRILLLKVAGFNLLMTLRLWSSR | 1G4-a95LYaTmCyt | 66 |
| AKRSGSG | linker | 67 |
| ATNFSLLKQAGDVEENPGP | P2A | 3 |
| MSIGLLCCAALSLLWAGPVNAGVTQTPKFQVLKTGQSMTLQCAQDMNHEYMSWYRQDPGMGLRLIHYSVGAGITDQGEVPNGYNVSRSTTEDFPLRLLSAAPSQTSVYFCASSYVGNTGELFFGEGSRLTVLEDLKNVFPPEVAVFEPSEAEISHTQKATLVCLATGFYPDHVELSWWVNGKEVHSGVSTDPQPLKEQPALNDSRYALSSRLRVSATFWQDPRNHFRCQVQFYGLSENDEWTQDRAKPVTQIVSAEAWGRAD | 1G4-a95LYbEc | 5 |
| CGFTSESYQQGVLSATILYEILLGKATLYAVLVSALVLMAMVKRKDSRG | 1G4-a95LYbTmCyt | 68 |

Fig. 3A

| Sequence | Name | SEQ ID NO: |
|---|---|---|
| MSIGLLCCAALSLLWAGPVNAGVTQTPKFQVLKTGQSMTLQCAQDMNHEYMSWYRQDPGMGLRLIHYSVGAGITDQGEVPNGYNVSRSTTEDFPLRLLSAAPSQTSVYFCASSYVGNTGELFFGEGSRLTVLEDLKNVFPPEVAVFEPSEAEISHTQKATLVCLATGFYPDHVELSWWVNGKEVHSGVSTDPQPLKEQPALNDSRYALSSRLRVSATFWQDPRNHFRCQVQFYGLSENDEWTQDRAKPVTQIVSAEAWGRAD | 1G4-a95LYbEc | 5 |
| CGFTSESYQQGVLSATILYEILLGKATLYAVLVSALVLMAMVKRKDSRG | 1G4-a95LYbTmCyt | 68 |
| AKRSGSG | linker | 67 |
| ATNFSLLKQAGDVEENPGP | P2A | 3 |
| METLLGLLILWLQLQWVSSKQEVTQIPAALSVPEGENLVLNCSFTDSAIYNLQWFRQDPGKGLTSLLLIQSSQREQTSGRLNASLDKSSGRSTLYIAASQPGDSATYLCAVRPLYGGSYIPTFGRGTSLIVHPYIQNPDPAVYQLRDSKSSDKSVCLFTDFDSQTNVSQSKDSDVYITDKTVLDMRSMDFKSNSAVAWSNKSDFACANAFNNSIIPEDTFFPSPESS | 1G4-a95LYaEc | 4 |
| CDVKLVEKSFETDTNLNFQNLSVIGFRILLLKVAGFNLLMTLRLWSSR | 1G4-a95LYaTmCyt | 66 |

Fig. 3B

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLIHYSVGAGITDQGEVPNGYNVSRSTTEDFPLRLLSAAP SQTSVYFCASSYVGNTGELFFGEGSRLTVLEDLKNVFPPEVAVFEPSEAEISHTQKATLVCLATGFYPDHVELSWWVNGKEVHSGVSTDPQPLKEQPALNDSRYAL SSRLRVSATFWQDPRNHFRCQVFYGLSENDEWTQDRAKPVTQIVSAEAWGRAD | 1G4-a95LY bEc (5) |
| GSPK | Linker (69) |
| FWVLVVVGGVLACYSLLVTVAFIIFWVRSKRSRLLHSDYMNMTPRRPGPTRKHYQPYAPPRDFAAYRS | CD28TmCyt (6) |
| RVKFSRSADAPAYQQGQGQNQLYNELNLGRREEYDVLDKRRGRDPEMGGKPRRKNPQEGLYNELQKDKMAEAYSEIGMKGERRRGKGHDGLYQGLSTATKDTYD ALHMQALPPR | Zcyt (7) |
| AKRSGSG ATNFSLLKQAGDVEENPGP | P2A (3) |
| METLLGLIILWLQLQWVSSKQEVTQIPAALSVPEGENLVLNCSFTDSAIYNLQWFRQDPGKGLTSLLLIQSSQREQTSGRLNASLDKSSGRSTLYIAASQPGDSATYL CAVRPLYGGSYIPTFGRGTSLIVHPYIQNPDPAVYQLRDSKSSDKSVCLFTDFDSQTNVSQSKDSDVYITDKTVLDMRSMDFKSNSAVAWSNKSDFACANAFNNSI IPEDTFFPSPESS | 1G4-a95LY aEc (4) |
| GSPK | Linker (69) |
| FWVLVVVGGVLACYSLLVTVAFIIFWVRSKRSRLLHSDYMNMTPRRPGPTRKHYQPYAPPRDFAAYRS | CD28TmCyt (6) |
| RVKFSRSADAPAYQQGQGQNQLYNELNLGRREEYDVLDKRRGRDPEMGGKPRRKNPQEGLYNELQKDKMAEAYSEIGMKGERRRGKGHDGLYQGLSTATKDTYD ALHMQALPPR | Zcyt (7) |

Fig. 4

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLIHYSVGAGITDQGEVPNGYNVSRSTTEDFPLRLLSAAP SQTSVYFCASSYVGNTGELFFGEGSRLTVLEDLKNVFPPEVAVFEPSEAEISHTQKATLVCLATGFYPDHVELSWWVNGKEVHSGVSTDPQPLKEQPALNDSRYAL SSRLRVSATFWQDPRNHFRCQVFYGLSENDEWTQDRAKPVTQIVSAEAWGRAD | 1G4-a95LY bEc (5) |
| GSPK | Linker (69) |
| FWVLVVVGGVLACYSLLVTVAFIIFWVRSKRSRLLHSDYMNMTPRRPGPTRKHYQPYAPPRDFAAYRS | CD28TmCyt (6) |
| KNRKAKAKPVTRGAGAGGRQRGQNKERPPPVPNPDYEPIRKGQRDLYSGLNQRRI | Ecyt (8) |
| AKRSGSG | Linker (67) |
| ATNFSLLKQAGDVEENPGP | P2A (3) |
| METLLGLIILWLQLQWVSSKQEVTQIPAALSVPEGENLVLNCSFTDSAIYNLQWFRQDPGKGLTSLLLIQSSQREQTSGRLNASLDKSSGRSTLYIAASQPGDSATYL CAVRPLYGGSYIPTFGRGTSLIVHPYIQNPDPAVYQLRDSKSSDKSVCLFTDFDSQTNVSQSKDSDVYITDKTVLDMRSMDFKSNSAVAWSNKSDFACANAFNNSII PEDTFFPSPESS | 1G4-a95LY aEc (4) |
| GSPK | Linker (69) |
| FWVLVVVGGVLACYSLLVTVAFIIFWVRSKRSRLLHSDYMNMTPRRPGPTRKHYQPYAPPRDFAAYRS | CD28TmCyt(6) |
| KNRKAKAKPVTRGAGAGGRQRGQNKERPPPVPNPDYEPIRKGQRDLYSGLNQRRI | Ecyt (8) |

Fig. 5

```
              F  W  V  L  V  V  V  G  G  V  L  A  C  Y  S  L  L  V  T  V
muhCD28TmCyt  TTCTGGGTTCTCGTCGTCGTGGGAGGTGTGTTAGCATGTTACTCTCTCTTGGTTACTGTC
hCD28TmCyt    TTTTGGGTGCTGGTGGTGGTTGGTGGAGTCCTGGCTTGCTATAGCTTGCTAGTAACAGTG
              **  *****  **  **  **  **  **  **  **    *  **  **  **       *    *  **  **  **

A  F  I  I  F  W  V  R  S  K  R  S  R  L  L  H  S  D  Y  M
muhCD28TmCyt  GCTTTCATAATCTTTTGGGTCCGCTCAAAACGCTCTCGCTTGTTACATTCCGATTATATG
hCD28TmCyt    GCCTTTATTATTTTCTGGGTGAGGAGTAAGAGGAGCAGGCTCCTGCACAGTGACTACATG
              **  **  **  **  **  *****    *    **  *       *    *    *  **    **  **  ***

N  M  T  P  R  R  P  G  P  T  R  K  H  Y  Q  P  Y  A  P  P
muhCD28TmCyt  AATATGACACCTAGGAGACCTGGCCCGACTAGGAAACACTATCAACCTTACGCACCTCCC
hCD28TmCyt    AACATGACTCCCCGCCGCCCCGGGCCCACCCGCAAGCATTACCAGCCCTATGCCCCACCA
              **  *****  **    *    *  **  **  **  **    *  **  **  **  **  **  **  **  **

R  D  F  A  A  Y  R  S
muhCD28TmCyt  AGAGATTTTGCTGCTTACAGGAGT
hCD28TmCyt    CGCGACTTCGCAGCCTATCGCTCC
              *  **  **  **  **  **    *
```

Fig. 6

```
              R  V  K  F  S  R  S  A  D  A  P  A  Y  Q  Q  G  Q  N  Q  L
muhCD3ZCyt    CGGGTCAAATTTTCACGCTCCGCTGATGCTCCTGCCTATCAACAAGGGCAAAATCAATTG
hCD3ZCyt      AGAGTGAAGTTCAGCAGGAGCGCAGACGCCCCCGCGTACCAGCAGGGCCAGAACCAGCTC
              *  **  **  **       *    ***  **  **  **  **  **  **  **  **  **  **  **    *

Y  N  E  L  N  L  G  R  R  E  E  Y  D  V  L  D  K  R  R  G
muhCD3ZCyt    TACAATGAATTGAACTTGGGTAGAAGGGAAGAATATGACGTGCTCGATAAACGGAGGGGG
hCD3ZCyt      TATAACGAGCTCAATCTAGGACGAAGAGAGGAGTACGATGTTTTGGACAAGAGACGTGGC
              **  **  **  *  **  **  *  **    ****  **  **  **  **    *  **  **    *    *  **

R  D  P  E  M  G  G  K  P  R  R  K  N  P  Q  E  G  L  Y  N
muhCD3ZCyt    AGAGATCCAGAAATGGGCGGTAAACCACGGCGCAAAAATCCACAAGAGGGATTGTATAAC
hCD3ZCyt      CGGGACCCTGAGATGGGGGGAAAGCCGAGAAGGAAGAACCCTCAGGAAGGCCTGTACAAT
              *  **  **  **  **  *****  **  **  **    *    *  **  **  **  **  **  **  ****  **

E  L  Q  K  D  K  M  A  E  A  Y  S  E  I  G  M  K  G  E  R
muhCD3ZCyt    GAGCTCCAAAAGGACAAAATGGCAGAAGCTTATTCAGAAATAGGAATGAAGGGGGAAAGG
hCD3ZCyt      GAACTGCAGAAAGATAAGATGGCGGAGGCCTACAGTGAGATTGGGATGAAAGGCGAGCGC
              **  **  **  **  **  **  **  *****  **  **  **        **  **  **  *****  **  **    *

R  R  G  K  G  H  D  G  L  Y  Q  G  L  S  T  A  T  K  D  T
muhCD3ZCyt    AGACGAGGTAAAGGTCATGACGGATTGTATCAAGGATTGTCAACCGCTACTAAAGATACA
hCD3ZCyt      CGGAGGGGCAAGGGGCACGATGGCCTTTACCAGGGTCTCAGTACAGCCACCAAGGACACC
              *    *  **  **  **  **  **  **  **    *  **  **  **    *       **  **  **  **  **

Y  D  A  L  H  M  Q  A  L  P  P  R
muhCD3ZCyt    TATGATGCTTTGCATATGCAAGCTTTGCCTCCCAGA
hCD3ZCyt      TACGACGCCCTTCACATGCAGGCCCTGCCCCCTCGC
              **  **  **    *  **  *****  **  ****  **    *
```

Fig. 7

```
                              F  W  V  L  V  V  V  G  G  V  L  A  C  Y  S  L  L
muhCD28TmCytmuCD3ZCyt         TTCTGGGTTCTCGTCGTCGTGGGAGGTGTGTTAGCATGTTACTCTCTCTT
hCD28TmCytCD3ZCyt             TTTTGGGTGCTGGTGGTGGTTGGTGGAGTCCTGGCTTGCTATAGCTTGCT
                              ** ***** ** ** ** ** ** ** *  ** ** **      *   *

V  T  V  A  F  I  I  F  W  V  R  S  K  R  S  R  L
muhCD28TmCytmuCD3ZCyt         GGTTACTGTCGCTTTCATAATCTTTTGGGTCCGCTCAAAACGCTCTCGCT
hCD28TmCytCD3ZCyt             AGTAACAGTGGCCTTTATTATTTTCTGGGTGAGGAGTAAGAGGAGCAGGC
                              ** ** ** ** ** ** ** ** *****  *    ** *       *

L  H  S  D  Y  M  N  M  T  P  R  R  P  G  P  T
muhCD28TmCytmuCD3ZCyt         TGTTACATTCCGATTATATGAATATGACACCTAGGAGACCTGGCCCCGACT
hCD28TmCytCD3ZCyt             TCCTGCACAGTGACTACATGAACATGACTCCCCGCCGCCCCGGGCCCACC
                              *  *  **   ** ** ***** ***** **   *  ** **  ** **

R  K  H  Y  Q  P  Y  A  P  P  R  D  F  A  A  Y  R
muhCD28TmCytmuCD3ZCyt         AGGAAACACTATCAACCTTACGCACCTCCCAGAGATTTTGCTGCTTACAG
hCD28TmCytCD3ZCyt             CGCAAGCATTACCAGCCCTATGCCCCACCACGCGACTTCGCAGCCTATCG
                              * ** ** ** ** ** ** ** **   **    * ** ** ** ** *

S  R  V  K  F  S  R  S  A  D  A  P  A  Y  Q  Q  G
muhCD28TmCytmuCD3ZCyt         GAGTCGGGTCAAATTTTCACGCTCCGCTGATGCTCCTGCCTATCAACAAG
hCD28TmCytCD3ZCyt             CTCCAGAGTGAAGTTCAGCAGGAGCGCAGACGCCCCCGCGTACCAGCAGG
                              *  ** **  **        *  *** ** ** ** ** ** ** ** *

Q  N  Q  L  Y  N  E  L  N  L  G  R  R  E  E  Y
muhCD28TmCytmuCD3ZCyt         GGCAAAATCAATTGTACAATGAATTGAACTTGGGTAGAAGGGAAGAATAT
hCD28TmCytCD3ZCyt             GCCAGAACCAGCTCTATAACGAGCTCAATCTAGGACGAAGAGAGGAGTAC
                              * ** ** ** ** * ** ** ** ** ** **** ** ** ** **

D  V  L  D  K  R  R  G  R  D  P  E  M  G  G  K  P
muhCD28TmCytmuCD3ZCyt         GACGTGCTCGATAAACGGAGGGGGAGAGATCCAGAAATGGGCGGTAAACC
hCD28TmCytCD3ZCyt             GATGTTTTGGACAAGAGACGTGGCCGGGACCCTGAGATGGGGGGAAAGCC
                              ** **  * *  ** **   *    * ** ** ** ***** ** ** **

R  R  K  N  P  Q  E  G  L  Y  N  E  L  Q  K  D  K
muhCD28TmCytmuCD3ZCyt         ACGGCGCAAAAATCCACAAGAGGGATTGTATAACGAGCTCCAAAAGGACA
hCD28TmCytCD3ZCyt             GAGAAGGAAGAACCCTCAGGAAGGCCTGTACAATGAACTGCAGAAAGATA
                              * * ** ** ** ** ** ** **     ***** ** ** ** ** * *

M  A  E  A  Y  S  E  I  G  M  K  G  E  R  R  R
muhCD28TmCytmuCD3ZCyt         AAATGGCAGAAGCTTATTCAGAAATAGGAATGAAGGGGGAAAGGAGACGA
hCD28TmCytCD3ZCyt             AGATGGCGGAGGCCTACAGTGAGATTGGGATGAAAGGCGAGCGCCGGAGG
                              * ***** ** **  ** **   ** ** ***** **  **  *  *  *

G  K  G  H  D  G  L  Y  Q  G  L  S  T  A  T  K  D
muhCD28TmCytmuCD3ZCyt         GGTAAAGGTCATGACGGATTGTATCAAGGATTGTCAACCGCTACTAAAGA
hCD28TmCytCD3ZCyt             GGCAAGGGCACGATGGCCTTTACCAGGGTCTCAGTACAGCCACCAAGGA
                              ** ** ** ** ** **  *  *    ** ** **   *  ** ** **

T  Y  D  A  L  H  M  Q  A  L  P  P  R
muhCD28TmCytmuCD3ZCyt         TACATATGATGCTTTGCATATGCAAGCTTTGCCTCCCAGA
hCD28TmCytCD3ZCyt             CACCTACGACGCCCTTCACATGCAGGCCCTGCCCCCTCGC
                              ** **  ** ** *  ** ***** **   **** **
```

Fig. 8

```
                                K  N  R  K  A  K  A  K  P  V  T  R  G  A  G  A  G
MuCD3ECyt                       AAAAACCGCAAAGCTAAAGCTAAACCCGTCACTAGGGGGGCCGGAGCAGG
hCD3ECyt_C119_NM_000733.1       AAGAATAGAAAGGCCAAGGCCAAGCCTGTGACACGAGGAGCGGGTGCTGG
                                **  **    *  **  **  **  **  **  **  **   *  **  **  **  **  **  **  **

G  R  Q  R  G  Q  N  K  E  R  P  P  P  V  P  N  P
MuCD3ECyt                       AGGGCGCCAGCGCGGTCAGAATAAAGAACGCCCTCCTCCCGTCCCTAATC
hCD3ECyt_C119_NM_000733.1       CGGCAGGCAAAGGGGACAAAACAAGGAGAGGCCACCACCTGTTCCCAACC
                                 **   *  **   *  **  **  **  **  **  **  **   *  **  **  **  **  **  *

D  Y  E  P  I  R  K  G  Q  R  D  L  Y  S  G  L
MuCD3ECyt                       CTGATTACGAACCGATTAGAAAGGGGCAAAGAGATCTCTACAGCGGACTC
hCD3ECyt_C119_NM_000733.1       CAGACTATGAGCCCATCCGcAAAGGCCAGCGGGACCTGTATTCTGGCCTG
                                 *  **  **  **  **  **   *  **  **  **   *  **  **  **        **  **

N  Q  R  R  I
MuCD3ECyt                       AACCAACGGAGAATT
hCD3ECyt_C119_NM_000733.1       AATCAGAGACGCATC
                                **  **    *   *  **
```

Fig. 9

```
                         R  V  K  F  S  R  S  A  D  A  P  A  Y  Q  Q  G  Q  N  Q  L
a.a. seq.
hCD3ZCyt       1         AGAGTGAAGTTCAGCAGGAGCGCAGACGCCCCCGCGTACCAGCAGGGCCAGAACCAGCTC
                         |      ||  ||  ||        |         |||  ||  ||  ||  ||  ||  ||  ||  ||  ||  ||       |
Mu2hCD3ZCyt    1         CGGGTCAAATTTTCACGCTCCGCTGATGCTCCTGCCTATCAACAAGGGCAAAATCAATTG Y  N  E  L  N  L  G  R  R  E  E  Y  D  V  L  D  K  R  R  G
a.a. seq.
hCD3ZCyt      61         TATAACGAGCTCAATCTAGGACGAAGAGAGGAGTACGATGTTTTGGACAAGAGACGTGGC
                         ||  ||  ||    |  ||    |  ||     ||||  ||  ||  ||  ||  ||    |  ||  ||    |    |  ||
Mu2hCD3ZCyt   61         TACAATGAATTGAACTTGGGTAGAAGGGAAGAATATGACGTGCTCGATAAACGGAGGGGG R  D  P  E  M  G  G  K  P  R  R  K  N  P  Q  E  G     LY  N
a.a. seq.
hCD3ZCyt     121         CGGGACCCTGAGATGGGGGGAAAGCCGAGAAGGAAGAACCCTCAGGAAGGCCTGTACAAT
                         |  ||  ||  ||  ||||||  ||  ||  ||     |   |  ||  ||  ||  ||  ||      ||||  ||
Mu2hCD3ZCyt  121         AGAGATCCAGAAATGGGCGGTAAACCACGGCGCAAAAATCCACAAGAGGGATTGTATAAC E  L  Q  K  D  K  M  A  E  A  Y  S  E  I  G  M  K  G  E  R
a.a. seq.
hCD3ZCyt     181         GAACTGCAGAAAGATAAGATGGCGGAGGCCTACAGTGAGATTGGGATGAAAGGCGAGCGC
                         ||  ||  ||  ||  ||  ||  ||  ||||||  ||  ||  ||       ||  ||  ||  ||||||  ||  ||    |
Mu2hCD3ZCyt  181         GAGCTCCAAAAGGACAAAATGGCAGAAGCTTATTCAGAAATAGGAATGAAGGGGGAAAGG R  R  G  K  G  H  D  G  L  Y  Q  G  L  S  T  A  T  K  D  T
a.a. seq.
hCD3ZCyt     241         CGGAGGGGCAAGGGGCACGATGGCCTTTACCAGGGTCTCAGTACAGCCACCAAGGACACC
                         |    |  |||  ||  ||  ||  ||  ||  |  ||  ||  ||       ||  ||  ||  ||  ||  ||  ||
Mu2hCD3ZCyt  241         AGACGAGGTAAAGGTCATGACGGATTGTATCAAGGATTGTCAACCGCTACTAAAGATACA Y  D  A  L  H  M  Q  A  L  P  P  R
a.a. seq.
hCD3ZCyt     301         TACGACGCCCTTCACATGCAGGCCCTGCCCCCTCGC       336
                         ||  ||  ||     |  ||  ||||||  ||     ||||  ||         |
Mu2hCD3ZCyt  301         TATGATGCTTTGCATATGCAAGCTTTGCCTCCCAGA       336
```

Fig. 10

```
a.a. seq.            F   W   V   L   V   V   V   G   G   V   L   A   C   Y   S   L   L   V   T   V
CD28Tm      1    TTTTGGGTGCTGGTGGTGGTTGGTGGAGTCCTGGCTTGCTATAGCTTGCTAGTAACAGTG
                 ||  ||||||  ||  ||  ||  ||  ||  ||  ||   |  |||  ||  ||       |    |  ||  ||  ||
mu2CD28Tm   1    TTCTGGGTTCTCGTCGTCGTGGGAGGTGTGTTAGCATGTTACTCTCTCTTGGTTACTGTC a.a. seq.            A   F   I   I   F   W   V
CD28Tm      61   GCCTTTATTATTTTCTGGGTG      81
                 ||  ||  ||  ||  ||  |||||
mu2CD28Tm   61   GCTTTCATAATCTTTTGGGTC      81
```

Fig. 11

```
a.a. seq.            R   S   K   R   S   R   L   L   H   S   D   Y   M   N   M   T   P   R   R
hCD28Cyt    1    AGGAGTAAGAGGAGCAGGCTCCTGCACAGTGACTACATGAACATGACTCCCCGCCGC
                   |      ||       |    |    |   ||     || || |||||  |||||  |    |
mu2hCD28Cyt 1    CGCTCAAAACGCTCTCGCTTGTTACATTCCGATTATATGAATATGACACCTAGGAGA a.a. seq.            P   G   P   T   R   K   H   Y   Q   P   Y   A   P   P   R   D   F   A   A   Y
hCD28Cyt    58   CCCGGGCCCACCCGCAAGCATTACCAGCCCTATGCCCCACCACGCGACTTCGCAGCCTAT
                 ||  ||  ||  ||   |  ||  ||  ||  ||  ||  ||  ||  ||   |  ||  ||  ||  ||
mu2hCD28Cyt 58   CCTGGCCCCGACTAGGAAACACTATCAACCTTACGCACCTCCCAGAGATTTTGCTGCTTAC a.a. seq.            R   S
hCD28Cyt    118  CGCTCC    123
                     |
mu2hCD28Cyt 118  AGGAGT    123
```

Fig. 12

```
a.a. seq.            K   R   G   R   K   K   L   L   Y   I   F   K   Q   P   F   M   R   P   V   Q
hBBCyt      1    AAACGGGGCAGAAAGAAACTCCTGTATATATTCAAACAACCATTTATGAGACCAGTACAA
                 ||   |  ||    |  ||  ||  ||  ||  ||  ||  ||  ||  ||  |||  ||  ||  ||
muhBBCyt    1    AAGAGAGGGCGTAAAAAGCTGCTCTACATCTTTAAGCAGCCTTTCATGCGTCCTGTTCAG a.a. seq.            T   T   Q   E   E   D   G   C   S   C   R   F   P   E   E   E   E   G   G   C
hBBCyt      61   ACTACTCAAGAGGAAGATGGCTGTAGCTGCCGATTTCCAGAAGAAGAAGAAGGAGGATGT
                 ||  ||  ||  ||  ||  ||  ||  ||       |||  |  ||  ||  ||  ||  ||  ||  ||
muhBBCyt    61   ACAACACAGGAAGAGGACGGATGCTCTTGCAGGTTCCCTGAGGAGGAGGGTGGTTGC a.a. seq.            E   L
hBBCyt      121  GAACTG    126
                 ||  ||
muhBBCyt121      GAGCTC    126
```

Fig. 13

```
a.a. seq.        A  K  P  T  T  T  P  A  P  R  P  P  T  P  A  P  T  I  A  S

CD8hinge    1    GCTAAGCCCACCACGACGCCAGCGCCGCGACCACCAACACCGGCGCCCACCATCGCGTCG
                 ||  ||  ||  ||  ||  ||  ||  ||  ||   |  ||  ||  ||  ||  ||  ||  ||  ||
mu2CD8hinge 1    GCAAAACCGACGACCACCCCTGCCCCCAGGCCTCCTACTCCCGCCCCGACGATTGCCAGC a.a. seq.        Q  P  L  S  L  R  P  E  A  C  P  P  A  A  G  G  A  V  H  T CD8hinge    61   CAGCCCCTGTCCCTGCGCCCAGAGGCGTGCCGGCCAGCGGCGGGGGGCGCAGTGCACACG
                 ||  ||   |        |    |  ||  ||  ||  ||   |  ||  ||  ||  ||  ||  ||  ||  ||
mu2CD8hinge 61   CAACCGTTAAGTTTAAGACCGGAAGCATGTAGACCGGCAGCTGGTGGGGCTGTTCATACA a.a. seq.        R  G  L  D  F  A CD8hinge    121  AGGGGGCTGGACTTCGCC       138
                    |  ||    |   ||  ||  ||
mu2CD8hinge 121  CGTGGCTTAGATTTTGCG       138
```

Fig. 14

```
a.a. seq.     C  D  I  Y  I  W  A  P  L  A  G  T  C  G  V  L  L  L  S  L hCD8Tm   1    TGTGATATCTACATCTGGGCGCCCTTGGCCGGGACTTGTGGGGTCCTTCTCCTGTCACTG    60
              ||  ||  ||  ||  ||  ||||||  ||   |  ||  ||  ||  ||  ||  ||   |   |  ||       ||
muhCD8Tm 1    TGCGACATTTATATTTGGGCCCCTCTCGCTGGCACATGCGGCGTGTTGTTGCTCAGCCTC    60 a.a. seq.     V  I  T  L  Y  C hCD8Tm   61   GTTATCACCCTTTACTGC     78
              ||  ||  ||  ||||||  ||
muhCD8Tm 61   GTGATTACACTTTATTGT     78
```

Fig. 15

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRL IHYSVGAGITDQGEVPNGYNVSRSTTEDFPLRLLSAAPSQTSVYFCASSYVGNTGELFFGEGSRLTVLED LKNVFPPEVAVFEPSEAEISHTQKATLVCLATGFYPDHVELSWWVNGKEVHSGVSTDPQPLKEQPAL NDSRYALSSRLRVSATFWQDPRNHFRCQVQFYGLSENDEWTQDRAKPVTQIVSAEAWGRAD | 1G4-a95LY bEc (5) |
| GSPK | linker (69) |
| CDIYIWAPLAGTCGVLLLSLVITLYC | CD8tm (31) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKD KMAEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLI QSSQREQTSGRLNASLDKSSGRSTLYIAASQPGDSATYLCAVRPLYGGSYIPTFGRGTSLIVHPYIQNPD PAVYQLRDSKSSDKSVCLFTDFDSQTNVSQSKDSDVYITDKTVLDMRSMDFKSNSAVAWSNKSDFAC ANAFNNSIIPEDTFFPSPESS | 1G4-a95LY aEc (4) |
| GSPK | linker (69) |
| CDIYIWAPLAGTCGVLLLSLVITLYC | CD8tm (31) |

Fig. 16

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLI HYSVGAGITDQGEVPNGYNVSRSTTEDFPLRLLSAAPSQTSVYFCASSYVGNTGELFFGEGSRLTVLEDL KNVFPPEVAVFEPSEAEISHTQKATLVCLATGFYPDHVELSWWVNGKEVHSGVSTDPQPLKEQPALND SRYALSSRLRVSATFWQDPRNHFRCQVQFYGLSENDEWTQDRAKPVTQIVSAEAWGRAD | 1G4-a95LY bEc (5) |
| GSPK | linker (69) |
| FWVLVVVGGVLACYSLLVTVAFIIFWV | CD28tm (27) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKDK MAEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLIQ SSQREQTSGRLNASLDKSSGRSTLYIAASQPGDSATYLCAVRPLYGGSYIPTFGRGTSLIVHPYIQNPDPA VYQLRDSKSSDKSVCLFTDFDSQTNVSQSKDSDVYITDKTVLDMRSMDFKSNSAVAWSNKSDFACAN AFNNSIIPEDTFFPSPESS | 1G4-a95LY aEc (4) |
| GSPK | linker (69) |
| FWVLVVVGGVLACYSLLVTVAFIIFWV | CD28tm (27) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKDK MAEAYSEIGMKGERRRGKGHDGLYQGLSTATKDTYDALHMQALPPR | Zcyt (7) |

Fig. 17

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLIHY SVGAGITDQGEVPNGYNVSRSTTEDFPLRLLSAAPSQTSVYFCASSYVGNTGELFFGEGSRLTVLEDLKNVF PPEVAVFEPSEAEISHTQKATLVCLATGFYPDHVELSWWVNGKEVHSGVSTDPQPLKEQPALNDSRYALSS RLRVSATFWQDPRNHFRCQVQFYGLSENDEWTQDRAKPVTQIVSAEAWGRAD | 1G4-a95LY bEc (5) |
| GSPK | linker (69) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKDKM AEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLIQSS QREQTSGRLNASLDKSSGRSTLYIAASQPGDSATYLCAVRPLYGGSYIPTFGRGTSLIVHPYIQNPDPAVYQL RDSKSSDKSVCLFTDFDSQTNVSQSKDSDVYITDKTVLDMRSMDFKSNSAVAWSNKSDFACANAFNNSII PEDTFFPSPESS | 1G4-a95LY aEc (4) |
| GSPK | linker (69) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKDKM AEAYSEIGMKGERRRGKGHDGLYQGLSTATKDTYDALHMQALPPR | Zcyt (7) |

Fig. 18

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLI HYSVGAGITDQGEVPNGYNVSRSTTEDFPLRLLSAAPSQTSVYFCASSYVGNTGELFFGEGSRLTVLEDLK NVFPPEVAVFEPSEAEISHTQKATLVCLATGFYPDHVELSWWVNGKEVHSGVSTDPQPLKEQPALNDSR YALSSRLRVSATFWQDPRNHFRCQVQFYGLSENDEWTQDRAKPVTQIVSAEAWGRAD | 1G4-a95LY bEc (5) |
| GSPK | linker (69) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKDK MAEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLIQ SSQREQTSGRLNASLDKSSGRSTLYIAASQPGDSATYLCAVRPLYGGSYIPTFGRGTSLIVHPYIQNPDPAV YQLRDSKSSDKSVCLFTDFDSQTNVSQSKDSDVYITDKTVLDMRSMDFKSNSAVAWSNKSDFACANAF NNSIIPEDTFFPSPESS | 1G4-a95LY aEc (4) |
| GSPK | linker (69) |
| CDIYIWAPLAGTCGVLLLSLVITLYC | CD8tm (31) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKDK MAEAYSEIGMKGERRRGKGHDGLYQGLSTATKDTYDALHMQALPPR | Zcyt (7) |

Fig. 19

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLIHYSV GAGITDQGEVPNGYNVSRSTTEDFPLRLLSAAPSQTSVYFCASSYVGNTGELFFGEGSRLTVLEDLKNVFPPEVA VFEPSEAEISHTQKATLVCLATGFYPDHVELSWWVNGKEVHSGVSTDPQPLKEQPALNDSRYALSSRLRVSATF WQDPRNHFRCQVQFYGLSENDEWTQDRAKPVTQIVSAEAWGRAD | 1G4-a95LY bEc (5) |
| GSPK | linker (69) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKDKMAEA YSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLIQSSQR EQTSGRLNASLDKSSGRSTLYIAASQPGDSATYLCAVRPLYGGSYIPTFGRGTSLIVHPYIQNPDPAVYQLRDSKS SDKSVCLFTDFDSQTNVSQSKDSDVYITDKTVLDMRSMDFKSNSAVAWSNKSDFACANAFNNSIIPEDTFFPS PESS | 1G4-a95LY aEc (4) |
| GSPK | linker (69) |
| CDIYIWAPLAGTCGVLLLSLVITLYC | CD8tm (31) |
| KRGRKKLLYIFKQPFMRPVQTTQEEDGCSCRFPEEEEGGCEL | BBcyt (29) |

Fig. 20

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLIHYSV GAGITDQGEVPNGYNVSRSTTEDFPLRLLSAAPSQTSVYFCASSYVGNTGELFFGEGSRLTVLEDLKNVFPPEVA VFEPSEAEISHTQKATLVCLATGFYPDHVELSWWVNGKEVHSGVSTDPQPLKEQPALNDSRYALSSRLRVSATF WQDPRNHFRCQVQFYGLSENDEWTQDRAKPVTQIVSAEAWGRAD | 1G4-a95LY bEc (5) |
| GSPK | linker (69) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKDKMAEA YSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLIQSSQR EQTSGRLNASLDKSSGRSTLYIAASQPGDSATYLCAVRPLYGGSYIPTFGRGTSLIVHPYIQNPDPAVYQLRDSKS SDKSVCLFTDFDSQTNVSQSKDSDVYITDKTVLDMRSMDFKSNSAVAWSNKSDFACANAFNNSIIPEDTFFPS PESS | 1G4-a95LY aEc (4) |
| GSPK | linker (69) |
| FWVLVVVGGVLACYSLLVTVAFIIFWV | CD28tm (27) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKDKMAEA YSEIGMKGERRRGKGHDGLYQGLSTATKDTYDALHMQALPPR | Zcyt (7) |

Fig. 21

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLI HYSVGAGITDQGEVPNGYNVSRSTTEDFPLRLLSAAPSQTSVYFCASSYVGNTGELFFGEGSRLTVLEDL KNVFPPEVAVFEPSEAEISHTQKATLVCLATGFYPDHVELSWWVNGKEVHSGVSTDPQPLKEQPALND SRYALSSRLRVSATFWQDPRNHFRCQVQFYGLSENDEWTQDRAKPVTQIVSAEAWGRAD | 1G4-a95LY bEc (5) |
| GSPK | linker (69) |
| CDIYIWAPLAGTCGVLLLSLVITLYC | CD8tm (31) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKDK MAEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLIQ SSQREQTSGRLNASLDKSSGRSTLYIAASQPGDSATYLCAVRPLYGGSYIPTFGRGTSLIVHPYIQNPDPA VYQLRDSKSSDKSVCLFTDFDSQTNVSQSKDSDVYITDKTVLDMRSMDFKSNSAVAWSNKSDFACANA FNNSIIPEDTFFPSPESS | 1G4-a95LY aEc (4) |
| GSPK | linker (69) |
| CDIYIWAPLAGTCGVLLLSLVITLYC | CD8tm (31) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKDK MAEAYSEIGMKGERRRGKGHDGLYQGLSTATKDTYDALHMQALPPR | Zcyt (7) |

Fig. 22

| Sequence | Name (SEQ ID NO) |
|---|---|
| MSIGLLCCAALSLLWAGPVNAGVTQTPKFQVLKTGQSMTLQCAQDMNHEYMSWYRQDPGMGLR LIHYSVGAGITDQGEVPNGYNVSRSTTEDFPLRLLSAAPSQTSVYFCASSYVGNTGELFFGEGSRLTVLE DLKNVFPPEVAVFEPSEAEISHTQKATLVCLATGFYPDHVELSWWVNGKEVHSGVSTDPQPLKEQPA LNDSRYALSSRLRVSATFWQDPRNHFRCQVQFYGLSENDEWTQDRAKPVTQIVSAEAWGRAD | 1G4-a95LY bEc (5) |
| GSPK | linker (69) |
| CDIYIWAPLAGTCGVLLLSLVITLYC | CD8tm (31) |
| RSKRSRLLHSDYMNMTPRRPGPTRKHYQPYAPPRDFAAYRS | CD28cyt (28) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKD KMAEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLI QSSQREQTSGRLNASLDKSSGRSTLYIAASQPGDSATYLCAVRPLYGGSYIPTFGRGTSLIVHPYIQNPD PAVYQLRDSKSSDKSVCLFTDFDSQTNVSQSKDSDVYITDKTVLDMRSMDFKSNSAVAWSNKSDFAC ANAFNNSIIPEDTFFPSPESS | 1G4-a95LY aEc (4) |
| GSPK | linker (69) |
| CDIYIWAPLAGTCGVLLLSLVITLYC | CD8tm (31) |
| KRGRKKLLYIFKQPFMRPVQTTQEEDGCSCRFPEEEEGGCEL | BBcyt (29) |
| KRGRKKLLYIFKQPFMRPVQTTQEEDGCSCRFPEEEEGGCEL | BBcyt (29) |
| RVKFSRSADAPAYQQGQNQLYNELNLGRREEYDVLDKRRGRDPEMGGKPRRKNPQEGLYNELQKD KMAEAYSEIGMKGERRRGKGHDGLYQGLSTATKDTYDALHMQALPPR | Zcyt (7) |

Fig. 23

| Sequence | Name (SEQ ID NO) |
|---|---|
| MSIGLLCCAALSLLWAGPVNAGVTQTPKFQVLKTGQSMTLQCAQDMNHEYMSWYRQDPGMGLRLIH YSVGAGITDQGEVPNGYNVSRSTTEDFPLRLLSAAPSQTSVYFCASSYVGNTGELFFGEGSRLTVLEDLKN VFPPEVAVFEPSEAEISHTQKATLVCLATGFYPDHVELSWWVNGKEVHSGVSTDPQPLKEQPALNDSRY ALSSRLRVSATFWQDPRNHFRCQVQFYGLSENDEWTQDRAKPVTQIVSAEAWGRAD | 1G4-a95LY bEc (5) |
| GSPK | linker (69) |
| AKPTTTPAPRPPTPAPTIASQPLSLRPEACRPAAGGAVHTRGLDFA | CD8hinge (30) |
| PR | Linker (AvrII site) (70) |
| KIEVMYPPPYLDNEKSNGTIIHVKGKHLCPSPLFPGPSKP | CD28pec (26) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKDKM AEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLIQS SQREQTSGRLNASLDKSSGRSTLYIAASQPGDSATYLCAVRPLYGGSYIPTFGRGTSLIVHPYIQNPDPAVY QLRDSKSSDKSVCLFTDFDSQTNVSQSKDSDVYITDKTVLDMRSMDFKSNSAVAWSNKSDFACANAFN NSIIPEDTFFPSPESS | 1G4-a95LY aEc (4) |
| GSPK | linker (69) |
| AKPTTTPAPRPPTPAPTIASQPLSLRPEACRPAAGGAVHTRGLDFA | CD8hinge (30) |
| PR | Linker (AvrII site) (70) |
| KIEVMYPPPYLDNEKSNGTIIHVKGKHLCPSPLFPGPSKP | CD28pec (26) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKDKM AEAYSEIGMKGERRRGKGHDGLYQGLSTATKDTYDALHMQALPPR | Zcyt (7) |

Fig. 24

| Sequence | Name (SEQ ID NO) |
|---|---|
| MSIGLLCCAALSLLWAGPVNAGVTQTPKFQVLKTGQSMTLQCAQDMNHEYMSWYRQDPGMGLR LIHYSVGAGITDQGEVPNGYNVSRSTTEDFPLRLLSAAPSQTSVYFCASSYVGNTGELFFGEGSRLTVL EDLKNVFPPEVAVFEPSEAEISHTQKATLVCLATGFYPDHVELSWWVNGKEVHSGVSTDPQPLKEQP ALNDSRYALSSRLRVSATFWQDPRNHFRCQVQFYGLSENDEWTQDRAKPVTQIVSAEAWGRAD | 1G4-a95LY bEc (5) |
| GSPK | linker (69) |
| AKPTTTPAPRPPTPAPTIASQPLSLRPEACRPAAGGAVHTRGLDFA | CD8hinge (30) |
| PR | Linker (AvrII site) (70) |
| KIEVMYPPPYLDNEKSNGTIIHVKGKHLCPSPLFPGPSKP | CD28pec (26) |
| FWVLVVVGGVLACYSLLVTVAFIIFWV | CD28tm (27) |
| RSKRSRLLHSDYMNMTPRRPGPTRKHYQPYAPPRDFAAYRS | CD28cyt (28) |
| RVKFSRSADAPAYQQGQNQLYNELNLGRREEYDVLDKRRGRDPEMGGKPRRKNPQEGLYNELQKD KMAEAYSEIGMKGERRRGKGHDGLYQGLSTATKDTYDALHMQALPPR | Zcyt (7) |
| AKRSGSG | linker (67) |
| ATNFSLLKQAGDVEENPGP | P2A (3) |
| METLLGLLILWLQLQWVSSKQEVTQIPAALSVPEGENLVLNCSFTDSAIYNLQWFRQDPGKGLTSLLLI QSSQREQTSGRLNASLDKSSGRSTLYIAASQPGDSATYLCAVRPLYGGSYIPTFGRGTSLIVHPYIQNPD PAVYQLRDSKSSDKSVCLFTDFDSQTNVSQSKDSDVYITDKTVLDMRSMDFKSNSAVAWSNKSDFA CANAFNNSIIPEDTFFPSPESS | 1G4-a95LY aEc (4) |
| GSPK | linker (69) |
| CDIYIWAPLAGTCGVLLLSLVITLYC | CD8tm (31) |
| KRGRKKLLYIFKQPFMRPVQTTQEEDGCSCRFPEEEEGGCEL | BBcyt (29) |

Fig. 25

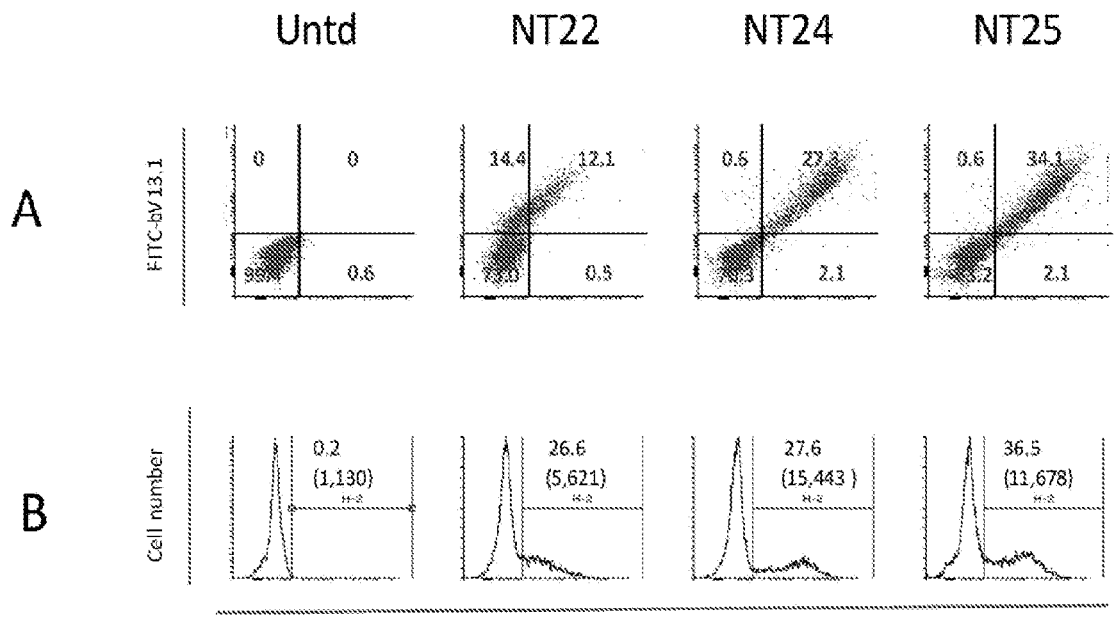

Figs. 26A and 26B

SEQUENCE LISTING

```
<160> NUMBER OF SEQ ID NOS: 73

<210> SEQ ID NO 1
<211> LENGTH: 275
<212> TYPE: PRT
<213> ORGANISM: Homo sapiens

<400> SEQUENCE: 1

Met Glu Thr Leu Leu Gly Leu Leu Ile Leu Trp Leu Gln Leu Gln Trp
1               5                   10                  15

Val Ser Ser Lys Gln Glu Val Thr Gln Ile Pro Ala Ala Leu Ser Val
            20                  25                  30

Pro Glu Gly Glu Asn Leu Val Leu Asn Cys Ser Phe Thr Asp Ser Ala
        35                  40                  45

Ile Tyr Asn Leu Gln Trp Phe Arg Gln Asp Pro Gly Lys Gly Leu Thr
    50                  55                  60

Ser Leu Leu Leu Ile Gln Ser Ser Gln Arg Glu Gln Thr Ser Gly Arg
```

```
                65                  70                  75                  80
Leu Asn Ala Ser Leu Asp Lys Ser Ser Gly Arg Ser Thr Leu Tyr Ile
                    85                  90                  95

Ala Ala Ser Gln Pro Gly Asp Ser Ala Thr Tyr Leu Cys Ala Val Arg
                100                 105                 110

Pro Leu Tyr Gly Gly Ser Tyr Ile Pro Thr Phe Gly Arg Gly Thr Ser
                115                 120                 125

Leu Ile Val His Pro Tyr Ile Gln Asn Pro Asp Pro Ala Val Tyr Gln
            130                 135                 140

Leu Arg Asp Ser Lys Ser Ser Asp Lys Ser Val Cys Leu Phe Thr Asp
145                 150                 155                 160

Phe Asp Ser Gln Thr Asn Val Ser Gln Ser Lys Asp Ser Asp Val Tyr
                165                 170                 175

Ile Thr Asp Lys Thr Val Leu Asp Met Arg Ser Met Asp Phe Lys Ser
                180                 185                 190

Asn Ser Ala Val Ala Trp Ser Asn Lys Ser Asp Phe Ala Cys Ala Asn
            195                 200                 205

Ala Phe Asn Asn Ser Ile Ile Pro Glu Asp Thr Phe Phe Pro Ser Pro
210                 215                 220

Glu Ser Ser Cys Asp Val Lys Leu Val Glu Lys Ser Phe Glu Thr Asp
225                 230                 235                 240

Thr Asn Leu Asn Phe Gln Asn Leu Ser Val Ile Gly Phe Arg Ile Leu
                245                 250                 255

Leu Leu Lys Val Ala Gly Phe Asn Leu Leu Met Thr Leu Arg Leu Trp
            260                 265                 270

Ser Ser Arg
        275

<210> SEQ ID NO 2
<211> LENGTH: 311
<212> TYPE: PRT
<213> ORGANISM: Homo sapiens

<400> SEQUENCE: 2

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
                20                  25                  30

Lys Thr Gly Gln Ser Met Thr Leu Gln Cys Ala Gln Asp Met Asn His
            35                  40                  45

Glu Tyr Met Ser Trp Tyr Arg Gln Asp Pro Gly Met Gly Leu Arg Leu
        50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
                100                 105                 110

Ser Tyr Val Gly Asn Thr Gly Glu Leu Phe Phe Gly Glu Gly Ser Arg
            115                 120                 125

Leu Thr Val Leu Glu Asp Leu Lys Asn Val Phe Pro Pro Glu Val Ala
        130                 135                 140

Val Phe Glu Pro Ser Glu Ala Glu Ile Ser His Thr Gln Lys Ala Thr
145                 150                 155                 160
```

```
Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Glu Ser Tyr Gln Gln
            260                 265                 270

Gly Val Leu Ser Ala Thr Ile Leu Tyr Glu Ile Leu Leu Gly Lys Ala
        275                 280                 285

Thr Leu Tyr Ala Val Leu Val Ser Ala Leu Val Leu Met Ala Met Val
    290                 295                 300

Lys Arg Lys Asp Ser Arg Gly
305                 310

<210> SEQ ID NO 3
<211> LENGTH: 19
<212> TYPE: PRT
<213> ORGANISM: Artificial sequence
<220> FEATURE:
<223> OTHER INFORMATION: Synthetic

<400> SEQUENCE: 3

Ala Thr Asn Phe Ser Leu Leu Lys Gln Ala Gly Asp Val Glu Glu Asn
1               5                   10                  15

Pro Gly Pro

<210> SEQ ID NO 4
<211> LENGTH: 227
<212> TYPE: PRT
<213> ORGANISM: Homo sapiens

<400> SEQUENCE: 4

Met Glu Thr Leu Leu Gly Leu Leu Ile Leu Trp Leu Gln Leu Gln Trp
1               5                   10                  15

Val Ser Ser Lys Gln Glu Val Thr Gln Ile Pro Ala Ala Leu Ser Val
            20                  25                  30

Pro Glu Gly Glu Asn Leu Val Leu Asn Cys Ser Phe Thr Asp Ser Ala
        35                  40                  45

Ile Tyr Asn Leu Gln Trp Phe Arg Gln Asp Pro Gly Lys Gly Leu Thr
    50                  55                  60

Ser Leu Leu Leu Ile Gln Ser Ser Gln Arg Glu Gln Thr Ser Gly Arg
65                  70                  75                  80

Leu Asn Ala Ser Leu Asp Lys Ser Ser Gly Arg Ser Thr Leu Tyr Ile
                85                  90                  95

Ala Ala Ser Gln Pro Gly Asp Ser Ala Thr Tyr Leu Cys Ala Val Arg
            100                 105                 110

Pro Leu Tyr Gly Gly Ser Tyr Ile Pro Thr Phe Gly Arg Gly Thr Ser
        115                 120                 125

Leu Ile Val His Pro Tyr Ile Gln Asn Pro Asp Pro Ala Val Tyr Gln
    130                 135                 140
```

```
Leu Arg Asp Ser Lys Ser Asp Lys Ser Val Cys Leu Phe Thr Asp
145                 150                 155                 160

Phe Asp Ser Gln Thr Asn Val Ser Gln Ser Lys Asp Ser Asp Val Tyr
                165                 170                 175

Ile Thr Asp Lys Thr Val Leu Asp Met Arg Ser Met Asp Phe Lys Ser
            180                 185                 190

Asn Ser Ala Val Ala Trp Ser Asn Lys Ser Asp Phe Ala Cys Ala Asn
                195                 200                 205

Ala Phe Asn Asn Ser Ile Ile Pro Glu Asp Thr Phe Phe Pro Ser Pro
            210                 215                 220

Glu Ser Ser
225
```

```
<210> SEQ ID NO 5
<211> LENGTH: 262
<212> TYPE: PRT
<213> ORGANISM: Homo sapiens

<400> SEQUENCE: 5
```

```
Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
                20                  25                  30

Lys Thr Gly Gln Ser Met Thr Leu Gln Cys Ala Gln Asp Met Asn His
            35                  40                  45

Glu Tyr Met Ser Trp Tyr Arg Gln Asp Pro Gly Met Gly Leu Arg Leu
50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
        210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp
            260
```

```
<210> SEQ ID NO 6
<211> LENGTH: 68
<212> TYPE: PRT
<213> ORGANISM: Homo sapiens

<400> SEQUENCE: 6

Phe Trp Val Leu Val Val Gly Gly Val Leu Ala Cys Tyr Ser Leu
1               5                   10                  15

Leu Val Thr Val Ala Phe Ile Ile Phe Trp Val Arg Ser Lys Arg Ser
            20                  25                  30

Arg Leu Leu His Ser Asp Tyr Met Asn Met Thr Pro Arg Arg Pro Gly
        35                  40                  45

Pro Thr Arg Lys His Tyr Gln Pro Tyr Ala Pro Pro Arg Asp Phe Ala
    50                  55                  60

Ala Tyr Arg Ser
65

<210> SEQ ID NO 7
<211> LENGTH: 112
<212> TYPE: PRT
<213> ORGANISM: Homo sapiens

<400> SEQUENCE: 7

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 8
<211> LENGTH: 55
<212> TYPE: PRT
<213> ORGANISM: Homo sapiens

<400> SEQUENCE: 8

Lys Asn Arg Lys Ala Lys Ala Lys Pro Val Thr Arg Gly Ala Gly Ala
1               5                   10                  15

Gly Gly Arg Gln Arg Gly Gln Asn Lys Glu Arg Pro Pro Pro Val Pro
            20                  25                  30

Asn Pro Asp Tyr Glu Pro Ile Arg Lys Gly Gln Arg Asp Leu Tyr Ser
        35                  40                  45

Gly Leu Asn Gln Arg Arg Ile
    50                  55

<210> SEQ ID NO 9
<211> LENGTH: 612
<212> TYPE: PRT
<213> ORGANISM: Artificial sequence
<220> FEATURE:
<223> OTHER INFORMATION: Synthetic
```

<400> SEQUENCE: 9

```
Met Glu Thr Leu Leu Gly Leu Leu Ile Leu Trp Leu Gln Leu Gln Trp
 1               5                  10                  15

Val Ser Ser Lys Gln Glu Val Thr Gln Ile Pro Ala Ala Leu Ser Val
             20                  25                  30

Pro Glu Gly Glu Asn Leu Val Leu Asn Cys Ser Phe Thr Asp Ser Ala
         35                  40                  45

Ile Tyr Asn Leu Gln Trp Phe Arg Gln Asp Pro Gly Lys Gly Leu Thr
     50                  55                  60

Ser Leu Leu Leu Ile Gln Ser Ser Gln Arg Glu Gln Thr Ser Gly Arg
 65                  70                  75                  80

Leu Asn Ala Ser Leu Asp Lys Ser Ser Gly Arg Ser Thr Leu Tyr Ile
                 85                  90                  95

Ala Ala Ser Gln Pro Gly Asp Ser Ala Thr Tyr Leu Cys Ala Val Arg
            100                 105                 110

Pro Leu Tyr Gly Gly Ser Tyr Ile Pro Thr Phe Gly Arg Gly Thr Ser
        115                 120                 125

Leu Ile Val His Pro Tyr Ile Gln Asn Pro Asp Pro Ala Val Tyr Gln
130                 135                 140

Leu Arg Asp Ser Lys Ser Ser Asp Lys Ser Val Cys Leu Phe Thr Asp
145                 150                 155                 160

Phe Asp Ser Gln Thr Asn Val Ser Gln Ser Lys Asp Ser Asp Val Tyr
                165                 170                 175

Ile Thr Asp Lys Thr Val Leu Asp Met Arg Ser Met Asp Phe Lys Ser
            180                 185                 190

Asn Ser Ala Val Ala Trp Ser Asn Lys Ser Asp Phe Ala Cys Ala Asn
        195                 200                 205

Ala Phe Asn Asn Ser Ile Ile Pro Glu Asp Thr Phe Phe Pro Ser Pro
    210                 215                 220

Glu Ser Ser Cys Asp Val Lys Leu Val Glu Lys Ser Phe Glu Thr Asp
225                 230                 235                 240

Thr Asn Leu Asn Phe Gln Asn Leu Ser Val Ile Gly Phe Arg Ile Leu
                245                 250                 255

Leu Leu Lys Val Ala Gly Phe Asn Leu Leu Met Thr Leu Arg Leu Trp
            260                 265                 270

Ser Ser Arg Ala Lys Arg Ser Gly Ser Gly Ala Thr Asn Phe Ser Leu
        275                 280                 285

Leu Lys Gln Ala Gly Asp Val Glu Glu Asn Pro Gly Pro Met Ser Ile
    290                 295                 300

Gly Leu Leu Cys Cys Ala Ala Leu Ser Leu Leu Trp Ala Gly Pro Val
305                 310                 315                 320

Asn Ala Gly Val Thr Gln Thr Pro Lys Phe Gln Val Leu Lys Thr Gly
                325                 330                 335

Gln Ser Met Thr Leu Gln Cys Ala Gln Asp Met Asn His Glu Tyr Met
            340                 345                 350

Ser Trp Tyr Arg Gln Asp Pro Gly Met Gly Leu Arg Leu Ile His Tyr
        355                 360                 365

Ser Val Gly Ala Gly Ile Thr Asp Gln Gly Glu Val Pro Asn Gly Tyr
    370                 375                 380

Asn Val Ser Arg Ser Thr Thr Glu Asp Phe Pro Leu Arg Leu Leu Ser
385                 390                 395                 400

Ala Ala Pro Ser Gln Thr Ser Val Tyr Phe Cys Ala Ser Ser Tyr Val
                405                 410                 415
```

-continued

Gly Asn Thr Gly Glu Leu Phe Phe Gly Glu Gly Ser Arg Leu Thr Val
            420                 425                 430

Leu Glu Asp Leu Lys Asn Val Phe Pro Pro Glu Val Ala Val Phe Glu
        435                 440                 445

Pro Ser Glu Ala Glu Ile Ser His Thr Gln Lys Ala Thr Leu Val Cys
    450                 455                 460

Leu Ala Thr Gly Phe Tyr Pro Asp His Val Glu Leu Ser Trp Trp Val
465                 470                 475                 480

Asn Gly Lys Glu Val His Ser Gly Val Ser Thr Asp Pro Gln Pro Leu
                485                 490                 495

Lys Glu Gln Pro Ala Leu Asn Asp Ser Arg Tyr Ala Leu Ser Ser Arg
            500                 505                 510

Leu Arg Val Ser Ala Thr Phe Trp Gln Asp Pro Arg Asn His Phe Arg
        515                 520                 525

Cys Gln Val Gln Phe Tyr Gly Leu Ser Glu Asn Asp Glu Trp Thr Gln
    530                 535                 540

Asp Arg Ala Lys Pro Val Thr Gln Ile Val Ser Ala Glu Ala Trp Gly
545                 550                 555                 560

Arg Ala Asp Cys Gly Phe Thr Ser Glu Ser Tyr Gln Gln Gly Val Leu
                565                 570                 575

Ser Ala Thr Ile Leu Tyr Glu Ile Leu Leu Gly Lys Ala Thr Leu Tyr
            580                 585                 590

Ala Val Leu Val Ser Ala Leu Val Leu Met Ala Met Val Lys Arg Lys
        595                 600                 605

Asp Ser Arg Gly
    610

<210> SEQ ID NO 10
<211> LENGTH: 883
<212> TYPE: PRT
<213> ORGANISM: Artificial sequence
<220> FEATURE:
<223> OTHER INFORMATION: Synthetic

<400> SEQUENCE: 10

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
    130                 135                 140

Val Phe Glu Pro Ser Glu Ala Glu Ile Ser His Thr Gln Lys Ala Thr
145                 150                 155                 160

```
Leu Val Cys Leu Ala Thr Gly Phe Tyr Pro Asp His Val Glu Leu Ser
            165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
            195                 200                 205

Ser Ser Arg Leu Arg Val Ser Ala Thr Phe Trp Gln Asp Pro Arg Asn
210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
            245                 250                 255

Ala Trp Gly Arg Ala Asp Gly Ser Pro Lys Phe Trp Val Leu Val Val
            260                 265                 270

Val Gly Gly Val Leu Ala Cys Tyr Ser Leu Leu Val Thr Val Ala Phe
            275                 280                 285

Ile Ile Phe Trp Val Arg Ser Lys Arg Ser Arg Leu Leu His Ser Asp
            290                 295                 300

Tyr Met Asn Met Thr Pro Arg Arg Pro Gly Pro Thr Arg Lys His Tyr
305                 310                 315                 320

Gln Pro Tyr Ala Pro Pro Arg Asp Phe Ala Ala Tyr Arg Ser Arg Val
            325                 330                 335

Lys Phe Ser Arg Ser Ala Asp Ala Pro Ala Tyr Gln Gln Gly Gln Asn
            340                 345                 350

Gln Leu Tyr Asn Glu Leu Asn Leu Gly Arg Arg Glu Glu Tyr Asp Val
            355                 360                 365

Leu Asp Lys Arg Arg Gly Arg Asp Pro Glu Met Gly Gly Lys Pro Arg
            370                 375                 380

Arg Lys Asn Pro Gln Glu Gly Leu Tyr Asn Glu Leu Gln Lys Asp Lys
385                 390                 395                 400

Met Ala Glu Ala Tyr Ser Glu Ile Gly Met Lys Gly Glu Arg Arg Arg
            405                 410                 415

Gly Lys Gly His Asp Gly Leu Tyr Gln Gly Leu Ser Thr Ala Thr Lys
            420                 425                 430

Asp Thr Tyr Asp Ala Leu His Met Gln Ala Leu Pro Pro Arg Ala Lys
            435                 440                 445

Arg Ser Gly Ser Gly Ala Thr Asn Phe Ser Leu Leu Lys Gln Ala Gly
450                 455                 460

Asp Val Glu Glu Asn Pro Gly Pro Met Glu Thr Leu Leu Gly Leu Leu
465                 470                 475                 480

Ile Leu Trp Leu Gln Leu Gln Trp Val Ser Ser Lys Gln Glu Val Thr
            485                 490                 495

Gln Ile Pro Ala Ala Leu Ser Val Pro Glu Gly Glu Asn Leu Val Leu
            500                 505                 510

Asn Cys Ser Phe Thr Asp Ser Ala Ile Tyr Asn Leu Gln Trp Phe Arg
            515                 520                 525

Gln Asp Pro Gly Lys Gly Leu Thr Ser Leu Leu Leu Ile Gln Ser Ser
            530                 535                 540

Gln Arg Glu Gln Thr Ser Gly Arg Leu Asn Ala Ser Leu Asp Lys Ser
545                 550                 555                 560

Ser Gly Arg Ser Thr Leu Tyr Ile Ala Ala Ser Gln Pro Gly Asp Ser
            565                 570                 575
```

Ala Thr Tyr Leu Cys Ala Val Arg Pro Leu Tyr Gly Gly Ser Tyr Ile
            580                 585                 590

Pro Thr Phe Gly Arg Gly Thr Ser Leu Ile Val His Pro Tyr Ile Gln
        595                 600                 605

Asn Pro Asp Pro Ala Val Tyr Gln Leu Arg Asp Ser Lys Ser Ser Asp
    610                 615                 620

Lys Ser Val Cys Leu Phe Thr Asp Phe Asp Ser Gln Thr Asn Val Ser
625                 630                 635                 640

Gln Ser Lys Asp Ser Asp Val Tyr Ile Thr Asp Lys Thr Val Leu Asp
            645                 650                 655

Met Arg Ser Met Asp Phe Lys Ser Asn Ser Ala Val Ala Trp Ser Asn
        660                 665                 670

Lys Ser Asp Phe Ala Cys Ala Asn Ala Phe Asn Asn Ser Ile Ile Pro
    675                 680                 685

Glu Asp Thr Phe Phe Pro Ser Pro Glu Ser Ser Gly Ser Pro Lys Phe
690                 695                 700

Trp Val Leu Val Val Val Gly Val Leu Ala Cys Tyr Ser Leu Leu
705                 710                 715                 720

Val Thr Val Ala Phe Ile Ile Phe Trp Val Arg Ser Lys Arg Ser Arg
            725                 730                 735

Leu Leu His Ser Asp Tyr Met Asn Met Thr Pro Arg Arg Pro Gly Pro
        740                 745                 750

Thr Arg Lys His Tyr Gln Pro Tyr Ala Pro Pro Arg Asp Phe Ala Ala
    755                 760                 765

Tyr Arg Ser Arg Val Lys Phe Ser Arg Ser Ala Asp Ala Pro Ala Tyr
770                 775                 780

Gln Gln Gly Gln Asn Gln Leu Tyr Asn Glu Leu Asn Leu Gly Arg Arg
785                 790                 795                 800

Glu Glu Tyr Asp Val Leu Asp Lys Arg Arg Gly Arg Asp Pro Glu Met
            805                 810                 815

Gly Gly Lys Pro Arg Arg Lys Asn Pro Gln Glu Gly Leu Tyr Asn Glu
        820                 825                 830

Leu Gln Lys Asp Lys Met Ala Glu Ala Tyr Ser Glu Ile Gly Met Lys
    835                 840                 845

Gly Glu Arg Arg Arg Gly Lys Gly His Asp Gly Leu Tyr Gln Gly Leu
850                 855                 860

Ser Thr Ala Thr Lys Asp Thr Tyr Asp Ala Leu His Met Gln Ala Leu
865                 870                 875                 880

Pro Pro Arg

<210> SEQ ID NO 11
<211> LENGTH: 769
<212> TYPE: PRT
<213> ORGANISM: Artificial sequence
<220> FEATURE:
<223> OTHER INFORMATION: Synthetic

<400> SEQUENCE: 11

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu

```
                50                  55                  60
Ile His Tyr Ser Val Gly Ala Gly Ile Thr Asp Gln Gly Glu Val Pro
 65                      70                  75                  80

Asn Gly Tyr Asn Val Ser Arg Ser Thr Thr Glu Asp Phe Pro Leu Arg
                     85                  90                  95

Leu Leu Ser Ala Ala Pro Ser Gln Thr Ser Val Tyr Phe Cys Ala Ser
                100                 105                 110

Ser Tyr Val Gly Asn Thr Gly Glu Leu Phe Phe Gly Glu Gly Ser Arg
            115                 120                 125

Leu Thr Val Leu Glu Asp Leu Lys Asn Val Phe Pro Pro Glu Val Ala
        130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Gly Ser Pro Lys Phe Trp Val Leu Val Val
            260                 265                 270

Val Gly Gly Val Leu Ala Cys Tyr Ser Leu Leu Val Thr Val Ala Phe
        275                 280                 285

Ile Ile Phe Trp Val Arg Ser Lys Arg Ser Arg Leu Leu His Ser Asp
290                 295                 300

Tyr Met Asn Met Thr Pro Arg Arg Pro Gly Pro Thr Arg Lys His Tyr
305                 310                 315                 320

Gln Pro Tyr Ala Pro Pro Arg Asp Phe Ala Ala Tyr Arg Ser Lys Asn
                325                 330                 335

Arg Lys Ala Lys Ala Lys Pro Val Thr Arg Gly Ala Gly Ala Gly Gly
            340                 345                 350

Arg Gln Arg Gly Gln Asn Lys Glu Arg Pro Pro Val Pro Asn Pro
        355                 360                 365

Asp Tyr Glu Pro Ile Arg Lys Gly Gln Arg Asp Leu Tyr Ser Gly Leu
        370                 375                 380

Asn Gln Arg Arg Ile Ala Lys Arg Ser Gly Ser Gly Ala Thr Asn Phe
385                 390                 395                 400

Ser Leu Leu Lys Gln Ala Gly Asp Val Glu Glu Asn Pro Gly Pro Met
                405                 410                 415

Glu Thr Leu Leu Gly Leu Leu Ile Leu Trp Leu Gln Leu Gln Trp Val
            420                 425                 430

Ser Ser Lys Gln Glu Val Thr Gln Ile Pro Ala Ala Leu Ser Val Pro
        435                 440                 445

Glu Gly Glu Asn Leu Val Leu Asn Cys Ser Phe Thr Asp Ser Ala Ile
    450                 455                 460

Tyr Asn Leu Gln Trp Phe Arg Gln Asp Pro Gly Lys Gly Leu Thr Ser
465                 470                 475                 480
```

```
Leu Leu Leu Ile Gln Ser Ser Gln Arg Glu Gln Thr Ser Gly Arg Leu
            485                 490                 495

Asn Ala Ser Leu Asp Lys Ser Ser Gly Arg Ser Thr Leu Tyr Ile Ala
        500                 505                 510

Ala Ser Gln Pro Gly Asp Ser Ala Thr Tyr Leu Cys Ala Val Arg Pro
        515                 520                 525

Leu Tyr Gly Gly Ser Tyr Ile Pro Thr Phe Gly Arg Gly Thr Ser Leu
        530                 535                 540

Ile Val His Pro Tyr Ile Gln Asn Pro Asp Pro Ala Val Tyr Gln Leu
545                 550                 555                 560

Arg Asp Ser Lys Ser Ser Asp Lys Ser Val Cys Leu Phe Thr Asp Phe
                565                 570                 575

Asp Ser Gln Thr Asn Val Ser Gln Ser Lys Asp Ser Asp Val Tyr Ile
            580                 585                 590

Thr Asp Lys Thr Val Leu Asp Met Arg Ser Met Asp Phe Lys Ser Asn
        595                 600                 605

Ser Ala Val Ala Trp Ser Asn Lys Ser Asp Phe Ala Cys Ala Asn Ala
        610                 615                 620

Phe Asn Asn Ser Ile Ile Pro Glu Asp Thr Phe Phe Pro Ser Pro Glu
625                 630                 635                 640

Ser Ser Gly Ser Pro Lys Phe Trp Val Leu Val Val Val Gly Gly Val
                645                 650                 655

Leu Ala Cys Tyr Ser Leu Leu Val Thr Val Ala Phe Ile Ile Phe Trp
            660                 665                 670

Val Arg Ser Lys Arg Ser Arg Leu Leu His Ser Asp Tyr Met Asn Met
                675                 680                 685

Thr Pro Arg Arg Pro Gly Pro Thr Arg Lys His Tyr Gln Pro Tyr Ala
        690                 695                 700

Pro Pro Arg Asp Phe Ala Ala Tyr Arg Ser Lys Asn Arg Lys Ala Lys
705                 710                 715                 720

Ala Lys Pro Val Thr Arg Gly Ala Gly Ala Gly Arg Gln Arg Gly
                725                 730                 735

Gln Asn Lys Glu Arg Pro Pro Val Pro Asn Pro Asp Tyr Glu Pro
            740                 745                 750

Ile Arg Lys Gly Gln Arg Asp Leu Tyr Ser Gly Leu Asn Gln Arg Arg
        755                 760                 765

Ile

<210> SEQ ID NO 12
<211> LENGTH: 1839
<212> TYPE: DNA
<213> ORGANISM: Artificial sequence
<220> FEATURE:
<223> OTHER INFORMATION: Synthetic

<400> SEQUENCE: 12
atggagaccc tcttgggcct gcttatcctt tggctgcagc tgcaatgggt gagcagcaaa      60
caggaggtga cgcagattcc tgcagctctg agtgtcccag aaggagaaaa cttggttctc     120
aactgcagtt tcactgatag cgctatttac aacctccagt ggtttaggca ggaccctggg     180
aaaggtctca catctctgtt gcttattcag tcaagtcaga gagagcaaac aagtggaaga     240
cttaatgcct cgctggataa tcatcagga cgtagtactt tatacattgc agcttctcag     300
cctggtgact cagccaccta cctctgtgct gtgaggcccc tgtacggagg aagctacata     360
```

| | |
|---|---:|
| cctacatttg gaagaggaac cagccttatt gttcatccgt atatccagaa ccctgaccct | 420 |
| gccgtgtacc agctgagaga ctctaaatcc agtgacaagt ctgtctgcct attcaccgat | 480 |
| tttgattctc aaacaaatgt gtcacaaagt aaggattctg atgtgtatat cacagacaaa | 540 |
| actgtgctag acatgaggtc tatggacttc aagagcaaca gtgctgtggc ctggagcaac | 600 |
| aaatctgact ttgcatgtgc aaacgccttc aacaacagca ttattccaga agacaccttc | 660 |
| ttccccagcc cagaaagttc ctgtgatgtc aagctggtcg agaaaagctt tgaaacagat | 720 |
| acgaacctaa actttcaaaa cctgtcagtg attgggttcc gaatcctcct cctgaaagtg | 780 |
| gccgggttta atctgctcat gacgctgcgg ctgtggtcca gccgggccaa gcggtctggg | 840 |
| tctggggcca ccaacttcag cctgctgaag caggccggcg acgtggagga aaccccggc | 900 |
| cccatgagca tcggcctcct gtgctgtgca gccttgtctc tcctgtgggc aggtccagtg | 960 |
| aatgctggtg tcactcagac cccaaaattc caggtcctga agacaggaca gagcatgaca | 1020 |
| ctgcagtgtg cccaggatat gaaccatgaa tacatgtcct ggtatcgaca agacccaggc | 1080 |
| atggggctga ggctgattca ttactcagtt ggtgctggta tcactgacca aggagaagtc | 1140 |
| cccaatggct acaatgtctc cagatcaacc acagaggatt cccgctcag gctgctgtcg | 1200 |
| gctgctccct cccagacatc tgtgtacttc tgtgccagca gttacgtcgg aacaccggg | 1260 |
| gagctgtttt ttggagaagg ctctaggctg accgtactgg aggacctgaa aaacgtgttc | 1320 |
| ccacccgagt cgctgtgtgtt tgagccatca gaagcagaga tctcccacac ccaaaaggcc | 1380 |
| acactggtgt gcctggccac aggcttctac cccgaccacg tggagctgag ctggtgggtg | 1440 |
| aatgggaagg aggtgcacag tggggtcagc acagacccgc agcccctcaa ggagcagccc | 1500 |
| gccctcaatg actccagata cgctctgagc agccgcctga gggtctcggc caccttctgg | 1560 |
| caggaccccc gcaaccactt ccgctgtcaa gtccagttct acgggctctc ggagaatgac | 1620 |
| gagtggaccc aggatagggc caaacccgtc acccagatcg tcagcgccga ggcctgggt | 1680 |
| agagcagact gtggcttcac ctccgagtct taccagcaag gggtcctgtc tgccaccatc | 1740 |
| ctctatgaga tcttgctagg gaaggccacc ttgtatgccg tgctggtcag tgccctcgtg | 1800 |
| ctgatggcta tggtcaagag aaaggattcc agaggctaa | 1839 |

<210> SEQ ID NO 13
<211> LENGTH: 2652
<212> TYPE: DNA
<213> ORGANISM: Artificial sequence
<220> FEATURE:
<223> OTHER INFORMATION: Synthetic

<400> SEQUENCE: 13

| | |
|---|---:|
| atgagcatcg gcctcctgtg ctgtgcagcc ttgtctctcc tgtgggcagg tccagtgaat | 60 |
| gctggtgtca ctcagacccc aaaattccag gtcctgaaga caggacagag catgacactg | 120 |
| cagtgtgccc aggatatgaa ccatgaatac atgtcctggt atcgacaaga cccaggcatg | 180 |
| gggctgaggc tgattcatta ctcagttggt gctggtatcc tgaccaagg agaagtcccc | 240 |
| aatggctaca atgtctccag atcaaccaca gaggatttcc cgctcaggct gctgtcggct | 300 |
| gctccctccc agacatctgt gtacttctgt gccagcagtt acgtcgggaa caccggggag | 360 |
| ctgttttttg gagaaggctc taggctgacc gtactggagg acctgaaaaa cgtgttccca | 420 |
| cccgaggtcg ctgtgtttga gccatcagaa gcagagatct cccacaccca aaaggccaca | 480 |
| ctggtgtgcc tggccacagg cttctacccc gaccacgtgg agctgagctg gtgggtgaat | 540 |
| gggaaggagg tgcacagtgg ggtcagcaca gacccgcagc ccctcaagga gcagcccgcc | 600 |

```
ctcaatgact ccagatacgc tctgagcagc cgcctgaggg tctcggccac cttctggcag    660 gaccccgca accacttccg ctgtcaagtc cagttctacg ggctctcgga gaatgacgag     720
tggacccagg atagggccaa acccgtcacc cagatcgtca gcgccgaggc ctggggtaga    780
gcagacggct ctcctaagtt ctgggttctc gtcgtcgtgg gaggtgtgtt agcatgttac    840
tctctcttgg ttactgtcgc tttcataatc ttttgggtcc gctcaaaacg ctctcgcttg    900
ttacattccg attatatgaa tatgacacct aggagacctg gcccgactag gaaacactat    960
caaccttacg cacctcccag agattttgct gcttacagga gtcgggtcaa attttcacgc   1020
tccgctgatg ctcctgccta tcaacaaggg caaaatcaat tgtacaatga attgaacttg   1080
ggtagaaggg aagaatatga cgtgctcgat aaacggaggg ggagagatcc agaaatgggc   1140
ggtaaaccac ggcgcaaaaa tccacaagag ggattgtata acgagctcca aaaggacaaa   1200
atggcagaag cttattcaga aataggaatg aagggggaaa ggagacgagg taaaggtcat   1260
gacggattgt atcaaggatt gtcaaccgct actaaagata catatgatgc tttgcatatg   1320
caagctttgc ctcccagagc caagcggtct gggtctgggg ccaccaactt cagcctgctg   1380
aagcaggccg cgacgtggag ggagaacccc ggccccatgg agaccctctt gggcctgctt   1440
atcctttggc tgcagctgca atgggtgagc agcaaacagg aggtgacgca gattcctgca   1500
gctctgagtg tcccagaagg agaaaacttg gttctcaact gcagtttcac tgatagcgct   1560
atttacaacc tccagtggtt taggcaggac cctgggaaag gtctcacatc tctgttgctt   1620
attcagtcaa gtcagagaga gcaaacaagt ggaagactta atgcctcgct ggataaatca   1680
tcaggacgta gtactttata cattgcagct tctcagcctg gtgactcagc cacctacctc   1740
tgtgctgtga ggcccctgta cggaggaagc tacataccta catttggaag aggaaccagc   1800
cttattgttc atccgtatat ccagaaccct gaccctgccg tgtaccagct gagagactct   1860
aaatccagtg acaagtctgt ctgcctattc accgattttg attctcaaac aaatgtgtca   1920
caaagtaagg attctgatgt gtatatcaca gacaaaactg tgctagacat gaggtctatg   1980
gacttcaaga gcaacagtgc tgtggcctgg agcaacaaat ctgactttgc atgtgcaaac   2040
gccttcaaca acagcattat tccagaagac accttcttcc ccagcccaga aagttccggc   2100
tccccaaaat tttgggtgct ggtggtggtt ggtggagtcc tggcttgcta tagcttgcta   2160
gtaacagtgg cctttattat tttctgggtg aggagtaaga gagcaggct cctgcacagt   2220 gactacatga acatgactcc ccgccgcccc gggcccaccc gcaagcatta ccagccctat   2280
gccccaccac gcgacttcgc agcctatcgc tccagagtga agttcagcag gagcgcagac   2340
gcccccgcgt accagcaggg ccagaaccag ctctataacg agctcaatct aggacgaaga   2400
gaggagtacg atgttttgga caagagacgt ggccgggacc ctgagatggg gggaaagccg   2460
agaaggaaga accctcagga aggcctgtac aatgaactgc agaaagataa gatggcggag   2520
gcctacagtg agattgggat gaaaggcgag cgccggaggg gcaaggggca cgatggcctt   2580
taccagggtc tcagtacagc caccaaggac acctacgacg cccttcacat gcaggccctg   2640
ccccctcgct aa                                                      2652
```

<210> SEQ ID NO 14
<211> LENGTH: 2310
<212> TYPE: DNA
<213> ORGANISM: Artificial sequence
<220> FEATURE:
<223> OTHER INFORMATION: Synthetic

<400> SEQUENCE: 14

```
atgagcatcg gcctcctgtg ctgtgcagcc ttgtctctcc tgtgggcagg tccagtgaat    60
gctggtgtca ctcagacccc aaaattccag gtcctgaaga caggacagag catgacactg   120
cagtgtgccc aggatatgaa ccatgaatac atgtcctggt atcgacaaga cccaggcatg   180
gggctgaggc tgattcatta ctcagttggt gctggtatca ctgaccaagg agaagtcccc   240
aatggctaca atgtctccag atcaaccaca gaggatttcc cgctcaggct gctgtcggct   300
gctccctccc agacatctgt gtacttctgt gccagcagtt acgtcgggaa caccggggag   360
ctgttttttg gagaaggctc taggctgacc gtactggagg acctgaaaaa cgtgttccca   420
cccgaggtcg ctgtgtttga gccatcagaa gcagagatct cccacaccca aaaggccaca   480
ctggtgtgcc tggccacagg cttctacccc gaccacgtgg agctgagctg gtgggtgaat   540
gggaaggagg tgcacagtgg ggtcagcaca gacccgcagc ccctcaagga gcagcccgcc   600
ctcaatgact ccagatacgc tctgagcagc cgcctgaggg tctcggccac cttctggcag   660
gaccccgca accacttccg ctgtcaagtc cagttctacg gctctcgga gaatgacgag   720
tggacccagg atagggccaa acccgtcacc cagatcgtca gcgccgaggc ctggggtaga   780
gcagacggct ctcctaagtt ctgggttctc gtcgtcgtgg gaggtgtgtt agcatgttac   840
tctctcttgg ttactgtcgc tttcataatc ttttgggtcc gctcaaaacg ctctcgcttg   900
ttacattccg attatatgaa tatgacacct aggagacctg gccgactag aaacactat   960
caaccttacg cacctcccag agattttgct gcttacagga gtaaaaaccg caaagctaaa  1020
gctaaacccg tcactagggg ggccggagca ggagggcgcc agcgcggtca gaataaagaa  1080
cgccctcctc ccgtccctaa tcctgattac gaaccgatta gaaaggggca agagatctc  1140
tacagcggac tcaaccaacg gagaattgcc aagcggtctg ggtctggggc caccaacttc  1200
agcctgctga agcaggccgg cgacgtggag gagaaccccg gccccatgga gaccctcttg  1260
ggcctgctta tcctttggct gcagctgcaa tgggtgagca gcaaacagga ggtgacgcag  1320
attcctgcag ctctgagtgt cccagaagga gaaaacttgg ttctcaactg cagtttcact  1380
gatagcgcta tttacaacct ccagtggttt aggcaggacc ctgggaaagg tctcacatct  1440
ctgttgctta ttcagtcaag tcagagagag caaacaagtg gaagacttaa tgcctcgctg  1500
gataaatcat caggacgtag tactttatac attgcagctt ctcagcctgg tgactcagcc  1560
acctacctct gtgctgtgag gccctgtac ggaggaagct acatacctac atttggaaga  1620
ggaaccagcc ttattgttca tccgtatatc cagaaccctg accctgccgt gtaccagctg  1680
agagactcta aatccagtga caagtctgtc tgcctattca ccgattttga ttctcaaaca  1740
aatgtgtcac aaagtaagga ttctgatgtg tatatcacag acaaaactgt gctagacatg  1800
aggtctatgg acttcaagag caacagtgct gtggcctgga gcaacaaatc tgactttgca  1860
tgtgcaaacg ccttcaacaa cagcattatt ccagaagaca ccttcttccc cagcccagaa  1920
agttccggct cccaaaaatt ttgggtgctg gtggtggttg tggagtcct ggcttgctat  1980
agcttgctag taacagtggc ctttattatt ttctgggtga ggagtaagag gagcaggctc  2040
ctgcacagtg actacatgaa catgactccc cgccgcccg ggcccacccg caagcattac  2100
cagccctatg ccccaccacg cgacttcgca gcctatcgct ccaagaatag aaaggccaag  2160
gccaagcctg tgacacgagg agcgggtgct ggcggcaggc aaaggggaca aaacaaggag  2220
aggcaccac ctgttcccaa cccagactat gagcccatcc gcaaaggcca gcgggaccctg  2280
tattctggcc tgaatcagag acgcatctaa                                    2310
```

<210> SEQ ID NO 15
<211> LENGTH: 141
<212> TYPE: PRT
<213> ORGANISM: Artificial sequence
<220> FEATURE:
<223> OTHER INFORMATION: Synthetic

<400> SEQUENCE: 15

Met Asn Met Thr Pro Arg Arg Pro Gly Pro Thr Arg Lys His Tyr Gln
1               5                   10                  15

Pro Tyr Ala Pro Pro Arg Asp Phe Ala Ala Tyr Arg Ser Arg Val Lys
            20                  25                  30

Phe Ser Arg Ser Ala Asp Ala Pro Ala Tyr Gln Gln Gly Gln Asn Gln
        35                  40                  45

Leu Tyr Asn Glu Leu Asn Leu Gly Arg Arg Glu Glu Tyr Asp Val Leu
    50                  55                  60

Asp Lys Arg Arg Gly Arg Asp Pro Glu Met Gly Gly Lys Pro Arg Arg
65                  70                  75                  80

Lys Asn Pro Gln Glu Gly Leu Tyr Asn Glu Leu Gln Lys Asp Lys Met
                85                  90                  95

Ala Glu Ala Tyr Ser Glu Ile Gly Met Lys Gly Glu Arg Arg Arg Gly
            100                 105                 110

Lys Gly His Asp Gly Leu Tyr Gln Gly Leu Ser Thr Ala Thr Lys Asp
        115                 120                 125

Thr Tyr Asp Ala Leu His Met Gln Ala Leu Pro Pro Arg
    130                 135                 140

<210> SEQ ID NO 16
<211> LENGTH: 540
<212> TYPE: DNA
<213> ORGANISM: Artificial sequence
<220> FEATURE:
<223> OTHER INFORMATION: Synthetic

<400> SEQUENCE: 16
ttttgggtgc tggtggtggt tggtggagtc ctggcttgct atagcttgct agtaacagtg     60
gcctttatta ttttctgggt gaggagtaag aggagcaggc tcctgcacag tgactacatg    120
aacatgactc cccgccgccc cgggcccacc cgcaagcatt accagcccta tgccccacca    180
cgcgacttcg cagcctatcg ctccagagtg aagttcagca ggagcgcaga cgccccgcg    240 taccagcagg gccagaacca gctctataac gagctcaatc taggacgaag agaggagtac    300
gatgttttgg acaagagacg tggccgggac cctgagatgg ggggaaagcc gagaaggaag    360
aaccctcagg aaggcctgta caatgaactg cagaaagata agatggcgga ggcctacagt    420
gagattggga tgaaaggcga gcgccggagg ggcaaggggc acgatggcct ttaccagggt    480
ctcagtacag ccaccaagga cacctacgac gccttcaca tgcaggccct gccccctcgc    540

<210> SEQ ID NO 17
<211> LENGTH: 204
<212> TYPE: DNA
<213> ORGANISM: Homo sapiens

<400> SEQUENCE: 17
ttttgggtgc tggtggtggt tggtggagtc ctggcttgct atagcttgct agtaacagtg     60
gcctttatta ttttctgggt gaggagtaag aggagcaggc tcctgcacag tgactacatg    120
aacatgactc cccgccgccc cgggcccacc cgcaagcatt accagcccta tgccccacca    180

| | |
|---|---|
| cgcgacttcg cagcctatcg ctcc | 204 |

<210> SEQ ID NO 18
<211> LENGTH: 204
<212> TYPE: DNA
<213> ORGANISM: Artificial sequence
<220> FEATURE:
<223> OTHER INFORMATION: Synthetic

<400> SEQUENCE: 18

| | |
|---|---|
| ttctgggttc tcgtcgtcgt gggaggtgtg ttagcatgtt actctctctt ggttactgtc | 60 |
| gctttcataa tcttttgggt ccgctcaaaa cgctctcgct tgttacattc cgattatatg | 120 |
| aatatgacac ctaggagacc tggcccgact aggaaacact atcaacctta cgcacctccc | 180 |
| agagattttg ctgcttacag gagt | 204 |

<210> SEQ ID NO 19
<211> LENGTH: 336
<212> TYPE: DNA
<213> ORGANISM: Homo sapiens

<400> SEQUENCE: 19

| | |
|---|---|
| agagtgaagt tcagcaggag cgcagacgcc cccgcgtacc agcagggcca gaaccagctc | 60 |
| tataacgagc tcaatctagg acgaagagag gagtacgatg ttttggacaa gagacgtggc | 120 |
| cgggaccctg agatgggggg aaagccgaga aggaagaacc ctcaggaagg cctgtacaat | 180 |
| gaactgcaga agataagat ggcggaggcc tacagtgaga ttgggatgaa aggcgagcgc | 240 |
| cggaggggca agggcacga tggcctttac cagggtctca gtacagccac caaggacacc | 300 |
| tacgacgccc ttcacatgca ggccctgccc cctcgc | 336 |

<210> SEQ ID NO 20
<211> LENGTH: 336
<212> TYPE: DNA
<213> ORGANISM: Artificial sequence
<220> FEATURE:
<223> OTHER INFORMATION: Synthetic

<400> SEQUENCE: 20

| | |
|---|---|
| cgggtcaaat tttcacgctc cgctgatgct cctgcctatc aacaagggca aaatcaattg | 60 |
| tacaatgaat tgaacttggg tagaaggaa gaatatgacg tgctcgataa acggaggggg | 120 |
| agagatccag aaatgggcgg taaaccacgg cgcaaaaatc cacaagaggg attgtataac | 180 |
| gagctccaaa aggacaaaat ggcagaagct tattcagaaa taggaatgaa gggggaaagg | 240 |
| agacgaggta aaggtcatga cggattgtat caaggattgt caaccgctac taaagataca | 300 |
| tatgatgctt tgcatatgca agctttgcct cccaga | 336 |

<210> SEQ ID NO 21
<211> LENGTH: 540
<212> TYPE: DNA
<213> ORGANISM: Artificial sequence
<220> FEATURE:
<223> OTHER INFORMATION: Synthetic

<400> SEQUENCE: 21

| | |
|---|---|
| ttctgggttc tcgtcgtcgt gggaggtgtg ttagcatgtt actctctctt ggttactgtc | 60 |
| gctttcataa tcttttgggt ccgctcaaaa cgctctcgct tgttacattc cgattatatg | 120 |
| aatatgacac ctaggagacc tggcccgact aggaaacact atcaacctta cgcacctccc | 180 |

```
agagattttg ctgcttacag gagtcgggtc aaattttcac gctccgctga tgctcctgcc    240
tatcaacaag ggcaaaatca attgtacaat gaattgaact tgggtagaag ggaagaatat    300
gacgtgctcg ataaacggag ggggagagat ccagaaatgg gcggtaaacc acggcgcaaa    360
aatccacaag agggattgta taacgagctc caaaaggaca aaatggcaga agcttattca    420
gaaataggaa tgaagggga aaggagacga ggtaaaggtc atgacggatt gtatcaagga    480
ttgtcaaccg ctactaaaga tacatatgat gctttgcata tgcaagcttt gcctcccaga    540
```

<210> SEQ ID NO 22
<211> LENGTH: 165
<212> TYPE: DNA
<213> ORGANISM: Homo sapiens

<400> SEQUENCE: 22

```
aagaatagaa aggccaaggc caagcctgtg acacgaggag cgggtgctgg cggcaggcaa     60
aggggacaaa acaaggagag gccaccacct gttcccaacc cagactatga gcccatccgg    120
aaaggccagc gggacctgta ttctggcctg aatcagagac gcatc                    165
```

<210> SEQ ID NO 23
<211> LENGTH: 165
<212> TYPE: DNA
<213> ORGANISM: Artificial sequence
<220> FEATURE:
<223> OTHER INFORMATION: Synthetic

<400> SEQUENCE: 23

```
aagaatagaa aggccaaggc caagcctgtg acacgaggag cgggtgctgg cggcaggcaa     60
aggggacaaa acaaggagag gccaccacct gttcccaacc cagactatga gcccatccgc    120
aaaggccagc gggacctgta ttctggcctg aatcagagac gcatc                    165
```

<210> SEQ ID NO 24
<211> LENGTH: 165
<212> TYPE: DNA
<213> ORGANISM: Artificial sequence
<220> FEATURE:
<223> OTHER INFORMATION: Synthetic

<400> SEQUENCE: 24

```
aaaaaccgca aagctaaagc taaaccgtc actaggggg ccggagcagg agggcgccag      60
cgcggtcaga ataaagaacg ccctcctccc gtccctaatc ctgattacga accgattaga    120
aaggggcaaa gagatctcta cagcggactc aaccaacgga gaatt                    165
```

<210> SEQ ID NO 25
<211> LENGTH: 9
<212> TYPE: PRT
<213> ORGANISM: Homo sapiens

<400> SEQUENCE: 25

Ser Leu Leu Met Trp Ile Thr Gln Cys
1               5

<210> SEQ ID NO 26
<211> LENGTH: 40
<212> TYPE: PRT
<213> ORGANISM: Homo sapiens

<400> SEQUENCE: 26

Lys Ile Glu Val Met Tyr Pro Pro Pro Tyr Leu Asp Asn Glu Lys Ser
1               5                   10                  15

Asn Gly Thr Ile Ile His Val Lys Gly Lys His Leu Cys Pro Ser Pro
            20                  25                  30

Leu Phe Pro Gly Pro Ser Lys Pro
            35                  40

<210> SEQ ID NO 27
<211> LENGTH: 27
<212> TYPE: PRT
<213> ORGANISM: Homo sapiens

<400> SEQUENCE: 27

Phe Trp Val Leu Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 28
<211> LENGTH: 41
<212> TYPE: PRT
<213> ORGANISM: Homo sapiens

<400> SEQUENCE: 28

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
            35                  40

<210> SEQ ID NO 29
<211> LENGTH: 42
<212> TYPE: PRT
<213> ORGANISM: Homo sapiens

<400> SEQUENCE: 29

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
            35                  40

<210> SEQ ID NO 30
<211> LENGTH: 46
<212> TYPE: PRT
<213> ORGANISM: Homo sapiens

<400> SEQUENCE: 30

Ala Lys Pro Thr Thr Thr Pro Ala Pro Arg Pro Pro Thr Pro Ala Pro
1               5                   10                  15

Thr Ile Ala Ser Gln Pro Leu Ser Leu Arg Pro Glu Ala Cys Arg Pro
            20                  25                  30

Ala Ala Gly Gly Ala Val His Thr Arg Gly Leu Asp Phe Ala
            35                  40                  45

<210> SEQ ID NO 31
<211> LENGTH: 26
<212> TYPE: PRT
<213> ORGANISM: Homo sapiens

<400> SEQUENCE: 31

Cys Asp Ile Tyr Ile Trp Ala Pro Leu Ala Gly Thr Cys Gly Val Leu
1               5                   10                  15

Leu Leu Ser Leu Val Ile Thr Leu Tyr Cys
            20                  25

<210> SEQ ID NO 32
<211> LENGTH: 883
<212> TYPE: PRT
<213> ORGANISM: Artificial sequence
<220> FEATURE:
<223> OTHER INFORMATION: Synthetic

<400> SEQUENCE: 32

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
    130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Gly Ser Pro Lys Cys Asp Ile Tyr Ile Trp
            260                 265                 270

Ala Pro Leu Ala Gly Thr Cys Gly Val Leu Leu Leu Ser Leu Val Ile
        275                 280                 285

Thr Leu Tyr Cys Lys Arg Gly Arg Lys Lys Leu Leu Tyr Ile Phe Lys
    290                 295                 300

Gln Pro Phe Met Arg Pro Val Gln Thr Thr Gln Glu Glu Asp Gly Cys
305                 310                 315                 320

Ser Cys Arg Phe Pro Glu Glu Glu Gly Gly Cys Glu Leu Arg Val
                325                 330                 335

-continued

```
Lys Phe Ser Arg Ser Ala Asp Ala Pro Ala Tyr Gln Gln Gly Gln Asn
            340                 345                 350

Gln Leu Tyr Asn Glu Leu Asn Leu Gly Arg Arg Glu Glu Tyr Asp Val
            355                 360                 365

Leu Asp Lys Arg Arg Gly Arg Asp Pro Glu Met Gly Gly Lys Pro Arg
            370                 375                 380

Arg Lys Asn Pro Gln Glu Gly Leu Tyr Asn Glu Leu Gln Lys Asp Lys
385                 390                 395                 400

Met Ala Glu Ala Tyr Ser Glu Ile Gly Met Lys Gly Glu Arg Arg Arg
                405                 410                 415

Gly Lys Gly His Asp Gly Leu Tyr Gln Gly Leu Ser Thr Ala Thr Lys
            420                 425                 430

Asp Thr Tyr Asp Ala Leu His Met Gln Ala Leu Pro Pro Arg Ala Lys
            435                 440                 445

Arg Ser Gly Ser Gly Ala Thr Asn Phe Ser Leu Leu Lys Gln Ala Gly
            450                 455                 460

Asp Val Glu Glu Asn Pro Gly Pro Met Glu Thr Leu Leu Gly Leu Leu
465                 470                 475                 480

Ile Leu Trp Leu Gln Leu Gln Trp Val Ser Ser Lys Gln Glu Val Thr
                485                 490                 495

Gln Ile Pro Ala Ala Leu Ser Val Pro Glu Gly Glu Asn Leu Val Leu
            500                 505                 510

Asn Cys Ser Phe Thr Asp Ser Ala Ile Tyr Asn Leu Gln Trp Phe Arg
            515                 520                 525

Gln Asp Pro Gly Lys Gly Leu Thr Ser Leu Leu Leu Ile Gln Ser Ser
            530                 535                 540

Gln Arg Glu Gln Thr Ser Gly Arg Leu Asn Ala Ser Leu Asp Lys Ser
545                 550                 555                 560

Ser Gly Arg Ser Thr Leu Tyr Ile Ala Ala Ser Gln Pro Gly Asp Ser
                565                 570                 575

Ala Thr Tyr Leu Cys Ala Val Arg Pro Leu Tyr Gly Gly Ser Tyr Ile
            580                 585                 590

Pro Thr Phe Gly Arg Gly Thr Ser Leu Ile Val His Pro Tyr Ile Gln
            595                 600                 605

Asn Pro Asp Pro Ala Val Tyr Gln Leu Arg Asp Ser Lys Ser Ser Asp
            610                 615                 620

Lys Ser Val Cys Leu Phe Thr Asp Phe Asp Ser Gln Thr Asn Val Ser
625                 630                 635                 640

Gln Ser Lys Asp Ser Asp Val Tyr Ile Thr Asp Lys Thr Val Leu Asp
                645                 650                 655

Met Arg Ser Met Asp Phe Lys Ser Asn Ser Ala Val Ala Trp Ser Asn
            660                 665                 670

Lys Ser Asp Phe Ala Cys Ala Asn Ala Phe Asn Asn Ser Ile Ile Pro
            675                 680                 685

Glu Asp Thr Phe Phe Pro Ser Pro Glu Ser Ser Gly Ser Pro Lys Cys
            690                 695                 700

Asp Ile Tyr Ile Trp Ala Pro Leu Ala Gly Thr Cys Gly Val Leu Leu
705                 710                 715                 720

Leu Ser Leu Val Ile Thr Leu Tyr Cys Lys Arg Gly Arg Lys Lys Leu
                725                 730                 735

Leu Tyr Ile Phe Lys Gln Pro Phe Met Arg Pro Val Gln Thr Thr Gln
            740                 745                 750
```

-continued

```
Glu Glu Asp Gly Cys Ser Cys Arg Phe Pro Glu Glu Glu Gly Gly
            755                 760                 765
Cys Glu Leu Arg Val Lys Phe Ser Arg Ser Ala Asp Ala Pro Ala Tyr
770                 775                 780
Gln Gln Gly Gln Asn Gln Leu Tyr Asn Glu Leu Asn Leu Gly Arg Arg
785                 790                 795                 800
Glu Glu Tyr Asp Val Leu Asp Lys Arg Gly Arg Asp Pro Glu Met
                805                 810                 815
Gly Gly Lys Pro Arg Arg Lys Asn Pro Gln Gly Leu Tyr Asn Glu
            820                 825                 830
Leu Gln Lys Asp Lys Met Ala Glu Ala Tyr Ser Glu Ile Gly Met Lys
            835                 840                 845
Gly Glu Arg Arg Arg Gly Lys Gly His Asp Gly Leu Tyr Gln Gly Leu
            850                 855                 860
Ser Thr Ala Thr Lys Asp Thr Tyr Asp Ala Leu His Met Gln Ala Leu
865                 870                 875                 880
Pro Pro Arg
```

<210> SEQ ID NO 33
<211> LENGTH: 885
<212> TYPE: PRT
<213> ORGANISM: Artificial sequence
<220> FEATURE:
<223> OTHER INFORMATION: Synthetic

<400> SEQUENCE: 33

```
Met Ser Ile Gly Leu Leu Cys Cys Ala Ala Leu Ser Leu Leu Trp Ala
1               5                   10                  15
Gly Pro Val Asn Ala Gly Val Thr Gln Thr Pro Lys Phe Gln Val Leu
            20                  25                  30
Lys Thr Gly Gln Ser Met Thr Leu Gln Cys Ala Gln Asp Met Asn His
        35                  40                  45
Glu Tyr Met Ser Trp Tyr Arg Gln Asp Pro Gly Met Gly Leu Arg Leu
    50                  55                  60
Ile His Tyr Ser Val Gly Ala Gly Ile Thr Asp Gln Gly Glu Val Pro
65                  70                  75                  80
Asn Gly Tyr Asn Val Ser Arg Ser Thr Thr Glu Asp Phe Pro Leu Arg
                85                  90                  95
Leu Leu Ser Ala Ala Pro Ser Gln Thr Ser Val Tyr Phe Cys Ala Ser
            100                 105                 110
Ser Tyr Val Gly Asn Thr Gly Glu Leu Phe Phe Gly Glu Gly Ser Arg
        115                 120                 125
Leu Thr Val Leu Glu Asp Leu Lys Asn Val Phe Pro Pro Glu Val Ala
    130                 135                 140
Val Phe Glu Pro Ser Glu Ala Glu Ile Ser His Thr Gln Lys Ala Thr
145                 150                 155                 160
Leu Val Cys Leu Ala Thr Gly Phe Tyr Pro Asp His Val Glu Leu Ser
                165                 170                 175
Trp Trp Val Asn Gly Lys Glu Val His Ser Gly Val Ser Thr Asp Pro
            180                 185                 190
Gln Pro Leu Lys Glu Gln Pro Ala Leu Asn Asp Ser Arg Tyr Ala Leu
        195                 200                 205
Ser Ser Arg Leu Arg Val Ser Ala Thr Phe Trp Gln Asp Pro Arg Asn
    210                 215                 220
His Phe Arg Cys Gln Val Gln Phe Tyr Gly Leu Ser Glu Asn Asp Glu
```

```
             225                 230                 235                 240
    Trp Thr Gln Asp Arg Ala Lys Pro Val Thr Gln Ile Val Ser Ala Glu
                     245                 250                 255

Ala Trp Gly Arg Ala Asp Gly Ser Pro Lys Phe Trp Val Leu Val Val
                     260                 265                 270

Val Gly Gly Val Leu Ala Cys Tyr Ser Leu Leu Val Thr Val Ala Phe
                     275                 280                 285

Ile Ile Phe Trp Val Lys Arg Gly Arg Lys Lys Leu Leu Tyr Ile Phe
                     290                 295                 300

Lys Gln Pro Phe Met Arg Pro Val Gln Thr Thr Gln Glu Glu Asp Gly
    305                 310                 315                 320

Cys Ser Cys Arg Phe Pro Glu Glu Glu Glu Gly Gly Cys Glu Leu Arg
                     325                 330                 335

Val Lys Phe Ser Arg Ser Ala Asp Ala Pro Ala Tyr Gln Gln Gly Gln
                     340                 345                 350

Asn Gln Leu Tyr Asn Glu Leu Asn Leu Gly Arg Arg Glu Glu Tyr Asp
                     355                 360                 365

Val Leu Asp Lys Arg Arg Gly Arg Asp Pro Glu Met Gly Gly Lys Pro
                     370                 375                 380

Arg Arg Lys Asn Pro Gln Glu Gly Leu Tyr Asn Glu Leu Gln Lys Asp
    385                 390                 395                 400

Lys Met Ala Glu Ala Tyr Ser Glu Ile Gly Met Lys Gly Glu Arg Arg
                     405                 410                 415

Arg Gly Lys Gly His Asp Gly Leu Tyr Gln Gly Leu Ser Thr Ala Thr
                     420                 425                 430

Lys Asp Thr Tyr Asp Ala Leu His Met Gln Ala Leu Pro Pro Arg Ala
                     435                 440                 445

Lys Arg Ser Gly Ser Gly Ala Thr Asn Phe Ser Leu Leu Lys Gln Ala
                     450                 455                 460

Gly Asp Val Glu Glu Asn Pro Gly Pro Met Glu Thr Leu Leu Gly Leu
    465                 470                 475                 480

Leu Ile Leu Trp Leu Gln Leu Gln Trp Val Ser Ser Lys Gln Glu Val
                     485                 490                 495

Thr Gln Ile Pro Ala Ala Leu Ser Val Pro Glu Gly Glu Asn Leu Val
                     500                 505                 510

Leu Asn Cys Ser Phe Thr Asp Ser Ala Ile Tyr Asn Leu Gln Trp Phe
                     515                 520                 525

Arg Gln Asp Pro Gly Lys Gly Leu Thr Ser Leu Leu Leu Ile Gln Ser
                     530                 535                 540

Ser Gln Arg Glu Gln Thr Ser Gly Arg Leu Asn Ala Ser Leu Asp Lys
    545                 550                 555                 560

Ser Ser Gly Arg Ser Thr Leu Tyr Ile Ala Ala Ser Gln Pro Gly Asp
                     565                 570                 575

Ser Ala Thr Tyr Leu Cys Ala Val Arg Pro Leu Tyr Gly Gly Ser Tyr
                     580                 585                 590

Ile Pro Thr Phe Gly Arg Gly Thr Ser Leu Ile Val His Pro Tyr Ile
                     595                 600                 605

Gln Asn Pro Asp Pro Ala Val Tyr Gln Leu Arg Asp Ser Lys Ser Ser
                     610                 615                 620

Asp Lys Ser Val Cys Leu Phe Thr Asp Phe Asp Ser Gln Thr Asn Val
    625                 630                 635                 640

Ser Gln Ser Lys Asp Ser Asp Val Tyr Ile Thr Asp Lys Thr Val Leu
                     645                 650                 655
```

```
Asp Met Arg Ser Met Asp Phe Lys Ser Asn Ser Ala Val Ala Trp Ser
            660                 665                 670

Asn Lys Ser Asp Phe Ala Cys Ala Asn Ala Phe Asn Asn Ser Ile Ile
        675                 680                 685

Pro Glu Asp Thr Phe Phe Pro Ser Pro Glu Ser Gly Ser Pro Lys
    690                 695                 700

Phe Trp Val Leu Val Val Gly Val Leu Ala Cys Tyr Ser Leu
705                 710                 715                 720

Leu Val Thr Val Ala Phe Ile Ile Phe Trp Val Lys Arg Gly Arg Lys
                725                 730                 735

Lys Leu Leu Tyr Ile Phe Lys Gln Pro Phe Met Arg Pro Val Gln Thr
            740                 745                 750

Thr Gln Glu Glu Asp Gly Cys Ser Cys Arg Phe Pro Glu Glu Glu Glu
        755                 760                 765

Gly Gly Cys Glu Leu Arg Val Lys Phe Ser Arg Ser Ala Asp Ala Pro
    770                 775                 780

Ala Tyr Gln Gln Gly Gln Asn Gln Leu Tyr Asn Glu Leu Asn Leu Gly
785                 790                 795                 800

Arg Arg Glu Glu Tyr Asp Val Leu Asp Lys Arg Gly Arg Asp Pro
                805                 810                 815

Glu Met Gly Gly Lys Pro Arg Arg Lys Asn Pro Gln Glu Gly Leu Tyr
            820                 825                 830

Asn Glu Leu Gln Lys Asp Lys Met Ala Glu Ala Tyr Ser Glu Ile Gly
        835                 840                 845

Met Lys Gly Glu Arg Arg Arg Gly Lys Gly His Asp Gly Leu Tyr Gln
    850                 855                 860

Gly Leu Ser Thr Ala Thr Lys Asp Thr Tyr Asp Ala Leu His Met Gln
865                 870                 875                 880

Ala Leu Pro Pro Arg
                885

<210> SEQ ID NO 34
<211> LENGTH: 967
<212> TYPE: PRT
<213> ORGANISM: Artificial sequence
<220> FEATURE:
<223> OTHER INFORMATION: Synthetic

<400> SEQUENCE: 34

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125
```

```
Leu Thr Val Leu Glu Asp Leu Lys Asn Val Phe Pro Pro Glu Val Ala
    130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Gly Ser Pro Lys Phe Trp Val Leu Val Val
            260                 265                 270

Val Gly Gly Val Leu Ala Cys Tyr Ser Leu Leu Val Thr Val Ala Phe
        275                 280                 285

Ile Ile Phe Trp Val Arg Ser Lys Arg Ser Arg Leu Leu His Ser Asp
    290                 295                 300

Tyr Met Asn Met Thr Pro Arg Arg Pro Gly Pro Thr Arg Lys His Tyr
305                 310                 315                 320

Gln Pro Tyr Ala Pro Pro Arg Asp Phe Ala Ala Tyr Arg Ser Lys Arg
                325                 330                 335

Gly Arg Lys Lys Leu Leu Tyr Ile Phe Lys Gln Pro Phe Met Arg Pro
            340                 345                 350

Val Gln Thr Thr Gln Glu Glu Asp Gly Cys Ser Cys Arg Phe Pro Glu
        355                 360                 365

Glu Glu Glu Gly Gly Cys Glu Leu Arg Val Lys Phe Ser Arg Ser Ala
    370                 375                 380

Asp Ala Pro Ala Tyr Gln Gln Gly Gln Asn Gln Leu Tyr Asn Glu Leu
385                 390                 395                 400

Asn Leu Gly Arg Arg Glu Glu Tyr Asp Val Leu Asp Lys Arg Arg Gly
                405                 410                 415

Arg Asp Pro Glu Met Gly Gly Lys Pro Arg Arg Lys Asn Pro Gln Glu
            420                 425                 430

Gly Leu Tyr Asn Glu Leu Gln Lys Asp Lys Met Ala Glu Ala Tyr Ser
        435                 440                 445

Glu Ile Gly Met Lys Gly Glu Arg Arg Arg Gly Lys Gly His Asp Gly
    450                 455                 460

Leu Tyr Gln Gly Leu Ser Thr Ala Thr Lys Asp Thr Tyr Asp Ala Leu
465                 470                 475                 480

His Met Gln Ala Leu Pro Pro Arg Ala Lys Arg Ser Gly Ser Gly Ala
                485                 490                 495

Thr Asn Phe Ser Leu Leu Lys Gln Ala Gly Asp Val Glu Glu Asn Pro
            500                 505                 510

Gly Pro Met Glu Thr Leu Leu Gly Leu Leu Ile Leu Trp Leu Gln Leu
        515                 520                 525

Gln Trp Val Ser Ser Lys Gln Glu Val Thr Gln Ile Pro Ala Ala Leu
    530                 535                 540
```

```
Ser Val Pro Glu Gly Glu Asn Leu Val Leu Asn Cys Ser Phe Thr Asp
545                 550                 555                 560

Ser Ala Ile Tyr Asn Leu Gln Trp Phe Arg Gln Asp Pro Gly Lys Gly
            565                 570                 575

Leu Thr Ser Leu Leu Leu Ile Gln Ser Ser Gln Arg Glu Gln Thr Ser
            580                 585                 590

Gly Arg Leu Asn Ala Ser Leu Asp Lys Ser Ser Gly Arg Ser Thr Leu
            595                 600                 605

Tyr Ile Ala Ala Ser Gln Pro Gly Asp Ser Ala Thr Tyr Leu Cys Ala
            610                 615                 620

Val Arg Pro Leu Tyr Gly Gly Ser Tyr Ile Pro Thr Phe Gly Arg Gly
625                 630                 635                 640

Thr Ser Leu Ile Val His Pro Tyr Ile Gln Asn Pro Asp Pro Ala Val
            645                 650                 655

Tyr Gln Leu Arg Asp Ser Lys Ser Ser Asp Lys Ser Val Cys Leu Phe
            660                 665                 670

Thr Asp Phe Asp Ser Gln Thr Asn Val Ser Gln Ser Lys Asp Ser Asp
            675                 680                 685

Val Tyr Ile Thr Asp Lys Thr Val Leu Asp Met Arg Ser Met Asp Phe
            690                 695                 700

Lys Ser Asn Ser Ala Val Ala Trp Ser Asn Lys Ser Asp Phe Ala Cys
705                 710                 715                 720

Ala Asn Ala Phe Asn Asn Ser Ile Ile Pro Glu Asp Thr Phe Phe Pro
            725                 730                 735

Ser Pro Glu Ser Ser Gly Ser Pro Lys Phe Trp Val Leu Val Val Val
            740                 745                 750

Gly Gly Val Leu Ala Cys Tyr Ser Leu Leu Val Thr Val Ala Phe Ile
            755                 760                 765

Ile Phe Trp Val Arg Ser Lys Arg Ser Arg Leu Leu His Ser Asp Tyr
            770                 775                 780

Met Asn Met Thr Pro Arg Arg Pro Gly Pro Thr Arg Lys His Tyr Gln
785                 790                 795                 800

Pro Tyr Ala Pro Pro Arg Asp Phe Ala Ala Tyr Arg Ser Lys Arg Gly
            805                 810                 815

Arg Lys Lys Leu Leu Tyr Ile Phe Lys Gln Pro Phe Met Arg Pro Val
            820                 825                 830

Gln Thr Thr Gln Glu Glu Asp Gly Cys Ser Cys Arg Phe Pro Glu Glu
            835                 840                 845

Glu Glu Gly Gly Cys Glu Leu Arg Val Lys Phe Ser Arg Ser Ala Asp
850                 855                 860

Ala Pro Ala Tyr Gln Gln Gly Gln Asn Gln Leu Tyr Asn Glu Leu Asn
865                 870                 875                 880

Leu Gly Arg Arg Glu Glu Tyr Asp Val Leu Asp Lys Arg Arg Gly Arg
            885                 890                 895

Asp Pro Glu Met Gly Gly Lys Pro Arg Arg Lys Asn Pro Gln Glu Gly
            900                 905                 910

Leu Tyr Asn Glu Leu Gln Lys Asp Lys Met Ala Glu Ala Tyr Ser Glu
            915                 920                 925

Ile Gly Met Lys Gly Glu Arg Arg Arg Gly Lys Gly His Asp Gly Leu
            930                 935                 940

Tyr Gln Gly Leu Ser Thr Ala Thr Lys Asp Thr Tyr Asp Ala Leu His
945                 950                 955                 960

Met Gln Ala Leu Pro Pro Arg
```

<210> SEQ ID NO 35
<211> LENGTH: 883
<212> TYPE: PRT
<213> ORGANISM: Artificial sequence
<220> FEATURE:
<223> OTHER INFORMATION: Synthetic

<400> SEQUENCE: 35

```
Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Gly Ser Pro Lys Phe Trp Val Leu Val Val
            260                 265                 270

Val Gly Gly Val Leu Ala Cys Tyr Ser Leu Leu Val Thr Val Ala Phe
        275                 280                 285

Ile Ile Phe Trp Val Arg Ser Lys Arg Ser Arg Leu Leu His Ser Asp
    290                 295                 300

Tyr Met Asn Met Thr Pro Arg Arg Pro Gly Pro Thr Arg Lys His Tyr
305                 310                 315                 320

Gln Pro Tyr Ala Pro Pro Arg Asp Phe Ala Ala Tyr Arg Ser Arg Val
                325                 330                 335

Lys Phe Ser Arg Ser Ala Asp Ala Pro Ala Tyr Gln Gln Gly Gln Asn
            340                 345                 350

Gln Leu Tyr Asn Glu Leu Asn Leu Gly Arg Arg Glu Glu Tyr Asp Val
```

```
                355                 360                 365
Leu Asp Lys Arg Arg Gly Arg Asp Pro Glu Met Gly Gly Lys Pro Arg
    370                 375                 380
Arg Lys Asn Pro Gln Glu Gly Leu Tyr Asn Glu Leu Gln Lys Asp Lys
385                 390                 395                 400
Met Ala Glu Ala Tyr Ser Glu Ile Gly Met Lys Gly Glu Arg Arg Arg
                405                 410                 415
Gly Lys Gly His Asp Gly Leu Tyr Gln Gly Leu Ser Thr Ala Thr Lys
            420                 425                 430
Asp Thr Tyr Asp Ala Leu His Met Gln Ala Leu Pro Pro Arg Ala Lys
            435                 440                 445
Arg Ser Gly Ser Gly Ala Thr Asn Phe Ser Leu Leu Lys Gln Ala Gly
450                 455                 460
Asp Val Glu Glu Asn Pro Gly Pro Met Glu Thr Leu Leu Gly Leu Leu
465                 470                 475                 480
Ile Leu Trp Leu Gln Leu Gln Trp Val Ser Ser Lys Gln Glu Val Thr
                485                 490                 495
Gln Ile Pro Ala Ala Leu Ser Val Pro Glu Gly Glu Asn Leu Val Leu
            500                 505                 510
Asn Cys Ser Phe Thr Asp Ser Ala Ile Tyr Asn Leu Gln Trp Phe Arg
            515                 520                 525
Gln Asp Pro Gly Lys Gly Leu Thr Ser Leu Leu Leu Ile Gln Ser Ser
            530                 535                 540
Gln Arg Glu Gln Thr Ser Gly Arg Leu Asn Ala Ser Leu Asp Lys Ser
545                 550                 555                 560
Ser Gly Arg Ser Thr Leu Tyr Ile Ala Ala Ser Gln Pro Gly Asp Ser
                565                 570                 575
Ala Thr Tyr Leu Cys Ala Val Arg Pro Leu Tyr Gly Gly Ser Tyr Ile
                580                 585                 590
Pro Thr Phe Gly Arg Gly Thr Ser Leu Ile Val His Pro Tyr Ile Gln
            595                 600                 605
Asn Pro Asp Pro Ala Val Tyr Gln Leu Arg Asp Ser Lys Ser Ser Asp
610                 615                 620
Lys Ser Val Cys Leu Phe Thr Asp Phe Asp Ser Gln Thr Asn Val Ser
625                 630                 635                 640
Gln Ser Lys Asp Ser Asp Val Tyr Ile Thr Asp Lys Thr Val Leu Asp
                645                 650                 655
Met Arg Ser Met Asp Phe Lys Ser Asn Ser Ala Val Ala Trp Ser Asn
                660                 665                 670
Lys Ser Asp Phe Ala Cys Ala Asn Ala Phe Asn Asn Ser Ile Ile Pro
            675                 680                 685
Glu Asp Thr Phe Phe Pro Ser Pro Glu Ser Ser Gly Ser Pro Lys Cys
            690                 695                 700
Asp Ile Tyr Ile Trp Ala Pro Leu Ala Gly Thr Cys Gly Val Leu Leu
705                 710                 715                 720
Leu Ser Leu Val Ile Thr Leu Tyr Cys Lys Arg Gly Arg Lys Lys Leu
                725                 730                 735
Leu Tyr Ile Phe Lys Gln Pro Phe Met Arg Pro Val Gln Thr Thr Gln
            740                 745                 750
Glu Glu Asp Gly Cys Ser Cys Arg Phe Pro Glu Glu Glu Glu Gly Gly
            755                 760                 765
Cys Glu Leu Arg Val Lys Phe Ser Arg Ser Ala Asp Ala Pro Ala Tyr
            770                 775                 780
```

```
Gln Gln Gly Gln Asn Gln Leu Tyr Asn Glu Leu Asn Leu Gly Arg Arg
785                 790                 795                 800

Glu Glu Tyr Asp Val Leu Asp Lys Arg Arg Gly Arg Asp Pro Glu Met
                805                 810                 815

Gly Gly Lys Pro Arg Arg Lys Asn Pro Gln Glu Gly Leu Tyr Asn Glu
            820                 825                 830

Leu Gln Lys Asp Lys Met Ala Glu Ala Tyr Ser Glu Ile Gly Met Lys
            835                 840                 845

Gly Glu Arg Arg Arg Gly Lys Gly His Asp Gly Leu Tyr Gln Gly Leu
        850                 855                 860

Ser Thr Ala Thr Lys Asp Thr Tyr Asp Ala Leu His Met Gln Ala Leu
865                 870                 875                 880

Pro Pro Arg

<210> SEQ ID NO 36
<211> LENGTH: 771
<212> TYPE: PRT
<213> ORGANISM: Artificial sequence
<220> FEATURE:
<223> OTHER INFORMATION: Synthetic

<400> SEQUENCE: 36

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255
```

```
Ala Trp Gly Arg Ala Asp Gly Ser Pro Lys Phe Trp Val Leu Val Val
            260                 265                 270

Val Gly Gly Val Leu Ala Cys Tyr Ser Leu Leu Val Thr Val Ala Phe
        275                 280                 285

Ile Ile Phe Trp Val Arg Ser Lys Arg Ser Arg Leu Leu His Ser Asp
    290                 295                 300

Tyr Met Asn Met Thr Pro Arg Arg Pro Gly Pro Thr Arg Lys His Tyr
305                 310                 315                 320

Gln Pro Tyr Ala Pro Pro Arg Asp Phe Ala Ala Tyr Arg Ser Arg Val
                325                 330                 335

Lys Phe Ser Arg Ser Ala Asp Ala Pro Ala Tyr Gln Gln Gly Gln Asn
            340                 345                 350

Gln Leu Tyr Asn Glu Leu Asn Leu Gly Arg Arg Glu Glu Tyr Asp Val
        355                 360                 365

Leu Asp Lys Arg Arg Gly Arg Asp Pro Glu Met Gly Gly Lys Pro Arg
    370                 375                 380

Arg Lys Asn Pro Gln Glu Gly Leu Tyr Asn Glu Leu Gln Lys Asp Lys
385                 390                 395                 400

Met Ala Glu Ala Tyr Ser Glu Ile Gly Met Lys Gly Glu Arg Arg Arg
                405                 410                 415

Gly Lys Gly His Asp Gly Leu Tyr Gln Gly Leu Ser Thr Ala Thr Lys
            420                 425                 430

Asp Thr Tyr Asp Ala Leu His Met Gln Ala Leu Pro Pro Arg Ala Lys
        435                 440                 445

Arg Ser Gly Ser Gly Ala Thr Asn Phe Ser Leu Leu Lys Gln Ala Gly
    450                 455                 460

Asp Val Glu Glu Asn Pro Gly Pro Met Glu Thr Leu Leu Gly Leu Leu
465                 470                 475                 480

Ile Leu Trp Leu Gln Leu Gln Trp Val Ser Ser Lys Gln Glu Val Thr
                485                 490                 495

Gln Ile Pro Ala Ala Leu Ser Val Pro Glu Gly Glu Asn Leu Val Leu
            500                 505                 510

Asn Cys Ser Phe Thr Asp Ser Ala Ile Tyr Asn Leu Gln Trp Phe Arg
        515                 520                 525

Gln Asp Pro Gly Lys Gly Leu Thr Ser Leu Leu Leu Ile Gln Ser Ser
    530                 535                 540

Gln Arg Glu Gln Thr Ser Gly Arg Leu Asn Ala Ser Leu Asp Lys Ser
545                 550                 555                 560

Ser Gly Arg Ser Thr Leu Tyr Ile Ala Ala Ser Gln Pro Gly Asp Ser
                565                 570                 575

Ala Thr Tyr Leu Cys Ala Val Arg Pro Leu Tyr Gly Gly Ser Tyr Ile
            580                 585                 590

Pro Thr Phe Gly Arg Gly Thr Ser Leu Ile Val His Pro Tyr Ile Gln
        595                 600                 605

Asn Pro Asp Pro Ala Val Tyr Gln Leu Arg Asp Ser Lys Ser Ser Asp
    610                 615                 620

Lys Ser Val Cys Leu Phe Thr Asp Phe Asp Ser Gln Thr Asn Val Ser
625                 630                 635                 640

Gln Ser Lys Asp Ser Asp Val Tyr Ile Thr Asp Lys Thr Val Leu Asp
                645                 650                 655

Met Arg Ser Met Asp Phe Lys Ser Asn Ser Ala Val Ala Trp Ser Asn
            660                 665                 670

Lys Ser Asp Phe Ala Cys Ala Asn Ala Phe Asn Asn Ser Ile Ile Pro
```

```
                 675                 680                 685

Glu Asp Thr Phe Phe Pro Ser Pro Glu Ser Ser Gly Ser Pro Lys Cys
            690                 695                 700

Asp Ile Tyr Ile Trp Ala Pro Leu Ala Gly Thr Cys Gly Val Leu Leu
705                 710                 715                 720

Leu Ser Leu Val Ile Thr Leu Tyr Cys Lys Arg Gly Arg Lys Lys Leu
                725                 730                 735

Leu Tyr Ile Phe Lys Gln Pro Phe Met Arg Pro Val Gln Thr Thr Gln
            740                 745                 750

Glu Glu Asp Gly Cys Ser Cys Arg Phe Pro Glu Glu Glu Glu Gly Gly
            755                 760                 765

Cys Glu Leu
    770

<210> SEQ ID NO 37
<211> LENGTH: 884
<212> TYPE: PRT
<213> ORGANISM: Artificial sequence
<220> FEATURE:
<223> OTHER INFORMATION: Synthetic

<400> SEQUENCE: 37

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
    130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Gly Ser Pro Lys Phe Trp Val Leu Val Val
```

```
                260                 265                 270
Val Gly Gly Val Leu Ala Cys Tyr Ser Leu Leu Val Thr Val Ala Phe
                275                 280                 285

Ile Ile Phe Trp Val Arg Ser Lys Arg Ser Arg Leu Leu His Ser Asp
            290                 295                 300

Tyr Met Asn Met Thr Pro Arg Arg Pro Gly Pro Thr Arg Lys His Tyr
305                 310                 315                 320

Gln Pro Tyr Ala Pro Arg Asp Phe Ala Ala Tyr Arg Ser Arg Val
                325                 330                 335

Lys Phe Ser Arg Ser Ala Asp Ala Pro Ala Tyr Gln Gln Gly Gln Asn
                340                 345                 350

Gln Leu Tyr Asn Glu Leu Asn Leu Gly Arg Arg Glu Glu Tyr Asp Val
            355                 360                 365

Leu Asp Lys Arg Arg Gly Arg Asp Pro Glu Met Gly Gly Lys Pro Arg
            370                 375                 380

Arg Lys Asn Pro Gln Glu Gly Leu Tyr Asn Glu Leu Gln Lys Asp Lys
385                 390                 395                 400

Met Ala Glu Ala Tyr Ser Glu Ile Gly Met Lys Gly Glu Arg Arg Arg
                405                 410                 415

Gly Lys Gly His Asp Gly Leu Tyr Gln Gly Leu Ser Thr Ala Thr Lys
                420                 425                 430

Asp Thr Tyr Asp Ala Leu His Met Gln Ala Leu Pro Pro Arg Ala Lys
            435                 440                 445

Arg Ser Gly Ser Gly Ala Thr Asn Phe Ser Leu Leu Lys Gln Ala Gly
            450                 455                 460

Asp Val Glu Glu Asn Pro Gly Pro Met Glu Thr Leu Leu Gly Leu Leu
465                 470                 475                 480

Ile Leu Trp Leu Gln Leu Gln Trp Val Ser Ser Lys Gln Glu Val Thr
                485                 490                 495

Gln Ile Pro Ala Ala Leu Ser Val Pro Glu Gly Glu Asn Leu Val Leu
                500                 505                 510

Asn Cys Ser Phe Thr Asp Ser Ala Ile Tyr Asn Leu Gln Trp Phe Arg
            515                 520                 525

Gln Asp Pro Gly Lys Gly Leu Thr Ser Leu Leu Leu Ile Gln Ser Ser
            530                 535                 540

Gln Arg Glu Gln Thr Ser Gly Arg Leu Asn Ala Ser Leu Asp Lys Ser
545                 550                 555                 560

Ser Gly Arg Ser Thr Leu Tyr Ile Ala Ala Ser Gln Pro Gly Asp Ser
                565                 570                 575

Ala Thr Tyr Leu Cys Ala Val Arg Pro Leu Tyr Gly Gly Ser Tyr Ile
                580                 585                 590

Pro Thr Phe Gly Arg Gly Thr Ser Leu Ile Val His Pro Tyr Ile Gln
            595                 600                 605

Asn Pro Asp Pro Ala Val Tyr Gln Leu Arg Asp Ser Lys Ser Ser Asp
            610                 615                 620

Lys Ser Val Cys Leu Phe Thr Asp Phe Asp Ser Gln Thr Asn Val Ser
625                 630                 635                 640

Gln Ser Lys Asp Ser Asp Val Tyr Ile Thr Asp Lys Thr Val Leu Asp
                645                 650                 655

Met Arg Ser Met Asp Phe Lys Ser Asn Ser Ala Val Ala Trp Ser Asn
            660                 665                 670

Lys Ser Asp Phe Ala Cys Ala Asn Ala Phe Asn Asn Ser Ile Ile Pro
            675                 680                 685
```

```
Glu Asp Thr Phe Phe Pro Ser Pro Glu Ser Ser Gly Ser Pro Lys Phe
    690                 695                 700

Trp Val Leu Val Val Val Gly Gly Val Leu Ala Cys Tyr Ser Leu Leu
705                 710                 715                 720

Val Thr Val Ala Phe Ile Ile Phe Trp Val Lys Arg Gly Arg Lys Lys
                725                 730                 735

Leu Leu Tyr Ile Phe Lys Gln Pro Phe Met Arg Pro Val Gln Thr Thr
            740                 745                 750

Gln Glu Glu Asp Gly Cys Ser Cys Arg Phe Pro Glu Glu Glu Glu Gly
        755                 760                 765

Gly Cys Glu Leu Arg Val Lys Phe Ser Arg Ser Ala Asp Ala Pro Ala
    770                 775                 780

Tyr Gln Gln Gly Gln Asn Gln Leu Tyr Asn Glu Leu Asn Leu Gly Arg
785                 790                 795                 800

Arg Glu Glu Tyr Asp Val Leu Asp Lys Arg Gly Arg Asp Pro Glu
                805                 810                 815

Met Gly Gly Lys Pro Arg Arg Lys Asn Pro Gln Glu Gly Leu Tyr Asn
                820                 825                 830

Glu Leu Gln Lys Asp Lys Met Ala Glu Ala Tyr Ser Glu Ile Gly Met
            835                 840                 845

Lys Gly Glu Arg Arg Arg Gly Lys Gly His Asp Gly Leu Tyr Gln Gly
    850                 855                 860

Leu Ser Thr Ala Thr Lys Asp Thr Tyr Asp Ala Leu His Met Gln Ala
865                 870                 875                 880

Leu Pro Pro Arg

<210> SEQ ID NO 38
<211> LENGTH: 882
<212> TYPE: PRT
<213> ORGANISM: Artificial sequence
<220> FEATURE:
<223> OTHER INFORMATION: Synthetic

<400> SEQUENCE: 38

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
                20                  25                  30

Lys Thr Gly Gln Ser Met Thr Leu Gln Cys Ala Gln Asp Met Asn His
            35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
    130                 135                 140

Val Phe Glu Pro Ser Glu Ala Glu Ile Ser His Thr Gln Lys Ala Thr
145                 150                 155                 160
```

```
Leu Val Cys Leu Ala Thr Gly Phe Tyr Pro Asp His Val Glu Leu Ser
            165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
            195                 200                 205

Ser Ser Arg Leu Arg Val Ser Ala Thr Phe Trp Gln Asp Pro Arg Asn
            210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
            245                 250                 255

Ala Trp Gly Arg Ala Asp Gly Ser Pro Lys Cys Asp Ile Tyr Ile Trp
            260                 265                 270

Ala Pro Leu Ala Gly Thr Cys Gly Val Leu Leu Leu Ser Leu Val Ile
            275                 280                 285

Thr Leu Tyr Cys Arg Ser Lys Arg Ser Arg Leu Leu His Ser Asp Tyr
            290                 295                 300

Met Asn Met Thr Pro Arg Arg Pro Gly Pro Thr Arg Lys His Tyr Gln
305                 310                 315                 320

Pro Tyr Ala Pro Pro Arg Asp Phe Ala Ala Tyr Arg Ser Arg Val Lys
            325                 330                 335

Phe Ser Arg Ser Ala Asp Ala Pro Ala Tyr Gln Gln Gly Gln Asn Gln
            340                 345                 350

Leu Tyr Asn Glu Leu Asn Leu Gly Arg Arg Glu Glu Tyr Asp Val Leu
            355                 360                 365

Asp Lys Arg Arg Gly Arg Asp Pro Glu Met Gly Gly Lys Pro Arg Arg
            370                 375                 380

Lys Asn Pro Gln Glu Gly Leu Tyr Asn Glu Leu Gln Lys Asp Lys Met
385                 390                 395                 400

Ala Glu Ala Tyr Ser Glu Ile Gly Met Lys Gly Glu Arg Arg Arg Gly
            405                 410                 415

Lys Gly His Asp Gly Leu Tyr Gln Gly Leu Ser Thr Ala Thr Lys Asp
            420                 425                 430

Thr Tyr Asp Ala Leu His Met Gln Ala Leu Pro Pro Arg Ala Lys Arg
            435                 440                 445

Ser Gly Ser Gly Ala Thr Asn Phe Ser Leu Leu Lys Gln Ala Gly Asp
            450                 455                 460

Val Glu Glu Asn Pro Gly Pro Met Glu Thr Leu Leu Gly Leu Leu Ile
465                 470                 475                 480

Leu Trp Leu Gln Leu Gln Trp Val Ser Ser Lys Gln Glu Val Thr Gln
            485                 490                 495

Ile Pro Ala Ala Leu Ser Val Pro Glu Gly Glu Asn Leu Val Leu Asn
            500                 505                 510

Cys Ser Phe Thr Asp Ser Ala Ile Tyr Asn Leu Gln Trp Phe Arg Gln
            515                 520                 525

Asp Pro Gly Lys Gly Leu Thr Ser Leu Leu Leu Ile Gln Ser Ser Gln
            530                 535                 540

Arg Glu Gln Thr Ser Gly Arg Leu Asn Ala Ser Leu Asp Lys Ser Ser
545                 550                 555                 560

Gly Arg Ser Thr Leu Tyr Ile Ala Ala Ser Gln Pro Gly Asp Ser Ala
            565                 570                 575

Thr Tyr Leu Cys Ala Val Arg Pro Leu Tyr Gly Gly Ser Tyr Ile Pro
```

```
                580             585                 590
Thr Phe Gly Arg Gly Thr Ser Leu Ile Val His Pro Tyr Ile Gln Asn
            595                 600                 605
Pro Asp Pro Ala Val Tyr Gln Leu Arg Asp Ser Lys Ser Ser Asp Lys
        610                 615                 620
Ser Val Cys Leu Phe Thr Asp Phe Asp Ser Gln Thr Asn Val Ser Gln
625                 630                 635                 640
Ser Lys Asp Ser Asp Val Tyr Ile Thr Asp Lys Thr Val Leu Asp Met
                645                 650                 655
Arg Ser Met Asp Phe Lys Ser Asn Ser Ala Val Ala Trp Ser Asn Lys
            660                 665                 670
Ser Asp Phe Ala Cys Ala Asn Ala Phe Asn Asn Ser Ile Ile Pro Glu
        675                 680                 685
Asp Thr Phe Phe Pro Ser Pro Glu Ser Ser Gly Ser Pro Lys Cys Asp
        690                 695                 700
Ile Tyr Ile Trp Ala Pro Leu Ala Gly Thr Cys Gly Val Leu Leu Leu
705                 710                 715                 720
Ser Leu Val Ile Thr Leu Tyr Cys Lys Arg Gly Arg Lys Lys Leu Leu
                725                 730                 735
Tyr Ile Phe Lys Gln Pro Phe Met Arg Pro Val Gln Thr Thr Gln Glu
            740                 745                 750
Glu Asp Gly Cys Ser Cys Arg Phe Pro Glu Glu Glu Gly Gly Cys
            755                 760                 765
Glu Leu Arg Val Lys Phe Ser Arg Ser Ala Asp Ala Pro Ala Tyr Gln
        770                 775                 780
Gln Gly Gln Asn Gln Leu Tyr Asn Glu Leu Asn Leu Gly Arg Arg Glu
785                 790                 795                 800
Glu Tyr Asp Val Leu Asp Lys Arg Gly Arg Asp Pro Glu Met Gly
                805                 810                 815
Gly Lys Pro Arg Arg Lys Asn Pro Gln Glu Gly Leu Tyr Asn Glu Leu
            820                 825                 830
Gln Lys Asp Lys Met Ala Glu Ala Tyr Ser Glu Ile Gly Met Lys Gly
        835                 840                 845
Glu Arg Arg Arg Gly Lys Gly His Asp Gly Leu Tyr Gln Gly Leu Ser
        850                 855                 860
Thr Ala Thr Lys Asp Thr Tyr Asp Ala Leu His Met Gln Ala Leu Pro
865                 870                 875                 880
Pro Arg

<210> SEQ ID NO 39
<211> LENGTH: 965
<212> TYPE: PRT
<213> ORGANISM: Artificial sequence
<220> FEATURE:
<223> OTHER INFORMATION: Synthetic

<400> SEQUENCE: 39

Met Ser Ile Gly Leu Leu Cys Cys Ala Ala Leu Ser Leu Leu Trp Ala
1               5                   10                  15
Gly Pro Val Asn Ala Gly Val Thr Gln Thr Pro Lys Phe Gln Val Leu
                20                  25                  30
Lys Thr Gly Gln Ser Met Thr Leu Gln Cys Ala Gln Asp Met Asn His
            35                  40                  45
Glu Tyr Met Ser Trp Tyr Arg Gln Asp Pro Gly Met Gly Leu Arg Leu
        50                  55                  60
```

```
Ile His Tyr Ser Val Gly Ala Gly Ile Thr Asp Gln Gly Glu Val Pro
 65                  70                  75                  80

Asn Gly Tyr Asn Val Ser Arg Ser Thr Thr Glu Asp Phe Pro Leu Arg
                 85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Gly Ser Pro Lys Cys Asp Ile Tyr Ile Trp
            260                 265                 270

Ala Pro Leu Ala Gly Thr Cys Gly Val Leu Leu Leu Ser Leu Val Ile
        275                 280                 285

Thr Leu Tyr Cys Arg Ser Lys Arg Ser Arg Leu Leu His Ser Asp Tyr
290                 295                 300

Met Asn Met Thr Pro Arg Arg Pro Gly Pro Thr Arg Lys His Tyr Gln
305                 310                 315                 320

Pro Tyr Ala Pro Pro Arg Asp Phe Ala Ala Tyr Arg Ser Arg Ser Lys
                325                 330                 335

Arg Ser Arg Leu Leu His Ser Asp Tyr Met Asn Met Thr Pro Arg Arg
            340                 345                 350

Pro Gly Pro Thr Arg Lys His Tyr Gln Pro Tyr Ala Pro Pro Arg Asp
        355                 360                 365

Phe Ala Ala Tyr Arg Ser Arg Val Lys Phe Ser Arg Ser Ala Asp Ala
370                 375                 380

Pro Ala Tyr Gln Gln Gly Gln Asn Gln Leu Tyr Asn Glu Leu Asn Leu
385                 390                 395                 400

Gly Arg Arg Glu Glu Tyr Asp Val Leu Asp Lys Arg Arg Gly Arg Asp
                405                 410                 415

Pro Glu Met Gly Gly Lys Pro Arg Arg Lys Asn Pro Gln Glu Gly Leu
            420                 425                 430

Tyr Asn Glu Leu Gln Lys Asp Lys Met Ala Glu Ala Tyr Ser Glu Ile
        435                 440                 445

Gly Met Lys Gly Glu Arg Arg Arg Gly Lys Gly His Asp Gly Leu Tyr
450                 455                 460

Gln Gly Leu Ser Thr Ala Thr Lys Asp Thr Tyr Asp Ala Leu His Met
465                 470                 475                 480
```

```
Gln Ala Leu Pro Pro Arg Ala Lys Arg Ser Gly Ser Gly Ala Thr Asn
                485                 490                 495

Phe Ser Leu Leu Lys Gln Ala Gly Asp Val Glu Glu Asn Pro Gly Pro
            500                 505                 510

Met Glu Thr Leu Leu Gly Leu Leu Ile Leu Trp Leu Gln Leu Gln Trp
            515                 520                 525

Val Ser Ser Lys Gln Glu Val Thr Gln Ile Pro Ala Ala Leu Ser Val
530                 535                 540

Pro Glu Gly Glu Asn Leu Val Leu Asn Cys Ser Phe Thr Asp Ser Ala
545                 550                 555                 560

Ile Tyr Asn Leu Gln Trp Phe Arg Gln Asp Pro Gly Lys Gly Leu Thr
                565                 570                 575

Ser Leu Leu Leu Ile Gln Ser Ser Gln Arg Glu Gln Thr Ser Gly Arg
            580                 585                 590

Leu Asn Ala Ser Leu Asp Lys Ser Ser Gly Arg Ser Thr Leu Tyr Ile
            595                 600                 605

Ala Ala Ser Gln Pro Gly Asp Ser Ala Thr Tyr Leu Cys Ala Val Arg
610                 615                 620

Pro Leu Tyr Gly Gly Ser Tyr Ile Pro Thr Phe Gly Arg Gly Thr Ser
625                 630                 635                 640

Leu Ile Val His Pro Tyr Ile Gln Asn Pro Asp Pro Ala Val Tyr Gln
                645                 650                 655

Leu Arg Asp Ser Lys Ser Ser Asp Lys Ser Val Cys Leu Phe Thr Asp
                660                 665                 670

Phe Asp Ser Gln Thr Asn Val Ser Gln Ser Lys Asp Ser Asp Val Tyr
            675                 680                 685

Ile Thr Asp Lys Thr Val Leu Asp Met Arg Ser Met Asp Phe Lys Ser
690                 695                 700

Asn Ser Ala Val Ala Trp Ser Asn Lys Ser Asp Phe Ala Cys Ala Asn
705                 710                 715                 720

Ala Phe Asn Asn Ser Ile Ile Pro Glu Asp Thr Phe Phe Pro Ser Pro
                725                 730                 735

Glu Ser Ser Gly Ser Pro Lys Cys Asp Ile Tyr Ile Trp Ala Pro Leu
            740                 745                 750

Ala Gly Thr Cys Gly Val Leu Leu Leu Ser Leu Val Ile Thr Leu Tyr
            755                 760                 765

Cys Lys Arg Gly Arg Lys Lys Leu Leu Tyr Ile Phe Lys Gln Pro Phe
        770                 775                 780

Met Arg Pro Val Gln Thr Thr Gln Glu Glu Asp Gly Cys Ser Cys Arg
785                 790                 795                 800

Phe Pro Glu Glu Glu Glu Gly Gly Cys Glu Leu Arg Val Lys Phe Ser Arg Ser Ala Asp Ala Pro
                805                 810                 815

Lys Leu Leu Tyr Ile Phe Lys Gln Pro Phe Met Arg Pro Val Gln Thr
            820                 825                 830

Thr Gln Glu Glu Asp Gly Cys Ser Cys Arg Phe Pro Glu Glu Glu
            835                 840                 845

Gly Gly Cys Glu Leu Arg Val Lys Phe Ser Arg Ser Ala Asp Ala Pro
850                 855                 860

Ala Tyr Gln Gln Gly Gln Asn Gln Leu Tyr Asn Glu Leu Asn Leu Gly
865                 870                 875                 880

Arg Arg Glu Glu Tyr Asp Val Leu Asp Lys Arg Arg Gly Arg Asp Pro
                885                 890                 895

Glu Met Gly Gly Lys Pro Arg Arg Lys Asn Pro Gln Glu Gly Leu Tyr
```

```
                    900             905                 910
Asn Glu Leu Gln Lys Asp Lys Met Ala Glu Ala Tyr Ser Glu Ile Gly
            915                 920                 925

Met Lys Gly Glu Arg Arg Gly Lys Gly His Asp Gly Leu Tyr Gln
        930                 935             940

Gly Leu Ser Thr Ala Thr Lys Asp Thr Tyr Asp Ala Leu His Met Gln
945                 950                 955                 960

Ala Leu Pro Pro Arg
                965

<210> SEQ ID NO 40
<211> LENGTH: 1059
<212> TYPE: PRT
<213> ORGANISM: Artificial sequence
<220> FEATURE:
<223> OTHER INFORMATION: Synthetic

<400> SEQUENCE: 40

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
            165                 170                 175

Trp Trp Val Asn Gly Lys Glu Val His Ser Gly Val Ser Thr Asp Pro
        180                 185                 190

Gln Pro Leu Lys Glu Gln Pro Ala Leu Asn Asp Ser Arg Tyr Ala Leu
    195                 200                 205

Ser Ser Arg Leu Arg Val Ser Ala Thr Phe Trp Gln Asp Pro Arg Asn
210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
            245                 250                 255

Ala Trp Gly Arg Ala Asp Gly Ser Pro Lys Ala Lys Pro Thr Thr Thr
        260                 265                 270

Pro Ala Pro Arg Pro Pro Thr Pro Ala Pro Thr Ile Ala Ser Gln Pro
    275                 280                 285

Leu Ser Leu Arg Pro Glu Ala Cys Arg Pro Ala Ala Gly Gly Ala Val
```

```
            290                 295                 300
His Thr Arg Gly Leu Asp Phe Ala Pro Arg Lys Ile Glu Val Met Tyr
305                 310                 315                 320

Pro Pro Pro Tyr Leu Asp Asn Glu Lys Ser Asn Gly Thr Ile Ile His
                325                 330                 335

Val Lys Gly Lys His Leu Cys Pro Ser Pro Leu Phe Pro Gly Pro Ser
            340                 345                 350

Lys Pro Phe Trp Val Leu Val Val Gly Val Leu Ala Cys Tyr
        355                 360                 365

Ser Leu Leu Val Thr Val Ala Phe Ile Ile Phe Trp Val Arg Ser Lys
370                 375                 380

Arg Ser Arg Leu Leu His Ser Asp Tyr Met Asn Met Thr Pro Arg Arg
385                 390                 395                 400

Pro Gly Pro Thr Arg Lys His Tyr Gln Pro Tyr Ala Pro Pro Arg Asp
                405                 410                 415

Phe Ala Ala Tyr Arg Ser Arg Val Lys Phe Ser Arg Ser Ala Asp Ala
            420                 425                 430

Pro Ala Tyr Gln Gln Gly Gln Asn Gln Leu Tyr Asn Glu Leu Asn Leu
            435                 440                 445

Gly Arg Arg Glu Glu Tyr Asp Val Leu Asp Lys Arg Arg Gly Arg Asp
450                 455                 460

Pro Glu Met Gly Gly Lys Pro Arg Arg Lys Asn Pro Gln Glu Gly Leu
465                 470                 475                 480

Tyr Asn Glu Leu Gln Lys Asp Lys Met Ala Glu Ala Tyr Ser Glu Ile
                485                 490                 495

Gly Met Lys Gly Glu Arg Arg Arg Gly Lys Gly His Asp Gly Leu Tyr
                500                 505                 510

Gln Gly Leu Ser Thr Ala Thr Lys Asp Thr Tyr Asp Ala Leu His Met
            515                 520                 525

Gln Ala Leu Pro Pro Arg Ala Lys Arg Ser Gly Ser Gly Ala Thr Asn
            530                 535                 540

Phe Ser Leu Leu Lys Gln Ala Gly Asp Val Glu Glu Asn Pro Gly Pro
545                 550                 555                 560

Met Glu Thr Leu Leu Gly Leu Leu Ile Leu Trp Leu Gln Leu Gln Trp
                565                 570                 575

Val Ser Ser Lys Gln Glu Val Thr Gln Ile Pro Ala Ala Leu Ser Val
            580                 585                 590

Pro Glu Gly Glu Asn Leu Val Leu Asn Cys Ser Phe Thr Asp Ser Ala
            595                 600                 605

Ile Tyr Asn Leu Gln Trp Phe Arg Gln Asp Pro Gly Lys Gly Leu Thr
610                 615                 620

Ser Leu Leu Leu Ile Gln Ser Ser Gln Arg Glu Gln Thr Ser Gly Arg
625                 630                 635                 640

Leu Asn Ala Ser Leu Asp Lys Ser Ser Gly Arg Ser Thr Leu Tyr Ile
                645                 650                 655

Ala Ala Ser Gln Pro Gly Asp Ser Ala Thr Tyr Leu Cys Ala Val Arg
            660                 665                 670

Pro Leu Tyr Gly Gly Ser Tyr Ile Pro Thr Phe Gly Arg Gly Thr Ser
            675                 680                 685

Leu Ile Val His Pro Tyr Ile Gln Asn Pro Asp Pro Ala Val Tyr Gln
            690                 695                 700

Leu Arg Asp Ser Lys Ser Ser Asp Lys Ser Val Cys Leu Phe Thr Asp
705                 710                 715                 720
```

Phe Asp Ser Gln Thr Asn Val Ser Gln Ser Lys Asp Ser Asp Val Tyr
            725                 730                 735

Ile Thr Asp Lys Thr Val Leu Asp Met Arg Ser Met Asp Phe Lys Ser
            740                 745                 750

Asn Ser Ala Val Ala Trp Ser Asn Lys Ser Asp Phe Ala Cys Ala Asn
            755                 760                 765

Ala Phe Asn Asn Ser Ile Ile Pro Glu Asp Thr Phe Phe Pro Ser Pro
            770                 775                 780

Glu Ser Ser Gly Ser Pro Lys Ala Lys Pro Thr Thr Thr Pro Ala Pro
785                 790                 795                 800

Arg Pro Pro Thr Pro Ala Pro Thr Ile Ala Ser Gln Pro Leu Ser Leu
            805                 810                 815

Arg Pro Glu Ala Cys Arg Pro Ala Ala Gly Gly Ala Val His Thr Arg
            820                 825                 830

Gly Leu Asp Phe Ala Pro Arg Lys Ile Glu Val Met Tyr Pro Pro Pro
            835                 840                 845

Tyr Leu Asp Asn Glu Lys Ser Asn Gly Thr Ile Ile His Val Lys Gly
            850                 855                 860

Lys His Leu Cys Pro Ser Pro Leu Phe Pro Gly Pro Ser Lys Pro Phe
865                 870                 875                 880

Trp Val Leu Val Val Val Gly Gly Val Leu Ala Cys Tyr Ser Leu Leu
            885                 890                 895

Val Thr Val Ala Phe Ile Ile Phe Trp Val Arg Ser Lys Arg Ser Arg
            900                 905                 910

Leu Leu His Ser Asp Tyr Met Asn Met Thr Pro Arg Arg Pro Gly Pro
            915                 920                 925

Thr Arg Lys His Tyr Gln Pro Tyr Ala Pro Pro Arg Asp Phe Ala Ala
            930                 935                 940

Tyr Arg Ser Arg Val Lys Phe Ser Arg Ser Ala Asp Ala Pro Ala Tyr
945                 950                 955                 960

Gln Gln Gly Gln Asn Gln Leu Tyr Asn Glu Leu Asn Leu Gly Arg Arg
            965                 970                 975

Glu Glu Tyr Asp Val Leu Asp Lys Arg Arg Gly Arg Asp Pro Glu Met
            980                 985                 990

Gly Gly Lys Pro Arg Arg Lys Asn Pro Gln Glu Gly Leu Tyr Asn Glu
            995                 1000                1005

Leu Gln Lys Asp Lys Met Ala Glu Ala Tyr Ser Glu Ile Gly Met
            1010                1015                1020

Lys Gly Glu Arg Arg Arg Gly Lys Gly His Asp Gly Leu Tyr Gln
            1025                1030                1035

Gly Leu Ser Thr Ala Thr Lys Asp Thr Tyr Asp Ala Leu His Met
            1040                1045                1050

Gln Ala Leu Pro Pro Arg
            1055

<210> SEQ ID NO 41
<211> LENGTH: 859
<212> TYPE: PRT
<213> ORGANISM: Artificial sequence
<220> FEATURE:
<223> OTHER INFORMATION: Synthetic

<400> SEQUENCE: 41

Met Ser Ile Gly Leu Leu Cys Cys Ala Ala Leu Ser Leu Leu Trp Ala
1               5                   10                  15

```
Gly Pro Val Asn Ala Gly Val Thr Gln Thr Pro Lys Phe Gln Val Leu
             20                  25                  30

Lys Thr Gly Gln Ser Met Thr Leu Gln Cys Ala Gln Asp Met Asn His
         35                  40                  45

Glu Tyr Met Ser Trp Tyr Arg Gln Asp Pro Gly Met Gly Leu Arg Leu
     50                  55                  60

Ile His Tyr Ser Val Gly Ala Gly Ile Thr Asp Gln Gly Glu Val Pro
 65                  70                  75                  80

Asn Gly Tyr Asn Val Ser Arg Ser Thr Thr Glu Asp Phe Pro Leu Arg
                 85                  90                  95

Leu Leu Ser Ala Ala Pro Ser Gln Thr Ser Val Tyr Phe Cys Ala Ser
                100                 105                 110

Ser Tyr Val Gly Asn Thr Gly Glu Leu Phe Phe Gly Glu Gly Ser Arg
            115                 120                 125

Leu Thr Val Leu Glu Asp Leu Lys Asn Val Phe Pro Pro Glu Val Ala
        130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Gly Ser Pro Lys Ala Lys Pro Thr Thr Thr
            260                 265                 270

Pro Ala Pro Arg Pro Pro Thr Pro Ala Pro Thr Ile Ala Ser Gln Pro
        275                 280                 285

Leu Ser Leu Arg Pro Glu Ala Cys Arg Pro Ala Ala Gly Gly Ala Val
290                 295                 300

His Thr Arg Gly Leu Asp Phe Ala Pro Arg Lys Ile Glu Val Met Tyr
305                 310                 315                 320

Pro Pro Pro Tyr Leu Asp Asn Glu Lys Ser Asn Gly Thr Ile Ile His
                325                 330                 335

Val Lys Gly Lys His Leu Cys Pro Ser Pro Leu Phe Pro Gly Pro Ser
            340                 345                 350

Lys Pro Phe Trp Val Leu Val Val Gly Gly Val Leu Ala Cys Tyr
        355                 360                 365

Ser Leu Leu Val Thr Val Ala Phe Ile Ile Phe Trp Val Arg Ser Lys
        370                 375                 380

Arg Ser Arg Leu Leu His Ser Asp Tyr Met Asn Met Thr Pro Arg Arg
385                 390                 395                 400

Pro Gly Pro Thr Arg Lys His Tyr Gln Pro Tyr Ala Pro Pro Arg Asp
                405                 410                 415

Phe Ala Ala Tyr Arg Ser Arg Val Lys Phe Ser Arg Ser Ala Asp Ala
            420                 425                 430
```

```
Pro Ala Tyr Gln Gln Gly Gln Asn Gln Leu Tyr Asn Glu Leu Asn Leu
            435                 440                 445
Gly Arg Arg Glu Glu Tyr Asp Val Leu Asp Lys Arg Arg Gly Arg Asp
    450                 455                 460
Pro Glu Met Gly Gly Lys Pro Arg Arg Lys Asn Pro Gln Glu Gly Leu
465                 470                 475                 480
Tyr Asn Glu Leu Gln Lys Asp Lys Met Ala Glu Ala Tyr Ser Glu Ile
                485                 490                 495
Gly Met Lys Gly Glu Arg Arg Arg Gly Lys Gly His Asp Gly Leu Tyr
            500                 505                 510
Gln Gly Leu Ser Thr Ala Thr Lys Asp Thr Tyr Asp Ala Leu His Met
        515                 520                 525
Gln Ala Leu Pro Pro Arg Ala Lys Arg Ser Gly Ser Gly Ala Thr Asn
    530                 535                 540
Phe Ser Leu Leu Lys Gln Ala Gly Asp Val Glu Glu Asn Pro Gly Pro
545                 550                 555                 560
Met Glu Thr Leu Leu Gly Leu Leu Ile Leu Trp Leu Gln Leu Gln Trp
                565                 570                 575
Val Ser Ser Lys Gln Glu Val Thr Gln Ile Pro Ala Ala Leu Ser Val
            580                 585                 590
Pro Glu Gly Glu Asn Leu Val Leu Asn Cys Ser Phe Thr Asp Ser Ala
        595                 600                 605
Ile Tyr Asn Leu Gln Trp Phe Arg Gln Asp Pro Gly Lys Gly Leu Thr
    610                 615                 620
Ser Leu Leu Leu Ile Gln Ser Ser Gln Arg Glu Gln Thr Ser Gly Arg
625                 630                 635                 640
Leu Asn Ala Ser Leu Asp Lys Ser Ser Gly Arg Ser Thr Leu Tyr Ile
                645                 650                 655
Ala Ala Ser Gln Pro Gly Asp Ser Ala Thr Tyr Leu Cys Ala Val Arg
            660                 665                 670
Pro Leu Tyr Gly Gly Ser Tyr Ile Pro Thr Phe Gly Arg Gly Thr Ser
        675                 680                 685
Leu Ile Val His Pro Tyr Ile Gln Asn Pro Asp Pro Ala Val Tyr Gln
    690                 695                 700
Leu Arg Asp Ser Lys Ser Ser Asp Lys Ser Val Cys Leu Phe Thr Asp
705                 710                 715                 720
Phe Asp Ser Gln Thr Asn Val Ser Gln Ser Lys Asp Ser Asp Val Tyr
                725                 730                 735
Ile Thr Asp Lys Thr Val Leu Asp Met Arg Ser Met Asp Phe Lys Ser
            740                 745                 750
Asn Ser Ala Val Ala Trp Ser Asn Lys Ser Asp Phe Ala Cys Ala Asn
        755                 760                 765
Ala Phe Asn Asn Ser Ile Ile Pro Glu Asp Thr Phe Phe Pro Ser Pro
    770                 775                 780
Glu Ser Ser Gly Ser Pro Lys Cys Asp Ile Tyr Ile Trp Ala Pro Leu
785                 790                 795                 800
Ala Gly Thr Cys Gly Val Leu Leu Ser Leu Val Ile Thr Leu Tyr
                805                 810                 815
Cys Lys Arg Gly Arg Lys Lys Leu Leu Tyr Ile Phe Lys Gln Pro Phe
            820                 825                 830
Met Arg Pro Val Gln Thr Thr Gln Glu Glu Asp Gly Cys Ser Cys Arg
        835                 840                 845
Phe Pro Glu Glu Glu Glu Gly Gly Cys Glu Leu
```

<210> SEQ ID NO 42
<211> LENGTH: 120
<212> TYPE: DNA
<213> ORGANISM: Homo sapiens

<400> SEQUENCE: 42
aaaattgaag ttatgtatcc tcctccttac ctagacaatg agaagagcaa tggaaccatt    60
atccatgtga aagggaaaca cctttgtcca agtccccctat ttcccggacc ttctaagccc   120

<210> SEQ ID NO 43
<211> LENGTH: 120
<212> TYPE: DNA
<213> ORGANISM: Homo sapiens

<400> SEQUENCE: 43
aagatcgagg taatgtaccc accgccctat cttgataacg aaaaatctaa cggtacaata    60
attcacgtca agggcaagca tttgtgccct tccccgttgt tcccgggccc aagcaaaccg   120

<210> SEQ ID NO 44
<211> LENGTH: 81
<212> TYPE: DNA
<213> ORGANISM: Homo sapiens

<400> SEQUENCE: 44 tttttgggtgc tggtggtggt tggtggagtc ctggcttgct atagcttgct agtaacagtg    60
gcctttatta ttttctgggt g                                              81

<210> SEQ ID NO 45
<211> LENGTH: 81
<212> TYPE: DNA
<213> ORGANISM: Homo sapiens

<400> SEQUENCE: 45
ttctgggttc tcgtcgtcgt gggaggtgtg ttagcatgtt actctctctt ggttactgtc    60
gctttcataa tcttttgggt c                                              81

<210> SEQ ID NO 46
<211> LENGTH: 123
<212> TYPE: DNA
<213> ORGANISM: Homo sapiens

<400> SEQUENCE: 46
aggagtaaga ggagcaggct cctgcacagt gactacatga acatgactcc ccgccgcccc    60
gggcccaccc gcaagcatta ccagccctat gccccaccac gcgacttcgc agcctatcgc   120
tcc                                                                 123

<210> SEQ ID NO 47
<211> LENGTH: 123
<212> TYPE: DNA
<213> ORGANISM: Artificial sequence
<220> FEATURE:
<223> OTHER INFORMATION: Synthetic

<400> SEQUENCE: 47
cgctcaaaac gctctcgctt gttacattcc gattatatga atatgacacc taggagacct    60
ggcccgacta ggaaacacta tcaacttac gcacctccca gagattttgc tgcttacagg    120
agt                                                                 123

<210> SEQ ID NO 48
<211> LENGTH: 126
<212> TYPE: DNA
<213> ORGANISM: Homo sapiens

<400> SEQUENCE: 48
aaacggggca gaaagaaact cctgtatata ttcaaacaac catttatgag accagtacaa    60
actactcaag aggaagatgg ctgtagctgc cgatttccag aagaagaaga aggaggatgt   120
gaactg                                                              126

<210> SEQ ID NO 49
<211> LENGTH: 126
<212> TYPE: DNA
<213> ORGANISM: Artificial sequence
<220> FEATURE:
<223> OTHER INFORMATION: Synthetic

<400> SEQUENCE: 49
aagagagggc gtaaaaagct gctctacatc tttaagcagc ctttcatgcg tcctgttcag    60
acaacacagg aagaggacgg atgctcttgc aggttccctg aggaggagga gggtggttgc   120
gagctc                                                              126

<210> SEQ ID NO 50
<211> LENGTH: 138
<212> TYPE: DNA
<213> ORGANISM: Homo sapiens

<400> SEQUENCE: 50
gctaagccca ccacgacgcc agcgccgcga ccaccaacac cggcgcccac catcgcgtcg    60
cagcccctgt ccctgcgccc agaggcgtgc cggccagcgg cgggggcgc agtgcacacg    120 aggggggctgg acttcgcc                                                138

<210> SEQ ID NO 51
<211> LENGTH: 138
<212> TYPE: DNA
<213> ORGANISM: Artificial sequence
<220> FEATURE:
<223> OTHER INFORMATION: Synthetic

<400> SEQUENCE: 51
gctaagccca ctactacccc agctcccagg cctcccacac ctgccccaac aatcgccagc    60
cagccactgt cccttaggcc cgaggcctgt aggcccgccg ccggaggagc cgtgcacacc   120
cgcggactgg attttgct                                                 138

<210> SEQ ID NO 52
<211> LENGTH: 78
<212> TYPE: DNA
<213> ORGANISM: Homo sapiens

<400> SEQUENCE: 52
tgtgatatct acatctgggc gcccttggcc gggacttgtg gggtccttct cctgtcactg    60
gttatcaccc tttactgc                                                  78

<210> SEQ ID NO 53
<211> LENGTH: 78
<212> TYPE: DNA
<213> ORGANISM: Artificial sequence
<220> FEATURE:

<223> OTHER INFORMATION: Synthetic

<400> SEQUENCE: 53

| | | | | | |
|---|---|---|---|---|---|
| tgcgacattt | atatttgggc | ccctctcgct | ggcacatgcg | gcgtgttgtt | gctcagcctc | 60 |
| gtgattacac | tttattgt | | | | 78 |

<210> SEQ ID NO 54
<211> LENGTH: 2652
<212> TYPE: DNA
<213> ORGANISM: Artificial sequence
<220> FEATURE:
<223> OTHER INFORMATION: Synthetic

<400> SEQUENCE: 54

| | | | | | |
|---|---|---|---|---|---|
| atgagcatcg | gcctcctgtg | ctgtgcagcc | ttgtctctcc | tgtgggcagg | tccagtgaat | 60 |
| gctggtgtca | ctcagacccc | aaaattccag | gtcctgaaga | caggacagag | catgacactg | 120 |
| cagtgtgccc | aggatatgaa | ccatgaatac | atgtcctggt | atcgacaaga | cccaggcatg | 180 |
| gggctgaggc | tgattcatta | ctcagttggt | gctggtatca | ctgaccaagg | agaagtcccc | 240 |
| aatggctaca | atgtctccag | atcaaccaca | gaggatttcc | cgctcaggct | gctgtcggct | 300 |
| gctccctccc | agacatctgt | gtacttctgt | gccagcagtt | acgtcgggaa | caccggggag | 360 |
| ctgtttttg | gagaaggctc | taggctgacc | gtactggagg | acctgaaaaa | cgtgttccca | 420 |
| cccgaggtcg | ctgtgtttga | gccatcagaa | gcagagatct | cccacaccca | aaaggccaca | 480 |
| ctggtgtgcc | tggccacagg | cttctacccc | gaccacgtgg | agctgagctg | gtgggtgaat | 540 |
| gggaaggagt | gcacagtgg | ggtcagcaca | gacccgcagc | ccctcaagga | gcagcccgcc | 600 |
| ctcaatgact | ccagatacgc | tctgagcagc | cgcctgaggg | tctcggccac | cttctggcag | 660 |
| gacccccgca | accacttccg | ctgtcaagtc | cagttctacg | gctctcgga | gaatgacgag | 720 |
| tggacccagg | atagggccaa | acccgtcacc | cagatcgtca | gcgccgaggc | ctggggtaga | 780 |
| gcagacggct | ctcctaagtg | cgacatttat | atttgggccc | ctctcgctgg | cacatgcggc | 840 |
| gtgttgttgc | tcagcctcgt | gattacactt | tattgtaaga | gagggcgtaa | aaagctgctc | 900 |
| tacatcttta | agcagccttt | catgcgtcct | gttcagacaa | cacaggaaga | ggacggatgc | 960 |
| tcttgcaggt | tccctgagga | ggaggagggt | ggttgcgagc | tccgggtcaa | attttcacgc | 1020 |
| tccgctgatg | ctcctgccta | tcaacaaggg | caaaatcaat | tgtacaatga | attgaacttg | 1080 |
| ggtagaaggg | aagaatatga | cgtgctcgat | aaacggaggg | ggagagatcc | agaaatgggc | 1140 |
| ggtaaaccac | ggcgcaaaaa | tccacaagag | ggattgtata | acgagctcca | aaaggacaaa | 1200 |
| atggcagaag | cttattcaga | aataggaatg | aaggggaaa | ggagacgagg | taaaggtcat | 1260 |
| gacggattgt | atcaaggatt | gtcaaccgct | actaaagata | catatgatgc | tttgcatatg | 1320 |
| caagctttgc | ctcccagagc | caagcggtct | gggtctgggg | ccaccaactt | cagcctgctg | 1380 |
| aagcaggccg | cgacgtgga | ggagaacccc | ggccccatgg | agaccctctt | gggcctgctt | 1440 |
| atcctttggc | tgcagctgca | atgggtgagc | agcaaacagg | aggtgacgca | gattcctgca | 1500 |
| gctctgagtg | tcccagaagg | agaaaacttg | gttctcaact | gcagtttcac | tgatagcgct | 1560 |
| atttacaacc | tccagtggtt | taggcaggac | cctgggaaag | gtctcacatc | tctgttgctt | 1620 |
| attcagtcaa | gtcagagaga | gcaaacaagt | ggaagactta | atgcctcgct | ggataaatca | 1680 |
| tcaggacgta | gtactttata | cattgcagct | tctcagcctg | gtgactcagc | cacctacctc | 1740 |
| tgtgctgtga | ggcccctgta | cggaggaagc | tacatacta | catttggaag | aggaaccagc | 1800 |
| cttattgttc | atccgtatat | ccagaacccct | gaccctgccg | tgtaccagct | gagagactct | 1860 |

| | |
|---|---:|
| aaatccagtg acaagtctgt ctgcctattc accgattttg attctcaaac aaatgtgtca | 1920 |
| caaagtaagg attctgatgt gtatatcaca gacaaaactg tgctagacat gaggtctatg | 1980 |
| gacttcaaga gcaacagtgc tgtggcctgg agcaacaaat ctgactttgc atgtgcaaac | 2040 |
| gccttcaaca acagcattat tccagaagac accttcttcc ccagcccaga aagttccggc | 2100 |
| tccccaaaat gtgatatcta catctgggcg cccttggccg ggacttgtgg ggtccttctc | 2160 |
| ctgtcactgg ttatcaccct ttactgcaaa cggggcagaa agaaactcct gtatatattc | 2220 |
| aaacaaccat ttatgagacc agtacaaact actcaagagg aagatggctg tagctgccga | 2280 |
| tttccagaag aagaagaagg aggatgtgaa ctgagagtga agttcagcag gagcgcagac | 2340 |
| gcccccgcgt accagcaggg ccagaaccag ctctataacg agctcaatct aggacgaaga | 2400 |
| gaggagtacg atgttttgga caagagacgt ggccgggacc tgagatgggg ggaaagccg | 2460 |
| agaaggaaga accctcagga aggcctgtac aatgaactgc agaaagataa gatggcggag | 2520 |
| gcctacagtg agattgggat gaaaggcgag cgccggaggg caaggggca cgatggcctt | 2580 |
| taccagggtc tcagtacagc caccaaggac acctacgacg cccttcacat gcaggccctg | 2640 |
| ccccctcgct aa | 2652 |

<210> SEQ ID NO 55
<211> LENGTH: 2658
<212> TYPE: DNA
<213> ORGANISM: Artificial sequence
<220> FEATURE:
<223> OTHER INFORMATION: Synthetic

<400> SEQUENCE: 55

| | |
|---|---:|
| atgagcatcg gcctcctgtg ctgtgcagcc ttgtctctcc tgtgggcagg tccagtgaat | 60 |
| gctggtgtca ctcagacccc aaaattccag gtcctgaaga caggacagag catgacactg | 120 |
| cagtgtgccc aggatatgaa ccatgaatac atgtcctggt atcgacaaga cccaggcatg | 180 |
| gggctgaggc tgattcatta ctcagttggt gctggtatca ctgaccaagg agaagtcccc | 240 |
| aatggctaca atgtctccag atcaaccaca gaggatttcc cgctcaggct gctgtcggct | 300 |
| gctccctccc agacatctgt gtacttctgt gccagcagtt acgtcgggaa caccggggag | 360 |
| ctgttttttg gagaaggctc taggctgacc gtactggagg acctgaaaaa cgtgttccca | 420 |
| cccgaggtcg ctgtgtttga gccatcagaa gcagagatct cccacaccca aaaggccaca | 480 |
| ctggtgtgcc tggccacagg cttctacccc gaccacgtgg agctgagctg gtgggtgaat | 540 |
| gggaaggagt gcacagtgg ggtcagcaca gacccgcagc ccctcaagga gcagcccgcc | 600 |
| ctcaatgact ccagatacgc tctgagcagc cgcctgaggg tctcggccac cttctggcag | 660 |
| gacccccgca accacttccg ctgtcaagtc cagttctacg gctctcggga atgacgag | 720 |
| tggacccagg atagggccaa acccgtcacc cagatcgtca gcgccgaggc ctggggtaga | 780 |
| gcagacggct ctcctaagtt ctgggttctc gtcgtcgtgg gaggtgtgtt agcatgttac | 840 |
| tctctcttgg ttactgtcgc tttcataatc ttttgggtca agagagggcg taaaaagctg | 900 |
| ctctacatct ttaagcagcc tttcatgcgt cctgttcaga caacacagga agaggacgga | 960 |
| tgctcttgca ggttccctga ggaggaggag ggtggttgcg agctccgggt caaattttca | 1020 |
| cgctccgctg atgctcctgc ctatcaacaa gggcaaaatc aattgtacaa tgaattgaac | 1080 |
| ttgggtagaa gggaagaata tgacgtgctc gataaacgga gggggagaga tccagaaatg | 1140 |
| ggcggtaaac cacggcgcaa aaatccacaa gagggattgt ataacgagct ccaaaaggac | 1200 |

| | |
|---|---:|
| aaaatggcag aagcttattc agaaatagga atgaaggggg aaaggagacg aggtaaaggt | 1260 |
| catgacggat tgtatcaagg attgtcaacc gctactaaag atacatatga tgctttgcat | 1320 |
| atgcaagctt tgcctcccag agccaagcgg tctgggtctg gggccaccaa cttcagcctg | 1380 |
| ctgaagcagg ccggcgacgt ggaggagaac cccggcccca tggagaccct cttgggcctg | 1440 |
| cttatccttt ggctgcagct gcaatgggtg agcagcaaac aggaggtgac gcagattcct | 1500 |
| gcagctctga gtgtcccaga aggagaaaac ttggttctca actgcagttt cactgatagc | 1560 |
| gctatttaca acctccagtg gtttaggcag gaccctggga aaggtctcac atctctgttg | 1620 |
| cttattcagt caagtcagag agagcaaaca agtggaagac ttaatgcctc gctggataaa | 1680 |
| tcatcaggac gtagtacttt atacattgca gcttctcagc tggtgactc agccacctac | 1740 |
| ctctgtgctg tgaggcccct gtacggagga agctacatac ctacatttgg aagaggaacc | 1800 |
| agccttattg ttcatccgta tatccagaac cctgaccctg ccgtgtacca gctgagagac | 1860 |
| tctaaatcca gtgacaagtc tgtctgccta ttcaccgatt ttgattctca aacaaatgtg | 1920 |
| tcacaaagta aggattctga tgtgtatatc acagacaaaa ctgtgctaga catgaggtct | 1980 |
| atggacttca agagcaacag tgctgtggcc tggagcaaca atctgactt tgcatgtgca | 2040 |
| aacgccttca caacagcat tattccagaa gacaccttct tccccagccc agaaagttcc | 2100 |
| ggctccccaa aattttgggt gctggtggtg gttggtggag tcctggcttg ctatagcttg | 2160 |
| ctagtaacag tggcctttat tattttctgg gtgaacgggg gcagaaagaa actcctgtat | 2220 |
| atattcaaac aaccatttat gagaccagta caaactactc aagaggaaga tggctgtagc | 2280 |
| tgccgatttc cagaagaaga agaaggagga tgtgaactga gagtgaagtt cagcaggagc | 2340 |
| gcagacgccc ccgcgtacca gcagggccag aaccagctct ataacgagct caatctagga | 2400 |
| cgaagagagg agtacgatgt tttggacaag agacgtggcc gggaccctga tgggggga | 2460 |
| aagccgagaa ggaagaaccc tcaggaaggc ctgtacaatg aactgcagaa agataagatg | 2520 |
| gcggaggcct acagtgagat tgggatgaaa ggcgagcgcc ggaggggcaa ggggcacgat | 2580 |
| ggcctttacc agggtctcag tacagccacc aaggacacct acgacgccct tcacatgcag | 2640 |
| gccctgcccc ctcgctaa | 2658 |

```
<210> SEQ ID NO 56
<211> LENGTH: 2904
<212> TYPE: DNA
<213> ORGANISM: Artificial sequence
<220> FEATURE:
<223> OTHER INFORMATION: Synthetic

<400> SEQUENCE: 56
```

| | |
|---|---:|
| atgagcatcg gcctcctgtg ctgtgcagcc ttgtctctcc tgtgggcagg tccagtgaat | 60 |
| gctggtgtca ctcagacccc aaaattccag gtcctgaaga caggacagag catgacactg | 120 |
| cagtgtgccc aggatatgaa ccatgaatac atgtcctggt atcgacaaga cccaggcatg | 180 |
| gggctgaggc tgattcatta ctcagttggt gctggtatca ctgaccaagg agaagtcccc | 240 |
| aatggctaca atgtctccag atcaaccaca gaggatttcc cgctcaggct gctgtcggct | 300 |
| gctccctccc agacatctgt gtacttctgt gccagcagtt acgtcgggaa caccggggag | 360 |
| ctgttttttg gagaaggctc taggctgacc gtactggagg acctgaaaaa cgtgttccca | 420 |
| cccgaggtcg ctgtgtttga gccatcagaa gcagagatct cccacaccca aaaggccaca | 480 |
| ctggtgtgcc tggccacagg cttctacccc gaccacgtgg agctgagctg gtgggtgaat | 540 |
| gggaaggagg tgcacagtgg ggtcagcaca gacccgcagc ccctcaagga gcagcccgcc | 600 |

```
ctcaatgact ccagatacgc tctgagcagc cgcctgaggg tctcggccac cttctggcag    660
gaccccgca accacttccg ctgtcaagtc cagttctacg ggctctcgga gaatgacgag    720
tggacccagg atagggccaa acccgtcacc cagatcgtca gcgccgaggc ctggggtaga    780
gcagacggct ctcctaagtt ctgggttctc gtcgtcgtgg gaggtgtgtt agcatgttac    840
tctctcttgg ttactgtcgc tttcataatc ttttgggtcc gctcaaaacg ctctcgcttg    900
ttacattccg attatatgaa tatgacacct aggagacctg gcccgactag gaaacactat    960
caaccttacg cacctcccag agattttgct gcttacagga gtaagagagg gcgtaaaaag   1020
ctgctctaca tctttaagca gcctttcatg cgtcctgttc agacaacaca ggaagaggac   1080
ggatgctctt gcaggttccc tgaggaggag gagggtggtt gcgagctccg ggtcaaattt   1140
tcacgctccg ctgatgctcc tgcctatcaa caagggcaaa atcaattgta caatgaattg   1200
aacttgggta aagggaaga atatgacgtg ctcgataaac ggaggggag agatccagaa     1260
atgggcggta aaccacggcg caaaatcca caagagggat tgtataacga gctccaaaag    1320
gacaaaatgg cagaagctta ttcagaaata ggaatgaagg gggaaggag acgaggtaaa     1380
ggtcatgacg gattgtatca aggattgtca accgctacta aagatacata tgatgctttg    1440
catatgcaag ctttgcctcc cagagccaag cggtctgggt ctggggccac caacttcagc    1500
ctgctgaagc aggccggcga cgtggaggag aaccccggcc ccatggagac cctcttgggc    1560
ctgcttatcc tttggctgca gctgcaatgg gtgagcagca acaggaggt gacgcagatt     1620
cctgcagctc tgagtgtccc agaaggagaa aacttggttc tcaactgcag tttcactgat    1680
agcgctattt acaacctcca gtggtttagg caggaccctg ggaaaggtct cacatctctg    1740
ttgcttattc agtcaagtca gagagagcaa acaagtggaa gacttaatgc ctcgctggat    1800
aaatcatcag gacgtagtac tttatacatt gcagcttctc agcctggtga ctcagccacc    1860
tacctctgtg ctgtgaggcc cctgtacgga ggaagctaca tacctacatt tggaagagga    1920
accagcctta ttgttcatcc gtatatccag aaccctgacc ctgccgtgta ccagctgaga    1980
gactctaaat ccagtgacaa gtctgtctgc ctattcaccg attttgattc tcaaacaaat    2040
gtgtcacaaa gtaaggattc tgatgtgtat atcacagaca aaactgtgct agacatgagg    2100
tctatggact tcaagagcaa cagtgctgtg gcctggagca caaatctga ctttgcatgt     2160
gcaaacgcct tcaacaacag cattattcca gaagacacct tcttcccag cccagaaagt    2220
tccggctccc caaattttg ggtgctggtg gtggttggtg gagtcctggc ttgctatagc     2280
ttgctagtaa cagtggcctt tattatttc tgggtgagga gtaagaggag caggctcctg    2340
cacagtgact acatgaacat gactccccgc cgccccgggc ccacccgcaa gcattaccag    2400
ccctatgccc caccacgcga cttcgcagcc tatcgctcca acggggcag aaagaaactc    2460
ctgtatatat tcaaacaacc atttatgaga ccagtacaaa ctactcaaga ggaagatggc    2520
tgtagctgcc gatttccaga agaagaagaa ggaggatgtg aactgagagt gaagttcagc    2580
aggagcgcag acgccccgc gtaccagcag ggccagaacc agctctataa cgagctcaat    2640
ctaggacgaa gagaggagta cgatgttttg gacaagagac gtggccggga ccctgagatg    2700
ggggggaaagc cgagaaggaa gaaccctcag gaaggcctgt acaatgaact gcagaaagat    2760
aagatggcgg aggcctacag tgagattggg atgaaaggcg agcgccggag gggcaagggg    2820
cacgatggcc tttaccaggg tctcagtaca gccaccaagg acacctacga cgcccttcac    2880
atgcaggccc tgccccctcg ctaa                                           2904
```

<210> SEQ ID NO 57
<211> LENGTH: 2652
<212> TYPE: DNA
<213> ORGANISM: Artificial sequence
<220> FEATURE:
<223> OTHER INFORMATION: Synthetic

<400> SEQUENCE: 57

| | | | | | |
|---|---|---|---|---|---|
| atgagcatcg | gcctcctgtg | ctgtgcagcc | ttgtctctcc | tgtgggcagg | tccagtgaat | 60 |
| gctggtgtca | ctcagacccc | aaaattccag | gtcctgaaga | caggacagag | catgacactg | 120 |
| cagtgtgccc | aggatatgaa | ccatgaatac | atgtcctggt | atcgacaaga | cccaggcatg | 180 |
| gggctgaggc | tgattcatta | ctcagttggt | gctggtatca | ctgaccaagg | agaagtcccc | 240 |
| aatggctaca | atgtctccag | atcaaccaca | gaggatttcc | cgctcaggct | gctgtcggct | 300 |
| gctccctccc | agacatctgt | gtacttctgt | gccagcagtt | acgtcgggaa | caccggggag | 360 |
| ctgttttttg | gagaaggctc | taggctgacc | gtactggagg | acctgaaaaa | cgtgttccca | 420 |
| cccgaggtcg | ctgtgtttga | gccatcagaa | gcagagatct | cccacaccca | aaaggccaca | 480 |
| ctggtgtgcc | tggccacagg | cttctacccc | gaccacgtgg | agctgagctg | gtgggtgaat | 540 |
| gggaaggagt | gcacagtggg | ggtcagcaca | gacccgcagc | cctcaaggga | gcagcccgcc | 600 |
| ctcaatgact | ccagatacgc | tctgagcagc | cgcctgaggg | tctcggccac | cttctggcag | 660 |
| gaccccccgca | accacttccg | ctgtcaagtc | cagttctacg | gctctcgga | gaatgacgag | 720 |
| tggacccagg | atagggccaa | acccgtcacc | cagatcgtca | gcgccgaggc | ctggggtaga | 780 |
| gcagacggct | ctcctaagtt | ctgggttctc | gtcgtcgtgg | gaggtgtgtt | agcatgttac | 840 |
| tctctcttgg | ttactgtcgc | tttcataatc | ttttgggtcc | gctcaaaacg | ctctcgcttg | 900 |
| ttacattccg | attatatgaa | tatgacacct | aggagacctg | gcccgactag | gaaacactat | 960 |
| caaccttacg | cacctcccag | agattttgct | gcttacagga | gtcgggtcaa | attttcacgc | 1020 |
| tccgctgatg | ctcctgccta | tcaacaaggg | caaaatcaat | tgtacaatga | attgaacttg | 1080 |
| ggtagaaggg | aagaatatga | cgtgctcgat | aaacggaggg | ggagagatcc | agaaatgggc | 1140 |
| ggtaaaccac | ggcgcaaaaa | tccacaagag | ggattgtata | acgagctcca | aaaggacaaa | 1200 |
| atggcagaag | cttattcaga | aataggaatg | aaggggggaaa | ggagacgagg | taaaggtcat | 1260 |
| gacggattgt | atcaaggatt | gtcaaccgct | actaaagata | catatgatgc | tttgcatatg | 1320 |
| caagctttgc | ctcccagagc | caagcggtct | gggtctgggg | ccaccaactt | cagcctgctg | 1380 |
| aagcaggccg | cgacgtgga | ggagaacccc | ggccccatgg | agaccctctt | gggcctgctt | 1440 |
| atcctttggc | tgcagctgca | atgggtgagc | agcaaacagg | aggtgacgca | gattcctgca | 1500 |
| gctctgagtg | tcccagaagg | agaaaacttg | gttctcaact | gcagtttcac | tgatagcgct | 1560 |
| atttacaacc | tccagtggtt | taggcaggac | cctgggaaag | gtctcacatc | tctgttgctt | 1620 |
| attcagtcaa | gtcagagaga | gcaaacaagt | ggaagactta | atgcctcgct | ggataaatca | 1680 |
| tcaggacgta | gtactttata | cattgcagct | tctcagcctg | gtgactcagc | cacctacctc | 1740 |
| tgtgctgtga | ggcccctgta | cggaggaagc | tacataccta | catttggaag | aggaaccagc | 1800 |
| cttattgttc | atccgtatat | ccagaaccct | gaccctgccg | tgtaccagct | gagagactct | 1860 |
| aaatccagtg | acaagtctgt | ctgcctattc | accgattttg | attctcaaac | aaatgtgtca | 1920 |
| caaagtaagg | attctgatgt | gtatatcaca | gacaaaactg | tgctagacat | gaggtctatg | 1980 |
| gacttcaaga | gcaacagtgc | tgtggcctgg | agcaacaaat | ctgactttgc | atgtgcaaac | 2040 |
| gccttcaaca | acagcattat | tccagaagac | accttcttcc | ccagcccaga | aagttccggc | 2100 |

| | |
|---|---|
| tccccaaaat gtgatatcta catctgggcg cccttggccg ggacttgtgg ggtccttctc | 2160 |
| ctgtcactgg ttatcaccct ttactgcaaa cggggcagaa agaaactcct gtatatattc | 2220 |
| aaacaaccat ttatgagacc agtacaaact actcaagagg aagatggctg tagctgccga | 2280 |
| tttccagaag aagaagaagg aggatgtgaa ctgagagtga agttcagcag gagcgcagac | 2340 |
| gcccccgcgt accagcaggg ccagaaccag ctctataacg agctcaatct aggacgaaga | 2400 |
| gaggagtacg atgttttgga caagagacgt ggccgggacc ctgagatggg gggaaagccg | 2460 |
| agaaggaaga accctcagga aggcctgtac aatgaactgc agaaagataa gatggcggag | 2520 |
| gcctacagtg agattgggat gaaggcgag cgccggaggg gcaaggggca cgatggcctt | 2580 |
| taccagggtc tcagtacagc caccaaggac acctacgacg cccttcacat gcaggccctg | 2640 |
| cccctcgct aa | 2652 |

<210> SEQ ID NO 58
<211> LENGTH: 2316
<212> TYPE: DNA
<213> ORGANISM: Artificial sequence
<220> FEATURE:
<223> OTHER INFORMATION: Synthetic

<400> SEQUENCE: 58

| | |
|---|---|
| atgagcatcg gcctcctgtg ctgtgcagcc ttgtctctcc tgtgggcagg tccagtgaat | 60 |
| gctggtgtca ctcagacccc aaaattccag gtcctgaaga caggacagag catgacactg | 120 |
| cagtgtgccc aggatatgaa ccatgaatac atgtcctggt atcgacaaga cccaggcatg | 180 |
| gggctgaggc tgattcatta ctcagttggt gctggtatca ctgaccaagg agaagtcccc | 240 |
| aatggctaca atgtctccag atcaaccaca gaggatttcc cgctcaggct gctgtcggct | 300 |
| gctccctccc agacatctgt gtacttctgt gccagcagtt acgtcgggaa caccggggag | 360 |
| ctgtttttg gagaaggctc taggctgacc gtactggagg acctgaaaaa cgtgttccca | 420 |
| cccgaggtcg ctgtgtttga gccatcagaa gcagagatct cccacaccca aaaggccaca | 480 |
| ctggtgtgcc tggccacagg cttctacccc gaccacgtgg agctgagctg gtgggtgaat | 540 |
| gggaaggagg tgcacagtgg ggtcagcaca gacccgcagc ccctcaagga gcagcccgcc | 600 |
| ctcaatgact ccagatacgc tctgagcagc cgcctgaggg tctcggccac cttctggcag | 660 |
| gacccccgca accacttccg ctgtcaagtc cagttctacg gctctcgga gaatgacgag | 720 |
| tggacccagg atagggccaa acccgtcacc cagatcgtca gcgccgaggc ctggggtaga | 780 |
| gcagacggct ctcctaagtt ctgggttctc gtcgtcgtgg gaggtgtgtt agcatgttac | 840 |
| tctctcttgg ttactgtcgc tttcataatc ttttgggtcc gctcaaaacg ctctcgcttg | 900 |
| ttacattccg attatatgaa tatgacacct aggagacctg gcccgactag gaaacactat | 960 |
| caaccttacg cacctcccag agattttgct gcttacagga gtcgggtcaa attttcacgc | 1020 |
| tccgctgatg ctcctgccta tcaacaaggg caaaatcaat tgtacaatga attgaacttg | 1080 |
| ggtagaaggg aagaatatga cgtgctcgat aaacggaggg ggagagatcc agaaatgggc | 1140 |
| ggtaaaccac ggcgcaaaaa tccacaagag ggattgtata acgagctcca aaaggacaaa | 1200 |
| atggcagaag cttattcaga aataggaatg aagggggaaa ggagacgagg taaaggtcat | 1260 |
| gacggattgt atcaaggatt gtcaaccgct actaaagata catatgatgc tttgcatatg | 1320 |
| caagctttgc ctcccagagc caagcggtct gggtctgggg ccaccaactt cagcctgctg | 1380 |
| aagcaggccg gcgacgtgga ggagaacccc ggccccatgg agaccctctt gggcctgctt | 1440 |

```
atcctttggc tgcagctgca atgggtgagc agcaaacagg aggtgacgca gattcctgca   1500
gctctgagtg tcccagaagg agaaaacttg gttctcaact gcagtttcac tgatagcgct   1560
atttacaacc tccagtggtt taggcaggac cctgggaaag gtctcacatc tctgttgctt   1620
attcagtcaa gtcagagaga gcaaacaagt ggaagactta atgcctcgct ggataaatca   1680
tcaggacgta gtactttata cattgcagct tctcagcctg gtgactcagc cacctacctc   1740
tgtgctgtga ggcccctgta cggaggaagc tacatacctc catttggaag aggaaccagc   1800
cttattgttc atccgtatat ccagaaccct gaccctgccg tgtaccagct gagagactct   1860
aaatccagtg acaagtctgt ctgcctattc accgattttg attctcaaac aaatgtgtca   1920
caaagtaagg attctgatgt gtatatcaca gacaaaactg tgctagacat gaggtctatg   1980
gacttcaaga gcaacagtgc tgtggcctgg agcaacaaat ctgactttgc atgtgcaaac   2040
gccttcaaca acagcattat tccagaagac accttcttcc ccagcccaga aagttccggc   2100
tccccaaaat gtgatatcta catctgggcg cccttggccg ggacttgtgg ggtccttctc   2160
ctgtcactgg ttatcaccct ttactgcaaa cggggcagaa agaaactcct gtatatattc   2220
aaacaaccat ttatgagacc agtacaaact actcaagagg aagatggctg tagctgccga   2280
tttccagaag aagaagaagg aggatgtgaa ctgtaa                             2316

<210> SEQ ID NO 59
<211> LENGTH: 2655
<212> TYPE: DNA
<213> ORGANISM: Artificial sequence
<220> FEATURE:
<223> OTHER INFORMATION: Synthetic

<400> SEQUENCE: 59
atgagcatcg gcctcctgtg ctgtgcagcc ttgtctctcc tgtgggcagg tccagtgaat     60
gctggtgtca ctcagacccc aaaattccag gtcctgaaga caggacagag catgacactg    120
cagtgtgccc aggatatgaa ccatgaatac atgtcctggt atcgacaaga cccaggcatg    180
gggctgaggc tgattcatta ctcagttggt gctggtatca ctgaccaagg agaagtcccc    240
aatggctaca atgtctccag atcaaccaca gaggatttcc cgctcaggct gctgtcggct    300
gctccctccc agacatctgt gtacttctgt gccagcagtt acgtcgggaa caccggggag    360
ctgttttttg gagaaggctc taggctgacc gtactggagg acctgaaaaa cgtgttccca    420
cccgaggtcg ctgtgtttga gccatcagaa gcagagatct cccacaccca aaaggccaca    480
ctggtgtgcc tggccacagg cttctacccc gaccacgtgg agctgagctg gtgggtgaat    540
gggaaggagg tgcacagtgg ggtcagcaca gacccgcagc cctcaaggaa gcagcccgcc    600
ctcaatgact ccagatacgc tctgagcagc cgcctgaggg tctcggccac cttctggcag    660
gaccccgcca ccacttccg ctgtcaagtc cagttctacg ggctctcgga aatgacgag    720 tggacccagg atagggccaa acccgtcacc cagatcgtca gcgccgaggc ctggggtaga    780
gcagacggct ctcctaagtt ctgggttctc gtcgtcgtgg aggtgtgtt agcatgttac    840 tctctcttgg ttactgtcgc tttcataatc ttttgggtcc gctcaaaacg ctctcgcttg    900
ttacattccg attatatgaa tatgacacct aggagacctg gccgactag aaacactat    960 caaccttacg cacctcccag agattttgct gcttacagga gtcgggtcaa attttcacgc   1020
tccgctgatg ctcctgccta tcaacaaggg caaaatcaat tgtacaatga attgaacttg   1080
ggtagaaggg aagaatatga cgtgctcgat aacggagggg ggagagatcc agaaatgggc   1140
ggtaaaccac ggcgcaaaaa tccacaagag ggattgtata acgagctcca aaaggacaaa   1200
```

```
atggcagaag cttattcaga aataggaatg aagggggaaa ggagacgagg taaaggtcat    1260
gacggattgt atcaaggatt gtcaaccgct actaaagata catatgatgc tttgcatatg    1320
caagctttgc ctcccagagc caagcggtct gggtctgggg ccaccaactt cagcctgctg    1380
aagcaggccg cgacgtgga ggagaacccc ggccccatgg agaccctctt gggcctgctt    1440
atcctttggc tgcagctgca atgggtgagc agcaaacagg aggtgacgca gattcctgca    1500
gctctgagtg tccagaaggg agaaaacttg gttctcaact gcagtttcac tgatagcgct    1560
atttacaacc tccagtggtt taggcaggac cctgggaaag gtctcacatc tctgttgctt    1620
attcagtcaa gtcagagaga gcaaacaagt ggaagactta atgcctcgct ggataaatca    1680
tcaggacgta gtactttata cattgcagct ctcagcctg gtgactcagc cacctacctc    1740
tgtgctgtga ggcccctgta cggaggaagc tacataccta catttggaag aggaaccagc    1800
cttattgttc atccgtatat ccagaaccct gaccctgccg tgtaccagct gagagactct    1860
aaatccagtg acaagtctgt ctgcctattc accgattttg attctcaaac aaatgtgtca    1920
caaagtaagg attctgatgt gtatatcaca gacaaaactg tgctagacat gaggtctatg    1980
gacttcaaga gcaacagtgc tgtggcctgg agcaacaaat ctgactttgc atgtgcaaac    2040
gccttcaaca acagcattat tccagaagac accttcttcc ccagcccaga aagttccggc    2100
tccccaaaat tttgggtgct ggtggtggtt ggtggagtcc tggcttgcta tagcttgcta    2160
gtaacagtgg cctttattat tttctgggtg aaacggggca gaaagaaact cctgtatata    2220
ttcaaacaac catttatgag accagtacaa actactcaag aggaagatgg ctgtagctgc    2280
cgatttccag aagaagaaga aggaggatgt gaactgagag tgaagttcag caggagcgca    2340 gacgccccg cgtaccagca gggccagaac cagctctata cgagctcaa tctaggacga    2400 agagaggagt acgatgtttt ggacaagaga cgtggccggg accctgagat gggggggaaag    2460 ccgagaagga gaaccctca ggaaggcctg tacaatgaac tgcagaaaga taagatggcg    2520
gaggcctaca gtgagattgg gatgaaaggc gagcgccgga ggggcaaggg gcacgatggc    2580
ctttaccagg gtctcagtac agccaccaag gacacctacg acgcccttca catgcaggcc    2640
ctgccccctc gctaa                                                    2655
```

<210> SEQ ID NO 60
<211> LENGTH: 2649
<212> TYPE: DNA
<213> ORGANISM: Artificial sequence
<220> FEATURE:
<223> OTHER INFORMATION: Synthetic

<400> SEQUENCE: 60

```
atgagcatcg gcctcctgtg ctgtgcagcc ttgtctctcc tgtgggcagg tccagtgaat      60
gctggtgtca ctcagacccc aaaattccag gtcctgaaga caggacagag catgacactg     120
cagtgtgccc aggatatgaa ccatgaatac atgtcctggt atcgacaaga cccaggcatg     180
gggctgaggc tgattcatta ctcagttggt gctggtatca ctgaccaagg agaagtcccc     240
aatggctaca atgtctccag atcaaccaca gaggatttcc cgctcaggct gctgtcggct     300
gctccctccc agacatctgt gtacttctgt gccagcagtt acgtcgggaa caccggggag     360
ctgttttttg gagaaggctc taggctgacc gtactggagg acctgaaaaa cgtgttccca     420
cccgaggtcg ctgtgtttga gccatcagaa gcagagatct cccacaccca aaaggccaca     480
ctggtgtgcc tggccacagg cttctacccc gaccacgtgg agctgagctg gtgggtgaat     540
```

```
gggaaggagg tgcacagtgg ggtcagcaca gacccgcagc ccctcaagga gcagcccgcc    600
ctcaatgact ccagatacgc tctgagcagc cgcctgaggg tctcggccac cttctggcag    660
gaccccgca accacttccg ctgtcaagtc cagttctacg ggctctcgga gaatgacgag     720
tggacccagg atagggccaa acccgtcacc cagatcgtca cgcccgaggc ctggggtaga    780
gcagacggct ctcctaagtg cgacatttat atttgggccc ctctcgctgg cacatgcggc    840
gtgttgttgc tcagcctcgt gattacactt tattgtcgct caaaacgctc tcgcttgtta    900
cattccgatt atatgaatat gacacctagg agacctggcc cgactaggaa acactatcaa    960
ccttacgcac ctcccagaga ttttgctgct tacaggagtc gggtcaaatt ttcacgctcc   1020
gctgatgctc ctgcctatca acaagggcaa aatcaattgt acaatgaatt gaacttgggt   1080
agaagggaag aatatgacgt gctcgataaa cggaggggga gagatccaga aatgggcggt   1140
aaaccacggc gcaaaaatcc acaagaggga ttgtataacg agctccaaaa ggacaaaatg   1200
gcagaagctt attcagaaat aggaatgaag ggggaaagga gacgaggtaa aggtcatgac   1260
ggattgtatc aaggattgtc aaccgctact aaagatacat atgatgcttt gcatatgcaa   1320
gctttgcctc ccagagccaa gcggtctggg tctggggcca ccaacttcag cctgctgaag   1380
caggccggcg acgtggagga gaaccccggc cccatgagaa ccctcttggg cctgcttatc   1440
ctttggctgc agctgcaatg ggtgagcagc aaacaggagg tgacgcagat tcctgcagct   1500
ctgagtgtcc cagaaggaga aaacttggtt ctcaactgca gtttcactga tagcgctatt   1560
tacaacctcc agtggtttag gcaggaccct gggaaaggtc tcacatctct gttgcttatt   1620
cagtcaagtc agagagagca aacaagtgga agacttaatg cctcgctgga taaatcatca   1680
ggacgtagta ctttatacat tgcagcttct cagcctggtg actcagccac ctacctctgt   1740
gctgtgaggc ccctgtacgg aggaagctac atacctacat ttggaagagg aaccagcctt   1800
attgttcatc cgtatatcca gaaccctgac cctgccgtgt accagctgag agactctaaa   1860
tccagtgaca agtctgtctg cctattcacc gattttgatt ctcaaacaaa tgtgtcacaa   1920
agtaaggatt ctgatgtgta tatcacagac aaaactgtgc tagacatgag gtctatggac   1980
ttcaagagca acagtgctgt ggcctggagc aacaaatctg actttgcatg tgcaaacgcc   2040
ttcaacaaca gcattattcc agaagacacc ttcttcccca gcccagaaag ttccggctcc   2100
ccaaaatgtg atatctacat ctgggcgccc ttggccggga cttgtggggt ccttctcctg   2160
tcactggtta tcacccttta ctgcaaacgg ggcagaaaga aactcctgta tatattcaaa   2220
caaccattta tgagaccagt acaaactact caagaggaag atggctgtag ctgccgattt   2280
ccagaagaag aagaaggagg atgtgaactg agagtgaagt tcagcaggag cgcagacgcc   2340
cccgcgtacc agcagggcca gaaccagctc tataacgagc tcaatctagg acgaagagag   2400
gagtacgatg ttttggacaa gagacgtggc cgggaccctg agatgggggg aaagccgaga   2460
aggaagaacc ctcaggaagg cctgtacaat gaactgcaga agataagat ggcggaggcc   2520
tacagtgaga ttgggatgaa aggcgagcgc cggagggggca aggggcacga tggcctttac   2580
cagggtctca gtacagccac caaggacacc tacgacgccc ttcacatgca ggccctgccc   2640
cctcgctaa                                                           2649
```

<210> SEQ ID NO 61
<211> LENGTH: 2898
<212> TYPE: DNA
<213> ORGANISM: Artificial sequence
<220> FEATURE:
<223> OTHER INFORMATION: Synthetic

<400> SEQUENCE: 61

```
atgagcatcg gcctcctgtg ctgtgcagcc ttgtctctcc tgtgggcagg tccagtgaat        60
gctggtgtca ctcagacccc aaaattccag gtcctgaaga caggacagag catgacactg       120
cagtgtgccc aggatatgaa ccatgaatac atgtcctggt atcgacaaga cccaggcatg       180
gggctgaggc tgattcatta ctcagttggt gctggtatca ctgaccaagg agaagtcccc       240
aatggctaca atgtctccag atcaaccaca gaggatttcc cgctcaggct gctgtcggct       300
gctccctccc agacatctgt gtacttctgt gccagcagtt acgtcgggaa caccggggag       360
ctgttttttg gagaaggctc taggctgacc gtactggagg acctgaaaaa cgtgttccca       420
cccgaggtcg ctgtgtttga gccatcagaa gcagagatct cccacaccca aaaggccaca       480
ctggtgtgcc tggccacagg cttctacccc gaccacgtgg agctgagctg gtgggtgaat       540
gggaaggagg tgcacagtgg ggtcagcaca gacccgcagc ccctcaagga gcagcccgcc       600
ctcaatgact ccagatacgc tctgagcagc gcctgaggg tctcggccac cttctggcag       660
gaccccccgca accacttccg ctgtcaagtc cagttctacg ggctctcgga gaatgacgag       720
tggacccagg atagggccaa acccgtcacc cagatcgtca gcgccgaggc ctggggtaga       780
gcagacggct ctcctaagtg cgacatttat atttgggccc ctctcgctgg cacatgcggc       840
gtgttgttgc tcagcctcgt gattacactt tattgtagga gtaagaggag caggctcctg       900
cacagtgact acatgaacat gactccccgc cgccccgggc ccacccgcaa gcattaccag       960
ccctatgccc caccacgcga cttcgcagcc tatcgctccc gctcaaaacg ctctcgcttg      1020
ttacattccg attatatgaa tatgacacct aggagacctg gccgactag gaaacactat      1080
caaccttacg cacctcccag agattttgct gcttacagga gtcgggtcaa attttcacgc      1140
tccgctgatg ctcctgccta tcaacaaggg caaaatcaat tgtacaatga attgaacttg      1200
ggtagaaggg aagaatatga cgtgctcgat aaacggaggg ggagagatcc agaaatgggc      1260
ggtaaaccac ggcgcaaaaa tccacaagag ggattgtata cgagctcca aaaggacaaa      1320
atggcagaag cttattcaga aataggaatg aaggggggaaa ggagacgagg taaaggtcat      1380
gacggattgt atcaaggatt gtcaaccgct actaaagata catatgatgc tttgcatatg      1440
caagctttgc ctcccagagc caagcggtct gggtctgggg ccaccaactt cagcctgctg      1500
aagcaggccg gcgacgtgga ggagaaccc ggccccatgg agaccctctt gggcctgctt      1560
atcctttggc tgcagctgca atgggtgagc agcaaacagg aggtgacgca gattcctgca      1620
gctctgagtg tcccagaagg agaaaacttg gttctcaact gcagtttcac tgatagcgct      1680
atttacaacc tccagtggtt taggcaggac cctgggaaag gtctcacatc tctgttgctt      1740
attcagtcaa gtcagagaga gcaaacaagt ggaagactta atgcctcgct ggataaatca      1800
tcaggacgta gtactttata cattgcagct tctcagcctg gtgactcagc cacctacctc      1860
tgtgctgtga ggcccctgta cggaggaagc tacatacca catttggaag aggaaccagc      1920
cttattgttc atccgtatat ccagaaccct gaccctgccg tgtaccagct gagagactct      1980
aaatccagtg acaagtctgt ctgcctattc accgattttg attctcaaac aaatgtgtca      2040
caaagtaagg attctgatgt gtatatcaca gacaaaactg tgctagacat gaggtctatg      2100
gacttcaaga gcaacagtgc tgtggcctgg agcaacaaat ctgactttgc atgtgcaaac      2160
gccttcaaca acagcattat tccagaagac accttcttcc ccagcccaga aagttccggc      2220
tccccaaaat gtgatatcta catctgggcg cccttggccg ggacttgtgg ggtccttctc      2280
```

| | |
|---|---|
| ctgtcactgg ttatcaccct ttactgcaag agagggcgta aaaagctgct ctacatcttt | 2340 |
| aagcagcctt tcatgcgtcc tgttcagaca acacaggaag aggacggatg ctcttgcagg | 2400 |
| ttccctgagg aggaggaggg tggttgcgag ctcaaacggg gcagaaagaa actcctgtat | 2460 |
| atattcaaac aaccatttat gagaccagta caaactactc aagaggaaga tggctgtagc | 2520 |
| tgccgatttc agaagaaga agaaggagga tgtgaactga gagtgaagtt cagcaggagc | 2580 |
| gcagacgccc ccgcgtacca gcagggccag aaccagctct ataacgagct caatctagga | 2640 |
| cgaagagagg agtacgatgt tttggacaag agacgtggcc gggaccctga gatgggggga | 2700 |
| aagccgagaa ggaagaaccc tcaggaaggc ctgtacaatg aactgcagaa agataagatg | 2760 |
| gcggaggcct acagtgagat tgggatgaaa ggcgagcgcc ggaggggcaa ggggcacgat | 2820 |
| ggcctttacc agggtctcag tacagccacc aaggacacct cgacgcccct tcacatgcag | 2880 |
| gccctgcccc ctcgctaa | 2898 |

<210> SEQ ID NO 62
<211> LENGTH: 3180
<212> TYPE: DNA
<213> ORGANISM: Artificial sequence
<220> FEATURE:
<223> OTHER INFORMATION: Synthetic

<400> SEQUENCE: 62

| | |
|---|---|
| atgagcatcg gcctcctgtg ctgtgcagcc ttgtctctcc tgtgggcagg tccagtgaat | 60 |
| gctggtgtca ctcagacccc aaaattccag gtcctgaaga caggacagag catgacactg | 120 |
| cagtgtgccc aggatatgaa ccatgaatac atgtcctggt atcgacaaga cccaggcatg | 180 |
| gggctgaggc tgattcatta ctcagttggt gctggtatca ctgaccaagg agaagtcccc | 240 |
| aatggctaca atgtctccag atcaaccaca gaggatttcc cgctcaggct gctgtcggct | 300 |
| gctccctccc agacatctgt gtacttctgt gccagcagtt acgtcgggaa caccggggag | 360 |
| ctgtttttg gagaaggctc taggctgacc gtactggagg acctgaaaaa cgtgttccca | 420 |
| cccgaggtcg ctgtgtttga gccatcagaa gcagagatct cccacaccca aaaggccaca | 480 |
| ctggtgtgcc tggccacagg cttctacccc gaccacgtgg agctgagctg gtgggtgaat | 540 |
| gggaaggagg tgcacagtgg ggtcagcaca gacccgcagc ccctcaagga gcagcccgcc | 600 |
| ctcaatgact ccagatacgc tctgagcagc cgcctgaggg tctcggccac cttctggcag | 660 |
| gacccccgca accacttccg ctgtcaagtc cagttctacg gctctcgga gaatgacgag | 720 |
| tggacccagg atagggccaa accgtcacc cagatcgtca gcgccgaggc ctggggtaga | 780 |
| gcagacggct ctcctaaggc aaaaccgacg accacccctg cccccaggcc tcctactccc | 840 |
| gccccgacga ttgccagcca accgttaagt ttaagaccgg aagcatgtag accggcagct | 900 |
| ggtggggctg ttcatacacg tggcttagat tttgcgccta ggaagatcga ggtaatgtac | 960 |
| ccaccgccct atcttgataa cgaaaaatct aacggtacaa taattcacgt caagggcaag | 1020 |
| catttgtgcc cttccccgtt gttcccgggc ccaagcaaac cgttctgggt tctcgtcgtc | 1080 |
| gtgggaggtg tgttagcatg ttactctctc ttggttactg tcgctttcat aatcttttgg | 1140 |
| gtccgctcaa aacgctctcg cttgttacat tccgattata tgaatatgac cctaggaga | 1200 |
| cctggcccga ctaggaaaca ctatcaacct tacgcacctc ccagagattt tgctgcttac | 1260 |
| aggagtcggg tcaaattttc acgctccgct gatgctcctg cctatcaaca agggcaaaat | 1320 |
| caattgtaca atgaattgaa cttgggtaga agggaagaat atgacgtgct cgataaacgg | 1380 |
| agggggagag atccagaaat gggcggtaaa ccacggcgca aaatccaca agagggattg | 1440 |

-continued

```
tataacgagc tccaaaagga caaaatggca gaagcttatt cagaaatagg aatgaagggg      1500
gaaaggagac gaggtaaagg tcatgacgga ttgtatcaag gattgtcaac cgctactaaa      1560
gatacatatg atgctttgca tatgcaagct ttgcctccca gagccaagcg gtctgggtct      1620
ggggccacca acttcagcct gctgaagcag gccggcgacg tggaggagaa ccccggcccc      1680
atggagaccc tcttgggcct gcttatcctt tggctgcagc tgcaatgggt gagcagcaaa      1740
caggaggtga cgcagattcc tgcagctctg agtgtcccag aaggagaaaa cttggttctc      1800
aactgcagtt tcactgatag cgctatttac aacctccagt ggtttaggca ggaccctggg      1860
aaaggtctca catctctgtt gcttattcag tcaagtcaga gagagcaaac aagtggaaga      1920
cttaatgcct cgctggataa atcatcagga cgtagtactt tatacattgc agcttctcag      1980
cctggtgact cagccaccta cctctgtgct gtgaggcccc tgtacggagg aagctacata      2040
cctacatttg gaagaggaac cagccttatt gttcatccgt atatccagaa ccctgaccct      2100
gccgtgtacc agctgagaga ctctaaatcc agtgacaagt ctgtctgcct attcaccgat      2160
tttgattctc aaacaaatgt gtcacaaagt aaggattctg atgtgtatat cacagacaaa      2220
actgtgctag acatgaggtc tatggacttc aagagcaaca gtgctgtggc ctggagcaac      2280
aaatctgact ttgcatgtgc aaacgccttc aacaacagca ttattccaga agacaccttc      2340
ttccccagcc cagaaagttc cggctcccca aaagctaagc ccaccacgac gccagcgccg      2400
cgaccaccaa caccggcgcc caccatcgcg tcgcagcccc tgtccctgcg cccagaggcg      2460
tgccggccag cggcgggggg cgcagtgcac acgagggggc tggacttcgc ccctaggaaa      2520
attgaagtta tgtatcctcc tccttaccta gacaatgaga agagcaatgg aaccattatc      2580
catgtgaaag gaaacacct tgtccaagt ccctatttc ccggaccttc taagcccttt       2640
tgggtgctgg tggtggttgg tggagtcctg gcttgctata gcttgctagt aacagtggcc      2700
tttattattt tctgggtgag gagtaagagg agcaggctcc tgcacagtga ctacatgaac      2760
atgactcccc gccgccccgg gcccacccgc aagcattacc agcccctatgc cccaccacgc      2820 gacttcgcag cctatcgctc cagagtgaag ttcagcagga gcgcagacgc ccccgcgtac      2880
cagcagggcc agaaccagct ctataacgag ctcaatctag acgaagaga ggagtacgat       2940 gttttggaca gagacgtgg ccgggaccct gagatggggg gaaagccgag aaggaagaac       3000
cctcaggaag gcctgtacaa tgaactgcag aaagataaga tggcggaggc ctacagtgag      3060
attgggatga aggcgagcg ccggaggggc aaggggcacg atggccttta ccagggtctc      3120
agtacagcca ccaaggacac ctacgacgcc cttcacatgc aggccctgcc ccctcgctaa      3180
```

```
<210> SEQ ID NO 63
<211> LENGTH: 2580
<212> TYPE: DNA
<213> ORGANISM: Artificial sequence
<220> FEATURE:
<223> OTHER INFORMATION: Synthetic

<400> SEQUENCE: 63
atgagcatcg gcctcctgtg ctgtgcagcc ttgtctctcc tgtgggcagg tccagtgaat        60
gctggtgtca ctcagacccc aaaattccag gtcctgaaga caggacagag catgacactg       120
cagtgtgccc aggatatgaa ccatgaatac atgtcctggt atcgacaaga cccaggcatg       180
gggctgaggc tgattcatta ctcagttggt gctggtatca ctgaccaagg agaagtcccc       240
aatggctaca atgtctccag atcaaccaca gaggatttcc cgctcaggct gctgtcggct       300
```

```
gctccctccc agacatctgt gtacttctgt gccagcagtt acgtcgggaa caccggggag    360
ctgttttttg gagaaggctc taggctgacc gtactggagg acctgaaaaa cgtgttccca    420
cccgaggtcg ctgtgtttga gccatcagaa gcagagatct cccacaccca aaaggccaca    480
ctggtgtgcc tggccacagg cttctacccc gaccacgtgg agctgagctg gtgggtgaat    540
gggaaggagg tgcacagtgg ggtcagcaca gacccgcagc ccctcaagga gcagcccgcc    600
ctcaatgact ccagatacgc tctgagcagc cgcctgaggg tctcggccac cttctggcag    660
gaccccgcca accacttccg ctgtcaagtc cagttctacg ggctctcgga gaatgacgag    720
tggacccagg atagggccaa acccgtcacc cagatcgtca cgcgccgaggc ctggggtaga    780
gcagacggct ctcctaaggc aaaaccgacg accacccctg cccccaggcc tcctactccc    840
gccccgacga ttgccagcca accgttaagt ttaagaccgg aagcatgtag accggcagct    900
ggtggggctg ttcatacacg tggcttagat tttgcgccta ggaagatcga ggtaatgtac    960
ccaccgccct atcttgataa cgaaaaatct aacggtacaa taattcacgt caagggcaag   1020
catttgtgcc cttcccgtt gttcccgggc ccaagcaaac cgttctgggt tctcgtcgtc    1080
gtgggaggtg tgttagcatg ttactctctc ttggttactg tcgctttcat aatcttttgg    1140
gtccgctcaa aacgctctcg cttgttacat tccgattata tgaatatgac acctaggaga    1200
cctggcccga ctaggaaaca ctatcaacct tacgcacctc ccagagattt tgctgcttac    1260
aggagtcggg tcaaattttc acgctccgct gatgctcctg cctatcaaca agggcaaaat    1320
caattgtaca atgaattgaa cttgggtaga agggaagaat atgacgtgct cgataaacgg    1380
agggggagag atccagaaat gggcggtaaa ccacggcgca aaaatccaca agagggattg    1440
tataacgagc tccaaaagga caaaatggca gaagcttatt cagaaatagg aatgaagggg    1500
gaaaggagac gaggtaaagg tcatgacgga ttgtatcaag gattgtcaac cgctactaaa    1560
gatacatatg atgctttgca tatgcaagct ttgcctccca gagccaagcg gtctgggtct    1620
ggggccacca acttcagcct gctgaagcag gccggcgacg tggaggagaa ccccggcccc    1680
atggagaccc tcttgggcct gcttatcctt tggctgcagc tgcaatgggt gagcagcaaa    1740
caggaggtga cgcagattcc tgcagctctg agtgtcccag aaggagaaaa cttggttctc    1800
aactgcagtt tcactgatag cgctatttac aacctccagt ggtttaggca ggaccctggg    1860
aaaggtctca catctctgtt gcttattcag tcaagtcaga gagagcaaac aagtggaaga    1920
cttaatgcct cgctggataa atcatcagga cgtagtactt tatacattgc agcttctcag    1980
cctggtgact cagccaccta cctctgtgct gtgaggcccc tgtacggagg aagctacata    2040
cctacatttg gaagaggaac cagccttatt gttcatccgt atatccagaa ccctgaccct    2100
gccgtgtacc agctgagaga ctctaaatcc agtgacaagt ctgtctgcct attcaccgat    2160
tttgattctc aaacaaatgt gtcacaaagt aaggattctg atgtgtatat cacagacaaa    2220
actgtgctag acatgaggtc tatggacttc aagagcaaca gtgctgtggc ctggagcaac    2280
aaatctgact ttgcatgtgc aaacgccttc aacaacagca ttattccaga agacaccttc    2340
ttccccagcc cagaaagttc cggctcccca aaatgtgata tctacatctg ggcgcccttg    2400
gccgggactt gtggggtcct tctcctgtca ctggttatca cctttactg caaacgggc    2460
agaaagaaac tcctgtatat attcaaacaa ccatttatga gaccagtaca aactactcaa    2520
gaggaagatg gctgtagctg ccgatttcca gaagaagaag aaggaggatg tgaactgtaa    2580
```

<210> SEQ ID NO 64
<211> LENGTH: 612

<212> TYPE: PRT
<213> ORGANISM: Artificial sequence
<220> FEATURE:
<223> OTHER INFORMATION: Synthetic

<400> SEQUENCE: 64

Met Ser Ile Gly Leu Leu Cys Cys Ala Ala Leu Ser Leu Leu Trp Ala
1               5                   10                  15

Gly Pro Val Asn Ala Gly Val Thr Gln Thr Pro Lys Phe Gln Val Leu
            20                  25                  30

Lys Thr Gly Gln Ser Met Thr Leu Gln Cys Ala Gln Asp Met Asn His
        35                  40                  45

Glu Tyr Met Ser Trp Tyr Arg Gln Asp Pro Gly Met Gly Leu Arg Leu
    50                  55                  60

Ile His Tyr Ser Val Gly Ala Gly Ile Thr Asp Gln Gly Glu Val Pro
65                  70                  75                  80

Asn Gly Tyr Asn Val Ser Arg Ser Thr Thr Glu Asp Phe Pro Leu Arg
                85                  90                  95

Leu Leu Ser Ala Ala Pro Ser Gln Thr Ser Val Tyr Phe Cys Ala Ser
            100                 105                 110

Ser Tyr Val Gly Asn Thr Gly Glu Leu Phe Phe Gly Glu Gly Ser Arg
        115                 120                 125

Leu Thr Val Leu Glu Asp Leu Lys Asn Val Phe Pro Pro Glu Val Ala
    130                 135                 140

Val Phe Glu Pro Ser Glu Ala Glu Ile Ser His Thr Gln Lys Ala Thr
145                 150                 155                 160

Leu Val Cys Leu Ala Thr Gly Phe Tyr Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Ala Leu
        195                 200                 205

Ser Ser Arg Leu Arg Val Ser Ala Thr Phe Trp Gln Asp Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Glu Ser Tyr Gln Gln
            260                 265                 270

Gly Val Leu Ser Ala Thr Ile Leu Tyr Glu Ile Leu Leu Gly Lys Ala
        275                 280                 285

Thr Leu Tyr Ala Val Leu Val Ser Ala Leu Val Leu Met Ala Met Val
    290                 295                 300

Lys Arg Lys Asp Ser Arg Gly Ala Lys Arg Ser Gly Ser Gly Ala Thr
305                 310                 315                 320

Asn Phe Ser Leu Leu Lys Gln Ala Gly Asp Val Glu Glu Asn Pro Gly
                325                 330                 335

Pro Met Glu Thr Leu Leu Gly Leu Leu Ile Leu Trp Leu Gln Leu Gln
            340                 345                 350

Trp Val Ser Ser Lys Gln Glu Val Thr Gln Ile Pro Ala Ala Leu Ser
        355                 360                 365

Val Pro Glu Gly Glu Asn Leu Val Leu Asn Cys Ser Phe Thr Asp Ser
    370                 375                 380

Ala Ile Tyr Asn Leu Gln Trp Phe Arg Gln Asp Pro Gly Lys Gly Leu
385                 390                 395                 400

Thr Ser Leu Leu Leu Ile Gln Ser Ser Gln Arg Glu Gln Thr Ser Gly
            405                 410                 415

Arg Leu Asn Ala Ser Leu Asp Lys Ser Ser Gly Arg Ser Thr Leu Tyr
        420                 425                 430

Ile Ala Ala Ser Gln Pro Gly Asp Ser Ala Thr Tyr Leu Cys Ala Val
            435                 440                 445

Arg Pro Leu Tyr Gly Gly Ser Tyr Ile Pro Thr Phe Gly Arg Gly Thr
    450                 455                 460

Ser Leu Ile Val His Pro Tyr Ile Gln Asn Pro Asp Pro Ala Val Tyr
465                 470                 475                 480

Gln Leu Arg Asp Ser Lys Ser Ser Asp Lys Ser Val Cys Leu Phe Thr
            485                 490                 495

Asp Phe Asp Ser Gln Thr Asn Val Ser Gln Ser Lys Asp Ser Asp Val
            500                 505                 510

Tyr Ile Thr Asp Lys Thr Val Leu Asp Met Arg Ser Met Asp Phe Lys
            515                 520                 525

Ser Asn Ser Ala Val Ala Trp Ser Asn Lys Ser Asp Phe Ala Cys Ala
530                 535                 540

Asn Ala Phe Asn Asn Ser Ile Ile Pro Glu Asp Thr Phe Phe Pro Ser
545                 550                 555                 560

Pro Glu Ser Ser Cys Asp Val Lys Leu Val Glu Lys Ser Phe Glu Thr
            565                 570                 575

Asp Thr Asn Leu Asn Phe Gln Asn Leu Ser Val Ile Gly Phe Arg Ile
            580                 585                 590

Leu Leu Leu Lys Val Ala Gly Phe Asn Leu Leu Met Thr Leu Arg Leu
            595                 600                 605

Trp Ser Ser Arg
    610

<210> SEQ ID NO 65
<211> LENGTH: 1839
<212> TYPE: DNA
<213> ORGANISM: Artificial sequence
<220> FEATURE:
<223> OTHER INFORMATION: Synthetic

<400> SEQUENCE: 65
atgagcatcg gcctcctgtg ctgtgcagcc ttgtctctcc tgtgggcagg tccagtgaat      60
gctggtgtca ctcagacccc aaaattccag gtcctgaaga caggacagag catgacactg     120
cagtgtgccc aggatatgaa ccatgaatac atgtcctggt atcgacaaga cccaggcatg     180
gggctgaggc tgattcatta ctcagttggt gctggtatca ctgaccaagg agaagtcccc     240
aatggctaca atgtctccag atcaaccaca gaggatttcc cgctcaggct gctgtcggct     300
gctccctccc agacatctgt gtacttctgt gccagcagtt acgtcgggaa caccggggag     360 ctgtttttg gagaaggctc taggctgacc gtactggagg acctgaaaaa cgtgttccca     420
cccgaggtcg ctgtgtttga gccatcagaa gcagagatct cccacaccca aaaggccaca     480
ctggtgtgcc tggccacagg cttctacccc gaccacgtgg agctgagctg gtgggtgaat     540
gggaaggagg tgcacagtgg ggtcagcaca gacccgcagc cctcaaggac gcagccgcc      600 ctcaatgact ccagatacgc tctgagcagc cgcctgaggg tctcggccac cttctggcag     660 gaccccgca accacttccg ctgtcaagtc cagttctacg ggctctcgga gaatgacgag      720

-continued

```
tggacccagg ataggggccaa acccgtcacc cagatcgtca gcgccgaggc ctggggtaga      780
gcagactgtg gcttcacctc cgagtcttac cagcaagggg tcctgtctgc caccatcctc      840
tatgagatct tgctagggaa ggccaccttg tatgccgtgc tggtcagtgc cctcgtgctg      900
atggctatgg tcaagagaaa ggattccaga ggcgccaagc ggtctgggtc tggggccacc      960
aacttcagcc tgctgaagca ggccggcgac gtggaggaga accccggccc catggagacc     1020
ctcttgggcc tgcttatcct ttggctgcag ctgcaatggg tgagcagcaa acaggaggtg     1080
acgcagattc ctgcagctct gagtgtccca gaaggagaaa acttggttct caactgcagt     1140
ttcactgata gcgctatttta caacctccag tggtttaggc aggaccctgg gaaaggtctc     1200
acatctctgt tgcttattca gtcaagtcag agagagcaaa caagtggaag acttaatgcc     1260
tcgctggata aatcatcagg acgtagtact ttatacattg cagcttctca gcctggtgac     1320
tcagccacct acctctgtgc tgtgaggccc ctgtacggag gaagctacat acctacattt     1380
ggaagaggaa ccagccttat tgttcatccg tatatccaga accctgaccc tgccgtgtac     1440
cagctgagag actctaaatc cagtgacaag tctgtctgcc tattcaccga ttttgattct     1500
caaacaaatg tgtcacaaag taaggattct gatgtgtata tcacagacaa aactgtgcta     1560
gacatgaggt ctatggactt caagagcaac agtgctgtgg cctggagcaa caaatctgac     1620
tttgcatgtg caaacgcctt caacaacagc attattccag aagacacctt cttccccagc     1680
ccagaaagtt cctgtgatgt caagctggtc gagaaaagct ttgaaacaga tacgaaccta     1740
aactttcaaa acctgtcagt gattgggttc cgaatcctcc tcctgaaagt ggccgggttt     1800
aatctgctca tgacgctgcg gctgtggtcc agccggtaa                            1839
```

<210> SEQ ID NO 66
<211> LENGTH: 48
<212> TYPE: PRT
<213> ORGANISM: Artificial sequence
<220> FEATURE:
<223> OTHER INFORMATION: Synthetic

<400> SEQUENCE: 66

```
Cys Asp Val Lys Leu Val Glu Lys Ser Phe Glu Thr Asp Thr Asn Leu
1               5                   10                  15

Asn Phe Gln Asn Leu Ser Val Ile Gly Phe Arg Ile Leu Leu Leu Lys
            20                  25                  30

Val Ala Gly Phe Asn Leu Leu Met Thr Leu Arg Leu Trp Ser Ser Arg
        35                  40                  45
```

<210> SEQ ID NO 67
<211> LENGTH: 7
<212> TYPE: PRT
<213> ORGANISM: Artificial sequence
<220> FEATURE:
<223> OTHER INFORMATION: Synthetic

<400> SEQUENCE: 67

```
Ala Lys Arg Ser Gly Ser Gly
1               5
```

<210> SEQ ID NO 68
<211> LENGTH: 49
<212> TYPE: PRT
<213> ORGANISM: Artificial sequence
<220> FEATURE:
<223> OTHER INFORMATION: Synthetic

<400> SEQUENCE: 68

```
Cys Gly Phe Thr Ser Glu Ser Tyr Gln Gln Gly Val Leu Ser Ala Thr
1               5                   10                  15

Ile Leu Tyr Glu Ile Leu Leu Gly Lys Ala Thr Leu Tyr Ala Val Leu
            20                  25                  30

Val Ser Ala Leu Val Leu Met Ala Met Val Lys Arg Lys Asp Ser Arg
        35                  40                  45

Gly

<210> SEQ ID NO 69
<211> LENGTH: 4
<212> TYPE: PRT
<213> ORGANISM: Artificial sequence
<220> FEATURE:
<223> OTHER INFORMATION: Synthetic

<400> SEQUENCE: 69

Gly Ser Pro Lys
1

<210> SEQ ID NO 70
<211> LENGTH: 2
<212> TYPE: PRT
<213> ORGANISM: Artificial sequence
<220> FEATURE:
<223> OTHER INFORMATION: Synthetic

<400> SEQUENCE: 70

Pro Arg
1

<210> SEQ ID NO 71
<211> LENGTH: 6
<212> TYPE: DNA
<213> ORGANISM: Artificial sequence
<220> FEATURE:
<223> OTHER INFORMATION: Synthetic

<400> SEQUENCE: 71 ctcgag                                                              6

<210> SEQ ID NO 72
<211> LENGTH: 14
<212> TYPE: DNA
<213> ORGANISM: Artificial sequence
<220> FEATURE:
<223> OTHER INFORMATION: Synthetic

<400> SEQUENCE: 72
cagccagcgg ccgc                                                    14

<210> SEQ ID NO 73
<211> LENGTH: 8
<212> TYPE: DNA
<213> ORGANISM: Artificial sequence
<220> FEATURE:
<223> OTHER INFORMATION: Synthetic

<400> SEQUENCE: 73 gcggccgc                                                            8
```

COMPOSITION AND METHOD FOR ADOPTIVE IMMUNOTHERAPY

CROSS REFERENCE TO RELATED APPLICATION

This application is a U.S. national phase of International Patent Application No. PCT/US20/43072, filed on Jul. 22, 2020, which claims priority to U.S. Provisional Application No. 62/877,331 filed on Jul. 23, 2019 and U.S. Provisional Application No. 63/044,059 filed on Jun. 25, 2020. The contents of the applications are incorporated herein by reference in their entireties.

FIELD OF THE INVENTION

This invention relates to recombinant antigen receptors and uses thereof. T cells engineered to express such antigen receptors are useful in the treatment of diseases characterized by expression of one or more antigens bound by the antigen receptors.

BACKGROUND

Adoptive immunotherapy involves administration of immune effector cells into a patient to produce therapeutic effects. The advent of chimeric antigen receptor (CAR) T cells has provided a useful tool to improve adoptive immunotherapy. To that end, use of genetic engineering to insert antigen-targeted receptors of defined specificity into T cells has greatly extended the capabilities of adoptive immunotherapy. CARs are a type of antigen-targeted receptor composed of intracellular T cell signaling domains fused to extracellular antigen-binding domains. Antibody-based CARs directly recognize cell surface antigens, independent of major histocompatibility complex (MHC)-mediated presentation, permitting the use of a single receptor construct specific for any given antigen in all patients. Initial CARs fused antigen-recognition domains to the CD3$\zeta$ (CD3zeta) activation chain of the T cell receptor (TCR) complex. Subsequent CAR iterations have included secondary costimulatory signals in tandem with CD3$\zeta$, including intracellular domains from CD28 or a variety of TNF receptor family molecules such as 4-1BB (CD137) and OX40 (CD134). Third generation receptors include two different costimulatory signals in addition to CD3$\zeta$, most commonly from CD28 and 4-1BB. The second and third generation of antibody-based CARs improved antitumor efficacy in vitro and in vivo.

Transgenic T cell receptors (tTCRs) and TCR-based CARs (TCR-CARs) are different from antibody-based CARs, primarily in which tTCR and TCR-based CARs bind to the antigen in the MHC (HLA) restricted fashion. Thus, the tTCRs and TCR-based CARs greatly expand the list of possible targets. Creation of TCR-CAR of $2^{nd}$ gen that comprises the cytoplasmic domains of human CD28 and CD3zeta (CD3Z) or cytoplasmic domains of human CD28 and CD3epsilon (CD3E) in two separate viral vector format were described previously (Govers et al., Journal of Immunology, 2014, 193: 5315-5326), and that comprises the cytoplasmic domains of human CD28 and CD3zeta in a single viral vector form was previously described in the U.S. Pat. No. 9,206,440 and Im E J et al., Recombination—deletion between homologous cassettes in retrovirus is suppressed via a strategy of degenerate codon substitution. Molecular Therapy—Methods & Clinical Development (2014) Article number: 14022). In addition, creation of TCR-CAR of $2^{nd}$ gen that comprises a single chain TCR and the cytoplasmic domains of human CD28 and CD3zeta in a single viral vector format were also described previously (Walseng et al., A TCR-based Chimeric Antigen Receptor. Sci Rep. 2017 Sep. 6; 7(1):10713). Third generation receptors include two different costimulatory signals in addition to CD3$\zeta$, most commonly from CD28 and 4-1BB. The he second and third generation of antibody-based CARs improved antitumor efficacy in vitro and in vivo.

Unlike to $2^{nd}$ or $3^{rd}$ generation of antibody-based CARs, tTCR and TCR-based CARs face various obstacles, such as loss of stability for efficient tTCR or TCR-based CAR expression and activity. While tTCR itself lacks co-stimulatory signaling in its own molecule, current reported TCR-based CARs either lack sufficient co-stimulatory signaling elements such as 4-1BB or lacks optimal designs for optimal cell surface expression and CAR-mediated T cell activity. There is a need for novel TCR-based CAR designs and adoptive therapies that provide cells with enhanced functionalities.

SUMMARY

This disclosure addresses the need mentioned above in a number of aspects. In one aspect, the disclosure provides an antigen receptor comprising (I) a first polypeptide chain that comprises an extracellular domain comprising a TCR beta chain or an antigen-binding fragment thereof, a transmembrane (TM or Tm) domain (TMD), and a cytoplasmic domain (Cyt or cyt); and (II) a second polypeptide chain that comprises an extracellular domain (Ec) comprising a TCR alpha chain or an antigen-binding fragment thereof, a transmembrane domain, and a cytoplasmic domain. The TCR beta chain and the TCR alpha chain form an antigen-binding site. In embodiments, the first polypeptide chain is substantially different from the second polypeptide chain in one or more of the transmembrane domain, and the cytoplasmic domain.

The cytoplasmic domain of the first polypeptide chain or of the second polypeptide chain comprises (a) 0, 1, or 2 copies of a cytoplasmic domain of a human 4-1BB or a fragment thereof, or (b) 0, 1, or 2 copies of a cytoplasmic domains of human CD3zeta (CD3Z) or a fragment thereof, or (c) 0, 1, or 2 copies of a cytoplasmic domains of human CD3 epsilon (CD3E) or a fragment thereof, or (d) 0, 1, or 2 copies of a cytoplasmic domain of human CD28 or a fragment thereof.

In the antigen receptor, the transmembrane domain of the first or the second polypeptide chain may comprise one selected from the group consisting of a transmembrane domain of CD8 and a transmembrane domain of CD28.

In some embodiments, the antigen receptor comprises 1 or 2 copies of the cytoplasmic domain of a human 4-1BB. Examples of such antigen receptor include those encoded by vectors NT 4, 5, 6, 21, 22, 23, 24 25, and 27 described herein. In some examples, the antigen receptor can comprise 1 or 2 copies of the cytoplasmic domain of human CD3zeta. In other examples, the antigen receptor may comprise 1 or 2 copies of the cytoplasmic domain of human CD28. Examples include those encoded by vectors NT 6, 21, 22, 23, 24 25, and 27.

In one embodiment, the antigen receptor comprises only 1 copy of the cytoplasmic domain of human 4-1BB, 1 copy of the cytoplasmic domains of human CD28, and 1 copy of the cytoplasmic domains of human CD3zeta. The antigen receptor can further comprise only one copy of the transmembrane domain of CD28 and one copy of the transmembrane domain of CD8. In one example (such as that encoded by NT22), the first polypeptide chain may contain the extracellular domain of a TCR beta chain, 1 copy of the CD28 transmembrane domain, 1 copy of the cytoplasmic domains of human CD28, and 1 copy of the cytoplasmic domains of human CD3zeta, while the second polypeptide chain may contain the extracellular domain of a TCR alpha chain, 1 copy of the CD8 transmembrane domain, and 1 copy of the cytoplasmic domain of human 4-1BB.

In one embodiment, the antigen receptor comprises 2 copies of the cytoplasmic domain of human 4-1BB, 2 copies of the cytoplasmic domain of human CD28, and 2 copies of the cytoplasmic domains of human CD3zeta. For example, each of the two chains can contain 1 copy for each of the cytoplasmic domain of human 4-1BB, the cytoplasmic domain of human CD28, and the cytoplasmic domains of human CD3zeta (e.g., that encoded by NT6). Alternatively, one polypeptide chain (e.g., the first polypeptide chain) may contain 2 copies of the cytoplasmic domain of human CD28 while the other (e.g., the second polypeptide chain) may contain 2 copies of the cytoplasmic domain of human 4-1BB. Examples include that encoded by vectors NT25.

In one embodiment of the antigen receptor, one of the two chains has the cytoplasmic domain of human CD3zeta. For instance, the first polypeptide chain may comprise 1 copy of the transmembrane domain of human CD28, 1 copy of the cytoplasmic domain human CD28, and 1 copy of the cytoplasmic domain of human CD3zeta. The second polypeptide chain may comprise 1 copy of the transmembrane domain of human CD8 and 1 copy of the cytoplasmic domain human 4-1BB, but no cytoplasmic domain of human CD3zeta. Examples include that encoded by NT22.

In one embodiment, the first and the second polypeptide chains have different co-stimulatory domains. For instance, the first polypeptide chain may comprise 1 copy of the transmembrane domain of human CD8, 1 copy of the cytoplasmic domain human CD28, and 1 copy of the cytoplasmic domain of human CD3zeta. The second polypeptide chain may comprise 1 copy of the transmembrane domain of human CD8, 1 copy of the cytoplasmic domain human 4-1BB, and 1 copy of the cytoplasmic domain of human CD3zeta. Examples include that encoded by NT24.

In one embodiment, the first polypeptide chain comprises 1 copy of the transmembrane domain of human CD8, 2 copies of the cytoplasmic domain human CD28, and 1 copy of the cytoplasmic domain of human CD3zeta. The second polypeptide chain comprises 1 copy of the transmembrane domain of human CD8, 2 copies of the cytoplasmic domain human 4-1BB, and 1 copy of the cytoplasmic domain of human CD3zeta. Examples include that encoded by NT25.

It was surprising and un-expected that (1) the anti-NY-ESO-1/A2 TCR-based CARs of $2^{nd}$ gen (e.g., NT2, NT3, NT4, and NT5) and $3^{rd}$ gen (e.g., NT24) show higher surface expression on virus transduced human T cells as determined by flow cytometry measurement, compared to the TCRs of native form (e.g., NT1 and NT1b), (2) human T cells expressing the anti-NY-ESO-1/A2 TCR-based CARs of $2^{nd}$ gen (for example Nt2, NT3, NT4, NT5) and 3rd gen (e.g., NT24), are more potent in TCR-CAR-mediated cytokine secretion (e.g., IL-2) and cell expansion post engagement with tumor target cells, compared to those expressing the TCRs of native form (e.g., NT1, NT1b), and (3) in the in vivo therapeutic assay involving a Xenograft Saos-2 tumor murine model, the data suggest that the $2^{nd}$ gen anti-NY-ESO-1 TCR-CARs (e.g., NT2, NT4) show superior anti-tumor activity than the native from NT1 (NT1a), while the $3^{rd}$ gen anti-NY-ESO-1/A2 TCR-CAR (e.g., NT24) is significantly more potent that its counter parts of $2^{nd}$ gen (e.g., NT2, NT4) with only TCR signal 2 only from human CD28 (e.g., NT2) or only from 4-1BB (e.g., NT4), and even more potent than the native form NT1 (e.g., NT1a).

In the antigen receptor described above, the antigen-binding site may bind to a tumor antigen, or a tumor-related antigen (TAA), or a viral antigen in the context of MHC (HLA) restricted fashion. That is, the extracellular domains, when expressed on a cell, bind to the tumor antigen, TAA, or viral antigen, in the context of MHC (HLA) restricted fashion. Various such antigens are known in the art and some examples are listed herein, including the tumor antigen is NY-ESO-1.

Methods of making the antigen receptor and cells expressing it are disclosed herein. The first polypeptide chain and second polypeptide chain can be expressed from two separate expression cassettes or vectors of from one common expression cassette/vector with the aid of an internal ribosomal entry site (IRES).

The two chains can be expressed as one fusion protein. Accordingly, the disclosure also provides a fusion protein comprising the first polypeptide chain and the second polypeptide chain. In that case, the first polypeptide chain and second polypeptide chain may be linked by a protein linker sequence or a self-cleaving peptide sequence. Examples of the self-cleaving peptide sequence include a P2A, E2A, F2A or T2A sequence.

This disclosure also provides an isolated nucleic acid or a set of isolated nucleic acids encoding the antigen receptor or the fusion protein described above. In one embodiment, the disclosure further provides an isolated nucleic acid or a set of isolated nucleic acids may comprise (I) a first nucleic acid sequence encoding the first polypeptide chain containing a first polypeptide segment of at least 10 (e.g., 10, 20, 30, 40, 50, 60, 70, 80, 100, 150, 200, 250, and 300) amino acids (aa) in length, and (II) a second nucleic acid sequence encoding the second polypeptide chain containing a second polypeptide segment of at least 10 (e.g., 10, 20, 30, 40, 50, 60, 70, 80, 100, 150, 200, 250, and 300) amino acids in length. The first polypeptide segment is at least 90% (e.g., 95%, 96%, 97%, 98%, 99%, or 100%) identical to the second polypeptide segment, and the first nucleic acid sequence and the second nucleic acid sequence contain at least one non-identical codon within the codons that encode identical amino acid residues in the first polypeptide segment and the second polypeptide segment. The first polypeptide chain and the second polypeptide chain comprise an identical polypeptide sequence of greater than 10 amino acids in length; and the first nucleic acid sequence and the second nucleic acid sequence contain at least one non-identical codon within the codons that encode the identical polypeptide sequence of the first and second nucleic acid sequences. In some embodiments, at least 2% (e.g., 5%, 10%, 20%, 30%, 40%, 50%, 60%, 70%, 80%, 90%, 95%, or 100%) of the codons are non-identical. The first nucleic acid sequence and the second nucleic acid sequence are less than 98% (e.g., 95%, 90%, 80%, 70%, 60%, 50%, 40%, 30%, 20%, 10%, 5%, or 0%) identical within the codons.

In some embodiments, the first nucleic acid sequence and the second nucleic acid sequence contain at least one non-identical codon within the codons that encode one or more selected from the group consisting of: (a) the TCR beta chain or an antigen-binding fragment thereof, (b) the TCR alpha chain or an antigen-binding fragment thereof, (c) the transmembrane domain of CD8, (d) the transmembrane domain of CD28, (e) the cytoplasmic domain of CD3Z or a fragment thereof, (f) the cytoplasmic domain of CD3E or a fragment thereof, (g) the cytoplasmic domain of CD28 or a fragment thereof, and (h) the cytoplasmic domain of 4-1BB or a fragment thereof. The isolated nucleic acid may encode one selected from the group consisting of SEQ ID NOs: 9, 64, 10, 11, and 32-41. The isolated nucleic acid or nucleic acids may comprise a sequence selected from the group consisting of SEQ ID NOs: 12, 65, 13, 14, and 54-63.

The above-described nucleic acid or nucleic acids can be used to express the antigen receptors described here. Accordingly, the disclosure further provides a vector comprising the isolated nucleic acid or nucleic acids described above. In some embodiments, the vector is an expression vector, including a viral vector as described herein. When expressing of the first and second polypeptide chains in cells, bicistronic or multicistronic expression vectors can be used. Among various strategies employed to construct bicistronic or multicistronic vectors, an TRES has been widely used. A self-cleaving 2A peptide could also be a good candidate to be used alone or together with an TRES. Accordingly, the first nucleic acid sequence and the second nucleic acid sequence can be linked via a nucleic acid sequence comprising an TRES. The disclosure further provides a cell comprising the above-described antigen receptor, fusion protein, isolated nucleic acid or nucleic acids, or vector. Examples of the cells are described below, including lymphocytes such as T cell.

Also provided is a pharmaceutical composition comprising (i) the above-described nucleic acid/nucleic acids, vector, or cell and (ii) a pharmaceutically acceptable carrier. Such a pharmaceutical composition can be used in a method of treating a tumor, or a viral infection disease. The method comprises administering to a subject in need thereof an effective amount of the pharmaceutical composition.

The details of one or more embodiments of the invention are set forth in the description below. Other features, objectives, and advantages of the invention will be apparent from the description and from the claims.

BRIEF DESCRIPTION OF THE DRAWINGS

FIGS. 1A and 1B are a set of diagrams showing exemplary antigen receptors. (A) Schematic presentation of four anti-NY-ESO-1 TCR or TCR-based CAR constructs: 1 (NT1); 2 (NT1b); 3 (NT2); and 4 (NT3). (B) Schematic presentation of additional eleven anti-NY-ESO-1 TCR-based CAR constructs: 5 (NT4); 6 (NT5); 7 (NT6); 8 (NT21); 9 (NT22); 10 (NT23); 11 (NT24); 12 (NT25); 13 (NT26); 14 (NT27); and 15 (NT28).

FIGS. 2A, 2B, 2C, and 2D are schematic presentations of four nucleotide sequences encoding anti-NY-ESO-1 TCR or TCR-based CAR constructs. A: NT1 (SEQ ID NO: 12); B: NT1b (SEQ ID NO: 65); C: NT2 (SEQ ID NO: 13); D: NT3 (SEQ ID NO: 14).

FIG. 3A displays the amino acid sequence of anti-NY-ESO-1 TCR alpha chain-2A-TCR beta chain (NT1; aNY-TCRa/b) (SEQ ID NO: 9).

FIG. 3B displays the amino acid sequence of anti-NY-ESO-1 TCR beta chain-2A-TCR alpha chain (NT1b; aNY-TCRb/a) (SEQ ID NO: 64).

FIG. 4 displays the amino acid sequence of NT2_anti-NY-ESO-1 betaCD28TmCytZCyt-2A-alphamuCD28Tm CytmuZCyt (aNY-TCR28Z) (SEQ ID NO: 10).

FIG. 5 displays the amino acid sequence of anti-NY-ESO-1 betaCD28TmCytECyt-2A-alphamuCD28Tm CytmuECyt (NT3; aNY-TCR28E) (SEQ ID NO: 11).

FIG. 6 displays an alignment of the nucleotide sequences hCD28TmCyt (SEQ ID NO: 17) and MuhCD28TmCy (SEQ ID NO: 18). Both DNA sequences encode an identical polypeptide sequence comprising the Tm and Cyt domains of a native human CD28(CD28TmCyt) (SEQ ID NO: 6). The overall homology between these two sequences is 56%. Identical nucleotides are denoted with an asterisk (*).

FIG. 7 displays an alignment of the nucleotide sequences hCD3ZCyt(ZCyt) (SEQ ID NO: 19) and muhCD3ZCyt (muZCyt) (SEQ ID NO: 20). Both DNA sequences encode an identical polypeptide sequence comprising the Cyt domain of a native human CD3Zeta (SEQ ID NO: 7). The overall homology between these two sequences is 57%. Identical nucleotides are denoted with an asterisk (*).

FIG. 8 displays an alignment of the nucleotide sequences hCD28TmCytCD3ZCyt (28TmCytZCyt)(SEQ ID NO: 16) and muhCD28TmCytCD3ZCyt (mu28TmCytZCyt) (SEQ ID NO: 21). Both DNA sequences encode an identical polypeptide sequence comprising the Tm and Cyt domain of a native human CD28 and the Cyt of a native human CD3Zeta (SEQ ID NO: 15). The overall homology between these two sequences is 59%. Identical nucleotides are denoted with an asterisk (*).

FIG. 9 displays an alignment of the nucleotide sequences hCD3ECyt(ECyt) that contains a single silent nucleotide mutation (G to C) at position 119 of human CD3E (Genbank no: NM_000733.1) (SEQ ID NO: 23) to disrupt the BspE 1 site (SEQ ID NO: 23) and muhCD3ECyt(muECyt) (SEQ ID NO: 24). Both DNA sequences encode an identical polypeptide sequence comprising the Cyt domain of a native human CD3 Epsilon Chain (CD3E) (ECyt) (SEQ ID NO: 8). The overall homology between these two sequences is 57%. Identical nucleotides are denoted with an asterisk (*).

FIG. 10 shows an alignment of nucleotide sequences of Cyt of CD3Z with mutated Cyt of CD3Z. The CD3ZCyt sequence (SEQ ID NO: 19) is from human CD3 Zeta (GenBank ID: J04132.1). The sequences of hCD3ZCyte and mu2hCD3ZCyt (SEQ ID NO: 20) encode an identical amino acid sequence (SEQ ID NO: 7). The vertical bar "|" indicates the identical nucleotides between the two sequences. The overall homology between these two sequences is 60.42%.

FIG. 11 shows an alignment of nucleotide sequences of Tm of CD28 with mutated Tm of CD28. The CD28Tm sequence (SEQ ID NO: 44) is from human CD28 (GenBank ID: BC093698.1). The sequences of CD28Tm and mu2CD28Tm (SEQ ID NO: 45) encode an identical amino acid sequence (SEQ ID NO: 27). The vertical bar "|" indicates the identical nucleotides between the two sequences. The overall homology between these two sequences is 62.96%.

FIG. 12 shows an alignment of nucleotide sequences of Cyt of CD28 with mutated Cyt of CD28. The CD28Cyt sequence (SEQ ID NO: 46) is from human CD28 (GenBank ID: BC093698.1). The sequences of hCD28Cyte and mu2hCD28Cyt (SEQ ID NO: 47) encode an identical amino acid sequence (SEQ ID NO: 28). The vertical bar "|" indicates the identical nucleotides between the two sequences. The overall homology between these two sequences is 53.65%.

FIG. 13 shows an alignment of nucleotide sequences of Cyt of 4-1BB with mutated Cyt of 4-1BB. The BBCyt sequence (SEQ ID NO: 48) is from human 4-1BB (GenBank ID: U03397.1). The sequences of hBBCyt and muhBBCyt (SEQ ID NO: 49) encode an identical amino acid sequence (SEQ ID NO: 29). The vertical bar "|" indicates the identical nucleotides between the two sequences. The overall homology between these two sequences is 63.49%.

FIG. 14 displays an alignment of the nucleotide sequences hCD8hinge (SEQ ID NO: 50) and MuhCD8hinge (SEQ ID NO: 51). Both DNA sequences encode an identical polypeptide sequence comprising the hinge domain of a native human CD8(CD8hinge) (SEQ ID NO: 30) (the amino acid sequence of 135-180 of Human CD8A (GenBank ID:NM_001768.4)). The overall homology between these two sequences is 58.70%. Identical nucleotides are denoted with a vertical bar "|".

FIG. 15 displays an alignment of the nucleotide sequences hCD8Tm (SEQ ID NO: 52) and MuhCD8Tm (SEQ ID NO: 53). Both DNA sequences encode an identical polypeptide sequence comprising the Tm domain of a native human CD8(CD8Tm) (SEQ ID NO: 31) (the amino acid sequence of 181-206 of Human CD8A, GenBank ID:NM_001768.4). The overall homology between these two sequences is 62.82%. Identical nucleotides are denoted with a vertical bar "|".

FIG. 16 displays the sequence of NT4_anti-NY-ESO-1 betaCD8tmBBCytZCyt-2A-alphamuCD8TmBBCytmuZCyt (aNY-TCRBBZ) (SEQ ID NO: 32).

FIG. 17 displays the sequence of NT5_anti-NY-ESO-1 betaCD28tmBBCytZCyt-2A-alphamuCD28TmBBCytmuZCyt (aNY-TCRBBZ) (SEQ ID NO: 33).

FIG. 18 displays the sequence of NT6_anti-NY-ESO-1 betaCD28TmCytZCyt-2A-alphamuCD28TmCytmuZCyt (aNY-TCR28BBZ) (SEQ ID NO: 34).

FIG. 19 displays the amino acid sequence of NT21 (SEQ ID NO: 35).

FIG. 20 displays the amino acid sequence of NT22 (SEQ ID NO: 36).

FIG. 21 displays the amino acid sequence of NT23 (SEQ ID NO: 37).

FIG. 22 displays the amino acid sequence of NT24 (SEQ ID NO: 38).

FIG. 23 displays the amino acid sequence of NT25 (SEQ ID NO: 39).

FIG. 24 displays the amino acid sequence of NT26 (SEQ ID NO: 40).

FIG. 25 displays the amino acid sequence of NT27 (SEQ ID NO: 41).

FIGS. 26A and 26B are diagrams showing surface expression of anti-NY-ESO-1 TCR-CARs on infected PG13 VPC. The PG13 were infected with anti-NY-ESO-1 TCR-CAR+ (NT22 (Vector 9; $3^{rd}$ gen), NT24 (Vector 11; $3^{rd}$ gen), NT25 (Vector 12; $2^{nd}$ gen)). (A) Intensity plots showing positive staining of single or double positive cells to FITC-anti-human TCRVb13.1 and APC-NYpep/A2 tetramer, individually. % of positive cells were shown in individual quadrants. (B) Histograms shows % of cells that were stained positive to NYpep/A2 tetramer. Untd: uninfected.

Figures 27A, 27B:
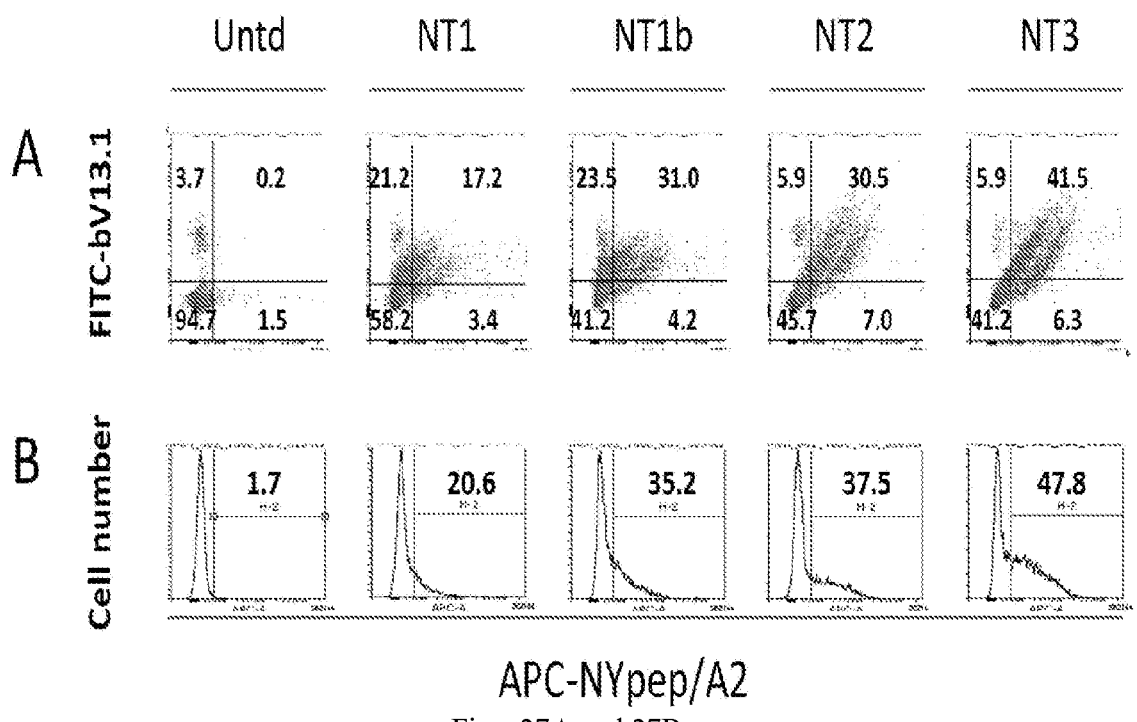
FIGS. 27A and 27B are diagrams showing surface expression of anti-NY-ESO-1 TCRs of native form or TCR-CARs of $2^{nd}$ gen on transduced activated human T cells. The ATC that were evaluated were transduced with one of the two anti-NY ESO-1 TCR (NT1, NT1b) or one of the two $2^{nd}$ gen TCR-based CARs (NT2 and NT3). (A) Intensity plots showing positive staining of single or double positive cells to FITC-anti-human TCRVb13.1 and APC-NYpep/A2 tetramer, individually. Percentage of positive cells were shown in individual quadrants. (B) Histograms show percentage of cells stained positive to NYpep/A2 tetramer.

Mean number of tumor size+S.D. from six mice in each group. (B) Percentages of survival of mice/group were calculated and presented.

DETAILED DESCRIPTION OF THE INVENTION

The present disclosure relates to agents, methods and compositions to confer and/or increase immune responses mediated by cellular immunotherapy, such as by adoptively transferring antigen-specific genetically modified subsets of lymphocytes.

Such an adoptive cell transfer or adoptive cell therapy (ACT) represents a promising therapeutic approach for the treatment of cancer patients. However, it faces various obstacles such as loss of stability for efficient CAR expression and activity. This disclosure addresses such obstacles in a number of aspects, including but not limited to, (1) novel designs of $3^{rd}$ gen TCR-CARs incorporating co-stimulatory signaling of, e.g., human 4-1BB, (2) novel designs involving variations in different transmembrane domains, varied copy numbers of same TCR signaling elements (such as CD3Zeta and co-stimulatory molecules of CD28 or 4-1BB). The approaches described herein enhance TCR-CAR mediated T cell signaling to improve TCR-CAR expressing T cell's anti-tumor ability via genetically expressing novel 3rd gen TCR-CAR in T cells.

The disclosure provides compositions comprising genetically modified lymphocytes that express chimeric antigen receptors having the ability to modulate the immune system and the innate and adaptive immune response. The disclosed agents, methods, and compositions provide genetically engineered lymphocytes with enhanced anti-tumor functions as well as methods of developing such lymphocytes.

Antigen Receptors

Genetically modified immune function cells, such as T cells and NK cells engineered to express foreign antigen receptors are effective immunotherapeutic for cancer and infectious diseases. Isolation of autologous antigen specific immune cells, such as T cells, for therapeutic application is a laborious task, and is not possible where such cells are absent or rare. Therefore, strategies have been developed to genetically transfer immune receptors specific to tumor or virus into patients' T cells. To this end, antigen receptors have been constructed that join antigen (Ag)-recognition domains to signaling domains of the TCR or Fc receptor. T cells expressing such antigen receptors recapitulate the immune specific responses mediated by the introduced receptor.

Chimeric antigen receptors (also known as chimeric immunoreceptors, chimeric T cell receptors or artificial T cell receptors) are receptor proteins that have been engineered to give T cells the new ability to target a specific protein. The receptors are chimeric because they combine antigen binding and T-cell activating functions into a single receptor. In addition to antigen-binding sites, a CAR can have one or more function domains.

Domains

As described herein, an antigen receptor contains three domains: an extracellular domain, a transmembrane domain, and a cytoplasmic domain (which can contain an intracellular signaling domain). In some embodiment, it contains a fourth domain: an extracellular hinge region between the extracellular domain and the cytoplasmic domain. As such, the chimeric antigen receptor combines many facets of normal T cell activation into a single protein. They link an extracellular antigen recognition domain to an intracellular signaling domain, which activates the T cell when an antigen is bound.

An extracellular domain comprises an antigen-binding or target-binding domain. Exposed to the outside of the cell, this domain interacts with potential target molecules and is responsible for targeting the CAR-T cell to any cell expressing a matching molecule. The antigen recognition domain typically can be derived from the variable regions of a monoclonal antibody linked together as a single-chain variable fragment (scFv) or from a TCR. In addition to antibody and TCR, other approaches can also been used to direct CAR specificity, usually taking advantage of ligand/receptor pairs that normally bind to each other. For example, cytokines, innate immune receptors, TNF receptors, growth factors, and structural proteins can be used as antigen recognition domains. In preferred embodiments, the extracellular domain comprises a variable region of antibody or functional fragment thereof, an extracellular domain of a T cell receptor (e.g., Va or Vb; VaCa or VbCb) or functional fragment thereof.

A hinge region, also called a spacer, is a small structural domain that sits between the antigen recognition region and the cell's outer membrane. An ideal hinge enhances the flexibility of the receptor's target binding domain, reducing the spatial constraints between the CAR and its target antigen. This promotes antigen binding and synapse formation between the CAR-T cells and target cells. Hinge sequences can comprise the membrane-proximal region from an immune molecule, such as IgG, CD8, or CD28.

A transmembrane domain is a structural component, consisting of a hydrophobic alpha helix that spans the cell membrane. It anchors the antigen receptor to the plasma membrane, bridging the extracellular hinge and antigen recognition domains with the cytoplasmic/intracellular signaling region. This domain is important for the stability of the receptor as a whole. In this disclosure, the transmembrane domain from the most membrane-proximal component of the cytoplasmic can be used, but different transmembrane domains may result in different receptor stability. As used herein, a transmembrane domain may comprise an art-recognized, functional transmembrane domain (e.g., that of CD3ζ, CD28, CD8, CD4, or FcεRiγ, or a variant polypeptide or functional fragment thereof). The CD28 transmembrane domain is known to result in a highly expressed, stable receptor.

An intracellular T-cell signaling domain lies in the receptor's cytoplasmic domain, inside the cell. After an antigen is bound to the external antigen recognition domain, the receptors cluster together and transmit an activation signal. Then the internal cytoplasmic end of the receptor perpetuates signaling inside the T cell. Normal T cell activation relies on the phosphorylation of immunoreceptor tyrosine-based activation motifs (ITAMs) present in the cytoplasmic domain of CD3-zeta. Accordingly, the CD3-zeta's cytoplasmic domain can be used. Other ITAM-containing domains can also be used. For example, the intracellular signaling domain may comprise e.g., the cytoplasmic portion of CD3ζ or a functional fragment thereof, FCεRIγ or a functional fragment thereof, and/or CD28 or a functional fragment thereof.

T cells also use co-stimulatory molecules in addition to CD3 signaling in order to persist after activation. The cytoplasmic domain of a CAR receptor therefore can also include one or more chimeric domains from co-stimulatory proteins (i.e., co-stimulatory domains). Signaling domains from a wide variety of co-stimulatory molecules can be used. Examples of co-stimulatory polypeptides known to stimulate or increase an immune response via their binding include CD28, OX-40, 4-1BB, CD27, and NKG2D and their corresponding ligands, including B7-1, B7-2, OX-40L, 4-1BBL, CD70, and NKG2D ligands. Such polypeptides are present in the tumor microenvironment and activate immune responses to neoplastic cells. In various embodiments, promoting, stimulating, or agonizing pro-inflammatory polypeptides and/or their ligands via a therapeutic transgene enhances the immune response of the immunoresponsive cell. For example, CD28 co-stimulation (signal 2) during T cell activation through TCR (signal 1) results in sustained proliferation, decreased activation-induced cell death (AICD) and improved long-term lymphocyte survival. Listed in the table below are examples of domain sequences can be included in a CAR.

TABLE A

| Name | SEQ ID NO | Source GenBank ID | Position of aa |
|---|---|---|---|
| cytoplasmic domains of human CD3zeta (CD3ZCyt) | 7 | J04132.1 | 52-163 |
| cytoplasmic domain of human CD3 epsilon (CD3Ecyt) | 8 | NM_000733.1 | 153-207 |
| transmembrane domain of human CD28 | 27 | BC093698.1 | 153-179 |
| cytoplasmic domain of human CD28 | 28 | BC093698.1 | 180-220 |
| cytoplasmic domain of human 4-1BB | 29 | U03397.1 | 214-255 |
| CD8hinge of human CD8A | 30 | NM_001768.4 | 135-180 |
| transmembrane domain of human CD8A | 31 | NM_001768.4 | 181-206 |

The two primary antigen receptors used to re-target T cells are transgenic T cell receptors (tTCRs) and chimeric antigen receptors (CARs). CARs can be classified into two forms, antibody-based CARs and TCR-based CARs. Antibody-based CAR therapy has demonstrated significant success in targeting B cell leukemia, and trials targeting solid tumors are underway. While antibody-based CARs have great potential as therapeutic agents in cancer immunotherapy, they are limited in their ability to recognize cell-surface molecules only. In contrast, tTCRs and TCR-based CARs have the ability to identify any processed antigen that is presented by the major histocompatibility complex (MHC), thus greatly expanding the list of possible targets. For example, in vitro studies have demonstrated that cells engineered with endogenously occurring NY-ESO-1 TCRs have activity against NY-ESO-1-expressing melanoma and non-melanoma cell lines. In a recent clinical trial employing NY-ESO-1-directed T cells, engineered cells bearing high-affinity tTCRs were delivered to patients with melanoma and synovial cell carcinoma. Nearly half of patients in this study demonstrated objective clinical responses, highlighting the potential of tTCR T cells in treating established solid tumors.

There are two ways to introduce genetically TCR-associated antigen specificity to T cells: genetically engineering T cells to express exogenous native TCRs (e.g., TCRα and TCRβ chains) and genetically engineering T cells to express exogenous TCR-based CARs. A TCR-based CAR can be created in such a way that it comprises an extracellular domain (e.g., extracellular domain of a TCR alpha chain or a TCR beta chain), a transmembrane domain and TCR signaling element (e.g., a cytoplasmic domain of CD3 zeta chain (CD3Z) or CD3 Epsilon Chain (CD3E) with or without integration of co-stimulation signaling element such as cytoplasmic domain of CD28 or CD137 (4-1BB). One advantage of TCR-based CAR over native TCR is that it can comprise TCR signaling elements such CD3Z and CDE, and be integrated with co-stimulation signaling elements such as CD28 and CD137 (4-1BB).

CD28 co-stimulation (signal 2) during T cell activation through TCR (signal 1; e.g., CD3Z- or CD3E mediated signaling) has been shown to promote sustained T cell proliferation. To combine activation and co-stimulatory functions within a single receptor, CARs can be constructed that are comprised of both CD3Zeta and CD28 sequences in the same molecule. Such IgCD28Z molecules have been demonstrated to possess superior function in T cells for cytotoxicity, proliferation, and IL2 and IFNγ production.

The extracellular portion of an antibody-based CAR (Antibody-based CAR; sFv-CAR) consists of a single chain Fv or a fragment thereof. Similar to sFv-CAR, a TCR-CAR can comprise TCR variable antigen binding fragments (Vα and V0, or antigen binding fragments thereof) in the context of specific MHC (HLA) molecules, linked to signaling domains of the TCR or Fc receptor. TCR-CAR can be constructed in two basic forms: as a single chain TCR-CAR (scTCR-CAR), or as a two chain TCR-CAR (tcTCR-CAR). For a scTCR-CAR, both TCR Vα and Vβ are present within the same single chain TCR protein, while in a tcTCR-CAR, the Vα and Vβ are in separate chains which form heterodimers.

It is known that TCRs have around 100- to 1,000-fold lower binding affinities for their cognate antigens (peptide/MHC complex), as compared to antibodies directed to the same cognate antigens. In addition, it has been reported that the single chain format of T cell receptors generally have greatly reduced affinities for cognate antigens, as compared to the affinities of their corresponding parental two chain forms for such antigens, with some single chain T cell receptors completely losing antigen binding affinity. Higher binding affinities of TCRs, including chimeric TCRs, have been shown to be associated with higher potencies of modified T cells expressing such receptors, with regard to the function of such cells in T cell activation, including induction of proliferation, killing of target cells and induction of cytokine secretion. Several reports have indicated that single chain formats of TCR-CARs possess binding affinities that are too low to be of therapeutic or diagnostic value. Therefore, to create functional TCR-CARs with reasonably high antigen binding affinities, the two-chain format for natural TCRs possesses significant advantages over a single-chain format.

Recombination between nucleic acids is a well-established phenomenon in molecular biology. Genetic recombination that requires strong sequence homology between participating nucleic acid sequences to occur is generally referred to as homologous recombination. While most genetic knockout strategies employ homologous recombination to achieve a targeted knockout, in certain systems the occurrence of genetic recombination can impact genetic manipulations detrimentally. In particular, homologous recombination events can adversely impact construction and production of vectors, particularly viral vectors (e.g., adenovirus, retrovirus, adeno-associated virus, herpes virus, etc.), where it is often desirable to maintain highly homologous sequences (e.g., identical polypeptide sequences) within a single, stable viral vector free of homologous recombination during, e.g., passage and/or propagation of viral vector through one or more host cells and/or organisms.

Two protein molecules comprising highly homologous polypeptide sequences that are encoded by similarly highly homologous nucleic acid sequences can be transduced to a single cell using a two-vector approach as a means of reducing possible viral recombination events. For example, TCR-CARs of two-chain format, which consist of various VaCa and VbCb, respectively, but share identical signaling element polypeptide sequences (e.g., cytoplasmic domains of CD28 and/or CD3Z). The two different vectors, each encoding one of the two homologous proteins of interest, might be generated from separate VPCs. However, the successful transduction rate of a single vector into mammalian cells, such as activated T cells exposed to a retrovirus, is often limited.

A novel approach for overcoming such problems associated with low host cell transduction efficiencies is to enable delivery of two or more nucleic acid sequences encoding for highly homologous (e.g., identical) polypeptides on a single viral vector. Such an approach allows one to produce viral vector sequences comprising nucleic acid sequences encoding two or more highly homologous (e.g., identical) polypeptides or polypeptide domains thereof. The viral vector sequences possess reduced risk of homologous recombination between such nucleic acid sequences, even during, e.g., extended passage in host cells and/or multiple infection, chromosomal integration, and/or excision events. Such reduced rates of homologous recombination are attributable, at least in part, to exploitation of the degeneracy of the genetic code during synthesis of the viral vectors as described herein.

In addition, the hinge/spacer region consists of a CAR's non-antigen binding extracellular region. The hinge/spacer region modulates CAR function by providing flexibility, extending the length, allowing dimerization to occur, or improving stability. These properties have been suggested to influence the effector cell-target cell interactions, thereby affecting the activation signal strength. Common hinge/spacers regions have made use of immunoglobulin Fc, CD8a and CD28 spacer regions.

Listed below are examples of domain sequences can be included in a CAR disclosed herein and related nucleic acid sequences.

```
SEQ ID NO: 1. Alpha chain of 1G4 a95LY TCR (275 aa)
METLLGLLILWLQLQWVSSKQEVTQIPAALSVPEGENLVLNCSFTDSAIYNLQWFRQDPGKGLTSLLLIQSSQRE

QTSGRLNASLDKSSGRSTLYIAASQPGDSATYLCAVRPLYGGSYIPTFGRGTSLIVHPYIQNPDPAVYQLRDSKS

SDKSVCLFTDFDSQTNVSQSKDSDVYITDKTVLDMRSMDFKSNSAVAWSNKSDFACANAFNNSIIPEDTFFPSPE

SSCDVKLVEKSFETDTNLNFQNLSVIGERILLLKVAGFNLLMTLRLWSSR

SEQ ID NO: 2. Beta chain of 1G4 a95LY TCR (311 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADCGFTSESYQQGVLSATILYEILLGKATLYAVLVSALVL

MAMVKRKDSRG

SEQ ID NO: 3. P2A (19 aa)
ATNFSLLKQAGDVEENPGP

SEQ ID NO: 4. Ec domain of alpha chain of 1G4 a95LY TCR (227 aa):
METLLGLLILWLQLQWVSSKQEVTQIPAALSVPEGENLVLNCSFTDSAIYNLQWFRQDPGKGLTSLLLIQSSQRE

QTSGRLNASLDKSSGRSTLYIAASQPGDSATYLCAVRPLYGGSYIPTFGRGTSLIVHPYIQNPDPAVYQLRDSKS

SDKSVCLFTDFDSQTNVSQSKDSDVYITDKTVLDMRSMDFKSNSAVAWSNKSDFACANAFNNSIIPEDTFFPSPE

SS

SEQ ID NO: 5. Ec domain of beta chain of 1G4 a95LY TCR (262 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRAD

SEQ ID NO: 6. Human CD28TmCyt (68 aa)
FWVLVVVGGVLACYSLLVTVAFIIFWVRSKRSRLLHSDYMNMTPRRPGPTRKHYQPYAPPRDFAAYRS SEQ ID NO: 7. Human CD3ZCyt (112 aa)
RVKFSRSADAPAYQQGQNQLYNELNLGRREEYDVLDKRRGRDPEMGGKPRRKNPQEGLYNELQKDKMAE

AYSEIGMKGERRRGKGHDGLYQGLSTATKDTYDALHMQALPPR

SEQ ID NO: 8. Human CD3ECyt (55 aa)
KNRKAKAKPVTRGAGAGGRQRGQNKERPPPVPNPDYEPIRKGQRDLYSGLNQRRI SEQ ID NO: 9. NT1_aNY-TCR (612 aa)
METLLGLLILWLQLQWVSSKQEVTQIPAALSVPEGENLVLNCSFTDSAIYNLQWFRQDPGKGLTSLLLIQSSQRE

QTSGRLNASLDKSSGRSTLYIAASQPGDSATYLCAVRPLYGGSYIPTFGRGTSLIVHPYIQNPDPAVYQLRDSKS
```

-continued

SDKSVCLFTDFDSQTNVSQSKDSDVYITDKTVLDMRSMDFKSNSAVAWSNKSDFACANAFNNSIIPEDTFFPSPE

SSCDVKLVEKSFETDTNLNFQNLSVIGFRILLLKVAGFNLLMTLRLWSSRAKRSGSGATNFSLLKQAGDVEENPG

PMSIGLLCCAALSLLWAGPVNAGVTQTPKFQVLKTGQSMTLQCAQDMNHEYMSWYRQDPGMGLRLIHYSVGAGIT

DQGEVPNGYNVSRSTTEDFPLRLLSAAPSQTSVYFCASSYVGNTGELFFGEGSRLTVLEDLKNVFPPEVAVFEPS

EAEISHTQKATLVCLATGFYPDHVELSWWVNGKEVHSGVSTDPQPLKEQPALNDSRYALSSRLRVSATFWQDPRN

HFRCQVQFYGLSENDEWTQDRAKPVTQIVSAEAWGRADCGFTSESYQQGVLSATILYEILLGKATLYAVLVSALV

LMAMVKRKDSRG

SEQ ID NO: 64. NT1b_Xho_NY-ESO.txt.xprt (612 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADCGFTSESYQQGVLSATILYEILLGKATLYAVLVSALVL

MAMVKRKDSRGAKRSGSGATNFSLLKQAGDVEENPGPMETLLGLLILWLQLQWVSSKQEVTQIPAALSVPEGENL

VLNCSFTDSAIYNLQWFRQDPGKGLTSLLLIQSSQREQTSGRLNASLDKSSGRSTLYIAASQPGDSATYLCAVRP

LYGGSYIPTFGRGTSLIVHPYIQNPDPAVYQLRDSKSSDKSVCLFTDFDSQTNVSQSKDSDVYITDKTVLDMRSM

DFKSNSAVAWSNKSDFACANAFNNSIIPEDTFFPSPESSCDVKLVEKSFETDTNLNFQNLSVIGFRILLLKVAGF

NLLMTLRLWSSR

SEQ ID NO: 10. NT2_aNY-TCR28Z (NYESO1-TCRba28Z_Xho-NY-ESO1
bmu2CD28tmcytCD3Zcyt-P2A-1g4TCRa95LYCD28tmcytCD3cyt), 883 aa
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKFWVLVVVGGVLACYSLLVTVAFIIFWVRSKRSRL

LHSDYMNMTPRRPGPTRKHYQPYAPPRDFAAYRSRVKFSRSADAPAYQQGQNQLYNELNLGRREEYDVLDKRRGR

DPEMGGKPRRKNPQEGLYNELQKDKMAEAYSEIGMKGERRRGKGHDGLYQGLSTATKDTYDALHMQALPPRAKRS

GSGATNFSLLKQAGDVEENPGPMETLLGLLILWLQLQWVSSKQEVTQIPAALSVPEGENLVLNCSFTDSAIYNLQ

WFRQDPGKGLTSLLLIQSSQREQTSGRLNASLDKSSGRSTLYIAASQPGDSATYLCAVRPLYGGSYIPTFGRGTS

LIVHPYIQNPDPAVYQLRDSKSSDKSVCLFTDFDSQTNVSQSKDSDVYITDKTVLDMRSMDFKSNSAVAWSNKSD

FACANAFNNSIIPEDTFFPSPESSGSPKFWVLVVVGGVLACYSLLVTVAFIIFWVRSKRSRLLHSDYMNMTPRRP

GPTRKHYQPYAPPRDFAAYRSRVKFSRSADAPAYQQGQNQLYNELNLGRREEYDVLDKRRGRDPEMGGKPRRKNP

QEGLYNELQKDKMAEAYSEIGMKGERRRGKGHDGLYQGLSTATKDTYDALHMQALPPR

SEQ ID NO: 11. NT3_aNY-TCR28E (NYESO1-TCRba28E_NY-
ESO1bmu2CD28tmcytCD3Ecyt-P2A-1g4TCRa95LYCD28tmcytCD3Ecyt) (769 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKFWVLVVVGGVLACYSLLVTVAFIIFWVRSKRSRL

LHSDYMNMTPRRPGPTRKHYQPYAPPRDFAAYRSKNRKAKAKPVTRGAGAGGRQRGQNKERPPPVPNPDYEPIRK

GQRDLYSGLNQRRIAKRSGSGATNFSLLKQAGDVEENPGPMETLLGLLILWLQLQWVSSKQEVTQIPAALSVPEG

ENLVLNCSFTDSAIYNLQWFRQDPGKGLTSLLLIQSSQREQTSGRLNASLDKSSGRSTLYIAASQPGDSATYLCA

VRPLYGGSYIPTFGRGTSLIVHPYIQNPDPAVYQLRDSKSSDKSVCLFTDFDSQTNVSQSKDSDVYITDKTVLDM

RSMDFKSNSAVAWSNKSDFACANAFNNSIIPEDTFFPSPESSGSPKFWVLVVVGGVLACYSLLVTVAFIIFWVRS

KRSRLLHSDYMNMTPRRPGPTRKHYQPYAPPRDFAAYRSKNRKAKAKPVTRGAGAGGRQRGQNKERPPPVPNPDY

EPIRKGQRDLYSGLNQRRI

SEQ ID NO: 12. Nucleotide sequence encoding NT1_aNY-TCR (NYESO1-TCRab_Xho-NY-ESO1lg4TCRa95LY-P2A-b-Not)
ATGGAGACCCTCTTGGGCCTGCTTATCCTTTGGCTGCAGCTGCAATGGGTGAGCAGCAAACAGGAGGTGACGCAG

ATTCCTGCAGCTCTGAGTGTCCCAGAAGGAGAAAACTTGGTTCTCAACTGCAGTTTCACTGATAGCGCTATTTAC

AACCTCCAGTGGTTTAGGCAGGACCCTGGGAAAGGTCTCACATCTCTGTTGCTTATTCAGTCAAGTCAGAGAGAG

CAAACAAGTGGAAGACTTAATGCCTCGCTGGATAAATCATCAGGACGTAGTACTTTATACATTGCAGCTTCTCAG

CCTGGTGACTCAGCCACCTACCTCTGTGCTGTGAGGCCCCTGTACGGAGGAAGCTACATACCTACATTTGGAAGA

GGAACCAGCCTTATTGTTCATCCGTATATCCAGAACCCTGACCCTGCCGTGTACCAGCTGAGAGACTCTAAATCC

AGTGACAAGTCTGTCTGCCTATTCACCGATTTTGATTCTCAAACAAATGTGTCACAAAGTAAGGATTCTGATGTG

TATATCACAGACAAAACTGTGCTAGACATGAGGTCTATGGACTTCAAGAGCAACAGTGCTGTGGCCTGGAGCAAC

AAATCTGACTTTGCATGTGCAAACGCCTTCAACAACAGCATTATTCCAGAAGACACCTTCTTCCCCAGCCCAGAA

AGTTCCTGTGATGTCAAGCTGGTCGAGAAAAGCTTTGAAACAGATACGAACCTAAACTTTCAAAACCTGTCAGTG

ATTGGGTTCCGAATCCTCCTCCTGAAAGTGGCCGGGTTTAATCTGCTCATGACGCTGCGGCTGTGGTCCAGCCGG

GCCAAGCGGTCTGGGTCTGGGGCCACCAACTTCAGCCTGCTGAAGCAGGCCGGCGACGTGGAGGAGAACCCCGGC

CCCATGAGCATCGGCCTCCTGTGCTGTGCAGCCTTGTCTCTCCTGTGGGCAGGTCCAGTGAATGCTGGTGTCACT

CAGACCCCAAAATTCCAGGTCCTGAAGACAGGACAGAGCATGACACTGCAGTGTGCCCAGGATATGAACCATGAA

TACATGTCCTGGTATCGACAAGACCCAGGCATGGGGCTGAGGCTGATTCATTACTCAGTTGGTGCTGGTATCACT

GACCAAGGAGAAGTCCCCAATGGCTACAATGTCTCCAGATCAACCACAGAGGATTTCCCGCTCAGGCTGCTGTCG

GCTGCTCCCTCCCAGACATCTGTGTACTTCTGTGCCAGCAGTTACGTCGGGAACACCGGGGAGCTGTTTTTTGGA

GAAGGCTCTAGGCTGACCGTACTGGAGGACCTGAAAAACGTGTTCCCACCCGAGGTCGCTGTGTTTGAGCCATCA

GAAGCAGAGATCTCCCACACCCAAAAGGCCACACTGGTGTGCCTGGCCACAGGCTTCTACCCCGACCACGTGGAG

CTGAGCTGGTGGGTGAATGGGAAGGAGGTGCACAGTGGGGTCAGCACAGACCCGCAGCCCCTCAAGGAGCAGCCC

GCCCTCAATGACTCCAGATACGCTCTGAGCAGCCGCCTGAGGGTCTCGGCCACCTTCTGGCAGGACCCCCGCAAC

CACTTCCGCTGTCAAGTCCAGTTCTACGGGCTCTCGGAGAATGACGAGTGGACCCAGGATAGGGCCAAACCCGTC

ACCCAGATCGTCAGCGCCGAGGCCTGGGGTAGAGCAGACTGTGGCTTCACCTCCGAGTCTTACCAGCAAGGGGTC

CTGTCTGCCACCATCCTCTATGAGATCTTGCTAGGGAAGGCCACCTTGTATGCCGTGCTGGTCAGTGCCCTCGTG

CTGATGGCTATGGTCAAGAGAAAGGATTCCAGAGGCTAA

SEQ ID NO: 65. NT1b_Xho_NY-ESO1-TCRb-P2A-lg4TCRa95LY-not.txt.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACTGTGGCTTCACCTCCGAGTCTTACCAGCAAGGGGTCCTG

-continued

TCTGCCACCATCCTCTATGAGATCTTGCTAGGGAAGGCCACCTTGTATGCCGTGCTGGTCAGTGCCCTCGTGCTG

ATGGCTATGGTCAAGAGAAAGGATTCCAGAGGCGCCAAGCGGTCTGGGTCTGGGGCCACCAACTTCAGCCTGCTG

AAGCAGGCCGGCGACGTGGAGGAGAACCCCGGCCCCATGGAGACCCTCTTGGGCCTGCTTATCCTTTGGCTGCAG

CTGCAATGGGTGAGCAGCAAACAGGAGGTGACGCAGATTCCTGCAGCTCTGAGTGTCCCAGAAGGAGAAAACTTG

GTTCTCAACTGCAGTTTCACTGATAGCGCTATTTACAACCTCCAGTGGTTTAGGCAGGACCCTGGGAAAGGTCTC

ACATCTCTGTTGCTTATTCAGTCAAGTCAGAGAGAGCAAACAAGTGGAAGACTTAATGCCTCGCTGGATAAATCA

TCAGGACGTAGTACTTTATACATTGCAGCTTCTCAGCCTGGTGACTCAGCCACCTACCTCTGTGCTGTGAGGCCC

CTGTACGGAGGAAGCTACATACCTACATTTGGAAGAGGAACCAGCCTTATTGTTCATCCGTATATCCAGAACCCT

GACCCTGCCGTGTACCAGCTGAGAGACTCTAAATCCAGTGACAAGTCTGTCTGCCTATTCACCGATTTTGATTCT

CAAACAAATGTGTCACAAAGTAAGGATTCTGATGTGTATATCACAGACAAAACTGTGCTAGACATGAGGTCTATG

GACTTCAAGAGCAACAGTGCTGTGGCCTGGAGCAACAAATCTGACTTTGCATGTGCAAACGCCTTCAACAACAGC

ATTATTCCAGAAGACACCTTCTTCCCCAGCCCAGAAAGTTCCTGTGATGTCAAGCTGGTCGAGAAAAGCTTTGAA

ACAGATACGAACCTAAACTTTCAAAACCTGTCAGTGATTGGGTTCCGAATCCTCCTCCTGAAAGTGGCCGGGTTT

AATCTGCTCATGACGCTGCGGCTGTGGTCCAGCCGGTAA

SEQ ID NO: 13. Nucleotide sequence encoding NT2_aNY-TCR28Z
NYESO1-TCRba28Z_Xho-NY-ESO1 bmu2CD28tmcytCD3Zcyt-P2A-
1g4TCRa95LYCD28tmcytCD3Zcyt-Not
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTTCTGGGTTCTCGTCGTCGTGGGAGGT

GTGTTAGCATGTTACTCTCTCTTGGTTACTGTCGCTTTCATAATCTTTTGGGTCCGCTCAAAACGCTCTCGCTTG

TTACATTCCGATTATATGAATATGACACCTAGGAGACCTGGCCCGACTAGGAAACACTATCAACCTTACGCACCT

CCCAGAGATTTTGCTGCTTACAGGAGTCGGGTCAAATTTTCACGCTCCGCTGATGCTCCTGCCTATCAACAAGGG

CAAAATCAATTGTACAATGAATTGAACTTGGGTAGAAGGGAAGAATATGACGTGCTCGATAAACGGAGGGGGAGA

GATCCAGAAATGGGCGGTAAACCACGGCGCAAAAATCCACAAGAGGGATTGTATAACGAGCTCCAAAAGGACAAA

ATGGCAGAAGCTTATTCAGAAATAGGAATGAAGGGGGAAAGGAGACGAGGTAAAGGTCATGACGGATTGTATCAA

GGATTGTCAACCGCTACTAAAGATACATATGATGCTTTGCATATGCAAGCTTTGCCTCCCAGAGCCAAGCGGTCT

GGGTCTGGGGCCACCAACTTCAGCCTGCTGAAGCAGGCCGGCGACGTGGAGGAGAACCCCGGCCCCATGGAGACC

CTCTTGGGCCTGCTTATCCTTTGGCTGCAGCTGCAATGGGTGAGCAGCAAACAGGAGGTGACGCAGATTCCTGCA

GCTCTGAGTGTCCCAGAAGGAGAAAACTTGGTTCTCAACTGCAGTTTCACTGATAGCGCTATTTACAACCTCCAG

TGGTTTAGGCAGGACCCTGGGAAAGGTCTCACATCTCTGTTGCTTATTCAGTCAAGTCAGAGAGAGCAAACAAGT

GGAAGACTTAATGCCTCGCTGGATAAATCATCAGGACGTAGTACTTTATACATTGCAGCTTCTCAGCCTGGTGAC

TCAGCCACCTACCTCTGTGCTGTGAGGCCCCTGTACGGAGGAAGCTACATACCTACATTTGGAAGAGGAACCAGC

CTTATTGTTCATCCGTATATCCAGAACCCTGACCCTGCCGTGTACCAGCTGAGAGACTCTAAATCCAGTGACAAG

-continued

```
TCTGTCTGCCTATTCACCGATTTTGATTCTCAAACAAATGTGTCACAAAGTAAGGATTCTGATGTGTATATCACA

GACAAAACTGTGCTAGACATGAGGTCTATGGACTTCAAGAGCAACAGTGCTGTGGCCTGGAGCAACAAATCTGAC

TTTGCATGTGCAAACGCCTTCAACAACAGCATTATTCCAGAAGACACCTTCTTCCCCAGCCCAGAAAGTTCCGGC

TCCCCAAAATTTTGGGTGCTGGTGGTGGTTGGTGGAGTCCTGGCTTGCTATAGCTTGCTAGTAACAGTGGCCTTT

ATTATTTTCTGGGTGAGGAGTAAGAGGAGCAGGCTCCTGCACAGTGACTACATGAACATGACTCCCCGCCGCCCC

GGGCCCACCCGCAAGCATTACCAGCCCTATGCCCCACCACGCGACTTCGCAGCCTATCGCTCCAGAGTGAAGTTC

AGCAGGAGCGCAGACGCCCCCGCGTACCAGCAGGGCCAGAACCAGCTCTATAACGAGCTCAATCTAGGACGAAGA

GAGGAGTACGATGTTTTGGACAAGAGACGTGGCCGGGACCCTGAGATGGGGGGAAAGCCGAGAAGGAAGAACCCT

CAGGAAGGCCTGTACAATGAACTGCAGAAAGATAAGATGGCGGAGGCCTACAGTGAGATTGGGATGAAAGGCGAG

CGCCGGAGGGGCAAGGGGCACGATGGCCTTTACCAGGGTCTCAGTACAGCCACCAAGGACACCTACGACGCCCTT

CACATGCAGGCCCTGCCCCCTCGCTAA

SEQ ID NO: 14. Nucleotide sequence encoding NT3_aNY-TCR28E
NYESO1-TCRba28E_Xho-NY-ESO1 bmu2CD28tmcytCD3Ecyt-P2A-
1g4TCRa95LYCD28tmcytCD3Ecyt-Not
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTTCTGGGTTCTCGTCGTCGTGGGAGGT

GTGTTAGCATGTTACTCTCTCTTGGTTACTGTCGCTTTCATAATCTTTTGGGTCCGCTCAAAACGCTCTCGCTTG

TTACATTCCGATTATATGAATATGACACCTAGGAGACCTGGCCCGACTAGGAAACACTATCAACCTTACGCACCT

CCCAGAGATTTTGCTGCTTACAGGAGTAAAAACCGCAAAGCTAAAGCTAAACCCGTCACTAGGGGGGCCGGAGCA

GGAGGGCGCCAGCGCGGTCAGAATAAAGAACGCCCTCCTCCCGTCCCTAATCCTGATTACGAACCGATTAGAAAG

GGGCAAAGAGATCTCTACAGCGGACTCAACCAACGGAGAATTGCCAAGCGGTCTGGGTCTGGGGCCACCAACTTC

AGCCTGCTGAAGCAGGCCGGCGACGTGGAGGAGAACCCCGGCCCCATGGAGACCCTCTTGGGCCTGCTTATCCTT

TGGCTGCAGCTGCAATGGGTGAGCAGCAAACAGGAGGTGACGCAGATTCCTGCAGCTCTGAGTGTCCCAGAAGGA

GAAAACTTGGTTCTCAACTGCAGTTTCACTGATAGCGCTATTTACAACCTCCAGTGGTTTAGGCAGGACCCTGGG

AAAGGTCTCACATCTCTGTTGCTTATTCAGTCAAGTCAGAGAGAGCAAACAAGTGGAAGACTTAATGCCTCGCTG

GATAAATCATCAGGACGTAGTACTTTATACATTGCAGCTTCTCAGCCTGGTGACTCAGCCACCTACCTCTGTGCT

GTGAGGCCCCTGTACGGAGGAAGCTACATACCTACATTTGGAAGAGGAACCAGCCTTATTGTTCATCCGTATATC

CAGAACCCTGACCCTGCCGTGTACCAGCTGAGAGACTCTAAATCCAGTGACAAGTCTGTCTGCCTATTCACCGAT

TTTGATTCTCAAACAAATGTGTCACAAAGTAAGGATTCTGATGTGTATATCACAGACAAAACTGTGCTAGACATG

AGGTCTATGGACTTCAAGAGCAACAGTGCTGTGGCCTGGAGCAACAAATCTGACTTTGCATGTGCAAACGCCTTC

AACAACAGCATTATTCCAGAAGACACCTTCTTCCCCAGCCCAGAAAGTTCCGGCTCCCCAAAATTTTGGGTGCTG

GTGGTGGTTGGTGGAGTCCTGGCTTGCTATAGCTTGCTAGTAACAGTGGCCTTTATTATTTTCTGGGTGAGGAGT

AAGAGGAGCAGGCTCCTGCACAGTGACTACATGAACATGACTCCCCGCCGCCCCGGGCCCACCCGCAAGCATTAC
```

-continued

CAGCCCTATGCCCCACCACGCGACTTCGCAGCCTATCGCTCCAAGAATAGAAAGGCCAAGGCCAAGCCTGTGACA

CGAGGAGCGGGTGCTGGCGGCAGGCAAAGGGGACAAAACAAGGAGAGGCCACCACCTGTTCCCAACCCAGACTAT

GAGCCCATCCGCAAAGGCCAGCGGGACCTGTATTCTGGCCTGAATCAGAGACGCATCTAA

SEQ ID NO: 15. hCD28TmCytCD3ZCyt (141 aa)
MNMTPRRPGPTRKHYQPYAPPRDFAAYRSRVKFSRSADAPAYQQGQNQLYNELNLGRREEYDVLDKRRGR

DPEMGGKPRRKNPQEGLYNELQKDKMAEAYSEIGMKGERRRGKGHDGLYQGLSTATKDTYDALHMQALPP

R

SEQ ID NO: 16. Nucleotide sequence encoding hCD28TmCytCD3ZCyt (540 bp)
TTTTGGGTGCTGGTGGTGGTTGGTGGAGTCCTGGCTTGCTATAGCTTGCTAGTAACAGTGGCCTTTATTA

TTTTCTGGGTGAGGAGTAAGAGGAGCAGGCTCCTGCACAGTGACTACATGAACATGACTCCCCGCCGCCC

CGGGCCCACCCGCAAGCATTACCAGCCCTATGCCCCACCACGCGACTTCGCAGCCTATCGCTCCAGAGTG

AAGTTCAGCAGGAGCGCAGACGCCCCCGCGTACCAGCAGGGCCAGAACCAGCTCTATAACGAGCTCAATC

TAGGACGAAGAGAGGAGTACGATGTTTTGGACAAGAGACGTGGCCGGGACCCTGAGATGGGGGGAAAGCC

GAGAAGGAAGAACCCTCAGGAAGGCCTGTACAATGAACTGCAGAAAGATAAGATGGCGGAGGCCTACAGT

GAGATTGGGATGAAAGGCGAGCGCCGGAGGGGCAAGGGGCACGATGGCCTTTACCAGGGTCTCAGTACAG

CCACCAAGGACACCTACGACGCCCTTCACATGCAGGCCCTGCCCCCTCGC

SEQ ID NO: 17. Nucleotide sequence encoding hCD28TmCyt (204 bp)
TTTTGGGTGCTGGTGGTGGTTGGTGGAGTCCTGGCTTGCTATAGCTTGCTAGTAACAGTGGCCTTTATTA

TTTTCTGGGTGAGGAGTAAGAGGAGCAGGCTCCTGCACAGTGACTACATGAACATGACTCCCCGCCGCCC

CGGGCCCACCCGCAAGCATTACCAGCCCTATGCCCCACCACGCGACTTCGCAGCCTATCGCTCC

SEQ ID NO: 18. Nutated nucleotide sequence encoding hCD28TmCytCD3ZCyt
(mu28TmCyt) (204 bp)
TTCTGGGTTCTCGTCGTCGTGGGAGGTGTGTTAGCATGTTACTCTCTCTTGGTTACTGTCGCTTTCATAATCTTT

TGGGTCCGCTCAAAACGCTCTCGCTTGTTACATTCCGATTATATGAATATGACACCTAGGAGACCTGGCCCGACT

AGGAAACACTATCAACCTTACGCACCTCCCAGAGATTTTGCTGCTTACAGGAGT

SEQ ID NO: 19. Nucleotide sequence encoding human CD3ZCyt (ZCyt), 336 bp
AGAGTGAAGTTCAGCAGGAGCGCAGACGCCCCCGCGTACCAGCAGGGCCAGAACCAGCTCTATAACGAGCTCAAT

CTAGGACGAAGAGAGGAGTACGATGTTTTGGACAAGAGACGTGGCCGGGACCCTGAGATGGGGGGAAAGCCGAGA

AGGAAGAACCCTCAGGAAGGCCTGTACAATGAACTGCAGAAAGATAAGATGGCGGAGGCCTACAGTGAGATTGGG

ATGAAAGGCGAGCGCCGGAGGGGCAAGGGGCACGATGGCCTTTACCAGGGTCTCAGTACAGCCACCAAGGACACC

TACGACGCCCTTCACATGCAGGCCCTGCCCCCTCGC

SEQ ID NO: 20. Mutated nucleotide sequence encoding human CD3ZCyt (muZCyt),
muhCD3ZCyt, 336 bp
CGGGTCAAATTTTCACGCTCCGCTGATGCTCCTGCCTATCAACAAGGGCAAAATCAATTGTACAATGAATTGAAC

TTGGGTAGAAGGGAAGAATATGACGTGCTCGATAAACGGAGGGGAGAGATCCAGAAATGGGCGGTAAACCACGG

CGCAAAAATCCACAAGAGGGATTGTATAACGAGCTCCAAAAGGACAAAATGGCAGAAGCTTATTCAGAAATAGGA

ATGAAGGGGAAAGGAGACGAGGTAAAGGTCATGACGGATTGTATCAAGGATTGTCAACCGCTACTAAAGATACA

TATGATGCTTTGCATATGCAAGCTTTGCCTCCCAGA

SEQ ID NO: 21. Mutated nucleotide sequence encoding hCD28TmCytCD3ZCyt
(mu28TmCytmuCyt)muhCD28TmCytmuCD3ZCyt, 540 bp
TTCTGGGTTCTCGTCGTCGTGGGAGGTGTGTTAGCATGTTACTCTCTCTTGGTTACTGTCGCTTTCATAATCTTT

TGGGTCCGCTCAAAACGCTCTCGCTTGTTACATTCCGATTATATGAATATGACACCTAGGAGACCTGGCCCGACT

AGGAAACACTATCAACCTTACGCACCTCCCAGAGATTTTGCTGCTTACAGGAGTCGGGTCAAATTTTCACGCTCC

GCTGATGCTCCTGCCTATCAACAAGGGCAAAATCAATTGTACAATGAATTGAACTTGGGTAGAAGGGAAGAATAT

GACGTGCTCGATAAACGGAGGGGGAGAGATCCAGAAATGGGCGGTAAACCACGGCGCAAAAATCCACAAGAGGGA

```
TTGTATAACGAGCTCCAAAAGGACAAAATGGCAGAAGCTTATTCAGAAATAGGAATGAAGGGGGAAAGGAGACGA

GGTAAAGGTCATGACGGATTGTATCAAGGATTGTCAACCGCTACTAAAGATACATATGATGCTTTGCATATGCAA

GCTTTGCCTCCCAGA
```

SEQ ID NO: 22. Nucleotide sequence of human CD3ECyt_NM_000733.1, (165 bp)
```
AAGAATAGAAAGGCCAAGGCCAAGCCTGTGACACGAGGAGCGGGTGCTGGCGGCAGGCAAAGGGGACAAAACAAG

GAGAGGCCACCACCTGTTCCCAACCCAGACTATGAGCCCATCCGGAAAGGCCAGCGGGACCTGTATTCTGGCCTG

AATCAGAGACGCATC
```

SEQ ID NO: 23. Nucleotide sequence of human CD3ECyt_NM_000733.1 with a single silent nucleotide mutation (G to C) at position 119 to disrupt the BspE 1 site, (165 bp)
```
AAGAATAGAAAGGCCAAGGCCAAGCCTGTGACACGAGGAGCGGGTGCTGGCGGCAGGCAAAGGGGACAAAACAAG

GAGAGGCCACCACCTGTTCCCAACCCAGACTATGAGCCCATCCGCAAAGGCCAGCGGGACCTGTATTCTGGCCTG

AATCAGAGACGCATC
```

SEQ ID NO: 24. Nucleotide sequence of silently mutated human CD3ECyt_NM_000733.1, edited, 165 bp
```
AAAAACCGCAAAGCTAAAGCTAAACCCGTCACTAGGGGGGCCGGAGCAGGAGGGCGCCAGCGCGGTCAGAATAAA

GAACGCCCTCCTCCCGTCCCTAATCCTGATTACGAACCGATTAGAAAGGGGCAAAGAGATCTCTACAGCGGACTC

AACCAACGGAGAATT
```

SEQ ID NO: 25. Human NY-ESO-1 peptide corresponding to residues 157 to 165 of human NY-ESO-1 (NY-ESO-1: 157-165) (9 aa)
SLLMWITQC SEQ ID NO: 26. CD28pec (40 aa)
KIEVMYPPPYLDNEKSNGTIIHVKGKHLCPSPLFPGPSKP SEQ ID NO: 27. Human CD28Tm
FWVLVVVGGVLACYSLLVTVAFIIFWV SEQ ID NO: 28. Human CD28Cyt
RSKRSRLLHSDYMNMTPRRPGPTRKHYQPYAPPRDFAAYRS SEQ ID NO: 29. Human 4-1BBCyt
KRGRKKLLYIFKQPFMRPVQTTQEEDGCSCRFPEEEEGGCEL SEQ ID NO: 30. CD8hinge.txt.xprt (46 aa)
AKPTTTPAPRPPTPAPTIASQPLSLRPEACRPAAGGAVHTRGLDFA SEQ ID NO: 31. CD8Tm_aa 181-20.txt.xprt (26 aa)
CDIYIWAPLAGTCGVLLLSLVITLYC SEQ ID NO: 32. NT4_NYESO1-TCRbaBBZ_Xho-NY-ESO1 bmuCD8tmBBcyt CD3Zcyt-P2A-1g4TCRa95LYCCD8tmBBcytZcyt-Not.txt.xprt, (883 aa)
```
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKCDIYIWAPLAGTCGVLLLSLVITLYCKRGRKKLL

YIFKQPFMRPVQTTQEEDGCSCRFPEEEEGGCELRVKFSRSADAPAYQQGQNQLYNELNLGRREEYDVLDKRRGR

DPEMGGKPRRKNPQEGLYNELQKDKMAEAYSEIGMKGERRRGKGHDGLYQGLSTATKDTYDALHMQALPPRAKRS

GSGATNFSLLKQAGDVEENPGPMETLLGLLILWLQLQWVSSKQEVTQIPAALSVPEGENLVLNCSFTDSAIYNLQ

WFRQDPGKGLTSLLLIQSSQREQTSGRLNASLDKSSGRSTLYIAASQPGDSATYLCAVRPLYGGSYIPTFGRGTS

LIVHPYIQNPDPAVYQLRDSKSSDKSVCLFTDFDSQTNVSQSKDSDVYITDKTVLDMRSMDFKSNSAVAWSNKSD

FACANAFNNSIIPEDTFFPSPESSGSPKCDIYIWAPLAGTCGVLLLSLVITLYCKRGRKKLLYIFKQPFMRPVQT

TQEEDGCSCRFPEEEEGGCELRVKFSRSADAPAYQQGQNQLYNELNLGRREEYDVLDKRRGRDPEMGGKPRRKNP

QEGLYNELQKDKMAEAYSEIGMKGERRRGKGHDGLYQGLSTATKDTYDALHMQALPPR
```

-continued

SEQ ID NO: 33. NT5_Design_NYE.txt.xprt (885 aa)
MSIGLLCCAALSLLWAGPVNAGVTQTPKFQVLKTGQSMTLQCAQDMNHEYMSWYRQDPGMGLRLIHYSVGAGITD
QGEVPNGYNVSRSTTEDFPLRLLSAAPSQTSVYFCASSYVGNTGELFFGEGSRLTVLEDLKNVFPPEVAVFEPSE
AEISHTQKATLVCLATGFYPDHVELSWWVNGKEVHSGVSTDPQPLKEQPALNDSRYALSSRLRVSATFWQDPRNH
FRCQVQFYGLSENDEWTQDRAKPVTQIVSAEAWGRADGSPKFWVLVVVGGVLACYSLLVTVAFIIFWVKRGRKKL
LYIFKQPFMRPVQTTQEEDGCSCRFPEEEEGGCELRVKFSRSADAPAYQQGQNQLYNELNLGRREEYDVLDKRRG
RDPEMGGKPRRKNPQEGLYNELQKDKMAEAYSEIGMKGERRRGKGHDGLYQGLSTATKDTYDALHMQALPPRAKR
SGSGATNFSLLKQAGDVEENPGPMETLLGLLILWLQLQWVSSKQEVTQIPAALSVPEGENLVLNCSFTDSAIYNL
QWFRQDPGKGLTSLLLIQSSQREQTSGRLNASLDKSSGRSTLYIAASQPGDSATYLCAVRPLYGGSYIPTFGRGT
SLIVHPYIQNPDPAVYQLRDSKSSDKSVCLFTDFDSQTNVSQSKDSDVYITDKTVLDMRSMDFKSNSAVAWSNKS
DFACANAFNNSIIPEDTFFPSPESSGSPKFWVLVVVGGVLACYSLLVTVAFIIFWVKRGRKKLLYIFKQPFMRPV
QTTQEEDGCSCRFPEEEEGGCELRVKFSRSADAPAYQQGQNQLYNELNLGRREEYDVLDKRRGRDPEMGGKPRRK
NPQEGLYNELQKDKMAEAYSEIGMKGERRRGKGHDGLYQGLSTATKDTYDALHMQALPPR SEQ ID NO: 34. NT6_NYESO1-TCRb.txt.xprt (967 aa)
MSIGLLCCAALSLLWAGPVNAGVTQTPKFQVLKTGQSMTLQCAQDMNHEYMSWYRQDPGMGLRLIHYSVGAGITD
QGEVPNGYNVSRSTTEDFPLRLLSAAPSQTSVYFCASSYVGNTGELFFGEGSRLTVLEDLKNVFPPEVAVFEPSE
AEISHTQKATLVCLATGFYPDHVELSWWVNGKEVHSGVSTDPQPLKEQPALNDSRYALSSRLRVSATFWQDPRNH
FRCQVQFYGLSENDEWTQDRAKPVTQIVSAEAWGRADGSPKFWVLVVVGGVLACYSLLVTVAFIIFWVRSKRSRL
LHSDYMNMTPRRPGPTRKHYQPYAPPRDFAAYRSKRGRKKLLYIFKQPFMRPVQTTQEEDGCSCRFPEEEEGGCE
LRVKFSRSADAPAYQQGQNQLYNELNLGRREEYDVLDKRRGRDPEMGGKPRRKNPQEGLYNELQKDKMAEAYSEI
GMKGERRRGKGHDGLYQGLSTATKDTYDALHMQALPPRAKRSGSGATNFSLLKQAGDVEENPGPMETLLGLLILW
LQLQWVSSKQEVTQIPAALSVPEGENLVLNCSFTDSAIYNLQWFRQDPGKGLTSLLLIQSSQREQTSGRLNASLD
KSSGRSTLYIAASQPGDSATYLCAVRPLYGGSYIPTFGRGTSLIVHPYIQNPDPAVYQLRDSKSSDKSVCLFTDF
DSQTNVSQSKDSDVYITDKTVLDMRSMDFKSNSAVAWSNKSDFACANAFNNSIIPEDTFFPSPESSGSPKFWVLV
VVGGVLACYSLLVTVAFIIFWVRSKRSRLLHSDYMNMTPRRPGPTRKHYQPYAPPRDFAAYRSKRGRKKLLYIFK
QPFMRPVQTTQEEDGCSCRFPEEEEGGCELRVKFSRSADAPAYQQGQNQLYNELNLGRREEYDVLDKRRGRDPEM
GGKPRRKNPQEGLYNELQKDKMAEAYSEIGMKGERRRGKGHDGLYQGLSTATKDTYDALHMQALPPR SEQ ID NO: 35. NT21_.txt.xprt (883 aa)
MSIGLLCCAALSLLWAGPVNAGVTQTPKFQVLKTGQSMTLQCAQDMNHEYMSWYRQDPGMGLRLIHYSVGAGITD
QGEVPNGYNVSRSTTEDFPLRLLSAAPSQTSVYFCASSYVGNTGELFFGEGSRLTVLEDLKNVFPPEVAVFEPSE
AEISHTQKATLVCLATGFYPDHVELSWWVNGKEVHSGVSTDPQPLKEQPALNDSRYALSSRLRVSATFWQDPRNH
FRCQVQFYGLSENDEWTQDRAKPVTQIVSAEAWGRADGSPKFWVLVVVGGVLACYSLLVTVAFIIFWVRSKRSRL
LHSDYMNMTPRRPGPTRKHYQPYAPPRDFAAYRSRVKFSRSADAPAYQQGQNQLYNELNLGRREEYDVLDKRRGR
DPEMGGKPRRKNPQEGLYNELQKDKMAEAYSEIGMKGERRRGKGHDGLYQGLSTATKDTYDALHMQALPPRAKRS
GSGATNFSLLKQAGDVEENPGPMETLLGLLILWLQLQWVSSKQEVTQIPAALSVPEGENLVLNCSFTDSAIYNLQ
WFRQDPGKGLTSLLLIQSSQREQTSGRLNASLDKSSGRSTLYIAASQPGDSATYLCAVRPLYGGSYIPTFGRGTS
LIVHPYIQNPDPAVYQLRDSKSSDKSVCLFTDFDSQTNVSQSKDSDVYITDKTVLDMRSMDFKSNSAVAWSNKSD
FACANAFNNSIIPEDTFFPSPESSGSPKCDIYIWAPLAGTCGVLLLSLVITLYCKRGRKKLLYIFKQPFMRPVQT
TQEEDGCSCRFPEEEEGGCELRVKFSRSADAPAYQQGQNQLYNELNLGRREEYDVLDKRRGRDPEMGGKPRRKNP
QEGLYNELQKDKMAEAYSEIGMKGERRRGKGHDGLYQGLSTATKDTYDALHMQALPPR SEQ ID NO: 36. NT22_.txt.xprt (771 aa)
MSIGLLCCAALSLLWAGPVNAGVTQTPKFQVLKTGQSMTLQCAQDMNHEYMSWYRQDPGMGLRLIHYSVGAGITD
QGEVPNGYNVSRSTTEDFPLRLLSAAPSQTSVYFCASSYVGNTGELFFGEGSRLTVLEDLKNVFPPEVAVFEPSE

```
AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKFWVLVVVGGVLACYSLLVTVAFIIFWVRSKRSRL

LHSDYMNMTPRRPGPTRKHYQPYAPPRDFAAYRSRVKFSRSADAPAYQQGQNQLYNELNLGRREEYDVLDKRRGR

DPEMGGKPRRKNPQEGLYNELQKDKMAEAYSEIGMKGERRRGKGHDGLYQGLSTATKDTYDALHMQALPPRAKRS

GSGATNFSLLKQAGDVEENPGPMETLLGLLILWLQLQWVSSKQEVTQIPAALSVPEGENLVLNCSFTDSAIYNLQ

WFRQDPGKGLTSLLLIQSSQREQTSGRLNASLDKSSGRSTLYIAASQPGDSATYLCAVRPLYGGSYIPTFGRGTS

LIVHPYIQNPDPAVYQLRDSKSSDKSVCLFTDFDSQTNVSQSKDSDVYITDKTVLDMRSMDFKSNSAVAWSNKSD

FACANAFNNSIIPEDTFFPSPESSGSPKCDIYIWAPLAGTCGVLLLSLVITLYCKRGRKKLLYIFKQPFMRPVQT

TQEEDGCSCRFPEEEEGGCEL

SEQ ID NO: 37. NT23_.txt.xprt (884 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKFWVLVVVGGVLACYSLLVTVAFIIFWVRSKRSRL

LHSDYMNMTPRRPGPTRKHYQPYAPPRDFAAYRSRVKFSRSADAPAYQQGQNQLYNELNLGRREEYDVLDKRRGR

DPEMGGKPRRKNPQEGLYNELQKDKMAEAYSEIGMKGERRRGKGHDGLYQGLSTATKDTYDALHMQALPPRAKRS

GSGATNFSLLKQAGDVEENPGPMETLLGLLILWLQLQWVSSKQEVTQIPAALSVPEGENLVLNCSFTDSAIYNLQ

WFRQDPGKGLTSLLLIQSSQREQTSGRLNASLDKSSGRSTLYIAASQPGDSATYLCAVRPLYGGSYIPTFGRGTS

LIVHPYIQNPDPAVYQLRDSKSSDKSVCLFTDFDSQTNVSQSKDSDVYITDKTVLDMRSMDFKSNSAVAWSNKSD

FACANAFNNSIIPEDTFFPSPESSGSPKFWVLVVVGGVLACYSLLVTVAFIIFWVKRGRKKLLYIFKQPFMRPVQ

TTQEEDGCSCRFPEEEEGGCELRVKFSRSADAPAYQQGQNQLYNELNLGRREEYDVLDKRRGRDPEMGGKPRRKN

PQEGLYNELQKDKMAEAYSEIGMKGERRRGKGHDGLYQGLSTATKDTYDALHMQALPPR

SEQ ID NO: 38. NT24_.txt.xprt (882 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKCDIYIWAPLAGTCGVLLLSLVITLYCRSKRSRLL

HSDYMNMTPRRPGPTRKHYQPYAPPRDFAAYRSRVKFSRSADAPAYQQGQNQLYNELNLGRREEYDVLDKRRGRD

PEMGGKPRRKNPQEGLYNELQKDKMAEAYSEIGMKGERRRGKGHDGLYQGLSTATKDTYDALHMQALPPRAKRSG

SGATNFSLLKQAGDVEENPGPMETLLGLLILWLQLQWVSSKQEVTQIPAALSVPEGENLVLNCSFTDSAIYNLQW

FRQDPGKGLTSLLLIQSSQREQTSGRLNASLDKSSGRSTLYIAASQPGDSATYLCAVRPLYGGSYIPTFGRGTSL

IVHPYIQNPDPAVYQLRDSKSSDKSVCLFTDFDSQTNVSQSKDSDVYITDKTVLDMRSMDFKSNSAVAWSNKSDF

ACANAFNNSIIPEDTFFPSPESSGSPKCDIYIWAPLAGTCGVLLLSLVITLYCKRGRKKLLYIFKQPFMRPVQTT

QEEDGCSCRFPEEEEGGCELRVKFSRSADAPAYQQGQNQLYNELNLGRREEYDVLDKRRGRDPEMGGKPRRKNPQ

EGLYNELQKDKMAEAYSEIGMKGERRRGKGHDGLYQGLSTATKDTYDALHMQALPPR

SEQ ID NO: 39. NT25_.txt.xprt (965 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKCDIYIWAPLAGTCGVLLLSLVITLYCRSKRSRLL

HSDYMNMTPRRPGPTRKHYQPYAPPRDFAAYRSRSKRSRLLHSDYMNMTPRRPGPTRKHYQPYAPPRDFAAYRSR

VKFSRSADAPAYQQGQNQLYNELNLGRREEYDVLDKRRGRDPEMGGKPRRKNPQEGLYNELQKDKMAEAYSEIGM
```

KGERRRGKGHDGLYQGLSTATKDTYDALHMQALPPRAKRSGSGATNFSLLKQAGDVEENPGPMETLLGLLILWLQ

LQWVSSKQEVTQIPAALSVPEGENLVLNCSFTDSAIYNLQWFRQDPGKGLTSLLLIQSSQREQTSGRLNASLDKS

SGRSTLYIAASQPGDSATYLCAVRPLYGGSYIPTFGRGTSLIVHPYIQNPDPAVYQLRDSKSSDKSVCLFTDFDS

QTNVSQSKDSDVYITDKTVLDMRSMDFKSNSAVAWSNKSDFACANAFNNSIIPEDTFFPSPESSGSPKCDIYIWA

PLAGTCGVLLLSLVITLYCKRGRKKLLYIFKQPFMRPVQTTQEEDGCSCRFPEEEEGGCELKRGRKKLLYIFKQP

FMRPVQTTQEEDGCSCRFPEEEEGGCELRVKFSRSADAPAYQQGQNQLYNELNLGRREEYDVLDKRRGRDPEMGG

KPRRKNPQEGLYNELQKDKMAEAYSEIGMKGERRRGKGHDGLYQGLSTATKDTYDALHMQALPPR

SEQ ID NO: 40. NT26_.txt.xprt (1059 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKAKPTTTPAPRPPTPAPTIASQPLSLRPEACRPAA

GGAVHTRGLDFAPRKIEVMYPPPYLDNEKSNGTIIHVKGKHLCPSPLFPGPSKPFWVLVVVGGVLACYSLLVTVA

FIIFWVRSKRSRLLHSDYMNMTPRRPGPTRKHYQPYAPPRDFAAYRSRVKFSRSADAPAYQQGQNQLYNELNLGR

REEYDVLDKRRGRDPEMGGKPRRKNPQEGLYNELQKDKMAEAYSEIGMKGERRRGKGHDGLYQGLSTATKDTYDA

LHMQALPPRAKRSGSGATNFSLLKQAGDVEENPGPMETLLGLLILWLQLQWVSSKQEVTQIPAALSVPEGENLVL

NCSFTDSAIYNLQWFRQDPGKGLTSLLLIQSSQREQTSGRLNASLDKSSGRSTLYIAASQPGDSATYLCAVRPLY

GGSYIPTFGRGTSLIVHPYIQNPDPAVYQLRDSKSSDKSVCLFTDFDSQTNVSQSKDSDVYITDKTVLDMRSMDF

KSNSAVAWSNKSDFACANAFNNSIIPEDTFFPSPESSGSPKAKPTTTPAPRPPTPAPTIASQPLSLRPEACRPAA

GGAVHTRGLDFAPRKIEVMYPPPYLDNEKSNGTIIHVKGKHLCPSPLFPGPSKPFWVLVVVGGVLACYSLLVTVA

FIIFWVRSKRSRLLHSDYMNMTPRRPGPTRKHYQPYAPPRDFAAYRSRVKFSRSADAPAYQQGQNQLYNELNLGR

REEYDVLDKRRGRDPEMGGKPRRKNPQEGLYNELQKDKMAEAYSEIGMKGERRRGKGHDGLYQGLSTATKDTYDA

LHMQALPPR

SEQ ID NO: 41. NT27_.txt.xprt (859 aa)
MSIGLLCCAALSLLWAGPVNAGVTQTPKFQVLKTGQSMTLQCAQDMNHEYMSWYRQDPGMGLRLIHYSVGAGITD

QGEVPNGYNVSRSTTEDFPLRLLSAAPSQTSVYFCASSYVGNTGELFFGEGSRLTVLEDLKNVFPPEVAVFEPSE

AEISHTQKATLVCLATGFYPDHVELSWWVNGKEVHSGVSTDPQPLKEQPALNDSRYALSSRLRVSATFWQDPRNH

FRCQVQFYGLSENDEWTQDRAKPVTQIVSAEAWGRADGSPKAKPTTTPAPRPPTPAPTIASQPLSLRPEACRPAA

GGAVHTRGLDFAPRKIEVMYPPPYLDNEKSNGTIIHVKGKHLCPSPLFPGPSKPFWVLVVVGGVLACYSLLVTVA

FIIFWVRSKRSRLLHSDYMNMTPRRPGPTRKHYQPYAPPRDFAAYRSRVKFSRSADAPAYQQGQNQLYNELNLGR

REEYDVLDKRRGRDPEMGGKPRRKNPQEGLYNELQKDKMAEAYSEIGMKGERRRGKGHDGLYQGLSTATKDTYDA

LHMQALPPRAKRSGSGATNFSLLKQAGDVEENPGPMETLLGLLILWLQLQWVSSKQEVTQIPAALSVPEGENLVL

NCSFTDSAIYNLQWFRQDPGKGLTSLLLIQSSQREQTSGRLNASLDKSSGRSTLYIAASQPGDSATYLCAVRPLY

GGSYIPTFGRGTSLIVHPYIQNPDPAVYQLRDSKSSDKSVCLFTDFDSQTNVSQSKDSDVYITDKTVLDMRSMDF

KSNSAVAWSNKSDFACANAFNNSIIPEDTFFPSPESSGSPKCDIYIWAPLAGTCGVLLLSLVITLYCKRGRKKLL

YIFKQPFMRPVQTTQEEDGCSCRFPEEEEGGCEL

SEQ ID NO: 42. Nucleotide sequence of pEc of hCD28_Human CD28_complete
cds_mRNA_BC093698.1.txt.xdna
(120 bp)
AAAATTGAAGTTATGTATCCTCCTCCTTACCTAGACAATGAGAAGAGCAATGGAACCATTATCCATGTGAAAGGG

AAACACCTTTGTCCAAGTCCCCTATTTCCCGGACCTTCTAAGCCC

-continued

SEQ ID NO: 43. nt of mu2 hCD28pEc_Human CD28_complete
cds_mRNA_BC093698.1.txt.xdna (120 bp)
AAGATCGAGGTAATGTACCCACCGCCCTATCTTGATAACGAAAAATCTAACGGTACAATAATTCACGTCAAGGGC

AAGCATTTGTGCCCTTCCCCGTTGTTCCCGGGCCCAAGCAAACCG

SEQ ID NO: 44. Nucleotide sequence of CD28Tm_human CD28_BC093698.1.txt.xdna
(81 bp)
TTTTGGGTGCTGGTGGTGGTTGGTGGAGTCCTGGCTTGCTATAGCTTGCTAGTAACAGTGGCCTTTATTATTTTC

TGGGTG

SEQ ID NO: 45. Nucleotide sequence of mu2CD28Tm_human
CD28_BC093698.1.txt.xdna (81 bp)
TTCTGGGTTCTCGTCGTCGTGGGAGGTGTGTTAGCATGTTACTCTCTCTTGGTTACTGTCGCTTTCATAATCTTT

TGGGTC

SEQ ID NO: 46. Nucleotide sequence of hCD28Cyt.txt.xdna (123 bp)
AGGAGTAAGAGGAGCAGGCTCCTGCACAGTGACTACATGAACATGACTCCCCGCCGCCCCGGGCCCACCCGCAAG

CATTACCAGCCCTATGCCCCACCACGCGACTTCGCAGCCTATCGCTCC

SEQ ID NO: 47. Nucleotide sequence of mu2hCD28Cyt.txt.xdna (123 bp)
CGCTCAAAACGCTCTCGCTTGTTACATTCCGATTATATGAATATGACACCTAGGAGACCTGGCCCGACTAGGAAA

CACTATCAACCTTACGCACCTCCCAGAGATTTTGCTGCTTACAGGAGT

SEQ ID NO: 48. Nucleotide sequence of design_h4-1BBCyt.xdna (126 bp)
AAACGGGGCAGAAAGAAACTCCTGTATATATTCAAACAACCATTTATGAGACCAGTACAAACTACTCAAGAGGAA

GATGGCTGTAGCTGCCGATTTCCAGAAGAAGAAGAAGGAGGATGTGAACTG

SEQ ID NO: 49. Nucleotide sequence of design_muh41BBCyt.xdna (126 bp)
AAGAGAGGGCGTAAAAAGCTGCTCTACATCTTTAAGCAGCCTTTCATGCGTCCTGTTCAGACAACACAGGAAGAG

GACGGATGCTCTTGCAGGTTCCCTGAGGAGGAGGAGGGTGGTTGCGAGCTC

SEQ ID NO: 50. Nucleotide sequence of CD8hinge (138 bp)
GCTAAGCCCACCACGACGCCAGCGCCGCGACCACCAACACCGGCGCCCACCATCGCGTCGCAGCCCCTGTCCCTG

CGCCCAGAGGCGTGCCGGCCAGCGGCGGGGGGCGCAGTGCACACGAGGGGGCTGGACTTCGCC

SEQ ID NO: 51. Nucleotide sequence of muCD8hinge (138 bp)
GCTAAGCCCACTACTACCCCAGCTCCCAGGCCTCCCACACCTGCCCCAACAATCGCCAGCCAGCCACTGTCCCTT

AGGCCCGAGGCCTGTAGGCCCGCCGCCGGAGGAGCCGTGCACACCCGCGGACTGGATTTTGCT

SEQ ID NO: 52. Nucleotide sequence of CD8Tm_aa 181-206 of
H_CD8A_NM_001768.4.xdna (78 bp)
TGTGATATCTACATCTGGGCGCCCTTGGCCGGGACTTGTGGGGTCCTTCTCCTGTCACTGGTTATCACCCTTTAC

TGC

SEQ ID NO: 53. Nucleotide sequence of MuCD8Tm, 78 bp
MuCD8Tm_aa 181-206 of H_CD8A_NM_001768.4
TGCGACATTTATATTTGGGCCCCTCTCGCTGGCACATGCGGCGTGTTGTTGCTCAGCCTCGTGATTACAC

TTTATTGT

SEQ ID NO: 54. Nucleotide sequence of NT4_Design_NYESO1-TCRbaBBZ_Xho-NY-
ESO1 bmuCD8tmBBcytCD3Zcyt-P2A-1g4TCRa95LYCCD8tmBBcytZcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

-continued

CAGATCGTCAGCGCCGAGGCCTGGGGTAGAGCAGACGGCTCTCCTAAGTGCGACATTTATATTTGGGCCCCTCTC

GCTGGCACATGCGGCGTGTTGTTGCTCAGCCTCGTGATTACACTTTATTGTAAGAGAGGGCGTAAAAAGCTGCTC

TACATCTTTAAGCAGCCTTTCATGCGTCCTGTTCAGACAACACAGGAAGAGGACGGATGCTCTTGCAGGTTCCCT

GAGGAGGAGGAGGGTGGTTGCGAGCTCCGGGTCAAATTTTCACGCTCCGCTGATGCTCCTGCCTATCAACAAGGG

CAAAATCAATTGTACAATGAATTGAACTTGGGTAGAAGGGAAGAATATGACGTGCTCGATAAACGGAGGGGAGA

GATCCAGAAATGGGCGGTAAACCACGGCGCAAAAATCCACAAGAGGGATTGTATAACGAGCTCCAAAAGGACAAA

ATGGCAGAAGCTTATTCAGAAATAGGAATGAAGGGGGAAAGGAGACGAGGTAAAGGTCATGACGGATTGTATCAA

GGATTGTCAACCGCTACTAAAGATACATATGATGCTTTGCATATGCAAGCTTTGCCTCCCAGAGCCAAGCGGTCT

GGGTCTGGGGCCACCAACTTCAGCCTGCTGAAGCAGGCCGGCGACGTGGAGGAGAACCCCGGCCCCATGGAGACC

CTCTTGGGCCTGCTTATCCTTTGGCTGCAGCTGCAATGGGTGAGCAGCAAACAGGAGGTGACGCAGATTCCTGCA

GCTCTGAGTGTCCCAGAAGGAGAAAACTTGGTTCTCAACTGCAGTTTCACTGATAGCGCTATTTACAACCTCCAG

TGGTTTAGGCAGGACCCTGGGAAAGGTCTCACATCTCTGTTGCTTATTCAGTCAAGTCAGAGAGAGCAAACAAGT

GGAAGACTTAATGCCTCGCTGGATAAATCATCAGGACGTAGTACTTTATACATTGCAGCTTCTCAGCCTGGTGAC

TCAGCCACCTACCTCTGTGCTGTGAGGCCCCTGTACGGAGGAAGCTACATACCTACATTTGGAAGAGGAACCAGC

CTTATTGTTCATCCGTATATCCAGAACCCTGACCCTGCCGTGTACCAGCTGAGAGACTCTAAATCCAGTGACAAG

TCTGTCTGCCTATTCACCGATTTTGATTCTCAAACAAATGTGTCACAAAGTAAGGATTCTGATGTGTATATCACA

GACAAAACTGTGCTAGACATGAGGTCTATGGACTTCAAGAGCAACAGTGCTGTGGCCTGGAGCAACAAATCTGAC

TTTGCATGTGCAAACGCCTTCAACAACAGCATTATTCCAGAAGACACCTTCTTCCCCAGCCCAGAAAGTTCCGGC

TCCCCAAAATGTGATATCTACATCTGGGCGCCCTTGGCCGGGACTTGTGGGGTCCTTCTCCTGTCACTGGTTATC

ACCCTTTACTGCAAACGGGGCAGAAAGAAACTCCTGTATATATTCAAACAACCATTTATGAGACCAGTACAAACT

ACTCAAGAGGAAGATGGCTGTAGCTGCCGATTTCCAGAAGAAGAAGAAGGAGGATGTGAACTGAGAGTGAAGTTC

AGCAGGAGCGCAGACGCCCCCGCGTACCAGCAGGGCCAGAACCAGCTCTATAACGAGCTCAATCTAGGACGAAGA

GAGGAGTACGATGTTTTGGACAAGAGACGTGGCCGGGACCCTGAGATGGGGGGAAAGCCGAGAAGGAAGAACCCT

CAGGAAGGCCTGTACAATGAACTGCAGAAAGATAAGATGGCGGAGGCCTACAGTGAGATTGGGATGAAAGGCGAG

CGCCGGAGGGGCAAGGGGCACGATGGCCTTTACCAGGGTCTCAGTACAGCCACCAAGGACACCTACGACGCCCTT

CACATGCAGGCCCTGCCCCCTCGCTAA

SEQ ID NO: 55. Nucleotide sequence of NT5_Design_NYESO1-
TCRbaCD28tmBBZ_Xho-NY-ESO1 bmu2CD28tmBBcytCD3Zcyt-P2A-
1g4TCRa95LYCD28tmBBcytCD3Zcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTTCTGGGTTCTCGTCGTCGTGGGAGGT

GTGTTAGCATGTTACTCTCTCTTGGTTACTGTCGCTTTCATAATCTTTTGGGTCAAGAGAGGGCGTAAAAAGCTG

CTCTACATCTTTAAGCAGCCTTTCATGCGTCCTGTTCAGACAACACAGGAAGAGGACGGATGCTCTTGCAGGTTC

-continued

CCTGAGGAGGAGGAGGGTGGTTGCGAGCTCCGGGTCAAATTTTCACGCTCCGCTGATGCTCCTGCCTATCAACAA

GGGCAAAATCAATTGTACAATGAATTGAACTTGGGTAGAAGGGAAGAATATGACGTGCTCGATAAACGGAGGGGG

AGAGATCCAGAAATGGGCGGTAAACCACGGCGCAAAAATCCACAAGAGGGATTGTATAACGAGCTCCAAAAGGAC

AAAATGGCAGAAGCTTATTCAGAAATAGGAATGAAGGGGGAAAGGAGACGAGGTAAAGGTCATGACGGATTGTAT

CAAGGATTGTCAACCGCTACTAAAGATACATATGATGCTTTGCATATGCAAGCTTTGCCTCCCAGAGCCAAGCGG

TCTGGGTCTGGGGCCACCAACTTCAGCCTGCTGAAGCAGGCCGGCGACGTGGAGGAGAACCCCGGCCCCATGGAG

ACCCTCTTGGGCCTGCTTATCCTTTGGCTGCAGCTGCAATGGGTGAGCAGCAAACAGGAGGTGACGCAGATTCCT

GCAGCTCTGAGTGTCCCAGAAGGAGAAAACTTGGTTCTCAACTGCAGTTTCACTGATAGCGCTATTTACAACCTC

CAGTGGTTTAGGCAGGACCCTGGGAAAGGTCTCACATCTCTGTTGCTTATTCAGTCAAGTCAGAGAGAGCAAACA

AGTGGAAGACTTAATGCCTCGCTGGATAAATCATCAGGACGTAGTACTTTATACATTGCAGCTTCTCAGCCTGGT

GACTCAGCCACCTACCTCTGTGCTGTGAGGCCCCTGTACGGAGGAAGCTACATACCTACATTTGGAAGAGGAACC

AGCCTTATTGTTCATCCGTATATCCAGAACCCTGACCCTGCCGTGTACCAGCTGAGAGACTCTAAATCCAGTGAC

AAGTCTGTCTGCCTATTCACCGATTTTGATTCTCAAACAAATGTGTCACAAAGTAAGGATTCTGATGTGTATATC

ACAGACAAAACTGTGCTAGACATGAGGTCTATGGACTTCAAGAGCAACAGTGCTGTGGCCTGGAGCAACAAATCT

GACTTTGCATGTGCAAACGCCTTCAACAACAGCATTATTCCAGAAGACACCTTCTTCCCCAGCCCAGAAAGTTCC

GGCTCCCCAAAATTTTGGGTGCTGGTGGTGGTTGGTGGAGTCCTGGCTTGCTATAGCTTGCTAGTAACAGTGGCC

TTTATTATTTTCTGGGTGAAACGGGGCAGAAAGAAACTCCTGTATATATTCAAACAACCATTTATGAGACCAGTA

CAAACTACTCAAGAGGAAGATGGCTGTAGCTGCCGATTTCCAGAAGAAGAAGAAGGAGGATGTGAACTGAGAGTG

AAGTTCAGCAGGAGCGCAGACGCCCCCGCGTACCAGCAGGGCCAGAACCAGCTCTATAACGAGCTCAATCTAGGA

CGAAGAGAGGAGTACGATGTTTTGGACAAGAGACGTGGCCGGGACCCTGAGATGGGGGGAAAGCCGAGAAGGAAG

AACCCTCAGGAAGGCCTGTACAATGAACTGCAGAAAGATAAGATGGCGGAGGCCTACAGTGAGATTGGGATGAAA

GGCGAGCGCCGGAGGGGCAAGGGGCACGATGGCCTTTACCAGGGTCTCAGTACAGCCACCAAGGACACCTACGAC

GCCCTTCACATGCAGGCCCTGCCCCCTCGCTAA

SEQ ID NO: 56. Nucleotide sequence of NT6_NYESO1-TCRba28BBZ_Xho-NY-ESO1
bmu2CD28tmcytBBcytCD3Zcyt-P2A-1g4TCRa95LYCD28tmcytBBcytCD3Zcyt-
Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTTCTGGGTTCTCGTCGTCGTGGGAGGT

GTGTTAGCATGTTACTCTCTCTTGGTTACTGTCGCTTTCATAATCTTTTGGGTCCGCTCAAAACGCTCTCGCTTG

TTACATTCCGATTATATGAATATGACACCTAGGAGACCTGGCCCGACTAGGAAACACTATCAACCTTACGCACCT

CCCAGAGATTTTGCTGCTTACAGGAGTAAGAGAGGGCGTAAAAAGCTGCTCTACATCTTTAAGCAGCCTTTCATG

CGTCCTGTTCAGACAACACAGGAAGAGGACGGATGCTCTTGCAGGTTCCCTGAGGAGGAGGAGGGTGGTTGCGAG

CTCCGGGTCAAATTTTCACGCTCCGCTGATGCTCCTGCCTATCAACAAGGGCAAAATCAATTGTACAATGAATTG

```
AACTTGGGTAGAAGGGAAGAATATGACGTGCTCGATAAACGGAGGGGGAGAGATCCAGAAATGGGCGGTAAACCA

CGGCGCAAAAATCCACAAGAGGGATTGTATAACGAGCTCCAAAAGGACAAAATGGCAGAAGCTTATTCAGAAATA

GGAATGAAGGGGGAAAGGAGACGAGGTAAAGGTCATGACGGATTGTATCAAGGATTGTCAACCGCTACTAAAGAT

ACATATGATGCTTTGCATATGCAAGCTTTGCCTCCCAGAGCCAAGCGGTCTGGGTCTGGGGCCACCAACTTCAGC

CTGCTGAAGCAGGCCGGCGACGTGGAGGAGAACCCCGGCCCCATGGAGACCCTCTTGGGCCTGCTTATCCTTTGG

CTGCAGCTGCAATGGGTGAGCAGCAAACAGGAGGTGACGCAGATTCCTGCAGCTCTGAGTGTCCCAGAAGGAGAA

AACTTGGTTCTCAACTGCAGTTTCACTGATAGCGCTATTTACAACCTCCAGTGGTTTAGGCAGGACCCTGGGAAA

GGTCTCACATCTCTGTTGCTTATTCAGTCAAGTCAGAGAGAGCAAACAAGTGGAAGACTTAATGCCTCGCTGGAT

AAATCATCAGGACGTAGTACTTTATACATTGCAGCTTCTCAGCCTGGTGACTCAGCCACCTACCTCTGTGCTGTG

AGGCCCCTGTACGGAGGAAGCTACATACCTACATTTGGAAGAGGAACCAGCCTTATTGTTCATCCGTATATCCAG

AACCCTGACCCTGCCGTGTACCAGCTGAGAGACTCTAAATCCAGTGACAAGTCTGTCTGCCTATTCACCGATTTT

GATTCTCAAACAAATGTGTCACAAAGTAAGGATTCTGATGTGTATATCACAGACAAAACTGTGCTAGACATGAGG

TCTATGGACTTCAAGAGCAACAGTGCTGTGGCCTGGAGCAACAAATCTGACTTTGCATGTGCAAACGCCTTCAAC

AACAGCATTATTCCAGAAGACACCTTCTTCCCCAGCCCAGAAAGTTCCGGCTCCCCAAAATTTTGGGTGCTGGTG

GTGGTTGGTGGAGTCCTGGCTTGCTATAGCTTGCTAGTAACAGTGGCCTTTATTATTTTCTGGGTGAGGAGTAAG

AGGAGCAGGCTCCTGCACAGTGACTACATGAACATGACTCCCCGCCGCCCCGGGCCCACCCGCAAGCATTACCAG

CCCTATGCCCCACCACGCGACTTCGCAGCCTATCGCTCCAAACGGGGCAGAAAGAAACTCCTGTATATATTCAAA

CAACCATTTATGAGACCAGTACAAACTACTCAAGAGGAAGATGGCTGTAGCTGCCGATTTCCAGAAGAAGAAGAA

GGAGGATGTGAACTGAGAGTGAAGTTCAGCAGGAGCGCAGACGCCCCCGCGTACCAGCAGGGCCAGAACCAGCTC

TATAACGAGCTCAATCTAGGACGAAGAGAGGAGTACGATGTTTTGGACAAGAGACGTGGCCGGGACCCTGAGATG

GGGGGAAAGCCGAGAAGGAAGAACCCTCAGGAAGGCCTGTACAATGAACTGCAGAAAGATAAGATGGCGGAGGCC

TACAGTGAGATTGGGATGAAAGGCGAGCGCCGGAGGGGCAAGGGGCACGATGGCCTTTACCAGGGTCTCAGTACA

GCCACCAAGGACACCTACGACGCCCTTCACATGCAGGCCCTGCCCCCTCGCTAA

SEQ ID NO: 57. Nucleotide sequence of NT21_NT2-4h1_NYESO1-
TCRb28tmcytZa8tmBZh1_Xho-NY-ESO1 bmu2CD28tmcytCD3Zcyt-P2A-
1g4TCRa95LYCD8tmBBcytCD3Zcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTTCTGGGTTCTCGTCGTCGTGGGAGGT

GTGTTAGCATGTTACTCTCTCTTGGTTACTGTCGCTTTCATAATCTTTTGGGTCCGCTCAAAACGCTCTCGCTTG

TTACATTCCGATTATATGAATATGACACCTAGGAGACCTGGCCCGACTAGGAAACACTATCAACCTTACGCACCT

CCCAGAGATTTTGCTGCTTACAGGAGTCGGGTCAAATTTTCACGCTCCGCTGATGCTCCTGCCTATCAACAAGGG

CAAAATCAATTGTACAATGAATTGAACTTGGGTAGAAGGGAAGAATATGACGTGCTCGATAAACGGAGGGGGAGA

GATCCAGAAATGGGCGGTAAACCACGGCGCAAAAATCCACAAGAGGGATTGTATAACGAGCTCCAAAAGGACAAA
```

-continued

```
ATGGCAGAAGCTTATTCAGAAATAGGAATGAAGGGGAAAGGAGACGAGGTAAAGGTCATGACGGATTGTATCAA

GGATTGTCAACCGCTACTAAAGATACATATGATGCTTTGCATATGCAAGCTTTGCCTCCCAGAGCCAAGCGGTCT

GGGTCTGGGGCCACCAACTTCAGCCTGCTGAAGCAGGCCGGCGACGTGGAGGAGAACCCCGGCCCCATGGAGACC

CTCTTGGGCCTGCTTATCCTTTGGCTGCAGCTGCAATGGGTGAGCAGCAAACAGGAGGTGACGCAGATTCCTGCA

GCTCTGAGTGTCCCAGAAGGAGAAAACTTGGTTCTCAACTGCAGTTTCACTGATAGCGCTATTTACAACCTCCAG

TGGTTTAGGCAGGACCCTGGGAAAGGTCTCACATCTCTGTTGCTTATTCAGTCAAGTCAGAGAGAGCAAACAAGT

GGAAGACTTAATGCCTCGCTGGATAAATCATCAGGACGTAGTACTTTATACATTGCAGCTTCTCAGCCTGGTGAC

TCAGCCACCTACCTCTGTGCTGTGAGGCCCCTGTACGGAGGAAGCTACATACCTACATTTGGAAGAGGAACCAGC

CTTATTGTTCATCCGTATATCCAGAACCCTGACCCTGCCGTGTACCAGCTGAGAGACTCTAAATCCAGTGACAAG

TCTGTCTGCCTATTCACCGATTTTGATTCTCAAACAAATGTGTCACAAAGTAAGGATTCTGATGTGTATATCACA

GACAAAACTGTGCTAGACATGAGGTCTATGGACTTCAAGAGCAACAGTGCTGTGGCCTGGAGCAACAAATCTGAC

TTTGCATGTGCAAACGCCTTCAACAACAGCATTATTCCAGAAGACACCTTCTTCCCCAGCCCAGAAAGTTCCGGC

TCCCCAAAATGTGATATCTACATCTGGGCGCCCTTGGCCGGGACTTGTGGGGTCCTTCTCCTGTCACTGGTTATC

ACCCTTTACTGCAAACGGGGCAGAAAGAAACTCCTGTATATATTCAAACAACCATTTATGAGACCAGTACAAACT

ACTCAAGAGGAAGATGGCTGTAGCTGCCGATTTCCAGAAGAAGAAGAAGGAGGATGTGAACTGAGAGTGAAGTTC

AGCAGGAGCGCAGACGCCCCCGCGTACCAGCAGGGCAGAACCAGCTCTATAACGAGCTCAATCTAGGACGAAGA

GAGGAGTACGATGTTTTGGACAAGAGACGTGGCCGGGACCCTGAGATGGGGGGAAAGCCGAGAAGGAAGAACCCT

CAGGAAGGCCTGTACAATGAACTGCAGAAAGATAAGATGGCGGAGGCCTACAGTGAGATTGGGATGAAAGGCGAG

CGCCGGAGGGGCAAGGGGCACGATGGCCTTTACCAGGGTCTCAGTACAGCCACCAAGGACACCTACGACGCCCTT

CACATGCAGGCCCTGCCCCCTCGCTAA

SEQ ID NO: 58. Nucleotide sequence of NT22_NT2-4h2_NYESO1-
TCRb28tmcytZa8tmBh2_Xho-NY-ESO1 bmu2CD28tmcytCD3Zcyt-P2A-
1g4TCRa95LYCD8tmBBcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTTCTGGGTTCTCGTCGTCGTGGGAGGT

GTGTTAGCATGTTACTCTCTCTTGGTTACTGTCGCTTTCATAATCTTTTGGGTCCGCTCAAAACGCTCTCGCTTG

TTACATTCCGATTATATGAATATGACACCTAGGAGACCTGGCCCGACTAGGAAACACTATCAACCTTACGCACCT

CCCAGAGATTTTGCTGCTTACAGGAGTCGGGTCAAATTTTCACGCTCCGCTGATGCTCCTGCCTATCAACAAGGG

CAAAATCAATTGTACAATGAATTGAACTTGGGTAGAAGGGAAGAATATGACGTGCTCGATAAACGGAGGGGGAGA

GATCCAGAAATGGGCGGTAAACCACGGCGCAAAAATCCACAAGAGGGATTGTATAACGAGCTCCAAAAGGACAAA

ATGGCAGAAGCTTATTCAGAAATAGGAATGAAGGGGAAAGGAGACGAGGTAAAGGTCATGACGGATTGTATCAA

GGATTGTCAACCGCTACTAAAGATACATATGATGCTTTGCATATGCAAGCTTTGCCTCCCAGAGCCAAGCGGTCT

GGGTCTGGGGCCACCAACTTCAGCCTGCTGAAGCAGGCCGGCGACGTGGAGGAGAACCCCGGCCCCATGGAGACC
```

-continued

CTCTTGGGCCTGCTTATCCTTTGGCTGCAGCTGCAATGGGTGAGCAGCAAACAGGAGGTGACGCAGATTCCTGCA

GCTCTGAGTGTCCCAGAAGGAGAAAACTTGGTTCTCAACTGCAGTTTCACTGATAGCGCTATTTACAACCTCCAG

TGGTTTAGGCAGGACCCTGGGAAAGGTCTCACATCTCTGTTGCTTATTCAGTCAAGTCAGAGAGAGCAAACAAGT

GGAAGACTTAATGCCTCGCTGGATAAATCATCAGGACGTAGTACTTTATACATTGCAGCTTCTCAGCCTGGTGAC

TCAGCCACCTACCTCTGTGCTGTGAGGCCCCTGTACGGAGGAAGCTACATACCTACATTTGGAAGAGGAACCAGC

CTTATTGTTCATCCGTATATCCAGAACCCTGACCCTGCCGTGTACCAGCTGAGAGACTCTAAATCCAGTGACAAG

TCTGTCTGCCTATTCACCGATTTTGATTCTCAAACAAATGTGTCACAAAGTAAGGATTCTGATGTGTATATCACA

GACAAAACTGTGCTAGACATGAGGTCTATGGACTTCAAGAGCAACAGTGCTGTGGCCTGGAGCAACAAATCTGAC

TTTGCATGTGCAAACGCCTTCAACAACAGCATTATTCCAGAAGACACCTTCTTCCCCAGCCCAGAAAGTTCCGGC

TCCCCAAAATGTGATATCTACATCTGGGCGCCCTTGGCCGGGACTTGTGGGGTCCTTCTCCTGTCACTGGTTATC

ACCCTTTACTGCAAACGGGGCAGAAAGAAACTCCTGTATATATTCAAACAACCATTTATGAGACCAGTACAAACT

ACTCAAGAGGAAGATGGCTGTAGCTGCCGATTTCCAGAAGAAGAAGAAGGAGGATGTGAACTGTAA

SEQ ID NO: 59. Nucleotide sequence of NT23_NT2-5h1_NYESO1-
TCRb28tmcytZa28tmBZh1_Xho-NY-ESO1 bmu2CD28tmcytCD3Zcyt-P2A-
1g4TCRa95LYCD28tmBBcytCD3Zcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTTCTGGGTTCTCGTCGTCGTGGGAGGT

GTGTTAGCATGTTACTCTCTCTTGGTTACTGTCGCTTTCATAATCTTTTGGGTCCGCTCAAAACGCTCTCGCTTG

TTACATTCCGATTATATGAATATGACACCTAGGAGACCTGGCCCGACTAGGAAACACTATCAACCTTACGCACCT

CCCAGAGATTTTGCTGCTTACAGGAGTCGGGTCAAATTTTCACGCTCCGCTGATGCTCCTGCCTATCAACAAGGG

CAAAATCAATTGTACAATGAATTGAACTTGGGTAGAAGGGAAGAATATGACGTGCTCGATAAACGGAGGGGGAGA

GATCCAGAAATGGGCGGTAAACCACGGCGCAAAAATCCACAAGAGGGATTGTATAACGAGCTCCAAAAGGACAAA

ATGGCAGAAGCTTATTCAGAAATAGGAATGAAGGGGGAAAGGAGACGAGGTAAAGGTCATGACGGATTGTATCAA

GGATTGTCAACCGCTACTAAAGATACATATGATGCTTTGCATATGCAAGCTTTGCCTCCCAGAGCCAAGCGGTCT

GGGTCTGGGGCCACCAACTTCAGCCTGCTGAAGCAGGCCGGCGACGTGGAGGAGAACCCCGGCCCCATGGAGACC

CTCTTGGGCCTGCTTATCCTTTGGCTGCAGCTGCAATGGGTGAGCAGCAAACAGGAGGTGACGCAGATTCCTGCA

GCTCTGAGTGTCCCAGAAGGAGAAAACTTGGTTCTCAACTGCAGTTTCACTGATAGCGCTATTTACAACCTCCAG

TGGTTTAGGCAGGACCCTGGGAAAGGTCTCACATCTCTGTTGCTTATTCAGTCAAGTCAGAGAGAGCAAACAAGT

GGAAGACTTAATGCCTCGCTGGATAAATCATCAGGACGTAGTACTTTATACATTGCAGCTTCTCAGCCTGGTGAC

TCAGCCACCTACCTCTGTGCTGTGAGGCCCCTGTACGGAGGAAGCTACATACCTACATTTGGAAGAGGAACCAGC

CTTATTGTTCATCCGTATATCCAGAACCCTGACCCTGCCGTGTACCAGCTGAGAGACTCTAAATCCAGTGACAAG

TCTGTCTGCCTATTCACCGATTTTGATTCTCAAACAAATGTGTCACAAAGTAAGGATTCTGATGTGTATATCACA

GACAAAACTGTGCTAGACATGAGGTCTATGGACTTCAAGAGCAACAGTGCTGTGGCCTGGAGCAACAAATCTGAC

```
TTTGCATGTGCAAACGCCTTCAACAACAGCATTATTCCAGAAGACACCTTCTTCCCCAGCCCAGAAAGTTCCGGC

TCCCCAAAATTTTGGGTGCTGGTGGTGGTTGGTGGAGTCCTGGCTTGCTATAGCTTGCTAGTAACAGTGGCCTTT

ATTATTTTCTGGGTGAAACGGGGCAGAAAGAAACTCCTGTATATATTCAAACAACCATTTATGAGACCAGTACAA

ACTACTCAAGAGGAAGATGGCTGTAGCTGCCGATTTCCAGAAGAAGAAGAAGGAGGATGTGAACTGAGAGTGAAG

TTCAGCAGGAGCGCAGACGCCCCCGCGTACCAGCAGGGCCAGAACCAGCTCTATAACGAGCTCAATCTAGGACGA

AGAGAGGAGTACGATGTTTTGGACAAGAGACGTGGCCGGGACCCTGAGATGGGGGGAAAGCCGAGAAGGAAGAAC

CCTCAGGAAGGCCTGTACAATGAACTGCAGAAAGATAAGATGGCGGAGGCCTACAGTGAGATTGGGATGAAAGGC

GAGCGCCGGAGGGGCAAGGGGCACGATGGCCTTTACCAGGGTCTCAGTACAGCCACCAAGGACACCTACGACGCC

CTTCACATGCAGGCCCTGCCCCCTCGCTAA

SEQ ID NO: 60. Nucleotide sequence of NT24_NT2-4h3_aNY-TCR-CAR
b8tm28cytZa8tmBBcytZ_Xho-NY-ESO1 bmuCD8tmmu2CD28cytmuCD3Zcyt-
linkerP2A-1g4TCRa95LYCD8tmBBcytZcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTGCGACATTTATATTTGGGCCCCTCTC

GCTGGCACATGCGGCGTGTTGTTGCTCAGCCTCGTGATTACACTTTATTGTCGCTCAAAACGCTCTCGCTTGTTA

CATTCCGATTATATGAATATGACACCTAGGAGACCTGGCCCGACTAGGAAACACTATCAACCTTACGCACCTCCC

AGAGATTTTGCTGCTTACAGGAGTCGGGTCAAATTTTCACGCTCCGCTGATGCTCCTGCCTATCAACAAGGGCAA

AATCAATTGTACAATGAATTGAACTTGGGTAGAAGGGAAGAATATGACGTGCTCGATAAACGGAGGGGGAGAGAT

CCAGAAATGGGCGGTAAACCACGGCGCAAAAATCCACAAGAGGGATTGTATAACGAGCTCCAAAAGGACAAAATG

GCAGAAGCTTATTCAGAAATAGGAATGAAGGGGGAAAGGAGACGAGGTAAAGGTCATGACGGATTGTATCAAGGA

TTGTCAACCGCTACTAAAGATACATATGATGCTTTGCATATGCAAGCTTTGCCTCCCAGAGCCAAGCGGTCTGGG

TCTGGGGCCACCAACTTCAGCCTGCTGAAGCAGGCCGGCGACGTGGAGGAGAACCCCGGCCCCATGGAGACCCTC

TTGGGCCTGCTTATCCTTTGGCTGCAGCTGCAATGGGTGAGCAGCAAACAGGAGGTGACGCAGATTCCTGCAGCT

CTGAGTGTCCCAGAAGGAGAAAACTTGGTTCTCAACTGCAGTTTCACTGATAGCGCTATTTACAACCTCCAGTGG

TTTAGGCAGGACCCTGGGAAAGGTCTCACATCTCTGTTGCTTATTCAGTCAAGTCAGAGAGAGCAAACAAGTGGA

AGACTTAATGCCTCGCTGGATAAATCATCAGGACGTAGTACTTTATACATTGCAGCTTCTCAGCCTGGTGACTCA

GCCACCTACCTCTGTGCTGTGAGGCCCCTGTACGAGGAAGCTACATACCTACATTTGGAAGAGGAACCAGCCTT

ATTGTTCATCCGTATATCCAGAACCCTGACCCTGCCGTGTACCAGCTGAGAGACTCTAAATCCAGTGACAAGTCT

GTCTGCCTATTCACCGATTTTGATTCTCAAACAAATGTGTCACAAAGTAAGGATTCTGATGTGTATATCACAGAC

AAAACTGTGCTAGACATGAGGTCTATGGACTTCAAGAGCAACAGTGCTGTGGCCTGGAGCAACAAATCTGACTTT

GCATGTGCAAACGCCTTCAACAACAGCATTATTCCAGAAGACACCTTCTTCCCCAGCCCAGAAAGTTCCGGCTCC

CCAAAATGTGATATCTACATCTGGGCGCCCTTGGCCGGGACTTGTGGGGTCCTTCTCCTGTCACTGGTTATCACC

CTTTACTGCAAACGGGGCAGAAAGAAACTCCTGTATATATTCAAACAACCATTTATGAGACCAGTACAAACTACT
```

-continued

CAAGAGGAAGATGGCTGTAGCTGCCGATTTCCAGAAGAAGAAGAAGGAGGATGTGAACTGAGAGTGAAGTTCAGC

AGGAGCGCAGACGCCCCCGCGTACCAGCAGGGCCAGAACCAGCTCTATAACGAGCTCAATCTAGGACGAAGAGAG

GAGTACGATGTTTTGGACAAGAGACGTGGCCGGGACCCTGAGATGGGGGGAAAGCCGAGAAGGAAGAACCCTCAG

GAAGGCCTGTACAATGAACTGCAGAAAGATAAGATGGCGGAGGCCTACAGTGAGATTGGGATGAAAGGCGAGCGC

CGGAGGGGCAAGGGGCACGATGGCCTTTACCAGGGTCTCAGTACAGCCACCAAGGACACCTACGACGCCCTTCAC

ATGCAGGCCCTGCCCCCTCGCTAA

SEQ ID NO: 61. Nucleotide sequence of NT25_aNY-TCR-CAR b8tm28cytcyt-
a8tmBBcytcytZ_Xho-NY-ESO1 bmu2CD8tmCD28cytmu2CD28cytmu2CD3Zcyt-
linkerP2A-1g4TCRa95LYCD8tmmuBBcytBBcytZcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGTGCGACATTTATATTTGGGCCCCTCTC

GCTGGCACATGCGGCGTGTTGTTGCTCAGCCTCGTGATTACACTTTATTGTAGGAGTAAGAGGAGCAGGCTCCTG

CACAGTGACTACATGAACATGACTCCCCGCCGCCCCGGGCCCACCCGCAAGCATTACCAGCCCTATGCCCCACCA

CGCGACTTCGCAGCCTATCGCTCCCGCTCAAAACGCTCTCGCTTGTTACATTCCGATTATATGAATATGACACCT

AGGAGACCTGGCCCGACTAGGAAACACTATCAACCTTACGCACCTCCCAGAGATTTTGCTGCTTACAGGAGTCGG

GTCAAATTTTCACGCTCCGCTGATGCTCCTGCCTATCAACAAGGGCAAAATCAATTGTACAATGAATTGAACTTG

GGTAGAAGGGAAGAATATGACGTGCTCGATAAACGGAGGGGGAGAGATCCAGAAATGGGCGGTAAACCACGGCGC

AAAAATCCACAAGAGGGATTGTATAACGAGCTCCAAAAGGACAAAATGGCAGAAGCTTATTCAGAAATAGGAATG

AAGGGGGAAAGGAGACGAGGTAAAGGTCATGACGGATTGTATCAAGGATTGTCAACCGCTACTAAAGATACATAT

GATGCTTTGCATATGCAAGCTTTGCCTCCCAGAGCCAAGCGGTCTGGGTCTGGGGCCACCAACTTCAGCCTGCTG

AAGCAGGCCGGCGACGTGGAGGAGAACCCCGGCCCCATGGAGACCCTCTTGGGCCTGCTTATCCTTTGGCTGCAG

CTGCAATGGGTGAGCAGCAAACAGGAGGTGACGCAGATTCCTGCAGCTCTGAGTGTCCCAGAAGGAGAAAACTTG

GTTCTCAACTGCAGTTTCACTGATAGCGCTATTTACAACCTCCAGTGGTTTAGGCAGGACCCTGGGAAAGGTCTC

ACATCTCTGTTGCTTATTCAGTCAAGTCAGAGAGAGCAAACAAGTGGAAGACTTAATGCCTCGCTGGATAAATCA

TCAGGACGTAGTACTTTATACATTGCAGCTTCTCAGCCTGGTGACTCAGCCACCTACCTCTGTGCTGTGAGGCCC

CTGTACGGAGGAAGCTACATACCTACATTTGGAAGAGGAACCAGCCTTATTGTTCATCCGTATATCCAGAACCCT

GACCCTGCCGTGTACCAGCTGAGAGACTCTAAATCCAGTGACAAGTCTGTCTGCCTATTCACCGATTTTGATTCT

CAAACAAATGTGTCACAAAGTAAGGATTCTGATGTGTATATCACAGACAAAACTGTGCTAGACATGAGGTCTATG

GACTTCAAGAGCAACAGTGCTGTGGCCTGGAGCAACAAATCTGACTTTGCATGTGCAAACGCCTTCAACAACAGC

ATTATTCCAGAAGACACCTTCTTCCCCAGCCCAGAAAGTTCCGGCTCCCAAAATGTGATATCTACATCTGGGCG

CCCTTGGCCGGGACTTGTGGGGTCCTTCTCCTGTCACTGGTTATCACCCTTTACTGCAAGAGAGGGCGTAAAAAG

CTGCTCTACATCTTTAAGCAGCCTTTCATGCGTCCTGTTCAGACAACACAGGAAGAGGACGGATGCTCTTGCAGG

TTCCCTGAGGAGGAGGAGGGTGGTTGCGAGCTCAAACGGGGCAGAAAGAAACTCCTGTATATATTCAAACAACCA

-continued

```
TTTATGAGACCAGTACAAACTACTCAAGAGGAAGATGGCTGTAGCTGCCGATTTCCAGAAGAAGAAGAAGGAGGA

TGTGAACTGAGAGTGAAGTTCAGCAGGAGCGCAGACGCCCCCGCGTACCAGCAGGGCCAGAACCAGCTCTATAAC

GAGCTCAATCTAGGACGAAGAGAGGAGTACGATGTTTTGGACAAGAGACGTGGCCGGGACCCTGAGATGGGGGA

AAGCCGAGAAGGAAGAACCCTCAGGAAGGCCTGTACAATGAACTGCAGAAAGATAAGATGGCGGAGGCCTACAGT

GAGATTGGGATGAAAGGCGAGCGCCGGAGGGGCAAGGGGCACGATGGCCTTTACCAGGGTCTCAGTACAGCCACC

AAGGACACCTACGACGCCCTTCACATGCAGGCCCTGCCCCCTCGCTAA
```

SEQ ID NO: 62. Nucleotide sequence of NT26_aNY-TCR-
CARb8h28pectmcytZa8h28pectmcytZ_Xho-NY-ESO1
bmu2CD8hmu2CD28pectmcytmu2Zcyt-P2A-1g4TCRa95LYCD8hCD28pectmcytZcyt-
Not.xdna

```
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGGCAAAACCGACGACCACCCCTGCCCCC

AGGCCTCCTACTCCCGCCCCGACGATTGCCAGCCAACCGTTAAGTTTAAGACCGGAAGCATGTAGACCGGCAGCT

GGTGGGGCTGTTCATACACGTGGCTTAGATTTTGCGCCTAGGAAGATCGAGGTAATGTACCCACCGCCCTATCTT

GATAACGAAAAATCTAACGGTACAATAATTCACGTCAAGGGCAAGCATTTGTGCCCTTCCCCGTTGTTCCCGGGC

CCAAGCAAACCGTTCTGGGTTCTCGTCGTCGTGGGAGGTGTGTTAGCATGTTACTCTCTCTTGGTTACTGTCGCT

TTCATAATCTTTTGGGTCCGCTCAAAACGCTCTCGCTTGTTACATTCCGATTATATGAATATGACACCTAGGAGA

CCTGGCCCGACTAGGAAACACTATCAACCTTACGCACCTCCCAGAGATTTTGCTGCTTACAGGAGTCGGGTCAAA

TTTTCACGCTCCGCTGATGCTCCTGCCTATCAACAAGGGCAAAATCAATTGTACAATGAATTGAACTTGGGTAGA

AGGGAAGAATATGACGTGCTCGATAAACGGAGGGGGAGAGATCCAGAAATGGGCGGTAAACCACGGCGCAAAAAT

CCACAAGAGGGATTGTATAACGAGCTCCAAAAGGACAAAATGGCAGAAGCTTATTCAGAAATAGGAATGAAGGGG

GAAAGGAGACGAGGTAAAGGTCATGACGGATTGTATCAAGGATTGTCAACCGCTACTAAAGATACATATGATGCT

TTGCATATGCAAGCTTTGCCTCCCAGAGCCAAGCGGTCTGGGTCTGGGGCCACCAACTTCAGCCTGCTGAAGCAG

GCCGGCGACGTGGAGGAGAACCCCGGCCCCATGGAGACCCTCTTGGGCCTGCTTATCCTTTGGCTGCAGCTGCAA

TGGGTGAGCAGCAAACAGGAGGTGACGCAGATTCCTGCAGCTCTGAGTGTCCCAGAAGGAGAAAACTTGGTTCTC

AACTGCAGTTTCACTGATAGCGCTATTTACAACCTCCAGTGGTTTAGGCAGGACCCTGGGAAAGGTCTCACATCT

CTGTTGCTTATTCAGTCAAGTCAGAGAGAGCAAACAAGTGGAAGACTTAATGCCTCGCTGGATAAATCATCAGGA

CGTAGTACTTTATACATTGCAGCTTCTCAGCCTGGTGACTCAGCCACCTACCTCTGTGCTGTGAGGCCCCTGTAC

GGAGGAAGCTACATACCTACATTTGGAAGAGGAACCAGCCTTATTGTTCATCCGTATATCCAGAACCCTGACCCT

GCCGTGTACCAGCTGAGAGACTCTAAATCCAGTGACAAGTCTGTCTGCCTATTCACCGATTTTGATTCTCAAACA

AATGTGTCACAAAGTAAGGATTCTGATGTGTATATCACAGACAAAACTGTGCTAGACATGAGGTCTATGGACTTC

AAGAGCAACAGTGCTGTGGCCTGGAGCAACAAATCTGACTTTGCATGTGCAAACGCCTTCAACAACAGCATTATT

CCAGAAGACACCTTCTTCCCCAGCCCAGAAAGTTCCGGCTCCCCAAAAGCTAAGCCCACCACGACGCCAGCGCCG
```

-continued

CGACCACCAACACCGGCGCCCACCATCGCGTCGCAGCCCCTGTCCCTGCGCCCAGAGGCGTGCCGGCCAGCGGCG

GGGGGCGCAGTGCACACGAGGGGGCTGGACTTCGCCCCTAGGAAAATTGAAGTTATGTATCCTCCTCCTTACCTA

GACAATGAGAAGAGCAATGGAACCATTATCCATGTGAAAGGGAAACACCTTTGTCCAAGTCCCCTATTTCCCGGA

CCTTCTAAGCCCTTTTGGGTGCTGGTGGTGGTTGGTGGAGTCCTGGCTTGCTATAGCTTGCTAGTAACAGTGGCC

TTTATTATTTTCTGGGTGAGGAGTAAGAGGAGCAGGCTCCTGCACAGTGACTACATGAACATGACTCCCCGCCGC

CCCGGGCCCACCCGCAAGCATTACCAGCCCTATGCCCCACCACGCGACTTCGCAGCCTATCGCTCCAGAGTGAAG

TTCAGCAGGAGCGCAGACGCCCCCGCGTACCAGCAGGGCCAGAACCAGCTCTATAACGAGCTCAATCTAGGACGA

AGAGAGGAGTACGATGTTTTGGACAAGAGACGTGGCCGGGACCCTGAGATGGGGGGAAAGCCGAGAAGGAAGAAC

CCTCAGGAAGGCCTGTACAATGAACTGCAGAAAGATAAGATGGCGGAGGCCTACAGTGAGATTGGGATGAAAGGC

GAGCGCCGGAGGGGCAAGGGGCACGATGGCCTTTACCAGGGTCTCAGTACAGCCACCAAGGACACCTACGACGCC

CTTCACATGCAGGCCCTGCCCCCTCGCTAA

SEQ ID NO: 63. Nucleotide sequence of NT27_NT2b-4h1_aNY-TCR-CAR
bCD8h28pectmcytZa8tmBBcyt_Xho-NY-ESO1
bmu2CD8hmu2CD28pectmcytmu2Zcyt-P2A-1g4TCRa95LYCD8tmBBcyt-Not.xdna
ATGAGCATCGGCCTCCTGTGCTGTGCAGCCTTGTCTCTCCTGTGGGCAGGTCCAGTGAATGCTGGTGTCACTCAG

ACCCCAAAATTCCAGGTCCTGAAGACAGGACAGAGCATGACACTGCAGTGTGCCCAGGATATGAACCATGAATAC

ATGTCCTGGTATCGACAAGACCCAGGCATGGGGCTGAGGCTGATTCATTACTCAGTTGGTGCTGGTATCACTGAC

CAAGGAGAAGTCCCCAATGGCTACAATGTCTCCAGATCAACCACAGAGGATTTCCCGCTCAGGCTGCTGTCGGCT

GCTCCCTCCCAGACATCTGTGTACTTCTGTGCCAGCAGTTACGTCGGGAACACCGGGGAGCTGTTTTTTGGAGAA

GGCTCTAGGCTGACCGTACTGGAGGACCTGAAAAACGTGTTCCCACCCGAGGTCGCTGTGTTTGAGCCATCAGAA

GCAGAGATCTCCCACACCCAAAAGGCCACACTGGTGTGCCTGGCCACAGGCTTCTACCCCGACCACGTGGAGCTG

AGCTGGTGGGTGAATGGGAAGGAGGTGCACAGTGGGGTCAGCACAGACCCGCAGCCCCTCAAGGAGCAGCCCGCC

CTCAATGACTCCAGATACGCTCTGAGCAGCCGCCTGAGGGTCTCGGCCACCTTCTGGCAGGACCCCCGCAACCAC

TTCCGCTGTCAAGTCCAGTTCTACGGGCTCTCGGAGAATGACGAGTGGACCCAGGATAGGGCCAAACCCGTCACC

CAGATCGTCAGCGCCGAGGCCTGGGGTAGAGCAGACGGCTCTCCTAAGGCAAAACCGACGACCACCCCTGCCCCC

AGGCCTCCTACTCCCGCCCCGACGATTGCCAGCCAACCGTTAAGTTTAAGACCGGAAGCATGTAGACCGGCAGCT

GGTGGGCTGTTCATACACGTGGCTTAGATTTTGCGCCTAGGAAGATCGAGGTAATGTACCCACCGCCCTATCTT

GATAACGAAAAATCTAACGGTACAATAATTCACGTCAAGGGCAAGCATTTGTGCCCTTCCCCGTTGTTCCCGGGC

CCAAGCAAACCGTTCTGGGTTCTCGTCGTCGTGGGAGGTGTGTTAGCATGTTACTCTCTCTTGGTTACTGTCGCT

TTCATAATCTTTTGGGTCCGCTCAAAACGCTCTCGCTTGTTACATTCCGATTATATGAATATGACACCTAGGAGA

CCTGGCCCGACTAGGAAACACTATCAACCTTACGCACCTCCCAGAGATTTTGCTGCTTACAGGAGTCGGGTCAAA

TTTTCACGCTCCGCTGATGCTCCTGCCTATCAACAAGGGCAAAATCAATTGTACAATGAATTGAACTTGGGTAGA

AGGGAAGAATATGACGTGCTCGATAAACGGAGGGGGAGAGATCCAGAAATGGGCGGTAAACCACGGCGCAAAAAT

CCACAAGAGGGATTGTATAACGAGCTCCAAAAGGACAAAATGGCAGAAGCTTATTCAGAAATAGGAATGAAGGGG

GAAAGGAGACGAGGTAAAGGTCATGACGGATTGTATCAAGGATTGTCAACCGCTACTAAAGATACATATGATGCT

TTGCATATGCAAGCTTTGCCTCCCAGAGCCAAGCGGTCTGGGTCTGGGGCCACCAACTTCAGCCTGCTGAAGCAG

GCCGGCGACGTGGAGGAGAACCCCGGCCCCATGGAGACCCTCTTGGGCCTGCTTATCCTTTGGCTGCAGCTGCAA

TGGGTGAGCAGCAAACAGGAGGTGACGCAGATTCCTGCAGCTCTGAGTGTCCCAGAAGGAGAAAACTTGGTTCTC

AACTGCAGTTTCACTGATAGCGCTATTTACAACCTCCAGTGGTTTAGGCAGGACCCTGGGAAAGGTCTCACATCT

CTGTTGCTTATTCAGTCAAGTCAGAGAGAGCAAACAAGTGGAAGACTTAATGCCTCGCTGGATAAATCATCAGGA

CGTAGTACTTTATACATTGCAGCTTCTCAGCCTGGTGACTCAGCCACCTACCTCTGTGCTGTGAGGCCCCTGTAC

GGAGGAAGCTACATACCTACATTTGGAAGAGGAACCAGCCTTATTGTTCATCCGTATATCCAGAACCCTGACCCT

-continued

```
GCCGTGTACCAGCTGAGAGACTCTAAATCCAGTGACAAGTCTGTCTGCCTATTCACCGATTTTGATTCTCAAACA

AATGTGTCACAAAGTAAGGATTCTGATGTGTATATCACAGACAAAACTGTGCTAGACATGAGGTCTATGGACTTC

AAGAGCAACAGTGCTGTGGCCTGGAGCAACAAATCTGACTTTGCATGTGCAAACGCCTTCAACAACAGCATTATT

CCAGAAGACACCTTCTTCCCCAGCCCAGAAAGTTCCGGCTCCCCAAAATGTGATATCTACATCTGGGCGCCCTTG

GCCGGGACTTGTGGGGTCCTTCTCCTGTCACTGGTTATCACCCTTTACTGCAAACGGGGCAGAAAGAAACTCCTG

TATATATTCAAACAACCATTTATGAGACCAGTACAAACTACTCAAGAGGAAGATGGCTGTAGCTGCCGATTTCCA

GAAGAAGAAGAAGGAGGATGTGAACTGTAA
```

Compositions and Kits

In one aspect, this disclosure provides a composition comprising a plurality of genetically modified lymphocytes expressing chimeric antigen receptors or the chains thereof as described above for modulating the immune system of a subject.

Various lymphocytes can be used in this invention. Examples of Lymphocytes may include T cells, B cells, NK cells, macrophages, neutrophils, dendritic cells, mast cells, eosinophils, and basophils. In some embodiments, lymphocytes are derived from CD34 hematopoietic stem cells, embryonic stem cells, or induced pluripotent stem cells. Lymphocytes can be autologous, allogeneic, syngeneic, or xenogeneic. In some embodiments, lymphocytes are autologous. In some embodiments, lymphocytes are human lymphocytes.

In some embodiments, lymphocytes are peripheral blood lymphocytes (PBLs). In some embodiments, the lymphocytes can be tumor-infiltrating lymphocytes (TILs). In some embodiments, the lymphocytes may express a chimer antigen receptor. In some embodiments, the lymphocytes may express a recombinant T cell receptor. The CAR or TCR may bind to a cancer antigen of interest.

Examples of such cancer and/or tumor antigens include, but are not limited to, e.g., cyclin-dependent kinase-4, β-catenin, Caspase-8, MAGE-1, MAGE-3, Tyrosinase, Surface Ig idiogype, Her-2/neu, MUC-1, HPV E6, HPV E7, CD5, idiotype, CAMPATH-1, CD20, CEA, mucin-1, Lewis$^x$, CA-125, EGFR, p185$^{HER2}$, IL-2R, FAP, Tenascin, metalloproteinases, phCG, gp100 or Pmell7, HER2/neu, CEA, gp100, MART1, TRP-2, melan-A, NY-ESO-1, MN (gp250), idiotype, MAGE-1, MAGE-3, Tyrosinase, Telomerase, MUC-1 antigens, and germ cell-derived tumor antigens, the blood group antigens, for example, Lea, Leb, LeX, LeY, H-2, B-1, B-2 antigens.

In certain embodiments, more than one cancer and/or tumor antigens can be bound by the same CAR-expressing T cell; for example, binding of one CAR of a T cell to a MAGE antigen can be combined with binding of another CAR of the T cell to another antigen, such as melanin A, tyrosinase, or gp100. For example, CD20 is a pan B antigen that is found on the surface of both malignant and non-malignant B cells that has proved to be an extremely effective target for immunotherapeutic antibodies for the treatment of non-Hodgkin's lymphoma. In this respect, pan T cell antigens such as CD2, CD3, CD5, CD6 and CD7 also comprise tumor-associated antigens within the meaning of the present invention. Still other exemplary tumor-associated antigens comprise, but are not limited to, MAGE-1, MAGE-3, MUC-1, HPV 16, HPV E6 & E7, TAG-72, CEA, L6-Antigen, CD19, CD22, CD37, CD52, HLA-DR, EGF Receptor and HER2 Receptor. In many cases immunoreactive antibodies (and/or immunoreactive antigen-binding fragments) for each of these antigens have been reported in the literature.

In embodiments, the two chains of the chimer antigen receptor are encoded by one nucleic acid transgene. The two chains can be linked by a self-cleaving peptide sequence. Alternatively, two sequences encoding the two chains are linked via a nucleic acid sequence comprising an IRES so that the two chains can be translated separately. The transgene expression can be regulated by a constitutively activated promoter or by an inducible promoter. In some embodiments, the transgene expression can be induced by the activation status of the lymphocyte. In others, the transgene can be introduced to the lymphocytes via integration-competent gamma-retroviruses or lentivirus, DNA transposition, etc.

The above-described genetically modified lymphocytes can be incorporated into pharmaceutical compositions suitable for administration. The pharmaceutical compositions generally comprise substantially isolated/purified lymphocytes and a pharmaceutically acceptable carrier in a form suitable for administration to a subject. Pharmaceutically acceptable carriers can be determined in part by the particular composition being administered, as well as by the particular method used to administer the composition. The pharmaceutical compositions are generally formulated in full compliance with all Good Manufacturing Practice (GMP) regulations of the U.S. Food and Drug Administration.

The terms "pharmaceutically acceptable" as referred to compositions, carriers, diluents, and reagents, are used interchangeably and include materials are capable of administration to or upon a subject without the production of undesirable physiological effects to the degree that would prohibit administration of the composition. For example, "pharmaceutically-acceptable excipient" includes an excipient that is useful in preparing a pharmaceutical composition that is generally safe, non-toxic, and desirable, and includes excipients that are acceptable for veterinary use as well as for human pharmaceutical use.

Examples of such carriers or diluents include, but are not limited to, water, saline, Ringer's solutions, dextrose solution, and 5% human serum albumin. The use of such media and compounds for pharmaceutically active substances is well known in the art. Except insofar as any conventional media or compound is incompatible with the disclosed composition, use thereof in the compositions is contemplated. In some embodiments, a second therapeutic agent, such as an anti-cancer or anti-tumor, can also be incorporated into pharmaceutical compositions.

Pharmaceutical compositions suitable for injectable use include sterile aqueous solutions (where water-soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, N.J.) or phosphate-buffered saline (PBS). In all cases, the composition must be sterile and should be fluid to the extent that easy syringeability exists. It must be stable under the conditions of manufacture and storage and must be preserved against the contaminating action of microorganisms such as bacteria and fungi. The carrier can be a solvent or dispersion medium containing, e.g., water, ethanol, polyol (e.g., glycerol, propylene glycol, and liquid polyethylene glycol, and the like), and suitable mixtures thereof. The proper fluidity can be maintained, e.g., by the use of a coating such as lecithin, by the maintenance of the required particle size in the case of dispersion and by the use of surfactants. In some embodiments, the composition includes the genetically modified lymphocytes as described above and optionally a cryo-protectant (e.g., glycerol, DMSO, PEG).

The composition or the pharmaceutical composition described herein can be provided in a kit. In one embodiment, the kit includes (a) a container that contains the composition and optionally (b) informational material. The informational material can be descriptive, instructional, marketing or other material that relates to the methods described herein and/or the use of the agents for therapeutic benefit. For example, kits may include instruction for the manufacturing, for the therapeutic regimen to be used, and periods of administration. In an embodiment, the kit includes also includes an additional therapeutic agent (e.g., a checkpoint modulator). The kit may comprise one or more containers, each with a different reagent. For example, the kit includes a first container that contains the composition and a second container for the additional therapeutic agent.

The containers can include a unit dosage of the pharmaceutical composition. In addition to the composition, the kit can include other ingredients, such as a solvent or buffer, an adjuvant, a stabilizer, or a preservative. The kit optionally includes a device suitable for administration of the composition, e.g., a syringe or other suitable delivery device. The device can be provided pre-loaded with one or both of the agents or can be empty, but suitable for loading.

Methods for Preparing Compositions

In general, the practice of the present invention employs, unless otherwise indicated, conventional techniques of chemistry, molecular biology, recombinant DNA technology, PCR technology, immunology (e.g., antibody technology), expression systems (e.g., cell-free expression, phage display, ribosome display, and PROFUSION), and any necessary cell culture that are within the skill of the art and are explained in the literature. Although certain aspects of the present invention relate to compositions and uses of recombinant RNA retrovirus (e.g., lentiviral HIV-2, SIV, etc.), the molecular cloning may be done using proviral DNA clones, thus allowing the use of standard cloning techniques. Site-directed mutagenesis in vitro by synthetic oligodeoxynucleotides can be carried out according to methods known in the art. Genetic fusions, especially of use in the synthesis of fusion proteins, e.g., CARs, of the present invention can be made by art-recognized methods, e.g., gene SOE (splicing by overlap extension) methods that commonly rely upon the use of fusion primers (which are optionally mutagenic) during PCR amplification. (Horton et al. 1989 Gene 77: 61-68; U.S. Pat. No. 5,023,171). Enzymatic amplification of DNA fragments by PCR technique can be carried out using a DNA thermal cycler according to manufacturer specifications.

Verification of the nucleotide sequences can be carried out by sequencing. Verification of whether a homologous recombination event has occurred between two homologous polypeptides that were and likely still are contained within a single vector of the present invention may be performed by any art-recognized method, including but not limited to, Northern blot and/or RT-PCR methods (e.g., if assessed directly within isolated retroviral genomes), Southern blot and/or PCR methods (e.g., if assessed upon host cell genomic DNAs comprising integrated retroviral vectors), and SDS-PAGE followed by Western blot and/or immunoprecipitation followed by SDS-PAGE and detection of labeled polypeptides (e.g., if homologous polypeptides are of discernible sizes and/or contain distinguishable domains, features and/or epitopes).

Some embodiments involve creating a retroviral vector encoding two or more identical or highly homologous molecules with degenerated codons. Methods for creating a retroviral vector encoding two or more identical or highly homologous molecules with degenerated codons employing silent mutation approach to reduce possible DNA recombination event has been previously described in e.g., U.S. Pat. No. 9,206,440 and Im E J et al., Recombination-deletion between homologous cassettes in retrovirus is suppressed via a strategy of degenerate codon substitution. Molecular Therapy—Methods & Clinical Development (2014) Article number: 14022). The references are incorporated by reference.

In another aspect, this disclosure provides a method of preparing the above-described composition. The method comprises: (a) providing a plurality of lymphocytes; (b) introducing to the plurality of lymphocytes a nucleic acid molecule encoding the first and the second polypeptide chains to obtain a plurality of genetically engineered lymphocytes; and (c) expanding the plurality of genetically engineered in a cell culture medium.

In some embodiments, the method may include: (a) providing a plurality of lymphocytes; (b) introducing to the plurality of lymphocytes a first nucleic acid molecule and a second nucleic acid molecule encoding the first and the second polypeptide chains, respectively, thereby obtaining a plurality of genetically-engineered lymphocytes; and (c) expanding the plurality of genetically-engineered in a cell culture medium. In some embodiments, the method may additionally include expanding a first plurality of lymphocytes in a cell culture medium following the step of introducing the first nucleic acid or expanding a second plurality of lymphocytes in a cell culture medium following the step of introducing the second nucleic acid.

Methods to obtain a composition of tumor-specific genetically modified subsets of lymphocytes described above can be performed in vitro or ex vivo. Methods in more particular form may be as disclosed in PCT/EP2018/080343, the content of which is hereby incorporated by reference in its entirety.

The term "culturing" or "expanding" refers to maintaining or cultivating cells under conditions in which they can proliferate and avoid senescence. For example, cells may be cultured in media optionally containing one or more growth factors, i.e., a growth factor cocktail. In some embodiments, the cell culture medium is a defined cell culture medium.

The cell culture medium may include neoantigen peptides. Stable cell lines may be established to allow for the continued propagation of cells.

Lymphocytes

Prior to the expansion and genetic modification of the lymphocytes, a source of lymphocytes from a subject is obtained. Lymphocytes can be obtained from several sources, including peripheral blood mononuclear cells, bone marrow, lymph node tissue, umbilical cord blood, thymus tissue, tissue from an infection site, ascites, pleural effusion, splenic tissue, and tumors. As described herein, any number of lymphocyte lines available in the art can be used. Lymphocytes can be obtained from a unit of blood collected from a subject using any number of techniques known to the person skilled in the art, such as the Ficoll™ separation. Circulating blood cells of an individual can be obtained by apheresis. The apheresis product typically contains lymphocytes, including T lymphocytes, monocytes, granulocytes, B lymphocytes, other nucleated white blood cells, red blood cells, and platelets. The cells harvested by apheresis can be washed to remove the plasma fraction and place the cells in a suitable buffer or medium for the subsequent processing steps. The cells may be washed with PBS. Alternatively, the wash solution may lack calcium and may lack magnesium or may lack many, if not all, divalent cations. As those of ordinary skill in the art would readily appreciate, a washing step can be achieved by methods known to those skilled in the art, such as using a semiautomatic continuous flow centrifuge (e.g., the Cobe 2991 cell processor, the Baxter CytoMate, or elHaemonetics Cell Saver 5) according to the manufacturer's instructions. After washing, the cells can be resuspended in a variety of biocompatible buffers, such as, for example, Ca2+ free, PBS free Mg2+, PlasmaLyte A, or other saline solution with or without buffer. Alternatively, the undesirable components of the apheresis sample can be removed and the cells resuspended directly in a culture medium.

As described herein, lymphocytes may be isolated from peripheral blood by lysis of red blood cells and depletion of monocytes, for example, by centrifugation through a PERCOLL gradient or by countercurrent centrifugal elutriation. If needed, specific subpopulation lymphocytes, such as T lymphocytes (i.e., Cd3+, CD28+, CD4+, CD8+, CD45RA+ or CD45RO+T lymphocytes) can be further isolated by positive or negative selection techniques. For example, T lymphocytes may be isolated by incubation with conjugated anti-CD3/anti-CD28 beads (i.e., 3×28), such as DYNABEADS M-450 CD3/CD28 T, for a sufficient period of time (i.e., 30 minutes to 24 hours) for positive selection of the desired T lymphocytes. For isolation of T lymphocytes from patients with leukemia, the use of longer incubation times, such as 24 hours, can increase cellular performance. Longer incubation times can be used to isolate T lymphocytes in any situation where there are few T lymphocytes compared to other cell types, such as isolating TTLs from tumor tissue or from immunocompromised individuals. The person skilled in the art will recognize that multiple rounds of selection may also be used. It may be desirable to perform the selection procedure and use the "unselected" cells in the activation and expansion process. "Unselected" cells can also undergo new rounds of selection.

Enrichment of a population of lymphocytes (e.g., T lymphocytes) by negative selection can be performed with a combination of antibodies directed to unique surface markers for the negatively selected cells. One method is the sorting and/or selection of cells by negative magnetic immune adherence or flow cytometry using a cocktail of monoclonal antibodies directed to cell surface markers present in the negatively selected cells. For example, to enrich CD4+ cells by negative selection, a monoclonal antibody typically includes antibodies against CD14, CD20, CD11b, CD16, HLA-DR, and CD8. Alternatively, the regulatory T lymphocytes are depleted by anti-C25 conjugate beads or other similar selection method.

Lymphocytes for stimulation can also be frozen after a washing step. Wishing not to be bound by theory, freezing and the following thawing step provide a more uniform product by eliminating granulocytes and, to some extent, monocytes in the cell population. After the washing step that removes the plasma and platelets, the cells can be suspended in a freezing solution. Although many solutions and freezing parameters are known in the art and will be useful in this context, one method involves the use of PBS containing 20% DMSO and 8% human serum albumin, or culture medium containing 10% dextran 40 and 5% dextrose human albumin and 7.5% DMSO or 31.25% Plasmalyte A, 31.25% dextrose 5%, 0.45% NaCl, 10% dextran 40 and 5% of dextrose, 20% serum of human albumin and 7.5% of DMSO or other suitable cell freezing medium containing for example Hespan and PlasmaLyte A. The cells may then be frozen at −80° C. at a rate of 1° C. per minute and stored in the vapor phase of a liquid nitrogen storage tank. Other methods of controlled freezing can be used, as well as uncontrolled freezing immediately at −20° C. or in liquid nitrogen.

The cryopreserved cells may be thawed and washed as described herein and allowed to stand for one hour at room temperature before activation using the methods of the present invention. As described herein, lymphocytes can be expanded, frozen, and used later. As described herein, samples may be collected from a patient shortly after the diagnosis of a particular disease as described herein, but before any treatment. The cells may be isolated from a blood sample or an apheresis of a subject before any number of relevant treatment modalities, including but not limited to treatment with agents such as natalizumab, efalizumab, antiviral agents, chemotherapy, radiation, immunosuppressive agents such as cyclosporine, azathioprine, methotrexate, mycophenolate and FK506, antibodies or other immunoablatories such as CAMPATH, anti-CD3 antibodies, cytoxane, fludarabine, cyclosporin, FK506, rapamycin, mycophenolic acid, steroids, FR901228, and irradiation. These drugs inhibit calcium-dependent calcineurin phosphatase (e.g., ciclosporin and FK506) or inhibit p70S6 kinase that is important for signaling induced by the growth factor (rapamycin) (Liu et al., Cell 66: 807-815, 1991; Henderson et al., Immun 73: 316-321, 1991, Bierer et al., Curr. Opin. Immun., 5: 763-773, 1993). The cells may be isolated from a patient and frozen for later use together with (e.g., before, simultaneously or after) bone marrow or stem cell transplant, therapy with T lymphocyte ablation using chemotherapeutic agents such as fludarabine, radiotherapy external beam (XRT), cyclophosphamide, or antibodies such as OKT3 or CAMPATH. As described herein, the cells may be isolated before and can be frozen for later use in the treatment after therapy with ablation of B lymphocytes, such as agents that react with CD20, for example, Rituxan.

Either before or after the genetic modification of lymphocytes to express a desirable transgene, lymphocytes can be activated and expanded generally using methods such as those described, for example, in U.S. Pat. Nos. 6,352,694; 6,534,055; 6,905,680; 6,692,964; 5,858,358; 6,887,466; 6,905,681; 7,144,575; 7,067,318; 7,172,869; 7,232,566; 7,175,843; 5,883,223; 6,905,874; 6,797,514; 6,867,041; and US patent application 20060121005.

Vectors

Transgenes can be introduced into lymphoid cells using various methods. These methods include, but are not limited to, transduction of cells using integration-competent gamma-retroviruses or lentivirus, and DNA transposition.

A wide variety of vectors can be used for the expression of the transgenes. The ability of certain viruses to infect cells or enter cells via receptor-mediated endocytosis, and to integrate into a host cell genome and express viral genes stably and efficiently have made them attractive candidates for the transfer of foreign nucleic acids into cells. Accordingly, in certain embodiments, a viral vector is used to introduce a nucleotide sequence encoding one or more transgenes or fragment thereof into a host cell for expression. The viral vector may comprise a nucleotide sequence encoding one or more transgenes or fragment thereof operably linked to one or more control sequences, for example, a promoter. Alternatively, the viral vector may not contain a control sequence and will instead rely on a control sequence within the host cell to drive expression of the transgenes or fragment thereof. Non-limiting examples of viral vectors that may be used to deliver a nucleic acid include adenoviral vectors, AAV vectors, and retroviral vectors.

For example, an adeno-associated virus (AAV) can be used to introduce a nucleotide sequence encoding one or more transgenes or fragment thereof into a host cell for expression. AAV systems have been described previously and are generally well known in the art (Kelleher and Vos, Biotechniques, 17(6):1110-7, 1994; Cotten et al., Proc Natl Acad Sci USA, 89(13):6094-6098, 1992; Curiel, Nat Immun, 13(2-3):141-64, 1994; Muzyczka, Curr Top Microbiol Immunol, 158:97-129, 1992). Details concerning the generation and use of rAAV vectors are described, for example, in U.S. Pat. Nos. 5,139,941 and 4,797,368, each incorporated herein by reference in its entirety for all purposes.

In some embodiments, a retroviral expression vector can be used to introduce a nucleotide sequence encoding one or more transgenes or fragment thereof into a host cell for expression. These systems have been described previously and are generally well known in the art (Nicolas and Rubinstein, In, Rodriguez and Denhardt, eds., Stoneham: Butterworth, pp. 494-513, 1988; Temin, In: Gene Transfer, Kucherlapati (ed.), New York: Plenum Press, pp. 149-188, 1986). Examples of vectors for eukaryotic expression in mammalian cells include ADS, pSVL, pCMV, pRc/RSV, pcDNA3, pBPV, etc., and vectors derived from viral systems such as vaccinia virus, adeno-associated viruses, herpes viruses, retroviruses, etc., using promoters such as CMV, SV40, EF-1, UbC, RSV, ADV, BPV, and β-actin.

Combinations of retroviruses and an appropriate packaging line may also find use, where the capsid proteins will be functional for infecting the target cells. Usually, the cells and viruses will be incubated for at least about 24 hours in the culture medium. The cells are then allowed to grow in the culture medium for short intervals in some applications, e.g., 24-73 hours, or for at least two weeks, and may be allowed to grow for five weeks or more, before analysis. Commonly used retroviral vectors are "defective," i.e., unable to produce viral proteins required for productive infection. Replication of the vector requires growth in the packaging cell line. The host cell specificity of the retrovirus is determined by the envelope protein, env (p120). The envelope protein is provided by the packaging cell line. Envelope proteins are of at least three types, ecotropic, amphotropic and xenotropic. Retroviruses packaged with ecotropic envelope protein, e.g., MMLV, are capable of infecting most murine and rat cell types. Ecotropic packaging cell lines include BOSC23. Retroviruses bearing amphotropic envelope protein, e.g., 4070A, are capable of infecting most mammalian cell types, including human, dog, and mouse. Amphotropic packaging cell lines include PA12 and PA317. Retroviruses packaged with xenotropic envelope protein, e.g., AKR env, are capable of infecting most mammalian cell types, except murine cells. The vectors may include genes that must later be removed, e.g., using a recombinase system such as Cre/Lox, or the cells that express them destroyed, e.g., by including genes that allow selective toxicity such as herpesvirus TK, BCL-xs, etc. Suitable inducible promoters are activated in a desired target cell type, either the transfected cell or progeny thereof.

Non-limiting examples of the vectors useful include retroviral vector SFG.MCS, and helper plasmids RD114, Peg-Pam3 (Arber et al. J Clin Invest 2015 Jan. 2; 125(1): 157-168), lentiviral vector pRRL, and helper plasmids R8.74 and pMD2G (e.g., Addgene Plasmid #12259). In some embodiments, the Sleeping Beauty transposon system can be used (Deniger et al. 2016 Mol Ther. June; 24(6): 1078-1089). In some embodiments, transgenes can be introduced into cells via deforming a cell as it passes through a small opening, disrupting the cell membrane and allowing material to be inserted into the cell, for example, electroporation (Xiaojun et al. 2017 Protein Cell, 8(7): 514-526), or the Cell Squeeze® method. Such electroporation methods of an RNA encoding a transgene allow for transient expression of such transgene in cells which can limit toxicity and other undesirable effects of engineered cells (Barrett et al. 2011 Hum Gene Ther. December; 22 (12): 1575-1586).

Physical methods for introducing a polynucleotide into a host cell include calcium phosphate precipitation, lipofection, particle bombardment, microinjection, electroporation, and the like. Methods for producing cells comprising exogenous vectors and/or nucleic acids are well known in the art. See, for example, Sambrook et al. (2001, Molecular Cloning: A Laboratory Manual, Cold Spring Harbor Laboratory, New York).

Chemical means for introducing a polynucleotide into a host cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as an in vitro and in vivo release vehicle is a liposome (e.g., an artificial membrane vesicle).

In the case where a non-viral delivery system is used, an exemplary delivery vehicle is a liposome. The use of lipid formulations is contemplated for the introduction of the nucleic acids into a host cell (in vitro, ex vivo, or in vivo). In another aspect, the nucleic acid may be associated with a lipid. The nucleic acid associated with a lipid may be encapsulated in the aqueous interior of a liposome, interspersed within the lipid bilayer of a liposome, bound to a liposome via a binding molecule that is associated with both the liposome and the oligonucleotide, entrapped in a liposome, in a complex with a liposome, dispersed in a solution containing a lipid, mixed with a lipid, combined with a lipid, contained as a suspension in a lipid, content or in a complex with a micelle, or associated otherwise with a lipid. The compositions associated with lipids, lipids/DNA or lipids/expression vector are not limited to any particular structure in solution. For example, they can be present in a bilayer structure, as micelles, or with a "collapsed" structure. They can also be simply interspersed in a solution, possibly forming aggregates that are not uniform in size or shape. Lipids are fatty substances that can be natural or synthetic lipids. For example, lipids include fatty droplets that occur naturally in the cytoplasm as well as the class of compounds containing long-chain aliphatic hydrocarbons and their derivatives, such as fatty acids, alcohols, amines, amino alcohols, and aldehydes.

Lipids suitable for use can be obtained from commercial sources. For example, dimyristyl phosphatidylcholine ("DMPC") can be obtained from Sigma, St. Louis, MO; Dicetylphosphate ("DCP") can be obtained from K & K Laboratories (Plainview, NY); Cholesterol ("Choi") can be obtained from Calbiochem-Behring; dimyristyl phosphatidylglycerol ("DMPG") and other lipids can be obtained from Avanti Polar Lipids, Inc. (Birmingham, AL). Lipid stock solutions in chloroform or chloroform/methanol can be stored at about −20° C. Chloroform is used as the sole solvent since it evaporates more easily than methanol. "Liposome" is a generic term that encompasses a variety of unique and multilamellar lipid vehicles formed by the generation of bilayers or closed lipid aggregates. Liposomes can be characterized as having vesicular structures with a bilayer membrane of phospholipids and an internal aqueous medium. Multilamellar liposomes have multiple layers of lipids separated by an aqueous medium. They form spontaneously when phospholipids are suspended in an excess of aqueous solution. The lipid components undergo self-rearrangement before the formation of closed structures and trap dissolved water and solutes between the lipid bilayers (Ghosh et al., 1991 Glycobiology 5: 505-10). However, compositions that have different structures in solution than the normal vesicular structure are also included. For example, lipids can assume a micellar structure or simply exist as nonuniform aggregates of lipid molecules. Lipofectamine-nucleic acid complexes are also contemplated.

Regardless of the method used to introduce exogenous nucleic acids into a host cell, the presence of the recombinant DNA sequence in the host cell can be confirmed by a series of tests. Such assays include, for example, "molecular biology" assays well known to those skilled in the art, such as Southern and Northern blot, RT-PCR and PCR; biochemical assays, such as the detection of the presence or absence of a particular peptide, for example, by immunological means (ELISA and Western blot) or by assays described herein to identify agents that are within the scope of the invention.

Methods of Treatment

The agents described above (e.g., vectors and cells) can be used as immunotherapeutics in treatment of various disease. Accordingly, this disclosure further provides a method of a disorder, such as infection, cancer or a tumor. The method comprises administering a therapeutically effective amount of the composition or the pharmaceutical composition, as described above, to a subject in need thereof.

As used herein, the terms "subject" and "patient" are used interchangeably irrespective of whether the subject has or is currently undergoing any form of treatment. As used herein, the terms "subject" and "subjects" may refer to any vertebrate, including, but not limited to, a mammal (e.g., cow, pig, camel, llama, horse, goat, rabbit, sheep, hamsters, guinea pig, cat, dog, rat, and mouse, a non-human primate (for example, a monkey, such as a cynomolgus monkey, chimpanzee, etc) and a human). The subject may be a human or a non-human. In more exemplary aspects, the mammal is a human. In some embodiments, the subject is a human. In some embodiments, the subject has a cancer. In some embodiments, the subject is immune-depleted.

Cancer

In some embodiments, the agents described above (e.g., vectors and cells) can be used as immunotherapeutics in treating cancer or a tumor. As used herein, "cancer," "tumor," and "malignancy" all relate equivalently to hyperplasia of a tissue or organ. If the tissue is a part of the lymphatic or immune system, malignant cells may include non-solid tumors of circulating cells. Malignancies of other tissues or organs may produce solid tumors. The methods of the present invention may be used in the treatment of lymphatic cells, circulating immune cells, and solid tumors.

Cancers that can be treated include tumors that are not vascularized or are not substantially vascularized, as well as vascularized tumors. Cancers may comprise non-solid tumors (such as hematologic tumors, e.g., leukemias and lymphomas) or may comprise solid tumors. The types of cancers to be treated with the compositions of the present invention include, but are not limited to, carcinoma, blastoma and sarcoma, and certain leukemias or malignant lymphoid tumors, benign and malignant tumors and malignancies, e.g., sarcomas, carcinomas, and melanomas. Also included are adult tumors/cancers and pediatric tumors/cancers.

Hematologic cancers are cancers of the blood or bone marrow. Examples of hematologic (or haematogenous) cancers include leukemias, including acute leukemias (such as acute lymphocytic leukemia, acute myelocytic leukemia, acute myelogenous myelogenous leukemia, promyelocytic, myelomonocytic, monocytic and erythroleukemia), chronic leukemias (such as chronic myelocytic (granulocytic) leukemia, chronic myelogenous leukemia and chronic lymphocytic leukemia), polycythemia vera, lymphoma, Hodgkin's disease, non-Hodgkin's lymphoma (indolent and high-grade forms), myeloma Multiple, Waldenstrom's macroglobulinemia, heavy chain disease, myelodysplastic syndrome, hairy cell leukemia, and myelodysplasia.

Solid tumors are abnormal masses of tissue that usually do not contain cysts or liquid areas. Solid tumors can be benign or malignant. The different types of solid tumors are named for the type of cells that form them (such as sarcomas, carcinomas, and lymphomas). Examples of solid tumors, such as sarcomas and carcinomas, include fibrosarcoma, myxosarcoma, liposarcoma, chondrosarcoma, osteosarcoma and other sarcomas, synovium, mesothelioma, Ewing tumor, leiomyosarcoma, rhabdomyosarcoma, colon carcinoma, lymphoid malignancy, pancreatic cancer, breast cancer, lung cancer, ovarian cancer, prostate cancer, hepatocellular carcinoma, squamous cell carcinoma, basal cell carcinoma, adenocarcinoma, carcinoma of the sweat gland, medullary thyroid carcinoma, papillary thyroid carcinoma, sebaceous gland carcinoma of pheochromocytomas, carcinoma papillary, papillary adenocarcinomas, medullary carcinoma, bronchogenic carcinoma, renal cell carcinoma, hepatoma, bile duct carcinoma, choriocarcinoma, Wilms tumor, cervical cancer, testicular tumor, seminoma, bladder carcinoma, melanoma, and CNS tumors (such as glioma) (such as brainstem glioma and mixed gliomas), glioblastoma (also astrocytoma, CNS lymphoma, germinoma, medulloblastoma, Schwannoma craniopharyngioma, ependymoma, pinealoma, hemangioblastoma, acoustic neuroma, oligodendroglioma, meningioma, neuroblastoma, retinoblastoma, and brain metastasis).

The agents described above can also be used as immunotherapeutics in treatment of infectious disease; for example, in procedures that employ CARs that recognize infectious disease antigens. Accordingly, polypeptides described herein can be made that bind to any of a number of forms of infectious disease antigen, thereby inducing an immune response to the infectious disease antigen upon binding. Infectious disease antigens to which CARs described herein can be designed to bind include, but are not limited to, bacterial antigens, viral antigens, fungal antigens, parasitic antigens, and microbial toxins. Exemplary forms of each class of antigen are considered in greater detail below.

Bacteria

Examples of bacteria (specifically, epitopes thereof) to which polypeptides or CARs of the instant invention may bind include, but are not limited to: *Pseudomonas aeruginosa, Pseudomonas fluorescens, Pseudomonas acidovorans, Pseudomonas alcaligenes, Pseudomonas putida, Stenotrophomonas maltophilia, Burkholderia cepacia, Aeromonas hydrophilia, Escherichia* co/i, *Citrobacterfreundii, Salmonella enterica Typhimurium, Salmonella enterica Typhi, Salmonella enterica* Paratyphi, *Salmonella enterica* Enteritidis, *Shigella dysenteriae,* Shigellaflexneri, *Shigella sonnei, Enterobacter cloacae, Enterobacter aerogenes, Klebsiella pneumoniae, Klebsiella oxytoca, Serratia marcescens, Francisella tularensis, Morganella morganii, Proteus mirabilis, Proteus vulgaris, Providencia alcalifaciens, Providencia rettgeri, Providencia stuartii, Acinetobacter calcoaceticus, Acinetobacter haemolyticus, Yersinia enterocolitica, Yersinia pestis, Yersinia pseudotuberculosis, Yersinia intermedia, Bordetella pertussis, Bordetella parapertussis, Bordetella bronchiseptica, Haemophilus influenzae, Haemophilus parainfluenzae, Haemophilus haemolyticus, Haemophilus parahaemolyticus, Haemophilus ducreyi, Pasteurella multocida, Pasteurella haemolytica, Branhamella catarrhalis, Helicobacter pylori,* Campylobacterfetus, Campylobacterjejuni, *Campylobacter coli, Borrelia burgdorferi, Vibrio cholerae, Vibrio parahaemolyticus, Legionella pneumophila, Listeria monocytogenes, Neisseria gonorrhoeae, Neisseria meningitidis, Gardnerella vaginalis, Bacteroides fragilis, Bacteroides distasonis, Bacteroides* 3452A homology group, *Bacteroides vulgatus, Bacteroides* ovalus, *Bacteroides* thetaiotaomicron, *Bacteroides unformis, Bacteroides eggerthii, Bacteroides splanchnicus, Clostridium difficile, Mycobacterium tuberculosis, Mycobacterium avium, Mycobacterium intracellulare, Mycobacterium leprae, Corynebacterium diphtheriae, Corynebacterium ulcerans, Streptococcus pneumoniae, Streptococcus agalactiae, Streptococcus pyogenes, Enterococcus faecalis, Enterococcus faecium, Staphylococcus aureus, Staphylococcus epidermidis, Staphylococcus saprophyticus, Staphylococcus intermedius, Staphylococcus hyicus* subsp. *hyicus, Staphylococcus haemolyticus, Staphylococcus hominis,* and *Staphylococcus saccharolyticus.* In a particular embodiment, a construct of the invention comprises a binding molecule which binds to Staphylococcal protein A.

Viruses

Examples of viruses (or epitopes thereof) which may be bound by polypeptides or CARs of the instant invention include, but are not limited to: polyomavirus JC (JCV), human immunodeficiency virus type I (HIV I), hepatitis B virus (HBV), hepatitis C virus (HCV), cytomegalovirus (CMV), Epstein Barr virus (EBV), influenza virus hemagglutinin (Genbank accession no. J02132; Air, 1981, Proc. Natl. Acad. Sci. USA 78:7639-7643; Newton et al., 1983, Virology 128:495-501), human respiratory syncytial virus G glycoprotein (Genbank accession no. Z33429; Garcia et al., 1994, J. Virol.; Collins et al., 1984, Proc. Natl. Acad. Sci. USA 81:7683), measles virus hemagglutinin (Genbank accession no. M81899; Rota et al., 1992, Virology 188:135-142), herpes simplex virus type 2 glycoprotein gB (Genbank accession no. M14923; Bzik et al., 1986, Virology 155:322-333), poliovirus I VP1 (Emini et al., 1983, Nature 304:699), envelope glycoproteins of HIV I (Putney et al., 1986, Science 234:1392-1395), hepatitis B surface antigen (Itoh et al., 1986, Nature 308:19; Neurath et al., 1986, Vaccine 4:34), diphtheria toxin (Audibert et al., 1981, Nature 289:543), *streptococcus* 24M epitope (Beachey, 1985, Adv. Exp. Med. Biol. 185:193), gonococcal pilin (Rothbard and Schoolnik, 1985, Adv. Exp. Med. Biol. 185:247), pseudorabies virus g50 (gpD), pseudorabies virus II (gpB), pseudorabies virus gIII (gpC), pseudorabies virus glycoprotein H, pseudorabies virus glycoprotein E, transmissible gastroenteritis glycoprotein 195, transmissible gastroenteritis matrix protein, swine rotavirus glycoprotein 38, swine parvovirus capsid protein, *Serpulina hydodysenteriae* protective antigen, bovine viral diarrhea glycoprotein 55, Newcastle disease virus hemagglutinin neuraminidase, swine flu hemagglutinin, swine flu neuraminidase, foot and mouth disease virus, hog colera virus, swine influenza virus, African swine fever virus, *Mycoplasma* hyopneumoniae, infectious bovine rhinotracheitis virus (e.g., infectious bovine rhinotracheitis virus glycoprotein E or glycoprotein G), or infectious laryngotracheitis virus (e.g., infectious laryngotracheitis virus glycoprotein G or glycoprotein I), a glycoprotein of La Crosse virus (Gonzales Scarano et al., 1982, Virology 120:42), neonatal calf diarrhea virus (Matsuno and Inouye, 1983, Infection and Immunity 39:155), Venezuelan equine encephalomyelitis virus (Mathews and Roehrig, 1982, J. Immunol. 129:2763), punta toro virus (Dalrymple et al., 1981, Replication of Negative Strand Viruses, Bishop and Compans (eds.), Elsevier, N.Y., p. 167), murine leukemia virus (Steeves et al., 1974, J. Virol. 14:187), mouse mammary tumor virus (Massey and Schochetman, 1981, Virology 115:20), hepatitis B virus core protein and/or hepatitis B virus surface antigen or a fragment or derivative thereof (see, e.g., U.K. Patent Publication No. GB 2034323A published Jun. 4, 1980; Ganem and Varmus, 1987, Ann. Rev. Biochem. 56:651 693; Tiollais et al., 1985, Nature 317:489 495), of equine influenza virus or equine herpesvirus (e.g., equine influenza virus type A/Alaska 91 neuraminidase, equine influenza virus type A/Miami 63 neuraminidase, equine influenza virus type A/Kentucky 81 neuraminidase equine herpesvirus type 1 glycoprotein B, and equine herpesvirus type I glycoprotein D, antigen of bovine respiratory syncytial virus or bovine parainfluenza virus (e.g., bovine respiratory syncytial virus attachment protein (BRSV G), bovine respiratory syncytial virus fusion protein (BRSV F), bovine respiratory syncytial virus nucleocapsid protein (BRSV N), bovine parainfluenza virus type 3 fusion protein, the bovine parainfluenza virus type 3 hemagglutinin neuraminidase), bovine viral diarrhea virus glycoprotein 48 or glycoprotein 53, hepatitis type A, influenza, varicella, adenovirus, herpes simplex type I (HSV I), herpes simplex type II (HSV II), rinderpest, rhinovirus, echovirus, rotavirus, respiratory syncytial virus, papilloma virus, papova virus, echinovirus, arbovirus, hantavirus, coxsackie virus, mumps virus, measles virus, rubella virus, polio virus, human immunodeficiency virus type II (HIV II), any picornaviridae, enteroviruses, caliciviridae, any of the Norwalk group of viruses, togaviruses, such as alphaviruses, flaviviruses, coronaviruses, rabies virus, Marburg viruses, ebola viruses, parainfluenza virus, orthomyxoviruses, bunyaviruses, arenaviruses, reoviruses, rotaviruses, orbiviruses, human T cell leukemia virus type I, human T cell leukemia virus type II, simian immunodeficiency virus, lentiviruses, polyomaviruses, parvoviruses, human herpesvirus 6, cercopithecine herpes virus I (B virus), and poxviruses.

In certain embodiments, polypeptides or CARs of the instant invention bind to HIV, inducing an immune response to the virus in a subject to whom the viral vector is administered. Various antigenic domains (e.g., epitopes) of HIV are known in the art and such domains include structural domains such as Gag, Gag-polymerase, Gag-protease, reverse transcriptase (RT), integrase (IN) and Env. The structural domains of HIV are often further subdivided into polypeptides, for example, p55, p24, p6 (Gag); p160, p10, p15, p31, p65 (pol, prot, RT and IN); and gp160, gp120 and gp41 (Ems) or Ogp140 as constructed by Chiron Corporation. Molecular variants of such polypeptides can also be targeted for binding by the polypeptides or CARs of the instant invention, for example, variants such as those described in PCT/US99/31245, PCT/US99/31273 and PCT/US99/31272.

Fungi

Examples of fungi (or epitopes thereof) which may be bound by polypeptides or CARs of the instant invention include, but are not limited to fungi from the genus *Mucor*, *Candida*, and *Aspergillus*, e.g., Mucor racmeosus, *Candida albicans*, and *Aspergillus niger*.

Parasites

Examples of parasites (or epitopes thereof) which may be bound by polypeptides or CARs of the instant invention include, but are not limited to: *Toxoplasma gondii*, *Treponema* pallidun, Malaria, and *Cryptosporidium*.

Microbial Toxins

Examples of microbial toxins (or epitopes thereof) which may be bound by polypeptides or CARs of the instant invention include, but are not limited to: toxins produced by *Bacillus anthracis, Bacillus cereus, Bordatella pertussis, Clostridium botulinum, Clostridium perfringens, Clostridium tetani, Croynebacterium diptheriae, Salmonella* sp. *Shigella* sp., Staphyloccus sp., and *Vibrio cholerae*. Toxins such as ricin from jack bean and other naturally occurring (e.g., produced by an organism) and man-made toxins or portions thereof may also be bound by the polypeptides or CARs of the instant invention.

The pharmaceutical compositions, as described, can be administered in a manner appropriate to the disease to be treated (or prevented). The amount and frequency of administration will be determined by factors such as the condition of the patient, and the type and severity of the patient's disease, although appropriate dosages can be determined by clinical trials.

When "an immunologically effective amount," "an effective antitumor quantity," "an effective tumor-inhibiting amount" or "therapeutic amount" is indicated, the precise amount of the compositions of the present invention to be administered can be determined by a physician having account for individual differences in age, weight, tumor size, extent of infection or metastasis, and patient's condition (subject). It can generally be stated that a pharmaceutical composition comprising the lymphocytes described herein can be administered at a dose of $10^4$ to $10^9$ cells/kg body weight, e.g., $10^5$ to $10^6$ cells/kg body weight, including all values integers within these intervals. The lymphocyte compositions can also be administered several times at these dosages. The cells can be administered using infusion techniques that are commonly known in immunotherapy (see, e.g., Rosenberg et al., New Eng. J. of Med. 319: 1676, 1988). The optimal dose and treatment regimen for a particular patient can be readily determined by one skilled in the art of medicine by monitoring the patient for signs of the disease and adjusting the treatment accordingly.

The administration of the present compositions can be carried out in any convenient way, including infusion or injection (i.e., intravenous, intrathecal, intramuscular, intraluminal, intratracheal, intraperitoneal, or subcutaneous), transdermal administration, or other methods known in the art. Administration can be once every two weeks, once a week, or more often, but the frequency may be decreased during a maintenance phase of the disease or disorder. In some embodiments, the composition is administered by intravenous infusion.

In certain cases, the cells activated and expanded using the methods described herein, or other methods known in the art wherein the lymphocytes are expanded to therapeutic levels, are administered to a patient together with (e.g., before, simultaneously or after) any number of relevant treatment modalities. Also described herein, the lymphocytes can be used in combination with chemotherapy, radiation, immunosuppressive agents, such as cyclosporin, azathioprine, methotrexate, mycophenolate, and FK506, antibodies, or other immunoablating agents such as CAMPATH, anti-cancer antibodies. CD3 or other antibody therapies, cytoxine, fludarabine, cyclosporine, FK506, rapamycin, mycophenolic acid, steroids, FR901228, cytokines, and irradiation.

The compositions of the present invention can also be administered to a patient together with (e.g., before, simultaneously or after) bone marrow transplantation, therapy with T lymphocyte ablation using chemotherapy agents such as fludarabine, radiation therapy external beam (XRT), cyclophosphamide, or antibodies such as OKT3 or CAMPATH. Also described herein, the compositions can be administered after ablative therapy of B lymphocytes, such as agents that react with CD20, for example, Rituxan. For example, subjects may undergo standard treatment with high-dose chemotherapy followed by transplantation of peripheral blood stem cells. In certain cases, after transplantation, the subjects receive an infusion of the expanded lymphocytes, or the expanded lymphocytes are administered before or after surgery.

In some embodiments, the method may further include administering to the subject a second therapeutic agent. The second therapeutic agent is an anti-cancer or anti-tumor agent. In some embodiments, the composition is administered to the subject before, after, or concurrently with the second therapeutic agent, including chemotherapeutic agents and immunotherapeutic agents.

In some embodiments, the method further comprises administering a therapeutically effective amount of an immune checkpoint modulator. Examples of the immune checkpoint modulator may include PD1, PDL1, CTLA4, TIM3, LAG3, and TRAIL. The checkpoint modulators may be administered simultaneously, separately, or concurrently with the composition of the present invention.

A "chemotherapeutic agent" is a chemical compound useful in the treatment of cancer. Examples of chemotherapeutic agents include alkylating agents such as thiotepa and cyclophosphamide (CYTOXANTM); alkyl sulfonates such as busulfan, improsulfan and piposulfan; aziridines such as benzodopa, carboquone, methyldopa, and uredopa; ethylenimines and methylamelamines including altretamine, triethylenemelamine, trietylenephosphoramide, triethylenethiophosphaoramide and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CBI-TMI); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as the enediyne antibiotics (e.g. calicheamicin, see, e.g., Agnew Chem. Intl. Ed. Engl. 33:183-186 (1994); dynemicin, including dynemicin A; an esperamicin; as well as neocarzinostatin chromophore and related chromoprotein enediyne antibiotic chromomophores), aclacinomysins, actinomycin, authramycin, azaserine, bleomycins, cactinomycin, carabicin, caminomycin, carzinophilin, chromomycins, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidamine; maytansinoids such as maytansine and ansamitocins; mitoguazone; mitoxantrone; mopidamol; nitracrine; pentostatin; phenamet; pirarubicin; podophyllinic acid; 2-ethylhydrazide; procarbazine; PSK®; razoxane; rhizoxin; sizofuran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g. paclitaxel (TAXOL®) and doxetaxel (TAXOTERE®); chlorambucil; gemcitabine; 6-thioguanine; mercaptopurine; methotrexate; platinum analogs such as cisplatin and carboplatin; vinblastine; platinum; etoposide (VP-16); ifosfamide; mitomycin C; mitoxantrone; vincristine; vinorelbine; navelbine; novantrone; teniposide; daunomycin; aminopterin; xeloda; ibandronate; CPT-11; topoisomerase inhibitor RFS 2000; difluoromethylornithine (DMFO); retinoic acid; capecitabine; and pharmaceutically acceptable salts, acids or derivatives of any of the above. Also included in this definition are anti-hormonal agents that act to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY117018, onapristone, and toremifene (Fareston); and anti-androgens such as flutamide, nilutamide, bicalutamide, leuprolide, xeloda, gemcitabine, KRAS mutation covalent inhibitors and goserelin; and pharmaceutically acceptable salts, acids or derivatives of any of the above. Additional examples include irinotecan, oxaliplatinum, and other standard colon cancer regimens.

An "immunotherapeutic agent" is a biological agent useful in the treatment of cancer. Examples of immunotherapeutic agents include atezolizumab, avelumab, blinatumomab, daratumumab, cemiplimab, durvalumab, elotuzumab, laherparepvec, ipilimumab, nivolumab, obinutuzumab, ofatumumab, pembrolizumab, cetuximab, and talimogene.

In the examples below, one approach described above was used for enhancing adoptive immunotherapy efficacy for cancer that expresses tumor-associated antigen NY-ESO-1 in the context of HLA-A0201 through engineering T cells with a TCR-based chimeric antigen receptor that holds high affinity and specificity to NY-ESO-1 in the context of HLA-A0201.

NY-ESO-1 is a protein normally expressed only in fetal and testicular tissue, but aberrantly expressed by some solid malignancies. This added NY-ESO-1 to a growing list of molecules expressed appropriately in the germ line and abnormally by some cancers. These molecules were termed "cancer/testis" antigens, and are capable of serving as targets for antigen-directed immunotherapies. The cancer-testis antigen NY-ESO-1 is expressed by many solid tumors and has limited expression by mature somatic tissues, making it a highly attractive target for tumor immunotherapy. Targeting NY-ESO-1 using engineered T cells has demonstrated clinical efficacy in the treatment of some adult tumors.

The approach involves: (1) integrating TCR co-stimulation signaling element in the CAR design; (2) creating a vector nucleic acid sequence that comprises two or more nucleic acid sequences that encode identical polypeptide sequences, by silently mutating one of the exogenous nucleic acid sequences using degenerate codons for the purpose of reducing the homology between the two nucleic acid sequences while maintaining the encoded polypeptide sequence; (3) integrating repeat units of TCR co-stimulation signaling elements of human CD28, or human 4-1BB or a combination of the two; and (4) comprising a same or different transmembrane domains in a same TCR-CAR construct. Specific nucleic acid sequences of such CAR genes are also disclosed. This approach created TCR-based CARs with the anti-NY-ESO-1 specificity by employing the EC domains of the alpha chain and beta chain of the 1G4 195LY TCR and incorporating TCR signaling element CD3Z or CD3E together with co-stimulating element CD28, or 4-1BB, or a combination of CD28 and 4-1BB in order to enhance TCR-CAR expressing T cell activation via TCR-CAR-mediated stimulation. This leads to increased anti-tumor activity in patients.

Definitions

A T-cell receptor or TCR is a protein complex found on the surface of T cells, or T lymphocytes, that is responsible for recognizing fragments of antigen as peptides bound to MHC molecules. The binding between TCR and antigen peptides is of relatively low affinity and is degenerate: that is, many TCRs recognize the same antigen peptide and many antigen peptides are recognized by the same TCR. A majority of T cells have a TCR existing as a complex of several proteins. A TCR is composed of two different protein chains. In humans, in 95% of T cells the TCR consists of an alpha (a) chain and a beta (p) chain (encoded by TRA and TRB, respectively), whereas in 5% of T cells the TCR consists of gamma and delta (γ/δ) chains (encoded by TRG and TRD, respectively). This ratio changes during ontogeny and in diseased states (such as leukemia). It also differs between species. Each chain of a TCR is composed of two extracellular domains: variable (V) region and a constant (C) region. The constant region is proximal to the cell membrane, followed by a transmembrane region and a short cytoplasmic tail, while the variable region binds to the peptide/MHC complex. For the purpose of the present invention, the term "constant region of a T cell receptor chain or a portion thereof" also includes embodiments wherein the constant region of a T cell receptor chain is (from N terminus to C terminus) followed by a transmembrane region and a cytoplasmic tail, such as a transmembrane region and a cytoplasmic tail which are naturally linked to the constant region of a T cell receptor chain.

The term "antigen receptor" or "antigen recognizing receptor" as used herein refers to a receptor that is capable of activating an immune cell (e.g., a T-cell) in response to antigen binding. In particular, the term "antigen receptor" includes engineered receptors, which confer an arbitrary specificity onto an immune effector cell such as a T cell. An antigen receptor according to the invention may be present on T cells, e.g. instead of or in addition to the T cell's own T cell receptor. Such T cells do not necessarily require processing and presentation of an antigen for recognition of the target cell but rather may recognize preferably with specificity any antigen present on a target cell. Preferably, said antigen receptor is expressed on the surface of the cells. Specifically, the term includes artificial or recombinant receptors comprising a single molecule or a complex of molecules which recognize, i.e. bind to, a target structure (e.g. an antigen) on a target cell (e.g. by binding of an antigen binding site or antigen binding domain to an antigen expressed on the surface of the target cell) and may confer specificity onto an immune effector cell such as a T cell expressing said antigen receptor on the cell surface. Preferably, recognition of the target structure by an antigen receptor results in activation of an immune effector cell expressing said antigen receptor. An antigen receptor may comprise one or more protein units said protein units comprising one or more domains as described herein. The term "antigen receptor" preferably does not include naturally occurring T cell receptors. According to the invention, the term "antigen receptor" is preferably synonymous with the terms "chimeric antigen receptor", "chimeric T cell receptor" and "artificial T cell receptor."

Exemplary antigen recognizing receptors may be native or genetically engineered TCRs, or genetically engineered TCR-like mAbs (Hoydahl et al. Antibodies 2019 8:32) or CARs in which a tumor antigen-binding domain is fused to an intracellular signaling domain capable of activating an immune cell (e.g., a T-cell). T-cell clones expressing native TCRs against specific cancer antigens have been previously disclosed (Traversari et al, J Exp Med, 1992 176:1453-7; Ottaviani et al, Cancer Immunol Immunother, 2005 54:1214-20; Chaux et al, J Immunol, 1999 163:2928-36; Luiten and van der Bruggen, Tissue Antigens, 2000 55:149-52; van der Bruggen et al, Eur J Immunol, 1994 24:3038-43; Huang et al, J Immunol, 1999 162:6849-54; Ma et al, Int J Cancer, 2004 109:698-702; Ebert et al, Cancer Res, 2009 69:1046-54; Ayyoub et al J Immunol 2002 168:1717-22; Chaux et al, European Journal of Immunology, 2001 31:1910-16; Wang et al, Cancer Immunol Immunother, 2007 56:807-18; Schultz et al, Cancer Research, 2000 60:6272-75; Cesson et al, Cancer Immunol Immunother, 2010 60:23-25; Zhang et al, Journal of Immunology, 2003 171:219-25; Gnjatic et al, PNAS, 2003 100:8862-67; Chen et al, PNAS, 2004.

The term "Chimeric Antigen Receptor" or "CAR" refers to a set of polypeptides, typically two in the simplest embodiments, which when in an immune effector cell, provides the cell with specificity for a target cell and with intracellular signal generation. In some embodiments, a CAR comprises at least an extracellular antigen binding domain, a transmembrane domain and a cytoplasmic signaling domain (also referred to herein as "an intracellular signaling domain") comprising a functional signaling domain derived from a stimulatory molecule and/or costimulatory molecule as defined below. In some embodiments, the set of polypeptides are in the same polypeptide chain, e.g., comprise a chimeric fusion protein. In some embodiments, the set of polypeptides are not contiguous with each other, e.g., are in different polypeptide chains. In some embodiments, the set of polypeptides include a dimerization switch that, upon the presence of a dimerization molecule, can couple the polypeptides to one another, e.g., can couple an antigen-binding domain to an intracellular signaling domain. In one aspect, the stimulatory molecule of the CAR is the zeta chain associated with the T cell receptor complex (e.g., CD3 zeta). In one aspect, the cytoplasmic signaling domain comprises a primary signaling domain (e.g., a primary signaling domain of CD3-zeta). In one aspect, the cytoplasmic signaling domain further comprises one or more functional signaling domains derived from at least one costimulatory molecule as defined below. In one aspect, the costimulatory molecule is chosen from the costimulatory molecules described herein, e.g., 4-1BB (i.e., CD137), CD27, and/or CD28.

The term "TCR-based CAR" or "TCR-CAR" refers to a CAR that comprises an antigen-binding domain formed by TCR α, β, γ, or δ chains or antigen-binding portions thereof.

The term "stimulatory molecule," refers to a molecule expressed by an immune cell, (e.g., T cell, NK cell, or B cell) that provides the cytoplasmic signaling sequence(s) that regulate activation of the immune cell in a stimulatory way for at least some aspect of the immune cell-signaling pathway. In one aspect, the signal is a primary signal that is initiated by, for instance, binding of a TCR/CD3 complex with an MHC molecule loaded with peptide, and which leads to mediation of a T cell response, including, but not limited to, proliferation, activation, differentiation, and the like. A primary cytoplasmic signaling sequence (also referred to as a "primary signaling domain") that acts in a stimulatory manner may contain a signaling motif, which is known as immunoreceptor tyrosine-based activation motif or ITAM. Examples of an ITAM containing cytoplasmic signaling sequence that is of particular use in the invention includes, but is not limited to, those derived from CD3 zeta, common FcRγ (FCER1G), FcγRIIa, FcR β (FcRlb), CD3γ, CD3Δ, CD3ε, CD79a, CD79b, DAP10, and DAP12. In a specific CAR of the invention, the intracellular signaling domain in any one or more CARS of the invention comprises an intracellular signaling sequence, e.g., a primary signaling sequence of CD3-zeta. In a specific CAR of the invention, the primary signaling sequence of CD3-zeta is the sequence provided herein or the equivalent residues from a non-human species, e.g., mouse, rodent, monkey, ape and the like. In a specific CAR of the invention, the primary signaling sequence of CD3-zeta is the sequence as provided herein, or the equivalent residues from a non-human species, e.g., mouse, rodent, monkey, ape and the like.

The term "costimulatory molecule" refers to the cognate binding partner on a T cell that specifically binds with a costimulatory ligand, thereby mediating a costimulatory response by the T cell, such as, but not limited to, proliferation. Costimulatory molecules are cell surface molecules other than antigen receptors or their ligands that contribute to an efficient immune response. Costimulatory molecules include, but are not limited to an MHC class I molecule, TNF receptor proteins, Immunoglobulin-like proteins, cytokine receptors, integrins, signaling lymphocytic activation molecules (SLAM proteins), activating NK cell receptors, BTLA, a Toll ligand receptor, OX40, CD2, CD7, CD27, CD28, CD30, CD40, CDS, ICAM-1, LFA-1 (CD11a/CD18), 4-1BB/CD137, B7-H3, CDS, ICAM-1, ICOS (CD278), GITR, BAFFR, LIGHT, HVEM (LIGHTR), KIRDS2, SLAMF7, NKp80 (KLRF1), NKp44, NKp30, NKp46, CD19, CD4, CD8alpha, CD8beta, IL2R beta, IL2R gamma, IL7R alpha, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, NKG2D, NKG2C, TNFR2, TRANCE/RANKL, DNAM1 (CD226), SLAMF4 (CD244, 2B4), CD84, CD96 (Tactile), CEACAMI, CRTAM, Ly9 (CD229), CD160 (BY55), PSGL1, CD100 (SEMA4D), CD69, SLAMF6 (NTB-A, Ly108), SLAM (SLAMFI, CD150, IPO-3), BLAME (SLAMF8), SELPLG (CD162), LTBR, LAT, GADS, SLP-76, PAG/Cbp, CD19a, and a ligand that specifically binds with CD83.

A costimulatory intracellular signaling domain refers to the intracellular portion of a costimulatory molecule. The intracellular signaling domain can comprise the entire intracellular portion, or the entire native intracellular signaling domain, of the molecule from which it is derived, or a functional fragment or derivative thereof As used herein, two polypeptide (or nucleic acid) sequences are "substantially different" means that the two sequences are less than 95%, (e.g., 90%, 85%, 80%, 75%, 70%, 65%, 60%, 55%, or 50%) identical to each other.

The term "functional variant" as used herein refers to a modified polypeptide or protein or transgene having substantial or significant sequence identity or similarity to a wild type, such functional variant retaining the biological activity of the wild type polypeptide or protein or transgene of which it is a variant. In some embodiments, functional variants of therapeutic polypeptide or protein or transgenes are used.

A conservative modification or functional equivalent of a peptide, polypeptide, or protein disclosed in this invention refers to a polypeptide derivative of the peptide, polypeptide, or protein, e.g., a protein having one or more point mutations, insertions, deletions, truncations, a fusion protein, or a combination thereof. It retains substantially the activity to of the parent peptide, polypeptide, or protein (such as those disclosed in this invention). In general, a conservative modification or functional equivalent is at least 60% (e.g., any number between 60% and 100%, inclusive, e.g., 60%, 70%, 75%, 80%, 85%, 90%, 95%, 96%, 97%, 98%, and 99%) identical to a parent (e.g., one of those described herein) Accordingly, within scope of this invention are hinge regions having one or more point mutations, insertions, deletions, truncations, a fusion protein, or a combination thereof.

Amino acid substitutions can be made, in some cases, by selecting substitutions that do not differ significantly in their effect on maintaining (a) the structure of the peptide backbone in the area of the substitution, (b) the charge or hydrophobicity of the molecule at the target sit; or (c) the bulk of the side chain. For example, naturally occurring residues can be divided into groups based on side-chain properties; (1) hydrophobic amino acids (norleucine, methionine, alanine, valine, leucine, and isoleucine); (2) neutral hydrophilic amino acids (cysteine, serine, threonine, asparagine, and glutamine); (3) acidic amino acids (aspartic acid and glutamic acid); (4) basic amino acids (histidine, lysine, and arginine); (5) amino acids that influence chain orientation (glycine and proline); and (6) aromatic amino acids (tryptophan, tyrosine, and phenylalanine). Substitutions made within these groups can be considered conservative substitutions. Examples of substitutions include, without limitation, substitution of valine for alanine, lysine for arginine, glutamine for asparagine, glutamic acid for aspartic acid, serine for cysteine, asparagine for glutamine, aspartic acid for glutamic acid, proline for glycine, arginine for histidine, leucine for isoleucine, isoleucine for leucine, arginine for lysine, leucine for methionine, leucine for phenylalanine, glycine for proline, threonine for serine, serine for threonine, tyrosine for tryptophan, phenylalanine for tyrosine, and/or leucine for valine. Exemplary substitutions are shown in the Table below. Amino acid substitutions may be introduced into a parent protein and the products screened for retention of the biological activity of the parent protein.

| Original Residue | Exemplary Substitutions |
| --- | --- |
| Ala (A) | Val; Leu; Ile |
| Arg (R) | Lys; Gln; Asn |
| Asn (N) | Gln; His; Asp, Lys; Arg |
| Asp (D) | Glu; Asn |
| Cys (C) | Ser; Ala |
| Gln (Q) | Asn; Glu |
| Glu (E) | Asp; Gln |
| Gly (G) | Ala |
| His (H) | Asn; Gln; Lys; Arg |
| Ile (I) | Leu; Val; Met; Ala; Phe; Norleucine |
| Leu (L) | Norleucine; Ile; Val; Met; Ala; Phe |
| Lys (K) | Arg; Gln; Asn |
| Met (M) | Leu; Phe; Ile |
| Phe (F) | Trp; Leu; Val; Ile; Ala; Tyr |
| Pro (P) | Ala |
| Ser (S) | Thr |
| Thr (T) | Val; Ser |
| Trp (W) | Tyr; Phe |
| Tyr (Y) | Trp; Phe; Thr; Ser |
| Val (V) | Ile; Leu; Met; Phe; Ala; Norleucine |

As used herein, the percent homology between two amino acid sequences is equivalent to the percent identity between the two sequences. The percent identity between the two sequences is a function of the number of identical positions shared by the sequences (i.e., % homology=# of identical positions/total # of positions×100), taking into account the number of gaps, and the length of each gap, which need to be introduced for optimal alignment of the two sequences. The comparison of sequences and determination of percent identity between two sequences can be accomplished using a mathematical algorithm, as described in the non-limiting examples below.

The percent identity between two amino acid sequences can be determined using the algorithm of E. Meyers and W. Miller (Comput. Appl. Biosci., 4:11-17 (1988)) which has been incorporated into the ALIGN program (version 2.0), using a PAM120 weight residue table, a gap length penalty of 12 and a gap penalty of 4. In addition, the percent identity between two amino acid sequences can be determined using the Needleman and Wunsch (J. Mol. Biol. 48:444-453 (1970)) algorithm which has been incorporated into the GAP program in the GCG software package (available at www.gcg.com), using either a Blossum 62 matrix or a PAM250 matrix, and a gap weight of 16, 14, 12, 10, 8, 6, or 4 and a length weight of 1, 2, 3, 4, 5, or 6.

As used herein, the term "antibody" means not only intact antibody molecules, but also fragments of antibody molecules that retain immunogen-binding ability. Such fragments are also well known in the art and are regularly employed both in vitro and in vivo. Accordingly, as used herein, the term "antibody" means not only intact immunoglobulin molecules but also the well-known active fragments f(ab')2, and fab. F(ab')2, and fab fragments that lack the Fc fragment of intact antibody, clear more rapidly from the circulation and may have less non-specific tissue binding of an intact antibody (Wahl et al., J. Nucl. Med. 24:316-325 (1983). The antibodies of the invention comprise whole native antibodies, bispecific antibodies; chimeric antibodies; fab, fab', single-chain v region fragments, fusion polypeptides, and unconventional antibodies.

As used herein, the term "single-chain variable fragment" or "scFv" is a fusion protein of the variable regions of the heavy (VH) and light chains (VL) of an immunoglobulin covalently linked to form a VH::VL heterodimer. The heavy (VH) and light chains (VL) are either joined directly or joined by a peptide-encoding linker (e.g., 10, 15, 20, 25 amino acids), which connects the n-terminus of the VH with the C-terminus of the VL, or the C-terminus of the VH with the N-terminus of the VL. The linker is usually rich in glycine for flexibility, as well as serine or threonine for solubility. Despite removal of the constant regions and the introduction of a linker, scFv proteins retain the specificity of the original immunoglobulin. Single-chain Fv polypeptide antibodies can be expressed from a nucleic acid including VH- and VL-encoding sequences as described by Huston, et al. (Proc. Nat. Acad. Sci., 85:5879-5883, 1988). See, also, U.S. Pat. Nos. 5,091,513, 5,132,405 and 4,956,778; and US patent publication nos. 20050196754 and 20050196754. Antagonistic scFvs having inhibitory activity have been described (see, e.g., Zhao et al., Hybridoma (Larchmont) 2008 27(6):455-51; Peter et al., J cachexia sarcopenia muscle 2012 Aug. 12; Shieh et al., J Immunol 2009 183(4):2277-85; Giomarelli et al., Thromb Haemost 2007 97(6):955-63; Fife et al., J Clin Invst 2006 116(8):2252-61; Brocks et al., Immunotechnology 1997 3(3):173-84; Moosmayer et al., Ther Immunol 1995 2(10:31-40). Agonistic scFvs having stimulatory activity have been described (see, e.g., Peter et al., J Biol Chem 2003 25278 (38):36740-7; Xie et al., Nat Biotech 1997 15(8):768-71; Ledbetter et al., Crit Rev Immunol 1997 17(5-6):427-55; Ho et al., Biochim Biophys Acta 2003 1638(3):257-66).

"Treating" or "treatment" as used herein refers to administration of a compound or agent to a subject who has a disorder with the purpose to cure, alleviate, relieve, remedy, delay the onset of, prevent, or ameliorate the disorder, the symptom of a disorder, the disease state secondary to the disorder, or the predisposition toward the disorder.

An "effective amount" or "therapeutically effective amount" refers to an amount of the compound or agent that is capable of producing a medically desirable result in a treated subject. The treatment method can be performed in vivo or ex vivo, alone or in conjunction with other drugs or therapy. A therapeutically effective amount can be administered in one or more administrations, applications or dosages and is not intended to be limited to a particular formulation or administration route.

The term "effective amount," "effective dose," or "effective dosage" is defined as an amount sufficient to achieve or at least partially achieve a desired effect. A "therapeutically effective amount" or "therapeutically effective dosage" of a drug or therapeutic agent is any amount of the drug that, when used alone or in combination with another therapeutic agent, promotes disease regression evidenced by a decrease in severity of disease symptoms, an increase in frequency and duration of disease symptom-free periods, or a prevention of impairment or disability due to the disease affliction. A "prophylactically effective amount" or a "prophylactically effective dosage" of a drug is an amount of the drug that, when administered alone or in combination with another therapeutic agent to a subject at risk of developing a disease or of suffering a recurrence of disease, inhibits the development or recurrence of the disease. The ability of a therapeutic or prophylactic agent to promote disease regression or inhibit the development or recurrence of the disease can be evaluated using a variety of methods known to the skilled practitioner, such as in human subjects during clinical trials, in animal model systems predictive of efficacy in humans, or by assaying the activity of the agent in in vitro assays.

As used herein, the term "pharmaceutically acceptable" refers to a material, such as a carrier or diluent, which does not abrogate the biological activity or properties of the composition, and is relatively non-toxic, i.e., the material may be administered to an individual without causing undesirable biological effects or interacting in a deleterious manner with any of the components of the composition in which it is contained.

The term "pharmaceutically acceptable carrier" includes a pharmaceutically acceptable salt, pharmaceutically acceptable material, composition or carrier, such as a liquid or solid filler, diluent, excipient, solvent or encapsulating material, involved in carrying or transporting a compound(s) of the present invention within or to the subject such that it may perform its intended function. Typically, such compounds are carried or transported from one organ, or portion of the body, to another organ, or portion of the body. Each salt or carrier must be "acceptable" in the sense of being compatible with the other ingredients of the formulation, and not injurious to the subject. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; diluent; granulating agent; lubricant; binder; disintegrating agent; wetting agent; emulsifier; coloring agent; release agent; coating agent; sweetening agent; flavoring agent; perfuming agent; preservative; antioxidant; plasticizer; gelling agent; thickener; hardener; setting agent; suspending agent; surfactant; humectant; carrier; stabilizer; and other non-toxic compatible substances employed in pharmaceutical formulations, or any combination thereof. As used herein, "pharmaceutically acceptable carrier" also includes any and all coatings, antibacterial and antifungal agents, and absorption delaying agents, and the like that are compatible with the activity of the compound, and are physiologically acceptable to the subject. Supplementary active compounds may also be incorporated into the compositions.

As used herein, the term "approximately" or "about," as applied to one or more values, refers to a value that is similar to a stated reference value. In some embodiments, the term "approximately" or "about" refers to a range of values that fall within 25%, 20%, 19%, 18%, 17%, 16%, 15%, 14%, 13%, 12%, 11%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Unless indicated otherwise herein, the term "about" is intended to include values, e.g., weight percents, proximate to the recited range that are equivalent in terms of the functionality of the individual ingredient, the composition, or the embodiment. It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

EXAMPLES

Example 1. Construction of Anti-NY-ESO-1 TCR-, Anti-NY-ESO-1 TCR-CAR-, Anti-Mesothelin CAR-, and GFP-Based MFG-Retroviral Vectors Construction of Retroviral Constructs For constitutive expression of genes of interest in T cells, both an MFG retroviral backbone originally developed by Dr. Mulligan (FIG. 1C), and an SFG retroviral backbone (U.S. Pat. No. 6,140,111) were used to construct recombinant retroviral vectors encoding the genes of interest, such a TCR of native form (NT1, NT1b) or TCR-CAR (NT2, NT3, NT4, NT5, NT6, NT21, NT22, NT23, NT24, NT25, NT26, NT27, and T28) specific to human NY-ESO-1 derived peptide/A2 complex (FIGS. 1A and 1B and Table 1).

The GFP was used as marker to chase GFP-based vector-transduced T cells by flow cytometry (FACS) and/or by fluorescent microscope. The anti-human mesothelin sFv (Genflank TD: AF035617.1) with high affinity for human mesothelin (Chowdhury P S et al. Proc Natl Acad Sci USA. 1998; 95:669-74) was chosen for the construction of anti-mesothelin-based CARs. Such usage of anti-mesothelin sFv was described previously in successfully creating functional anti-mesothelin CARs of $2^{nd}$ and $3^{rd}$ gen (Carpenito C. et al. Proc Natl Acad Sci USA. 2009; 106:3360-5).

Recombination between nucleic acids is a well-established phenomenon in molecular biology. Genetic recombination that requires strong sequence homology between participating nucleic acid sequences to occur is generally referred to as homologous recombination. While most genetic knockout strategies employ homologous recombination to achieve a targeted knockout, in certain systems the occurrence of genetic recombination can impact genetic manipulations detrimentally. In particular, homologous recombination events can adversely impact construction and production of vectors, particularly viral vectors (e.g., adenovirus, retrovirus, adeno-associated virus, herpes virus, etc.), where it is often desirable to maintain highly homologous sequences (e.g., identical polypeptide sequences) within a single, stable viral vector free of homologous recombination during, e.g., passage and/or propagation of viral vector through one or more host cells and/or organisms.

TABLE 1

List of genes encoding anti-NY-ESO-1 TCR, anti-NY-ESO-1 TCR-CARs, anti-mesothelin CARs, and GFP.

| # | Vector Code | Name | Short Name | SEQ ID NO | REF (# oF FIGS.) |
|---|---|---|---|---|---|
| 1 | NTI | aNYnativeTCRa/b | aNY-TCRa/b | 9, 12 | 1, 2, 3 |
| 2 | NT1b | aNYnativeTCRb/a | aNY-TCRb/a | 64, 65 | 1, 2, 3b |
| 3 | NT2 | aNY-bCD28tmcytZcyt/ aCD28tmcytZcyt | aNY-b/a28tm28Z | 10, 13 | 1, 2, 4 |
| 4 | NT3 | aNY-bCD28tmcytEcyt/ aCD28tmcytEcyt | aNY-b/a28tm28E | 11, 14 | 1, 2, 5 |
| 5 | NT4 | aNY-bCD8tmBBcytZcyt/ aCD8tmBBcytZcyt | aNY-b/a8tmBBZ | 32, 54 | 1b, 16 |
| 6 | NT5 | aNY-bCD28tmBBcytZcyt/ aCD28tmBBcytZcyt | aNY-b/a28tmBBZ | 33, 55 | 1b, 17 |
| 7 | NT6 | aNY-bCD28tmCytBBcytZcyt/ aCD28tmcytBBcytZcyt | aNY-b/a28tm28BBZ | 34, 56 | 1b, 18 |
| 8 | NT21 | aNY-bCD28tmCytZcyt/ aCD8tmBBcytZcyt | aNY-b28tm28Z/a8tmBBZ | 35, 57 | 1b, 19 |
| 9 | NT22 | aNY-bCD28tmCytBBcytZcyt/ aCD28tmcytBBcyt | aNY-b28tm28Z/a8tmBB | 36, 58 | 1b, 20 |
| 10 | NT23 | aNY-bCD28tmcytZcyt/ aCD28tmBBcytZcyt | aNY-b28tm28Z/a28tmBBZ | 37, 59 | 1b, 21 |
| 11 | NT24 | aNY-bCD8tmCD2 8cytZcyt/ aCD8tmBBcytZcyt | aNY-b8tm28Z/a8tmBBZ | 38, 60 | 1b, 22 |
| 12 | NT25 | aNY-bCD8tmcytcytZcyt/ aCD8tmBBcytcytZcyt | aNY-b8tm2828Z/a8tmBBBBZ | 39, 61 | 1b, 23 |
| 13 | NT26 | aNY-bCD8hCD28pectmcytZcyt/ aCD 8hCD2 8pectmcytZcyt | aNY-b/a8h28pectm28Z | 40, 62 | 1b, 24 |
| 14 | NT27 | aNY-bCD8hCD28pectmcytZcyt/ aCD8tmBBcyt | aNY-b8h28pectm28Z/a8tmBB | 41, 63 | 1b, 25 |
| 15 | NT28 | aNY-bCD8hCD28pectmcytZcyt/ aCD8hCD2 8pectmBBcyt aEBV-bCD8tmBBcytZcyt/aCD 8t mCD28cyt | aNY-b8h28pectmcytZ/ab8h28pe ctmBBaEBV-b8tmBBZ/aCD8tm28 | | 1b |

An approach previously described (U.S. Pat. No. 9,206, 440) was employed for the vector designs for overcoming such problems associated with potential homologous recombination between nucleic acids is to enable delivery of two or more nucleic acid sequences encoding for highly homologous (e.g., identical) polypeptide fragments in a single protein molecule on a single viral vector. In such an approach, the silent mutation method at the nucleotide sequence level is employed to produce viral vector sequences comprising of nucleic acid sequences encoding two or more highly homologous (e.g., identical) polypeptides or polypeptide domains thereof, yet that possess reduced risk of homologous recombination between such nucleic acid sequences, even during, e.g., extended passage in host cells and/or multiple infection, chromosomal integration, and/or excision events.

A mutated TCR that recognizes the peptide SLLMWITQC (SEQ ID NO: 25), corresponding to residues 157 to 165 of NY-ESO-1 (NY-ESO-1:157-165) with high affinity, in the context of the HLA-A*0201 class I restriction element, was previously described (Robbins P F et al., J Clin Oncol. 2011; 29:917-24; and Robbins P F et al., J Immunol. 2008; 180:6116-6131). This TCR, termed 1G4-α95LY, contains two amino acid substitutions in the third complementarity determining region of the native 1G4 TCR a chain that conferred to CD8+ and CD4+ T cells, an enhanced ability to recognize HLA-A*0201-positive target cells expressing the NY-ESO-1 antigen. The entire alpha chain and beta chain (SEQ ID NO: 1 and SEQ ID NO: 2), or their extracellular domains of the TCR IG4-α95LY (SEQ ID NO: 4 and SEQ ID NO: 5) were initially made use of for the generation of two anti-NY-ESO-1 TCRs of native form IG4-a95LY TCR (NT1, NT1b) (SEQ ID NO: 9, 64) or two TCR-CARs (IG4-a95LY TCR-CAR) (NT2; IG4-a95LY TCR-based CAR-CD28Z (aNY-b/a28tm28Z), (SEQ ID NO: 10), and NT3; IG4-a95LY TCR-based CAR-CD28E(aNY-b/ a28tm28E) (SEQ ID NO: 11) (FIGS. 1 and 2), that recognize the peptide SLLMWITQC (SEQ ID NO: 25), corresponding to residues 157 to 165 of NY-ESO-1 (NY-ESO-1:157-165) with high affinity, in the context of the HLA-A*0201 class I restriction element.

The above-mentioned MFG retroviral backbone was employed to construct recombinant viral vector encoding one of two anti-NY-ESO-1 TCR of native forms (Vectors 1 and 2; FIGS. 1A, 1B), one of twelve anti-NY-ESO-1 TCR-based CARs (Vectors 3-15; FIGS. 1A, 1B), or anti-human mesothelin-CAR, or GFP.

(1) 1G4-a95LY TCR-vectors of anti-NY-ESO-1/A2 of native form (FIGS. 1A, 1B, 2A, 2B):

Vector 1 (NT1, NT1a, aNY-TCRa/b) (SEQ ID NOs: 9 and 12)

A MFG-based retroviral vector encoding a TCR that recognizes the peptide SLLMWITQC (SEQ ID NO: 25) in the context of the HLA-A*0201 class I restriction element, was generated in the retroviral vector backbone as previously described (Robbins P F et al., J Clin Oncol. 2011; 29:917-24 and Robbins et al., J Immunol. 2008; 180:6116-6131), but in the MFG-based vector. This TCR, termed 1G4-a95:LY, contained two amino acid substitutions in the third complementarity determining region of the native 1G4 TCR a chain that conferred to CD8+ and CD4+ T cells, an enhanced ability to recognize HLA-A*0201-positive target cells expressing the NY-ESO-1 antigen (Robbins P F et al, J Immunol. 2008; 180:6116-6131).

The 1G4 α- and β-chains were expressed in retroviral constructs that contained the "self-cleaving" P2A sequence (Szymczak et al., Nat. Biotechnol. 2004; 22:589-594) between the two gene products. The peptide sequence of the NT1 (aNY-TCRa/b) (SEQ ID NO: 9) (FIG. 3) was designed to be encoded by a nucleotide sequence (SEQ ID NO: 12). To facilitate the molecular subcloning of the gene of interest in the cloning site of the MFG-based vector, an XhoI site (CTCGAG, SEQ ID NO: 71), and a short sequence (CAGCCAGCGGCCGC, SEQ ID NO: 72) comprising of a NotI site (GCGGCCGC, SEQ ID NO: 73) were inserted immediately upstream of the "ATG" start codon and downstream of the stop codon "TAA" in the coding region, respectively (SEQ ID NO: 12).

Vector 2 (NT1b; aNY-TCRb/a)

Vector 2 (NT2; aNY-TCRb/a) (SEQ ID NOs: 64 and 65) was designed exactly the same as Vector 1 (NT1; aNY-TCRa/b) except that the DNA fragments encoding the native form of the TCR's alpha chain is located immediate downstream of the 3' end of the P2A encoding sequence while the beta chain located upstream of the P2A encoding sequence (FIGS. 1, 2, and 3).

(2) 1G4-a95LY TCR-CAR integrated with CD28 and CD3Z signaling-vector (NT2, NT3) (FIG. 1C and FIG. 1D)

Vector 3 (NT2; aNY-b/a28tm28Z) ($2^{nd}$ gen)

A recombinant retrovirus encoding two or more molecules that are identical or highly homologous at nucleic acid sequences may lead to homologous recombination, and as a result, genomic rearrangements, such as deletions and duplications of homologous genes may occur. For example, nucleic acid sequences encoding the Tm and Cyt domains of TCR-based CARs such as CD28TmCyt, CD3ZCyt and CD3ECyt segments may cause unwanted mutations and/or deletion of genes encoding the TCR-CARs during plasmid DNA and retroviral vector preparation processes. To address this problem, mutation procedures can be applied to suppress homology driven recombination between the repeated segments in the same vector.

The 28Z or 28E peptide sequence was preceded by the amino acids GSPK (SEQ ID NO: 69) as a linker (FIGS. 4 and 5), and linked to TCRa (TCR-Ca amino acids ending at SPESS) and TCRb (TCR-Cb amino acids ending at WGRAD) as previously described (Govers et al., Journal of Immunology, 2014, 193: 5315-5326).

The NT2 (Vector 3; aNY-b/a28tm28Z (1G4 a95LY TCR-based CAR) was designed to comprise 28Z signaling (FIG. 1C and FIG. 2C) (SEQ ID NO: 10).

To construct NT2 (FIG. 2C; SEQ ID NO: 10, 13), the extra cellular domain of the beta chain (SEQ ID NO: 5) and the extra cellular domain of the alpha chain (SEQ ID NO: 4) were molecularly linked, via a linker (amino acids GSPK (SEQ ID NO: 69) to the Tm and Cyt of human CD28 (28TmCyt) (SEQ ID NO: 6) and the Cyt of human CD3Z (ZCyt) (SEQ ID NO: 7), in which the CD28Z (SEQ ID NO: 15) immediately linked to the extra cellular domain of 1G4 a95LY TCR alpha chain were silently mutated without alternation of its original amino acid sequence (mu28muZ) (FIGS. 6-8) (SEQ ID NO: 21), in order to reduce the homology at the level of nucleotide sequences encoding the 28Z between those linked immediately to the C-terminus of Ec of the beta chain and alpha chain. Similar to the 1G4 a95LY TCR for native form (NT1, and NT1b), a "self-cleaving" P2A sequence (SEQ ID NO: 3) was also inserted in between the betaCD28Z and alphaCD28muZ (FIG. 4).

Vector 13 (NT26; aNY-b/a8h28pectm28Z) ($2^{nd}$ gen)

Vector 13 (NT26, SEQ ID NOs: 40 and 62) was designed and created in the same manner as Vector 3 (NT2) except that two DNA sequences encoding a same amino acid sequence of a human CD8a hinge (CD8h) (SEQ ID NO: 30) and partial human CD28 extracellular domain (CD28pec)

(SEQ ID NO: 26) were inserted between the amino acids GSPK (SEQ ID NO: 69) linked to the C-terminal of Cb and N-terminal of CD28Tm (SEQ ID NO: 42, 50), and between the amino acids GSPK (SEQ ID NO: 69) linked to the C-terminal of Ca and N-terminal of CD28Tm (SEQ ID NO: 43,51).

(3) 1G4-a95LY TCR-CAR integrated with CD28 and CD3E signaling-vector (NT3; aNY-b/a28tm28E) (FIGS. 1 and 2)

Vector 4 (NT3; aNY-b/a28tm28E) ($2^{nd}$ gen)

The design of the 28E cassette at amino acid sequence level was identical to that described previously, covering the Tm and Cyt (Ic) domains of human CD28 (GI: 338444, aa 153-220, numbering starting from first methionine), followed by the IC domain of human CD3ε (GI:4502670, aa 153-207) (Tan Van et al., J Immunol 2014; 193:5315-5326). The 28F cassette was preceded by the amino acids GSPK (SEQ ID NO: 69) and linked to the downstream of the Ec of the C alpha region (TCR-Ca amino acids ending at SPESS) and TCRb (TCR-Cb amino acids ending at WGRAD). A nucleotide sequence encoding the NT3 (SEQ ID NO: 14) comprising of a nucleotide sequence of Xho I immediately upstream of the coding region of the aNY-TCR28E site and a short fragment of 3 prime end franking and a Not I site were designed (FIG. 2D, FIG. 5, and FIG. 11) (SEQ ID NO: 14) (SEQ ID NO: 11) and commercially synthesized (BIO BASIC CANADA INC, Canada). G4 a95LY TCR-based CAR comprising 28E signaling (NT3; 1G4 a95LY TCR-28E) (aNY-b/a28tm28E) (FIG. 1D and FIG. 2D)

Similar to the aNY-TCR28Z (NT2; Vector 3), to construct IG4 a95LY TCR-based CAR comprising 28E signaling (1G4 a95LY TCR-28E; aNY-TCR28E; Vector 3), the Ec domains of the beta and alpha chains were molecularly linked, via a linker (amino acids GSPK (SEQ ID NO: 69), to the Tm domain and Cyt domain of human CD28 and Cyt of human CD3E, in which the CD28E immediately linked to the extra cellular domain of 1G4 a95LY TCR alpha chain were silently mutated without alteration of its original amino acid sequence (mu28muE) (FIG. 6), in order to reduce the homology at the level of nucleotide sequences encoding the 28E between those linked immediately to the C-termini of Ec domains of the beta chain and alpha chain. Similar to the 1G4 a95LY TCR, a "self-cleaving" P2A sequence (SEQ ID NO: 3) was also inserted in between the betaCD28E and alphamuCD28muE (FIG. 5).

(4) 1G4-a95LY TCR-CAR integrated with 4-1BB and CD3Z signaling-vectors (Vectors 5 (NT4; aNY-b/a8tmBBZ) and 6 (NT5; aNY-b/a28tmBBZ)

Vector 5 (NT4; aNY-b/a8tmBBZ) ($2^{nd}$ gen)

Vector 5 (SEQ ID NOs: 32 and 54) was designed and created in the same manner as Vector 3 (NT2) except that the DNA sequences encoding the Tm and Cyt domains of CD28 were replaced by DNA sequences encoding the Tm domain of human CD8 (SEQ ID NO: 31) (SEQ ID NOs: 52 and 53) and the Cyt domain of human 4-1BB (SEQ ID NO: 29) (SEQ ID NO: 48,49).

Vector 6 (NT5; aNY-b/a28tmBBZ) ($2^{nd}$ gen)

The vector 6 (NT5; aNY-b/a28tmBBZ) (SEQ ID NO: 33,55) was designed and created exactly the same as Vector 5 (NT4) except that the DNA sequences encoding the Tm domain of CD8 were replaced by DNA sequences encoding the Tm domain of human CD28 (SEQ ID NO: 29) (SEQ ID NOs: 48, 49).

(5) 1G4-a95LY TCR-CAR integrated with a combination of CD28 and 4-1BB and CD3Z signaling-vectors (Vectors 7 (NT6), 8 (NT21), 9 (NT22), 10 (NT23), 11 (NT24), 12 (NT25), 14 (NT27).

Vector 7 (NT6; aNY-b/a28tm28BBZ) ($3^{rd}$ gen)

Vector 7 (SEQ ID NO: 34, 56) was designed and created in the same manner as Vector 3 (NT2) except that the DNA sequences encoding the Cyt domain of human 4-1BB (SEQ ID NO: 29) (SEQ ID NOs: 48 and 49) were inserted between the Cyt domains of the C-terminal of CD28 and N-terminal of CD3Z, respectively.

Vector 11 (NT24; aNY-b8tm28Z/a8tmBBZ) ($3^{rd}$ gen)

Vector 11 (SEQ ID NO: 38, 60) was designed and created in the same manner as Vector 5 (NT4; aNY-b/a8tmBBZ) except that DNA sequence encoding the Cyt domain of 4-1BB located between the C-terminus of CD8Tm and N-terminus of CD3ZCyt in the first polypeptide comprising the Ec domain of TCR beta chain (i.e., upstream of P2A peptide) was replaced by a DNA sequence encoding the Cyt domain of human CD28.

Vector 12 (NT25; aNY-b8tm2828Z/a8tmBBBBZ)($3^{rd}$ gen)

Vector 12 (SEQ ID NOs: 39 and 61) was designed and created in the same manner as Vector 11 (NT24) except that an additional DNA sequence encoding the Cyt domain of CD28($2^{nd}$ unit of CD28Cyt) was inserted in between the C-terminal of CD8Tm and N-terminal of CD28Cyt in the $1^{st}$ polypeptide comprising the Ec the anti-NY-ESO-1TCR beta chain, and an additional DNA sequence encoding the Cyt domain of 4-1BB($2^{nd}$ unit of 4-1BBcyt) was inserted in between the C-terminal of CD8Tm and N-terminal of 41B-B in the $2^{nd}$ polypeptide comprising the Ec of the anti-NY-ESO-1TCR alpha chain.

Similar molecular designs and approaches as described above were employed to design and create the other vectors including Vector 8 (SEQ ID NOs: 35, 57; NT21; aNY-b28tm28Z/a8tmBBZ), Vector 9 (SEQ ID NOs: 36, 58; NT22; aNY-b28tm28Z/a8tmBB) Vector 10 (SEQ ID NOs: 37, 59; NT23; aNY-b28tm28Z/a28tmBBZ), Vector 14 (SEQ ID NOs: 41, 63; NT24; aNY-b8h28pectm28Z/a8tmBB) (Table 1), accordingly.

The DNA fragments encoding the fourteen anti-NY-ESO-1 TCRs or TCR-CARs (Vectors 1-14; Table 1), were commercially synthesized (BIO BASIC CANADA INC, Canada), and subsequently sub-cloned into XhoI/NotI sites of the MCS region of the MFG-based retroviral vector (FIG. 1C) in the manner as previously described (Yang W et al. Int Immunol. 2007; 19:1083-93). All vector inserts encoding TCR or TCR-CARs were verified by DNA sequencing.

Example 2. Generation of Retrovirus Encoding Relevant Gene Product of Interest

Phoenix ampho cells (a 293 cell derivative line with high calcium phosphate transfection efficiency) were transfected individually with the fourteen vectors (Table 1; FIGS. 1, 2). Viral supernatants (containing virions) of the transfected Phoenix cells were collected, immediately used to infect PG13 cells or other mouse cells, or stored in −80° C. for future use, followed by standard protocols known in the art such as those described in Yang W et al., Int Immunol. 2007; 19:1083-93 and Beaudoin E L et al., J Virol Methods 2008; 148:253-9.

PG13 cells, a viral producing cell (VPC) line, were infected with the retroviral supernatant obtained from Phoenix cells transfected separately with vectors of interests. FACS-based cell sorting was conducted to enrich corresponding vector-infected PG13 cells. Infected PG13 cells were enriched by cell sorting for human TCR Vβ13.1 chain positive cells after staining with FITC anti-human TCR V013.1 Antibody (EBIOSCIENCE, AFFYMETRIX, and THERMO FISHER SCIENTIFIC), or NYpep/A2 tetramer (Tetramer/APC—HLA-A*02:01 NY-ESO-1 (SLL-MWITQC; SEQ ID NO: 25) (Fred Hutchinson Cancer Research Center, Seattle, WA 98109, USA) positive cells as previously described. Production of high titer retrovirus supernatant with enriched VPCs followed standard protocols known in the art.

In one instance, prior to FACS-based cell sorting of enrichment of TCR+ or TCR-CAR+PG13 cells after viral infection, the infected PG13 cells were subjected to FACS analysis. PG13 cells were infected with a retroviral supernatant obtained from Phoenix cells transfected separately with vectors encoding three anti-NY-ESO-1 TCR-CARs (NT22, NT24, and NT25). The infected PG13 cell lines (without previous enrichment for CAR+ cells by FACS-based cells sorting) were analyzed for surface expression of TCRVbl3.1 and binding of NYpep/A2 tetramer by FACS. Live cells were gated for analysis. Shown in FIG. 26 are Intensity plots showing positive staining of single or double positive cells to FITC-anti-human TCRVb13.1 and APC-NYpep/A2 tetramer, individually.

Example 3. Generation of Activated Human T Cells Transduced Individually with Retrovirus Anti-CD3 antibody-activated human T cells (ATC) derived PBMC were individually transduced with each of seven vectors: aNY-TCRs (NT1, NT1b) and aNY-TCR-CARs (NT2, NT3, NT4, and NT5, NT6) (Table 1) in the manner described in Yang W et al., Int Immunol. 2007; 19:1083-9. Seven to ten days post transduction, flow cytometry analysis was conducted by staining with a combination of FITC-anti-human TCR V013.1 and Tetramer/APC—HLA-A*02:01 NY-ESO-1 (SLLMWITQC, SEQ ID NO: 5) (Fred Hutchinson Cancer Research Center, Seattle, WA). The results are shown in FIG. 27.

As shown in the figure, the two $2^{nd}$ gen anti-NYESO-1/A2 TCR-CARs (NT2 and NT3) expressed at significantly higher levels on the transduced ATC (including CD4+ and CD8+ cells) cells both for human TCRVb13.1 and NYpep/A2 tetramer-binding TCRs compared to the native forms (NT1 and NT1b). Approximately 3.9% of the un-transduced cells (Untd) were also positive for TCRVb13.1 staining, but these cells do not significantly stained with APC-NYpep/A2 tetramer.

It was found that between 1°0.4-51.2% of activated T cells bound to the Tetramer/APC-HLA-A*02:01 NY-ESO-1. The expression of TCR V013.1 on their cell surface was measured based on FITC anti-human TCR Vβ13.1 antibody (EBIOSCIENCE/AFFYMETRIX, CA) staining and similar percentages of activated T cells expressed correct pairs of functional 1G4 a95LY TCR Ec domain on the cell surface based on positive tetramer staining with Tetramer/PE—HLA-A*02:01 NY-ESO-1 followed by FACS analysis. Further analysis indicated that approximately half of CAR+ CD3+ cells of infected activated human T cells were CD4+ (52%) and CD8+(48%).

Example 4. Antigen Specific-Mediated Secretion of Cytokine IL-2 of Human ATC Transduced with Anti-NY-ESO-1 TCR or One of the Two TCR-Based CARs In this example, the activity of inducing cytokine secretion by activated human T cells was examined by detecting IL-2 secretion in media where the T cells were co-cultured with HLA-A0201+ target cells in the absence and presence of various amounts of specific antigen peptides.

Briefly, $0.5 \times 10^5$ of HLA-A0201+ target cells (T2 cells, 174× CEM.T2, ATCC CRL-1992™) were incubated in absence or presence of various concentrations of peptide NY-ESO-1 (SLLMWITQC, SEQ ID NO: 25) at 10 nM, 100 nM and 2 uM) in culture medium for 3 hours at 37° C. The cells were washed twice to remove unbound peptides and then co-cultured with $1.5 \times 10^5$ activated T cells that were transduced individually with vectors NT1 (NT1a), NT1b, NT2 and NT3 (FIG. 2) in 200 ul of culture medium (complete RPMI 1640+10% FCS+Pen/Strep) (R-10) per well of a U-bottom 96-well plate for 24 hours.

The cultured supernatants were collected and measured for IL-2 concentrations by ELISA detection kit (EBIOSCIENCES). Resulting IL-2 secretion data show that activated T cells transduced individually with all three anti-NY-ESO-1 vectors NT1 (NT1a), NT1b, NT2 and NT3 (FIG. 2) specifically secreted IL-2, upon engagement with the NY-ESO-1 peptide-pulsed-T2 cells, but not T2 cells un-pulsed with the NY-ESO-1 peptide, or pulsed with negative control peptides.

It was found that the T cells transduced with NT2 secreted the highest amounts of IL-2 among the three while the T cells transduced with NT1 produced the lowest amount at the same concentrations of peptide at which T2 cells were pulsed. These results indicate that both the two TCR-CARs (NT2 and NT3) were superior to the NT1 (FIG. 2A) in transduced TCR- or TCR-CAR mediated T cell activation.

Example 5. Specific Killing of Tumor Cells by ATC Transduced with Anti-NY ESO-1 TCR or One of the Two TCR-Based CARs In this example, assays were carried out to examine activities of killing tumor cell by activated human T cells (ATC) transduced with anti-NY-ESO-1 TCR or TCR-based vectors NT1, NT1b, NT2 and NT3 (FIG. 2) using Saos-2 cells (ATCC® HTB-85™). Saos-2 cell line, a human osteosarcoma cell line, is NY-ESO-1+ and HLA-A0201+.

Figure 28:
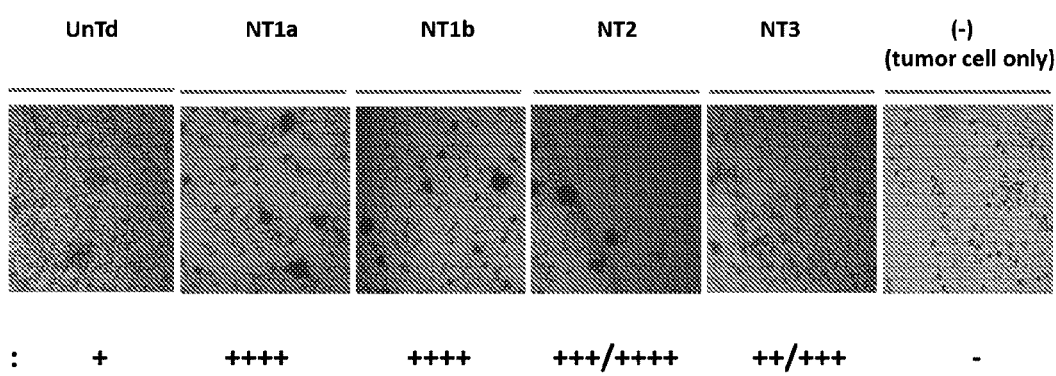
FIG. 28 is a set of photographs showing specific killing of tumor cells (Saos-2) by ATC transduced with one of the two anti-NY ESO-1 TCR (NT1, NT1b) or one of the two $2^{nd}$ gen TCR-based CARs (NT2 and NT3).

Briefly, $1 \times 10^3$ Saos-2 cells were pre-plated on to a well of a 96-flat well tissue culture plate for 12 hours. Then, $1 \times 10^4$ un-transduced or transduced human T cells were added to each well. These T-cells had been un-transduced or transduced individually with the three vectors, NT1, NT2 and NT3 in a complete RPMI 1640+10% FCS+Pen/Strep medium (R10) complemented with 90 IU of rec hu IL-2/ml). The cells were cultured for up to 5 days (120 hrs.) (FIG. 28). The survival tumor target cells, which were profoundly larger than and distinct from T cells, attached to the bottom of wells, and were observed and graded daily.

The killing activity of T cells was graded as: "++++", 75-100% killing; "++++", 75-100% killing; "+++", 50-75% killing; "++", 25-50% killing; "+", 0-25% killing, by comparing the surviving tumor cell number from the wells with T cells to those from the wells without T cells. Photos of representative views of wells under microscope were taken at day 5 (120 hrs) post the addition of T cells. See FIG. 28.

As shown in the figures, ATCs expressing aNY-TCRa/b (NT1 (NT1a) and NT1b) exhibited similar, highest tumor-killing activities. ATC-expressing NT2 exhibited slightly lower killing activity, and those with NT3 showed relatively lower killing ability. Un-transduced ATC showed no notable killing. These results suggest that human T cells transduced individually with the four vectors can specifically kill the Saos-2 tumor cells.

Example 6. Antigen Specific-Mediated Secretion of Cytokine IL-2 and INF-γ

In this examples, assays were carried out to examine cytokine secretion by ATC transduced with one of the two anti-NY ESO-1 TCR (NT1 (NT1a) and NT1b) or one of the two 2$^{nd}$ gen TCR-based CARs (NT2 and NT3).

Figures 29A, 29B:
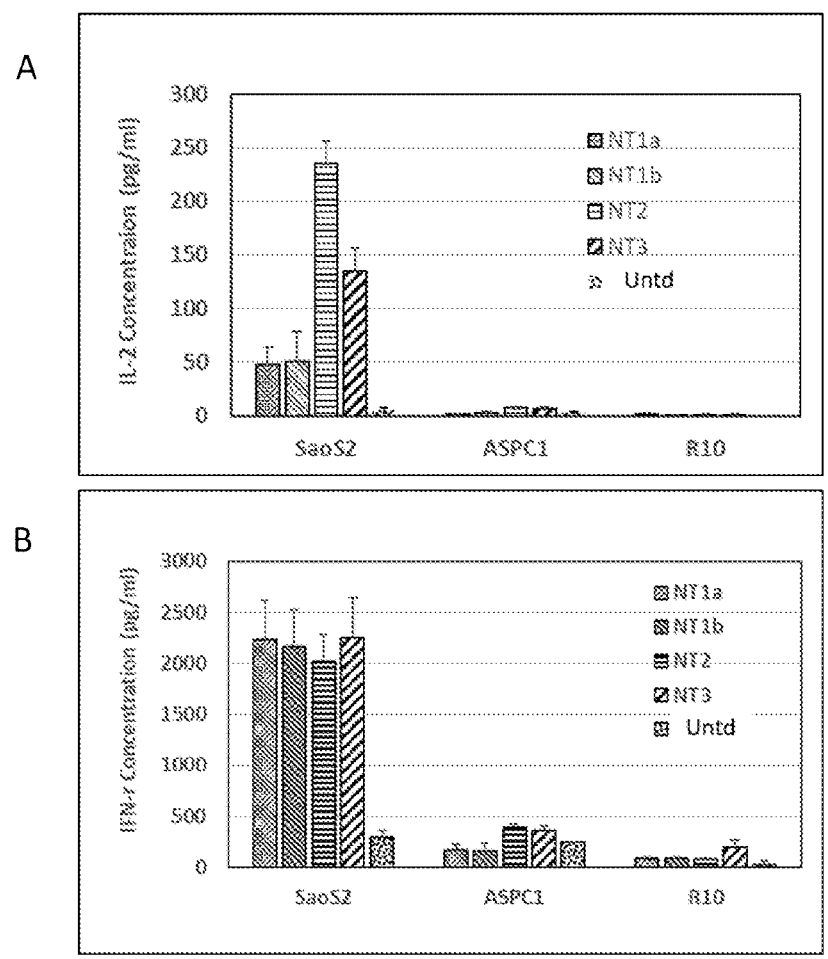
FIGS. 29A and 29B are diagrams showing cytokine secretion of by ATC transduced with one of the two anti-NY ESO-1 TCR (NT1, NT1b) or one of the two $2^{nd}$ gen TCR-based CARs (NT2 and NT3). (A) IL-2 secretion and (B) INF-γ secretion, where data are presented as the mean number±S.D. from three samples in each group.

ATC transduced with NT1a, NT1b, NT2, or NT3 were prepared in the manner described above. The percentages of T cells that were NYpep/A2 positive based on APC-NYpep/A2 tetramer staining by FACS (for NT1a, NT1b, NT2, and NT3) were adjusted to 20% with un-transduced T cells ("untd") as describe above. Then, 0.5×10$^6$ target cells (Saos-2 or control AspCl) or media only (RPMI-1640+10% FCS+Pen/Strep)(R10) without any IL-2 added) were co-cultured with 2×10$^6$ of the ATCs transduced with NT1a, NT1b, NT2, or NT3 in a 24-flat well tissue culture plate in a total volume of 1.5 ml of R10 (without any IL-2 added) for 24 hours. Concentrations of IL-2 or INF-γ in the cell supernatants were measured by ELISA with kits from BIOLEGENDS (Cat #s. 431804 and 430101). The results are shown in FIG. 29. As shown in FIG. 29A, T cells transduced with NT2 secreted the highest amount of IL-2 (about 230 pg/ml), while those with NT3 secreted a moderate amount of IL-2, and those with either of the two native form of anti-NY-ESO-1/A2 TCR (NT1 and NT1b) secreted the lowest amount.

Example 7. Changes of Percentages of NYpep/A2+ Cells of ATC Transduced with NT1, NT1b, NT2 and NT3

ATC transduced with one of the two anti-NY ESO-1 TCR (NT1 and NT1b) or one of the two 2$^{nd}$ gen TCR-based CARs (NT2 and NT3) were prepared in the manner described above. The percentages of T cells that were NYpep/A2 positive based on APC-NYpep/A2 tetramer staining by FACS (for NT1a, NT1b, NT2, and NT3) were adjusted to 20% with untd T cells as described above.

Figure 30:
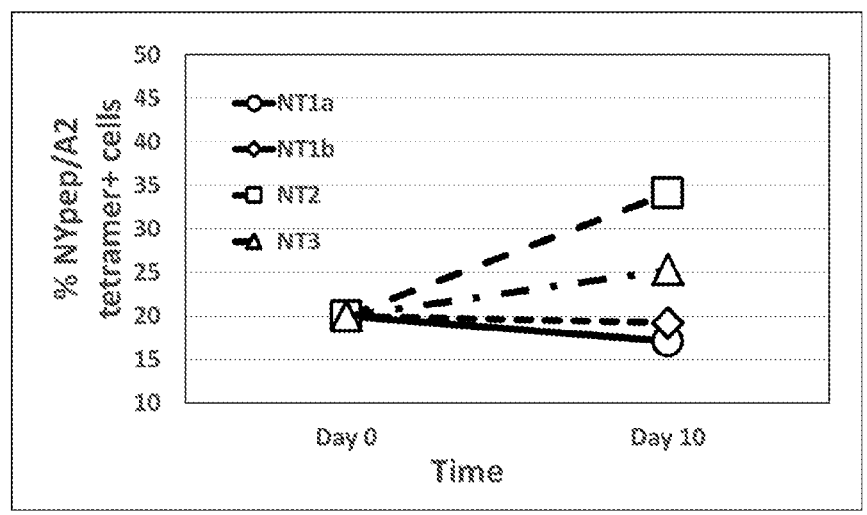
FIG. 30 is a diagram showing changes of percentages of NYpep/A2+ cells of ATC transduced with one of the two anti-NY ESO-1 TCR (NT1 and NT1b) or one of the two $2^{nd}$ gen TCR-based CARs (NT2 and NT3) post co-culture with tumor target cells (Saos-2)

On day 1, 1×10$^6$ target cells (Saos-2) were co-cultured with 4×10$^6$ of the ATC transduced with NT1a, NT1b, NT2, or NT3 in a 12-flat well tissue culture plate in a total volume of 4 ml of R10 containing 90 IU IL-2/ml for 48 hours. On day 3, the cells were transferred to a new 24-well plate. On day 6, cells from each well were split into two wells with R10 containing 180 IU IL-2/ml in a total volume of 4 ml/well. On day 10, the cells were harvested and analyzed for binding of NYpep/A2 tetramer by FACS. The results are shown in FIG. 30. As shown in the figure, live cells were gated for analysis and percentage of positive cells were shown. It was found that the percentage of NYpep/A2 positive was most significantly increased in NT2 (about 32%), while a medium increase was observed in NT3 (approx. 25%) and a decreased was observed in the NT1a and NT1b groups (about 17-19%).

Example 8. Analysis of 2$^{nd}$ Gen TCR-CAR and 3$^{rd}$ Gen TCR-CAR

In this example, assays were carried out to examine and compare anti-NY-ESO-1 TCRs of a native form and TCR-CARs of 2$^{nd}$ or 3$^{rd}$ gen on transduced activated human T cells.

Figures 31A, 31B:
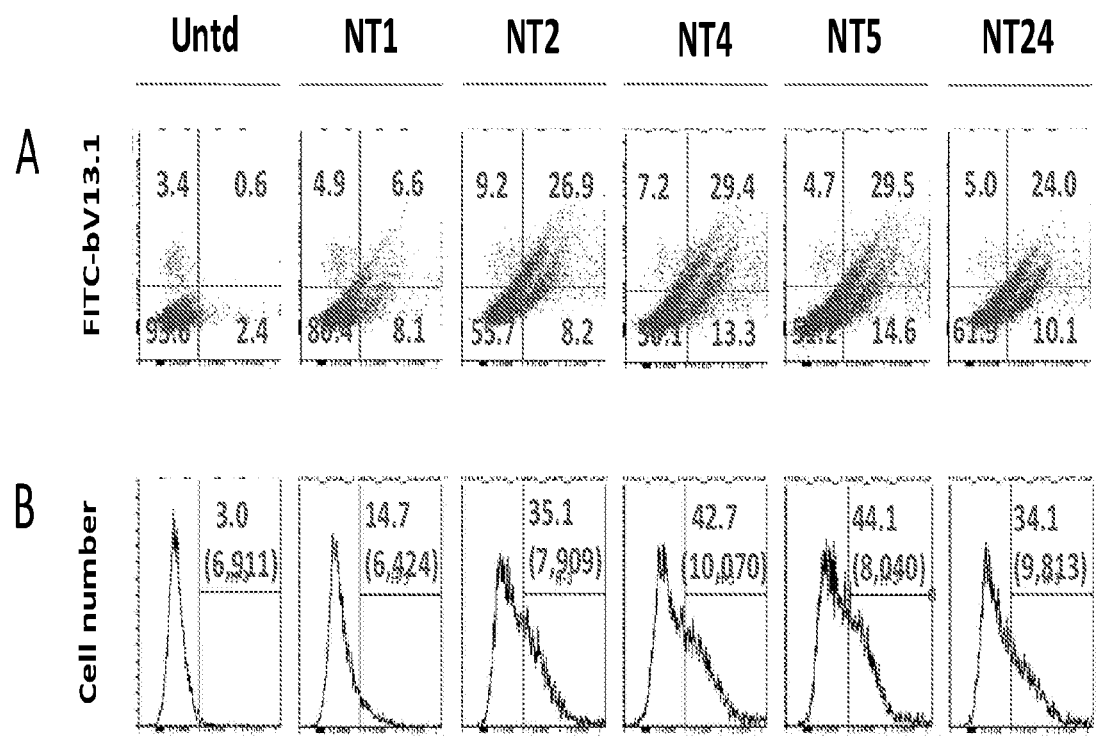
FIGS. 31A and 31B are diagrams showing surface expression of anti-NY-ESO-1 TCRs of a native form or TCR-CARs of $2^{nd}$ or $3^{rd}$ gen on transduced activated human T cells. The ATC that were evaluated were transduced with anti-NY ESO-1 TCR (NT1 (also named NT1a); Vector 1) or anti-NY-ESO-1 TCR-CAR+(NT2 (Vector 3; $2^{nd}$ gen), NT4 (Vector 5; $2^{nd}$ gen), NT5 (Vector 6; $2^{nd}$ gen), NT24 (Vector 11; $3^{rd}$ gen), or left untransduced (Untd)). (A) Intensity plots showing positive staining of single or double positive cells to FITC-anti-human TCRVb13.1 and APC-NYpep/A2 tetramer, individually. % of positive cells were shown in individual quadrants. (B) Histograms shows % of cells that were stained positive to NYpep/A2 tetramer (the digit numbers in the parentheses indicate the geomeans).

First, surface expression of the TCRs or TCR-CARs on transduced activated human T cells were examined. Briefly, anti-CD3 antibody-activated human T cells were untransduced (Untd), or transduced with virus containing supernatant derived from previously sorted-anti-NY-ESO-1 TCR+ (NT1 (also named NT1a) or anti-NY-ESO-1 TCR-CAR+ (NT2; 2$^{nd}$ gen), NT4 (Vector 5; 2$^{nd}$ gen), NT5 (Vector 6; 2$^{nd}$ gen), and NT24 (Vector 11; 3$^{rd}$ gen) cell lines as describe above. Seven to ten days post transduction, the transduced T cells were analyzed for surface expression of TCRVb13.1 and binding of NYpep/A2 tetramer by FACS. Live cells were gated for analysis. The results are shown in FIGS. 31A and B. As shown in the figures, T cells transduced with each of the three 2$^{nd}$ gen anti-NY-ESO-1 TCR-CARs (NT2, NT4 and NT5) expressed the most and similar highest levels of TCRVb13.1 an NYpep/A2 tetramer-binding TCR or TCR-CARs as determined by TCRVb13.1 an NYpep/A2 tetramer staining by FACS. Those with the 3$^{rd}$ gen TCR-CAR NT24 exhibited relatively lower double TCRVb13.1 and NYpep/A2 tetramer-binding+ cells, while those with the native form TCR (NT1) exhibited the lowest percentage of double TCRVb13.1 and NYpep/A2 tetramer-binding+ cells.

Figure 32:
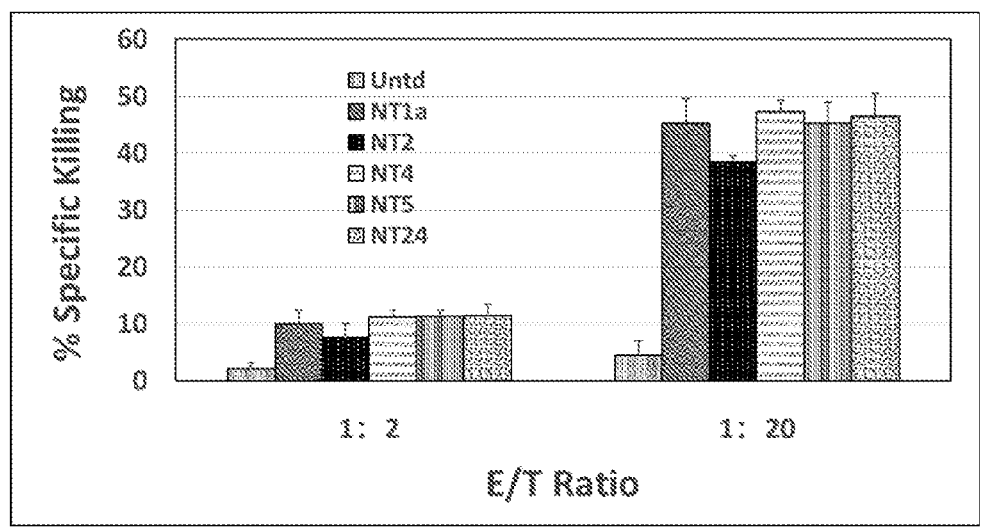
FIG. 32 is a diagram showing killing of target cells by human ATC transduced with anti-NY ESO-1 TCR or one of the four TCR-based CARs post engagement with target cells (Saos-2). The ATC that were evaluated were transduced with anti-NY ESO-1 TCR (NT1 (also named NT1a); Vector 1) or anti-NY-ESO-1 TCR-CAR+(NT2 (Vector 3; $2^{nd}$ gen), NT4 (Vector 5; $2^{nd}$ gen), NT5 (Vector 6; $2^{nd}$ gen), NT24 (Vector 11; $3^{rd}$ gen), or left untransduced (Untd)).

Second, assays were carried out to examine the ability of killing of target cells by human ATC transduced with anti-NY ESO-1 TCR or one of the four TCR-CARs post engagement with target cells. Briefly, ATC transduced with NT1 (also named NT1a), NT2, NT4, NT5, or NT24 were prepared as described above. Killing of antigen-specific target cells for these activated human T cells was carried out in vitro killing assay in which transduced human T cells (effector) were co-cultured with Saos-2 tumor cells (target) in the presence of cytokine IL-2. In the experiment, human T cells transduced individually with NT1a, NT2, NT4, NT5, or NT24 were adjusted to 15% NYpep/A+ with untd T cells, then co-cultured with Saos-2 tumor cells (target) for 12 hrs in the presence of cytokine IL-2 in the E/T ratios of 1:2 and 1:20, respectively. At the end of incubation, the T cell-mediated cytotoxicity was measured using the Cayman's 7-AAD/CFSE Cell-Mediated Cytotoxicity Assay Kit. The results are sown in FIG. 32, where the data are presented as the mean number±S.D. from three samples in each group. As shown in FIG. 32, T cells transduced with one of NT1a or one of the three TCR-based CARs (NT4, NT5 and NT24) that comprising TCR signal 2 derived from 4-1BB show the highest and similar target cell killing ability at both E/T ratios (1:2 and 1:20). Those with the NT2 (TCR-CAR of 2$^{nd}$ gen comprising only TCR signal 2 derived from CD28) exhibited a slightly lower killing ability. No significant killing of target cells was seen with untransduced cells (Untd).

Figures 33A, 33B:
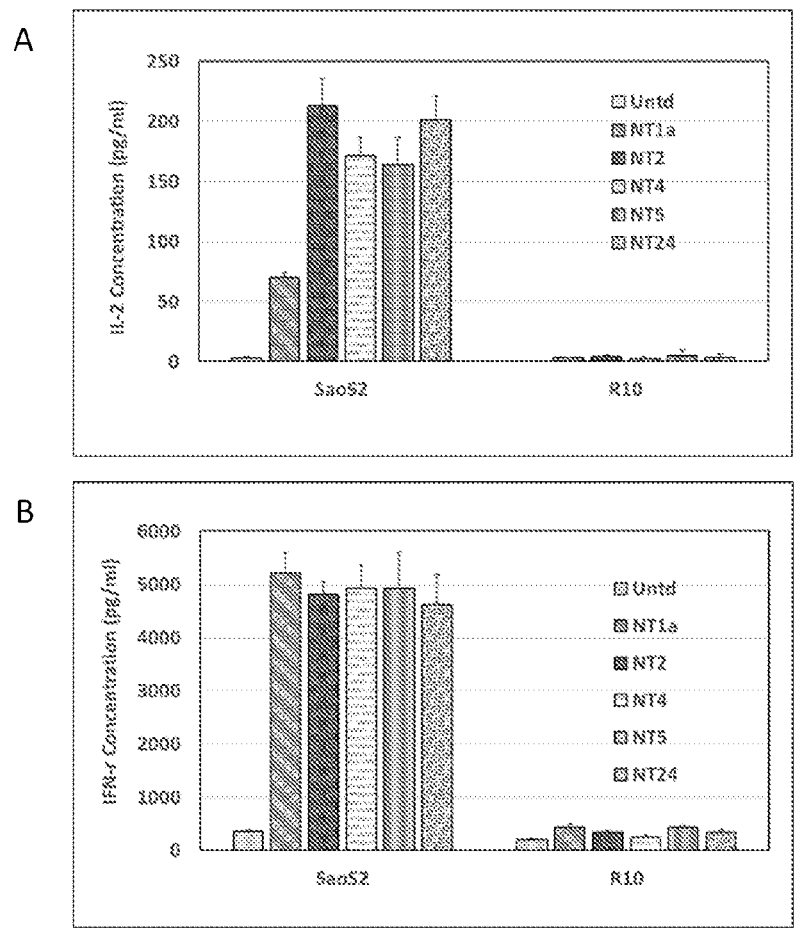
FIGS. 33A and 33B are diagrams showing (A) IL-2 secretion and (B) IFN-γ of human ATC transduced with anti-NY ESO-1 TCR or one of the four TCR-based CARs post engagement with target cells (Saos-2). The ATC that were evaluated were transduced with anti-NY ESO-1 TCR (NT1 (also named NT1a); Vector 1) or anti-NY-ESO-1 TCR-CAR+ (NT2 (Vector 3; $2^{nd}$ gen), NT4 (Vector 5; $2^{nd}$ gen), NT5 (Vector 6; $2^{nd}$ gen), NT24 (Vector 11; $3^{rd}$ gen)). The ATC were transduced with anti-NY ESO-1 TCR (NT1 (also named NT1a); Vector 1) or anti-NY-ESO-1 TCR-CAR+(NT2 (Vector 3; $2^{nd}$ gen), NT4 (Vector 5; $2^{nd}$ gen), NT5 (Vector 6; $2^{nd}$ gen), NT24 (Vector 11; $3^{rd}$ gen)), or left untransduced (Untd)).

Third, cytokine secretion of human ATC transduced with the TCR or TCR-based CARs post engagement with target cells were examined. The ATC transduced with NT1a, NT2, NT4, NT5, or NT24 were prepared as described above. The transduced T cells were again adjusted to 15% NYpep/A+ with untd T cells. Then, 0.5×10$^6$ target Saos-2 cells or media only (R10) were co-cultured with 2×10$^6$ of the transduced ATC or untransduced human T cells (Untd) in a 24-flat well tissue culture plate in a total volume of 1.5 ml of R10 (without any IL-2 added) for 24 hours. Cytokine concentrations in the cell supernatants were measured by ELISA as described above. The results are shown in FIGS. 33A and B, where the data are presented as the mean number±S.D. from three samples in each group. As shown in FIG. 33A, those with NT2 or NT24 (both comprising one (NT24) or two (NT2) TCR signaling 2 derived from human CD28) secreted the highest amount of IL-2 (about 200 pg/ml, and 215 pg/ml, respectively). Those with the NT4 or NT5 (with TCR signal 2 from 4-1BB) produced moderate amounts (about 170 pg/ml and 165 pg/ml, respectively). Those with the native form of anti-NY-ESO-1/A2 TCR (NT1) secreted the lowest amount. For IFN-γ as shown FIG. 33B, the ATC transduced with NT1 (also named NT1a), NT2, NT4, NT5, and NT24 secreted similar levels of IFN-γ upon engagement with target Saos-2 cells, but not in the absence of target cells (R10 control). The negative control cells Untd did not produce significant amount of IL-2 or IFN-r in the presence or absence of target cells.

Figures 34A, 34B:
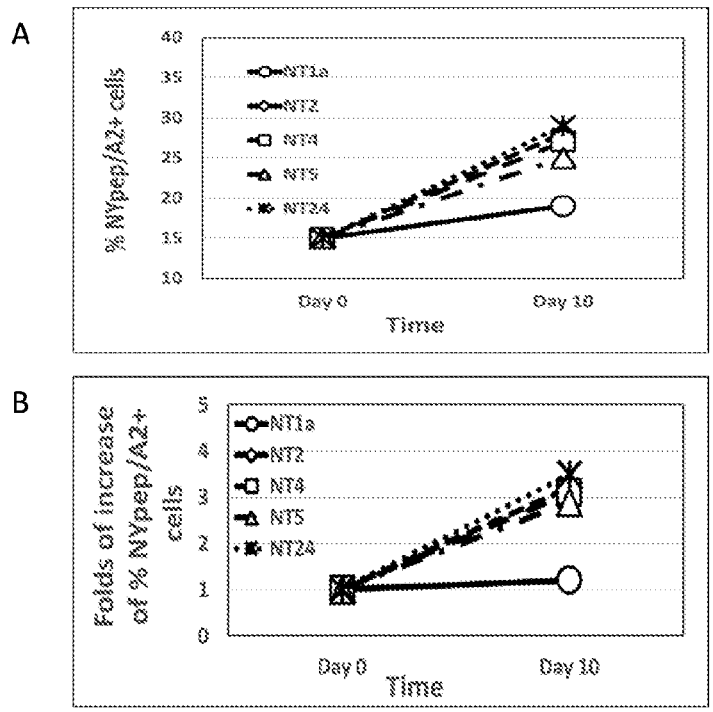
FIGS. 34A and 34B are diagrams showing changes of (A) percentages and (B) expansion of NYpep/A2+ ATC transduced with anti-NY ESO-1 TCR or one of the four TCR-based CARs post engagement with target cells (Saos-2). The ATC that were evaluated were transduced with anti-NY ESO-1 TCR (NT1 (also named NT1a); Vector 1) or anti-NY-ESO-1 TCR-CAR+(NT2 (Vector 3; $2_{nd}$ gen), NT4 (Vector 5; $2_{nd}$ gen), NT5 (Vector 6; $2_{nd}$ gen), NT24 (Vector 11; $3^{rd}$ gen)), or left untransduced (Untd)).

Finally, assays were carried out to examine changes of percentages and expansion of NYpep/A2+ ATC transduced with anti-NY ESO-1 TCR or one of the four TCR-based CARs post engagement with target cells. Briefly, on day 1, ATC transduced with NT1a, NT2, NT4, NT5 or NT24 were adjusted to 15% NYpep/A+ with untd T cells. Then, 1×10⁶ target Saos-2 cells were co-cultured with 6×10⁶ of ATC that were previously adjusted to 15% NYpep/A+ cells and consisted of 0.9×10⁶ NYpep/A+ cells in a 12-flat well tissue culture plate in a total volume of 5 ml of R10 containing 90 IU IL-2/ml for 48 hours. On day 3, all cells were transferred to a new 12-well plate. On day 6 (6 days post the initial of co-culture), cells in each well were split into two new wells with R10 containing 180 IU IL-2/ml in a total volume of 5 ml/well. On day 10, the suspended cells were harvested, counted under microscopic examination with trypan blue staining, and analyzed for binding of FITC-anti-human CD3 antibody and APC-NYpep/A2 tetramer by FACS. It was found that over 95-98% of live cells were CD3+(data not shown). Live and CD3+ cells were gated for analysis. The results are shown in FIGS. 34A and B. The total numbers of NYpep/A2+ ATC were calculated based on formula:

total number of live cells (by trypan blue staining)×% of NYpep/A2+ cells as shown in FIG. 34A/total number of NYpep/A2+ ATC.

As shown in FIG. 34A, percentage of NYpep/A2 positive cells significantly increased from 15% to similar levels in all four TCR-CARs (NT2, NT4, NT5 and NT24) ranging from 25.3% to 29.2%; 28.4%, 27.1%, 25.3% and 29.2%, respectively. That for the NT1a increased slightly increased to 19.1%. As shown in FIG. 34B, the folds of increase for NT2, NT4, NT5 and NT24 were 3.2, 3.1, 2.9, and 3.5, respectively, while that for NT1a was 1.2.

Example 9. In Vivo Anti-Tumor Activities

In this example, xenograft tumor murine models were used to examine in vivo anti-tumor activities of T-cells transduced with vectors described herein.

Briefly, 5 days prior to adoptive cell transfer of effector T cells (Day −5), Saos-2 cells were injected subcutaneously into the hind flank of SCID female mice in 100 ul PBS at e.g., 3×10⁶ cells/mouse. Activated human T cells transduced individually with retrovirus encoding NT1a, NT2, NT4, and NT24 or un-transduced human T cells (Untd) were prepared as described above for FIG. 31.

On Day 0, the mice were divided into five groups, six mice in each. ATC transduced with NT1a, NT2, NT4, NT5, or NT24 were adjusted to 15% NYpep/A+ with un-transduced T cells. The cells (containing both CD4+ and CD8+ T cells) were then administered intravenously into the tail vein at a dose of 1×10' T cells/100 ul PBS/mouse.

Figures 35A, 35B:
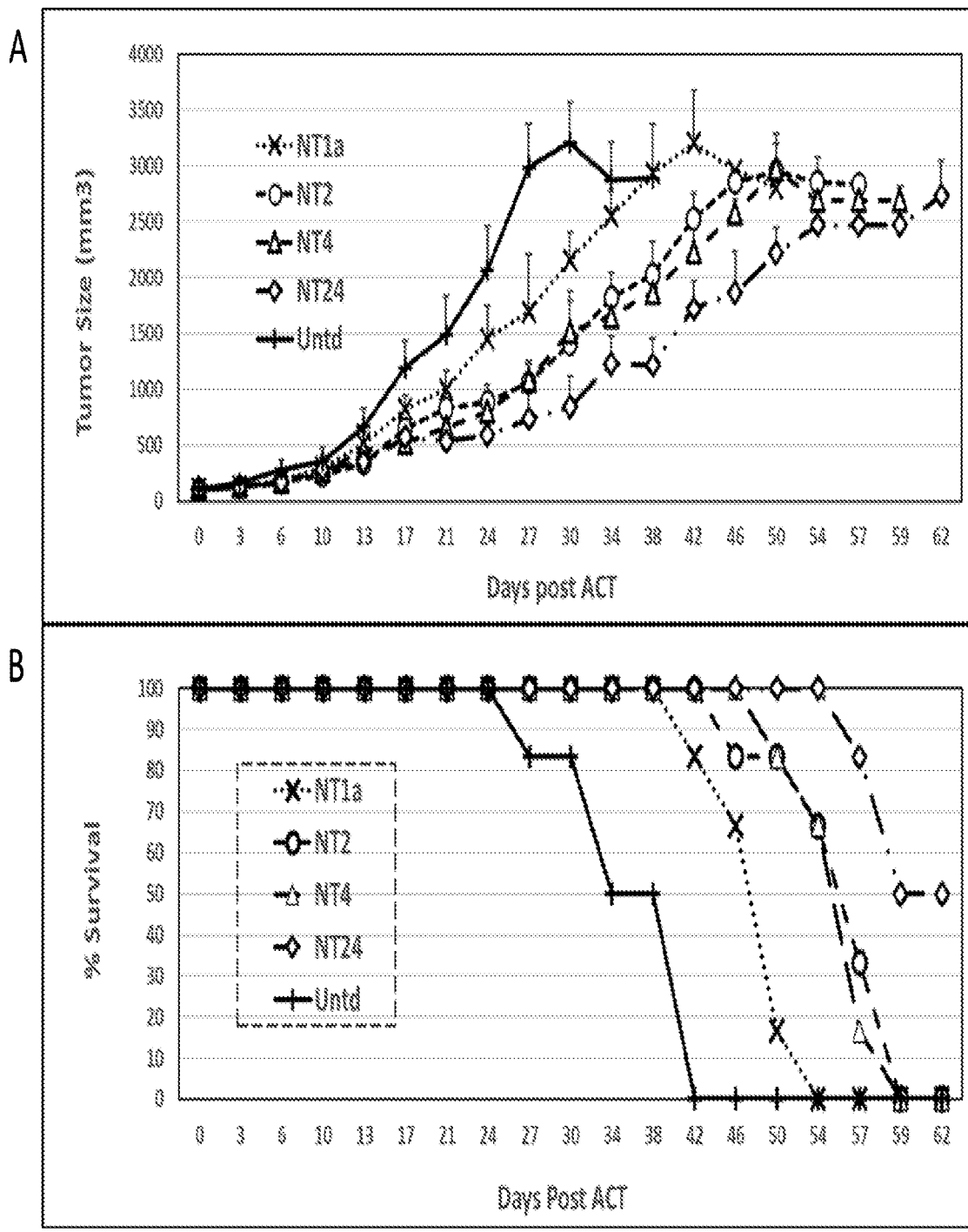
FIGS. 35A and 35B are diagrams showing in vivo therapeutic effects of expression of $2^{nd}$ gen or $3^{rd}$ gen TCR-CARs in possible enhanced anti-NY-ESO-1/A2 TCR CAR-mediated anti-tumor activity in human T cells in Xenograft Saos-2 tumor murine models. The ATC that were evaluated in the in vivo anti-tumor therapeutic experiment were transduced with anti-NY ESO-1 TCR (NT1 (also named NT1a); Vector 1) or anti-NY-ESO-1 TCR-CAR+(NT2 (Vector 3; $2^{nd}$ gen), NT4 (Vector 5; $2^{nd}$ gen), NT5 (Vector 6; $2^{nd}$ gen), NT24 (Vector 11; $3^{rd}$ gen)), or left untransduced (Untd)). (A)

The mice were monitored for tumor growth. Tumor size was measured with calipers, and tumor volume was calculated using the formula (Tumor Measurement (mm³) =Length×Width×Height×0.5236). Mice sacrificed due to oversize of tumor or found dead were excluded from collection and analysis of data on tumor sizes. The results are shown in FIG. 35. As shown in the figures, only the NT24 group had all 6 mice (100%) still alive on day 54 post ACT administration. In contrast, 0, 4, 4, and 0 of the mice in the NT1, NT2, NT4 and Untd groups respectively were alive. In addition, at the end of the experiment on day 62 post ATC, while none of the six was alive in the NT1, NT2, NT4 and Untd group, respectively, 3 out of 6 (50%) mice in the NT24 group were alive.

These in vivo data indicate that the $3^{rd}$ gen anti-NY-ESO-1/A2 TCR-CAR NT24 is significantly more potent that its counter parts of $2^{nd}$ gen with only TCR signal 2 only from human CD28 (NT2) or only from 4-1BB (NT4), and even more potent than the native form NT1 (NT1a). The data also suggest that the both of the two $2^{nd}$ gen anti-NY-ESO-1 TCR-CARs show superior anti-tumor activity than the native from NT1 (NT1a).

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the scope of the invention, and all such variations are intended to be included within the scope of the following claims. All references cited herein are incorporated by reference in their entireties.

---

What is claimed is:

1. An antigen receptor, comprising (I) a first polypeptide chain that comprises an extracellular domain comprising a T cell receptor (TCR) beta chain or an antigen-binding fragment thereof, a transmembrane domain, and a cytoplasmic domain, and (II) a second polypeptide chain that comprises an extracellular domain comprising a TCR alpha chain or an antigen-binding fragment thereof, a transmembrane domain, and a cytoplasmic domain, wherein
   the TCR beta chain and the TCR alpha chain form an antigen binding site, and
   wherein (i) the cytoplasmic domain of the first polypeptide chain comprises a cytoplasmic domain of human CD28 and a cytoplasmic domain of human CD3zeta, and (ii) the cytoplasmic domain of the second polypeptide chain comprises a cytoplasmic domain of a human 4-1BB and a cytoplasmic domain of human CD3zeta.

2. The antigen receptor of claim 1, wherein
   the first polypeptide chain comprises 1 copy of the transmembrane domain of human CD28, 1 copy of the cytoplasmic domain human CD28, and 1 copy of the cytoplasmic domain of human CD3zeta, and
   the second polypeptide chain comprises 1 copy of the transmembrane domain of human CD8, and 1 copy of the cytoplasmic domain human 4-1BB.

3. The antigen receptor of claim 1, wherein
   the first polypeptide chain comprises 1 copy of the transmembrane domain of human CD8, 1 copy of the cytoplasmic domain human CD28, and 1 copy of the cytoplasmic domain of human CD3zeta, and
   the second polypeptide chain comprises 1 copy of the transmembrane domain of human CD8, 1 copy of the cytoplasmic domain human 4-1BB, and 1 copy of the cytoplasmic domain of human CD3zeta.

4. The antigen receptor of claim 1, wherein
   the first polypeptide chain comprises 1 copy of the transmembrane domain of human CD8, 2 copies of the cytoplasmic domain human CD28, and 1 copy of the cytoplasmic domain of human CD3zeta, and
   the second polypeptide chain comprises 1 copy of the transmembrane domain of human CD8, 2 copies of the cytoplasmic domain human 4-1BB, and 1 copy of the cytoplasmic domain of human CD3zeta.

5. The antigen receptor of claim 1, wherein the transmembrane domain of the first or the second polypeptide chain comprises one selected from the group consisting of a transmembrane domain of CD8 and a transmembrane domain of CD28.

6. The antigen receptor of claim 1, wherein the antigen binding site binds to a tumor antigen, or a tumor-related antigen (TAA), or a viral antigen in the context of MHC (HLA) restricted fashion, or wherein the extracellular domains, when expressed on a cell, bind to a tumor antigen, or a TAA, or a viral antigen, in the context of MHC (HLA) restricted fashion.

7. The antigen receptor of claim 6, wherein the tumor antigen is NY-ESO-1.

8. A fusion protein comprising the first polypeptide chain and the second polypeptide chain recited in claim 1, wherein the first polypeptide chain and second polypeptide chain are linked by a protein linker sequence or a self-cleaving peptide sequence.

9. A cell comprising the antigen receptor of claim 1.

10. A pharmaceutical composition comprising (i) the cell of claim 9, and (ii) a pharmaceutically acceptable carrier.

* * * * *